US012352505B2

(12) United States Patent
Von Behrens

(10) Patent No.: US 12,352,505 B2
(45) Date of Patent: Jul. 8, 2025

(54) THERMAL ENERGY STORAGE SYSTEMS WITH IMPROVED SEISMIC STABILITY

(71) Applicant: Rondo Energy, Inc., Alameda, CA (US)

(72) Inventor: Peter Emery Von Behrens, Oakland, CA (US)

(73) Assignee: Rondo Energy, Inc., Alameda, CA (US)

(*) Notice: Subject to any disclaimer, the term of this patent is extended or adjusted under 35 U.S.C. 154(b) by 0 days.

(21) Appl. No.: 18/633,425

(22) Filed: Apr. 11, 2024

(65) Prior Publication Data

US 2024/0344776 A1    Oct. 17, 2024

Related U.S. Application Data

(60) Provisional application No. 63/627,523, filed on Jan. 31, 2024, provisional application No. 63/626,501, (Continued)

(51) Int. Cl.
*F28D 20/00* (2006.01)
*F01K 23/10* (2006.01)

(52) U.S. Cl.
CPC .......... *F28D 20/0043* (2013.01); *F01K 23/10* (2013.01)

(58) Field of Classification Search
CPC ....... F28D 20/0043; F01K 23/10; F01K 3/186
(Continued)

(56) References Cited

U.S. PATENT DOCUMENTS 1,089,951 A  3/1914 Otto
1,700,542 A  1/1929 O'Donnell
(Continued)

FOREIGN PATENT DOCUMENTS

AU  2012292959 B2  2/2016
AU  2016100264 A4  4/2016
(Continued)

OTHER PUBLICATIONS

International Search Report and Written Opinion mailed on Aug. 23, 2024 for International Application No. PCT/US2024/024158, 9 pages.

(Continued)

*Primary Examiner* — Jon T. Schermerhorn, Jr.
(74) *Attorney, Agent, or Firm* — Procopio, Cory, Hargreaves & Savitch LLP; Matt Rainey

(57) ABSTRACT

A thermal energy storage (TES) system converts variable renewable electricity (VRE) to continuous heat at over 900° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. The thermal storage medium may constitute refractory material such as brick or concrete configured with radiation cavities and fluid flow channels to provide for rapid radiative charging from VRE and long-term convective discharging. Configurations of the thermal storage medium enable a substantially horizontal thermocline and heat delivery arrangement, which provides seismic stability and facilitates significant expandability of the TES system primarily by increasing the length of the system without adding undue height, contributing to both stability and efficiency of the heat delivery structure.

28 Claims, 98 Drawing Sheets

Related U.S. Application Data filed on Jan. 29, 2024, provisional application No. 63/578,139, filed on Aug. 22, 2023, provisional application No. 63/459,540, filed on Apr. 14, 2023.

(58) Field of Classification Search
USPC .......................................................... 165/10
See application file for complete search history.

(56) References Cited

U.S. PATENT DOCUMENTS

| | | | |
|---|---|---|---|
| 1,700,642 A | 1/1929 | Meindersma | |
| 2,833,532 A | 5/1958 | Ries | |
| 3,381,113 A | 4/1968 | Jacques et al. | |
| 3,549,136 A * | 12/1970 | Blackwood | C21B 9/06 165/DIG. 35 |
| 3,788,066 A | 1/1974 | Nebgen | |
| 3,908,381 A | 9/1975 | Barber et al. | |
| 3,995,434 A * | 12/1976 | Kato | E02B 3/06 52/607 |
| 4,110,987 A | 9/1978 | Cahn et al. | |
| 4,124,061 A | 11/1978 | Mitchell et al. | |
| 4,127,161 A | 11/1978 | Clyne et al. | |
| 4,146,057 A | 3/1979 | Friedman et al. | |
| 4,172,442 A | 10/1979 | Boblitz | |
| 4,200,783 A | 4/1980 | Ehret | |
| 4,222,365 A | 9/1980 | Thomson | |
| 4,234,782 A | 11/1980 | Barabas et al. | |
| 4,237,692 A | 12/1980 | Ahrens et al. | |
| 4,312,324 A | 1/1982 | Ross et al. | |
| 4,329,592 A | 5/1982 | Wagner et al. | |
| 4,397,962 A | 8/1983 | Schockmel | |
| 4,438,630 A | 3/1984 | Rowe | |
| 4,524,756 A | 6/1985 | Ahrens et al. | |
| 4,651,810 A * | 3/1987 | Triessnig | F27D 1/04 165/9.2 |
| 4,809,523 A | 3/1989 | Vandenberg | |
| 4,874,034 A * | 10/1989 | Hirata | F28D 17/02 165/DIG. 30 |
| 5,154,224 A * | 10/1992 | Yasui | F27D 1/042 165/DIG. 30 |
| 5,286,472 A | 2/1994 | Fulford | |
| 5,384,489 A | 1/1995 | Bellac | |
| 5,416,416 A | 5/1995 | Bisher | |
| 5,419,388 A * | 5/1995 | Hickel | F28D 17/02 432/39 |
| 5,553,604 A | 9/1996 | Frei | |
| 5,634,313 A * | 6/1997 | Mogling | F27D 1/04 52/603 |
| 5,924,477 A * | 7/1999 | Doru | F27D 1/042 52/603 |
| 6,274,855 B1 | 8/2001 | Tatematsu et al. | |
| 6,302,188 B1 * | 10/2001 | Ruhl | F23G 7/07 60/299 |
| 6,322,356 B1 * | 11/2001 | Gupta | F27D 17/20 165/9.2 |
| 6,631,754 B1 * | 10/2003 | Bremont | F28D 17/005 165/4 |
| 7,213,409 B1 | 5/2007 | Nuckols | |
| 7,693,402 B2 | 4/2010 | Hudson et al. | |
| 8,226,917 B2 | 7/2012 | Fan et al. | |
| 8,544,275 B2 | 10/2013 | Shinnar | |
| 8,701,773 B2 | 4/2014 | O'Donnell et al. | |
| 8,960,182 B2 | 2/2015 | Magaldi et al. | |
| 9,370,044 B2 | 6/2016 | McDonald | |
| 9,512,826 B2 | 12/2016 | Rodionov et al. | |
| 9,556,708 B2 | 1/2017 | Schneider et al. | |
| 9,816,490 B2 | 11/2017 | Conlon | |
| 9,816,491 B2 | 11/2017 | Perry | |
| 9,948,140 B2 | 4/2018 | Pietsch et al. | |
| 9,989,271 B1 | 6/2018 | Becker | |
| 10,113,535 B2 | 10/2018 | Conlon | |
| 10,345,050 B2 | 7/2019 | Pietsch et al. | |
| 10,767,935 B2 | 9/2020 | Bergan et al. | |
| 10,775,111 B2 | 9/2020 | Kerth | |
| 10,876,521 B2 | 12/2020 | Anderson et al. | |
| 11,352,951 B2 | 6/2022 | Apte et al. | |
| 11,391,181 B2 * | 7/2022 | O'Donnell | F28D 20/0056 |
| 11,459,944 B2 | 10/2022 | Robinson | |
| 11,480,160 B1 | 10/2022 | Mokheimer et al. | |
| 11,809,153 B1 | 11/2023 | Kearns | |
| 11,994,347 B2 | 5/2024 | Ponec et al. | |
| 2004/0062063 A1 | 4/2004 | Siri | |
| 2004/0099261 A1 | 5/2004 | Litwin | |
| 2004/0148922 A1 | 8/2004 | Pinkerton | |
| 2004/0182081 A1 | 9/2004 | Sim et al. | |
| 2004/0211215 A1 | 10/2004 | Maier-Laxhuber et al. | |
| 2005/0126172 A1 | 6/2005 | Hudson et al. | |
| 2006/0107664 A1 | 5/2006 | Hudson et al. | |
| 2006/0174622 A1 | 8/2006 | Skowronski | |
| 2006/0179840 A1 | 8/2006 | Murphy et al. | |
| 2006/0211777 A1 | 9/2006 | Severinsky | |
| 2006/0266039 A1 | 11/2006 | Skowronski et al. | |
| 2006/0277910 A1 | 12/2006 | Hoetger | |
| 2007/0209365 A1 | 9/2007 | Hamer et al. | |
| 2007/0220889 A1 | 9/2007 | Nayef et al. | |
| 2008/0000231 A1 | 1/2008 | Litwin et al. | |
| 2008/0066736 A1 | 3/2008 | Zhu | |
| 2008/0127647 A1 | 6/2008 | Leitner | |
| 2008/0279761 A1 | 11/2008 | Kimura et al. | |
| 2009/0038668 A1 | 2/2009 | Plaisted | |
| 2009/0090109 A1 | 4/2009 | Mills et al. | |
| 2009/0117633 A1 | 5/2009 | Bradley et al. | |
| 2009/0208402 A1 | 8/2009 | Rossi | |
| 2009/0320828 A1 | 12/2009 | Koketsu et al. | |
| 2010/0101462 A1 | 4/2010 | Hayashi | |
| 2010/0132391 A1 | 6/2010 | Barot | |
| 2010/0178156 A1 | 7/2010 | Rivas Cortes et al. | |
| 2010/0195357 A1 | 8/2010 | Fornage et al. | |
| 2010/0229523 A1 | 9/2010 | Holt et al. | |
| 2010/0251711 A1 | 10/2010 | Howes et al. | |
| 2010/0295306 A1 | 11/2010 | Ridnik et al. | |
| 2011/0083443 A1 | 4/2011 | Jockenhoevel et al. | |
| 2011/0226440 A1 | 9/2011 | Bissell et al. | |
| 2011/0247335 A1 | 10/2011 | Schmid et al. | |
| 2011/0277469 A1 | 11/2011 | Brenmiller et al. | |
| 2011/0286902 A1 | 11/2011 | Fan et al. | |
| 2011/0289924 A1 | 12/2011 | Pietsch | |
| 2012/0067047 A1 | 3/2012 | Peterson et al. | |
| 2012/0102950 A1 | 5/2012 | Turchi | |
| 2012/0131898 A1 | 5/2012 | Mokheimer et al. | |
| 2012/0151926 A1 | 6/2012 | Labbe | |
| 2012/0167559 A1 | 7/2012 | Havel | |
| 2012/0241677 A1 | 9/2012 | Perkins et al. | |
| 2012/0255309 A1 | 10/2012 | Venetos et al. | |
| 2013/0025817 A1 | 1/2013 | Callaghan | |
| 2013/0047976 A1 | 2/2013 | Kaftori | |
| 2013/0081394 A1 | 4/2013 | Perry | |
| 2013/0081395 A1 | 4/2013 | Frey et al. | |
| 2013/0118169 A1 | 5/2013 | Milam et al. | |
| 2013/0175006 A1 | 7/2013 | Robinson et al. | |
| 2014/0004469 A1 | 1/2014 | Recourt et al. | |
| 2014/0053554 A1 | 2/2014 | Tartibi et al. | |
| 2014/0074314 A1 | 3/2014 | Niknafs et al. | |
| 2014/0102073 A1 | 4/2014 | Pang et al. | |
| 2014/0116069 A1 | 5/2014 | Peterson et al. | |
| 2014/0190469 A1 | 7/2014 | O'Donnell et al. | |
| 2014/0216717 A1 | 8/2014 | O'Donnell et al. | |
| 2014/0223906 A1 | 8/2014 | Gee et al. | |
| 2014/0224469 A1 | 8/2014 | Mirmobin et al. | |
| 2014/0366536 A1 | 12/2014 | Muren | |
| 2015/0033740 A1 | 2/2015 | Anderson et al. | |
| 2015/0053266 A1 | 2/2015 | Chen et al. | |
| 2015/0143806 A1 | 5/2015 | Friesth | |
| 2015/0143811 A1 | 5/2015 | Pang et al. | |
| 2015/0176920 A1 | 6/2015 | Vendeirinho | |
| 2015/0224850 A1 | 8/2015 | Bank et al. | |
| 2015/0267566 A1 | 9/2015 | Vamvas | |
| 2015/0276234 A1 | 10/2015 | Muro et al. | |
| 2015/0295508 A1 | 10/2015 | Conry | |
| 2015/0354545 A1 | 12/2015 | Conlon | |
| 2016/0130709 A1 | 5/2016 | Hong et al. | |
| 2016/0146110 A1 | 5/2016 | Hackstein et al. | |
| 2016/0164451 A1 | 6/2016 | Lenert et al. | |

(56) References Cited

U.S. PATENT DOCUMENTS

| | | |
|---|---|---|
| 2016/0208657 A1 | 7/2016 | Brückner et al. |
| 2016/0214910 A1 | 7/2016 | King |
| 2017/0051949 A1 | 2/2017 | Uselton |
| 2017/0093163 A1 | 3/2017 | Johnson et al. |
| 2017/0204741 A1 | 7/2017 | Hogen et al. |
| 2017/0241649 A1 | 8/2017 | Cave |
| 2017/0241669 A1 | 8/2017 | von Behrens |
| 2017/0283713 A1 | 10/2017 | Stephens et al. |
| 2017/0362090 A1 | 12/2017 | Melsert et al. |
| 2017/0362724 A1 | 12/2017 | Planque et al. |
| 2018/0003445 A1 | 1/2018 | Bergan et al. |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0106739 A1 | 4/2018 | Esmaili et al. |
| 2018/0163574 A1 | 6/2018 | Bailey et al. |
| 2018/0179955 A1 | 6/2018 | Apte et al. |
| 2018/0207557 A1 | 7/2018 | Nellis |
| 2018/0216010 A1 | 8/2018 | Hong |
| 2018/0231316 A1* | 8/2018 | Watremetz ............... C09K 5/14 |
| 2018/0238563 A1 | 8/2018 | Stepa et al. |
| 2018/0245485 A1 | 8/2018 | Conlon |
| 2018/0292097 A1 | 10/2018 | Specter |
| 2018/0347406 A1 | 12/2018 | Friesth |
| 2018/0372337 A1 | 12/2018 | Walker |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0096535 A1 | 3/2019 | Olshansky et al. |
| 2019/0140477 A1 | 5/2019 | Yang et al. |
| 2019/0162482 A1 | 5/2019 | Kerth |
| 2019/0170436 A1 | 6/2019 | De et al. |
| 2019/0186786 A1 | 6/2019 | Neiser |
| 2019/0226462 A1 | 7/2019 | Conlon |
| 2019/0245224 A1 | 8/2019 | Lacroix et al. |
| 2019/0331098 A1 | 10/2019 | von Behrens et al. |
| 2019/0359894 A1 | 11/2019 | Heidel et al. |
| 2020/0095984 A1 | 3/2020 | Karni et al. |
| 2020/0124356 A1 | 4/2020 | Ma et al. |
| 2020/0172815 A1 | 6/2020 | Stephens et al. |
| 2020/0217518 A1 | 7/2020 | Field et al. |
| 2020/0232345 A1 | 7/2020 | Zwinkels |
| 2020/0332201 A1 | 10/2020 | Koseoglu et al. |
| 2020/0346165 A1 | 11/2020 | Lu et al. |
| 2020/0378599 A1 | 12/2020 | Risseeuw et al. |
| 2020/0386447 A1 | 12/2020 | Wang |
| 2021/0053689 A1 | 2/2021 | Lynn et al. |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0211066 A1 | 7/2021 | Vavilpalli et al. |
| 2021/0325069 A1 | 10/2021 | Cotton et al. |
| 2021/0328544 A1 | 10/2021 | Johnson et al. |
| 2022/0049615 A1 | 2/2022 | Truong |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0170386 A1 | 6/2022 | O'Donnell et al. |
| 2022/0228271 A1 | 7/2022 | Ashok et al. |
| 2022/0228772 A1 | 7/2022 | Murata et al. |
| 2022/0268179 A1 | 8/2022 | O'Donnell et al. |
| 2022/0290929 A1 | 9/2022 | Doerbeck |
| 2022/0307386 A1 | 9/2022 | Savic et al. |
| 2022/0403759 A1 | 12/2022 | Stapp, III et al. |
| 2023/0216297 A1 | 7/2023 | Peri et al. |
| 2023/0407186 A1 | 12/2023 | Sundaram et al. |
| 2024/0092646 A1 | 3/2024 | Isobe et al. |
| 2025/0026986 A1 | 1/2025 | Zellhuber et al. |

FOREIGN PATENT DOCUMENTS

| | | |
|---|---|---|
| AU | 2016204109 B2 | 5/2018 |
| CH | 703751 A1 | 3/2012 |
| CN | 1559893 A | 1/2005 |
| CN | 101799200 A | 8/2010 |
| CN | 101592439 B | 4/2011 |
| CN | 104242433 A | 12/2014 |
| CN | 104296577 B | 4/2016 |
| CN | 105605957 A | 5/2016 |
| CN | 105948037 A | 9/2016 |
| CN | 106052451 A | 10/2016 |
| CN | 106247836 A | 12/2016 |
| CN | 107246732 A | 10/2017 |
| CN | 107872196 A | 4/2018 |
| CN | 108204760 A | 6/2018 |
| CN | 108362151 A | 8/2018 |
| CN | 108362152 A | 8/2018 |
| CN | 108612634 A | 10/2018 |
| CN | 106767074 B | 12/2018 |
| CN | 109883241 A | 6/2019 |
| CN | 110411260 A | 11/2019 |
| CN | 111256364 A | 6/2020 |
| CN | 210802160 U | 6/2020 |
| CN | 211183438 U | 8/2020 |
| CN | 111655989 A | 9/2020 |
| CN | 112113203 A | 12/2020 |
| CN | 212157096 U | 12/2020 |
| CN | 113835372 A | 12/2021 |
| CN | 114754617 A | 7/2022 |
| DE | 19808810 C1 | 6/1999 |
| DE | 10029732 A1 | 1/2002 |
| DE | 102009020531 B3 | 4/2011 |
| DE | 102013212981 A1 | 1/2015 |
| DE | 102017212684 A1 | 1/2019 |
| EP | 0079247 A1 | 5/1983 |
| EP | 794161 B1 | 7/1996 |
| EP | 1930587 A2 | 6/2008 |
| EP | 2372116 A1 | 10/2011 |
| EP | 2722496 A2 | 4/2014 |
| EP | 3081770 A1 | 10/2016 |
| EP | 3324018 A1 | 5/2018 |
| EP | 3486594 A1 | 5/2019 |
| EP | 2837086 B1 | 11/2019 |
| EP | 3245388 B1 | 11/2019 |
| EP | 3725917 A1 | 10/2020 |
| EP | 2909547 B1 | 9/2021 |
| EP | 3642296 A1 | 1/2022 |
| GB | 2109026 A | 5/1983 |
| GB | 2152652 A | 8/1985 |
| GB | 2477801 A | 8/2011 |
| IL | 284451 | 8/2021 |
| JP | 2006145200 A | 6/2006 |
| KR | 2001-0100320 A | 11/2001 |
| KR | 102308531 B1 | 10/2021 |
| MA | 40029 A | 12/2015 |
| TW | 202100240 A | 1/2021 |
| WO | WO 1980/000170 | 2/1980 |
| WO | WO 2007/108014 A1 | 9/2007 |
| WO | WO 2008/052249 A1 | 5/2008 |
| WO | WO 2008/108870 A1 | 9/2008 |
| WO | WO 2009/152562 A1 | 12/2009 |
| WO | 2011/066039 A1 | 6/2011 |
| WO | WO 2011/077248 A2 | 6/2011 |
| WO | WO 2011/109514 A1 | 9/2011 |
| WO | WO 2012/123853 A1 | 9/2012 |
| WO | WO 2012/127178 A1 | 9/2012 |
| WO | WO 2012/150969 A1 | 11/2012 |
| WO | WO 2013/020176 A1 | 2/2013 |
| WO | WO 2014/063191 A1 | 5/2014 |
| WO | WO 2014/151843 A2 | 9/2014 |
| WO | WO 2015/149124 A1 | 10/2015 |
| WO | WO 2015/187423 A2 | 12/2015 |
| WO | WO 2016/065191 A1 | 4/2016 |
| WO | WO 2016/150455 A1 | 9/2016 |
| WO | 2017/001710 A1 | 1/2017 |
| WO | WO 2017/049320 A1 | 3/2017 |
| WO | WO 2017/147022 A1 | 8/2017 |
| WO | WO 2018/011363 A1 | 1/2018 |

(56) References Cited

FOREIGN PATENT DOCUMENTS

| WO | WO 2018/101989 A1 | 6/2018 |
|---|---|---|
| WO | WO 2018/164647 A1 | 9/2018 |
| WO | WO 2019/020562 A1 | 1/2019 |
| WO | WO 2019/149623 A1 | 8/2019 |
| WO | WO 2019/224538 A1 | 11/2019 |
| WO | WO 2020/068758 A1 | 4/2020 |
| WO | 2020/136456 A1 | 7/2020 |
| WO | WO 2020/254001 A1 | 12/2020 |
| WO | WO 2022/086630 A1 | 4/2022 |
| WO | WO 2022/187903 A1 | 9/2022 |
| ZA | 201603514 B | 11/2018 |

OTHER PUBLICATIONS

Zhou et al., "Highly Conductive Porous Graphene/Ceramic Composites for Heat Transfer and Thermal Energy Storage," Adv. Funct. Mater., 2013, 23, pp. 2263-2269.

International Search Report and Written Opinion mailed on Dec. 20, 2024 for International Application No. PCT/US2024/024156, 29 pages.

Song, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.

"Ethylene Production via Cracking of Ethane-Propane", Chemical Engineering, Nov. 1, 2015, Total pp. 4.

"Matching Time of Use Periods With Grid Conditions Maximizes Use of Renewable Resources", California ISO, Outcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis Mckittrick, "Low Temperature & Coproduced Resources Reservoir Thermal Energy Storage (RTES) Portfolio", Geothermal Technologies Office, U.S. Department of Energy, dated Feb. 2022. Total pp. 4.

Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.

Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

Bao Truong, "Malta Pumped Heat Energy Storage System Green Heat & Power Application", Energy Storage for Manufacturing and Industrial Decarbonization Workshop, Feb. 9, 2022, Total pp. 5.

Ben Bollinger, "Malta Pumped Heat Energy Storage", Malta, Aug. 10, 2021, Total pp. 9.

Cédric Philibert, "Renewable Energy for Industry", Renewable Energy Division, International Energy Agency, Nordic Pavillion, COP23, Fidji—Bonn, Nov. 15, 2017, Total pp. 7.

Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

Charles Forsberg, "Hybrid systems to address seasonal mismatches between electricity production and demand in nuclear renewable electrical grids", Energy Policy, vol. 62, Nov. 2013, pp. 333-341, Total pp. 9.

Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.

Christopher Fraughton, "Electro-Thermal Energy Storage General Presentation", MAN Energy Solutions, Aug. 2021, Total pp. 23.

CK-12 Foundation, "Saturated Hydrocarbon", Apr. 2, 2022, Total pp. 8.

Clifford K . HO, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.

Cowper Stove An overview ScienceDirect Topics, Sep. 13, 2021, Total pp. 25.

D. Fernandes et al., "Thermal energy storage: How previous findings determine current research priorities", Energy, vol. 39, Issue 1, Mar. 2012, pp. 246-257, Total pp. 12.

Daniel C Stack et al., "Performance of firebrick resistance-heated energy storage for industrial heat applications and round-trip electricity storage", Applied Energy, vol. 242, May 15, 2019, pp. 782-796, Total pp. 15.

Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.

Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.

Daniel Stack et al., "Joule Hive-Replacing fire with renewable heat", Aug. 28, 2021, Total pp. 15.

Da Vid Bierman, "Clean, affordable, and reliable heat & electricity", Antora Energy, Feb. 2022, Total pp. 9.

David L. Chandler "MIT News: Turning desalination waste into a useful resource" MIT News Office, Feb. 13, 2019 (Cited in NFOA dated Sep. 14, 2022 in related U.S. Appl. No. 17/650,522.).

David Roberts, "Solar power's greatest challenge was discovered 10 years ago. It looks like a duck", www.vox.com, Aug. 29, 2018, Total pp. 19.

Dr. Avi Shultz, "Concentrating Solar-thermal Power and Thermal Energy Storage", U.S. Department of Energy, dated Feb. 8, 2022. Total pp. 7.

Dr. Avi Shultz, "Industrial Decarbonization:Renewable Process Heating from Concentrating Solar Thermal", U.S. Department of Energy, dated Feb. 8, 2022. Total pp. 6.

Dr. Eric L. Miller, "The Hydrogen Energy Earthshot and H2@Scale: Importance to Industrial Decarbonization", Energy StorM Panel, Feb. 8, 2022, Total pp. 9.

Dr. Gianluca Ambrosetti et al., "Cement Production", Energy Storage for Manufacturing and Industrial Decarbonization Workshop "Energy StorM", Feb. 8, 2022, Total pp. 10.

Dr. Jeffrey Goldmeer, "Power to Gas: Hydrogen for Power Generation Fuel Flexible Gas Turbines as Enablers for a Low or Reduced Carbon Energy Ecosystem," GE Power, Feb. 2019, 19 pages.

Echogen, "CO2-Based Pumped-Thermal Energy Storage Technical Overview & Status", Echogen Power System, Total pp. 20.

Elizabeth Endler, "Energy Storage for Manufacturing Petrochemical Industry Perspective", Feb. 8, 2022, "Energy StorM" Workshop, US Department of Energy, Total pp. 14.

Elliott Group, "Materials for Hydrogen Compression", Thermo-Mechanical-Chemical Energy Storage Workshop, Elliott, Aug. 10-11, 2021, Total pp. 25.

Emiliano Bellini, "Long-duration thermal storage system based on silica sand", pv magazine International, Nov. 5, 2021, Total pp. 6.

Emiliano Bellini, "Storing wind, solar power with silica sands", pv magazine International, Sep. 1, 2021, Total pp. 10.

(56) References Cited

OTHER PUBLICATIONS

GE Energy Storage Unit RSU-4000, Modular, Scalable Energy Storage Solution for Utility-Scale Applications; www/ge.com/energystorage; 2020, 1 page.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.
Haisheng Chen et al., "Progress in electrical energy storage system: A critical review", Progress in Natural Science, vol. 19, Issue 3, Mar. 10, 2009, pp. 291-312, Total pp. 22.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
"How thermal power plants can benefit from the energy transition", The Future of Energy 2019, Siemens Gamesa Renewable Energy, 10 pages.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report mailed on Sep. 14, 2022 for International Application No. PCT/US2021/061041, 41 pages.
International Search Report and Written Opinion mailed on Mar. 1, 2024 for International Application No. PCT/US2023/034488, 14 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8.
Ji, Huichao, et al., "Electricity Consumption Prediction of Solid Electric Thermal Storage with a Cyber-Physical Approach", Energies 2019, 12, 47441 doi: 10.3390/en12244744, www.mdpi.com/journal/energies, published on Dec. 12, 2019, in 18 pages.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "LCRI Update TMCES 2021", Low-Carbon Resources Initiative, Electric Power Research Institute, Aug. 2021, Total pp. 31.
Joshua Schmitt, "Development of an Advanced Hydrogen Energy Storage System Using Aerogel in a Cryogenic Flux Capacitor (Cfc)", Southwest Research Institute, Aug. 10, 2021, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2019, Total pp. 7.
Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Mecys Palsauskas, et al.: ""Device ensuring effective usage of photovoltaics for water heating"", Electrical Engineering, 101 (1), 189-202, Apr. 8, 2019 (Apr. 8, 2019), DOI: 10.1007/s00202-019-00766-0.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.
PCT; Invitation to Pay Additional Fees issued in International Patent Application No. PCT/US2021/061041; mailed Mar. 24, 2022; 21 Pages.
Pintail Power LLC, "Liquid Air Combined Cycle Hybrid Energy Storage", Pintail Power Llc, Tmces Workshop, Aug. 10-11, 2021, San Antonio, TX, Total pp. 12.
Office Action in U.S. Appl. No. 17/650,519 mailed Apr. 20, 2022, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Reply to Communication Under Rule 71(3) EPC, received in corresponding EP App. No. 21 843 808.3, submitted May 6, 2024, in 9 pages.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.

(56) References Cited

OTHER PUBLICATIONS

Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, 10 Aug. 10, 2021, Total pp. 11.
Sempra Energy Utility, "SoCalGas", Total pp. 6.
Sharadga, Hussein, et al., "A hybrid PV/T and Kalina cycle for power generation", Int J Energy Res. 2018;42:4817-4829, https://doi.org/10.1002/er.4237, dated Sep. 7, 2018.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens Ag, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, 2020, Total pp. 9.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, May 2020, Total pp. 2.
Stefica Nicol Bikes, "Australian engineers patent thermal block to store renewable energy", www.reuters.com, Oct. 27, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require a High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and The Environment, vol. 186, 2014, Total pp. 8.
Third Party Objections raised in corresponding EP App. No. 21 843 808.3, dated Apr. 30, 2024, with English Translation, in 8 pages.
Thomas A. Buscheck, "Hybrid-energy technology enabled by heat storage and oxy-combustion for power and industrial-heat applications with near-zero or negative CO2 emissions", Thermal-Mechanical-Chemical Energy Storage Workshop, San Antonio, Texas, Aug. 10, 2021, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A, Feb. 9, 2022, Total pp. 13.
Tony Bowdery et al., "Heat Exchangers For Thermal Energy Storage: Challenges and Mitigation", Meggitt, Aug. 2021, Total pp. 20.
Torbjörn Lindquist, "Powering the evolution of a renewable society, by redefining energy infrastructure", Azelio, Feb. 7, 2022, Total pp. 10.
Travis McLing et al., " Dynamic Earth Energy Storage: Grid Scale Energy Storage using Planet Earth as a Thermal Battery (RTES)", Feb. 2022, Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Mshal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 25 pages.
Zhao, Haichuan, et al., "Thermal Calculation and Experimental Investigation of Electric Heating and Solid Thermal Storage System", Energies 2020, 13, 5241; doi: 10.3390/en13205241, www.mdpi.com/journal/energies, published on Oct. 9, 2020, in 20 pages.
International Search Report and Written Opinion mailed on May 17, 2024 for International Application No. PCT/US2023/085826, 14 pages.
AMETEK Process Instruments, "Reduce Nox Emissions While Improving Fuel Efficiency", EDG Series Gas Analyzers, Year: 2018, in 2 pages.
Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.
Sakakibara, Reyu, et al., "Practical emitters for thermophotovoltaics: a review", Journal of Photonics for Energy, vol. 9, Issue 3, 032713 (Feb. 2019), https://doi.org/10.1117/1.JPE.9.032713, in 38 pages.

\* cited by examiner

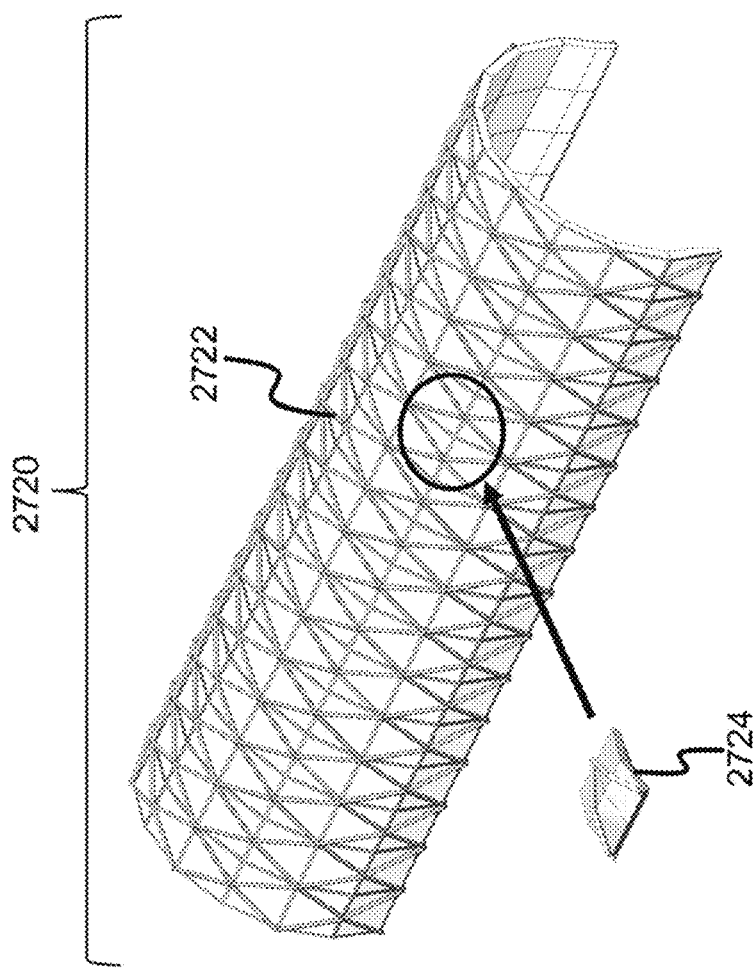
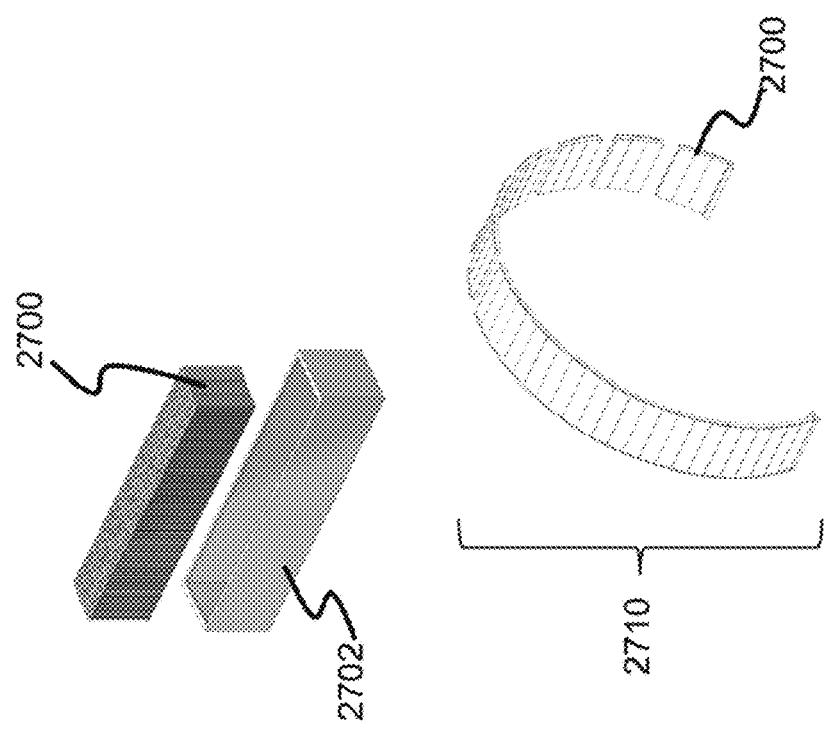
FIG. 27

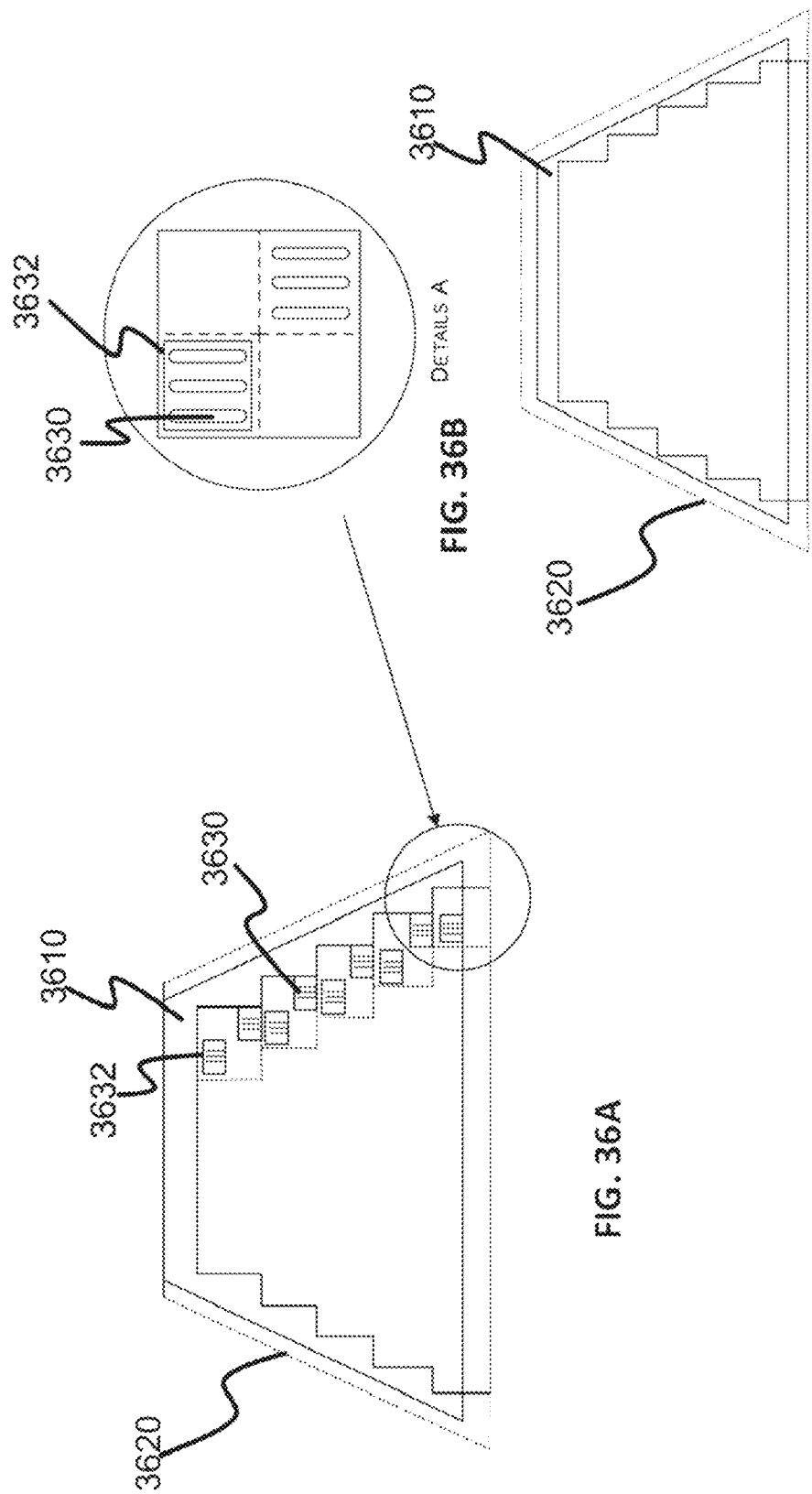

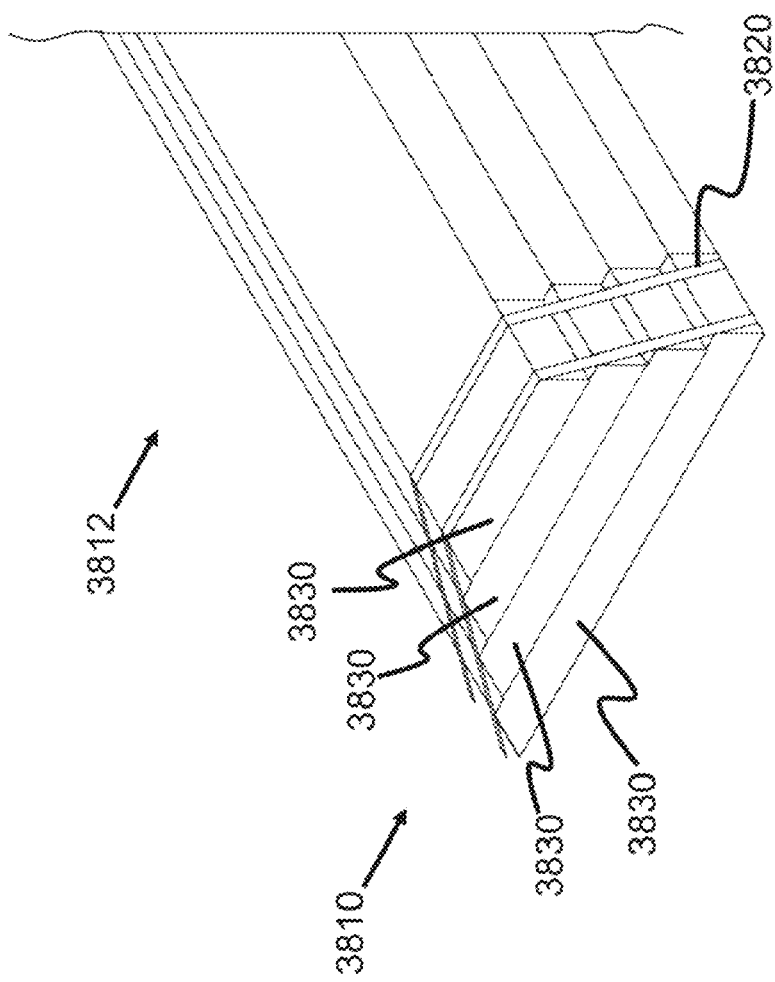

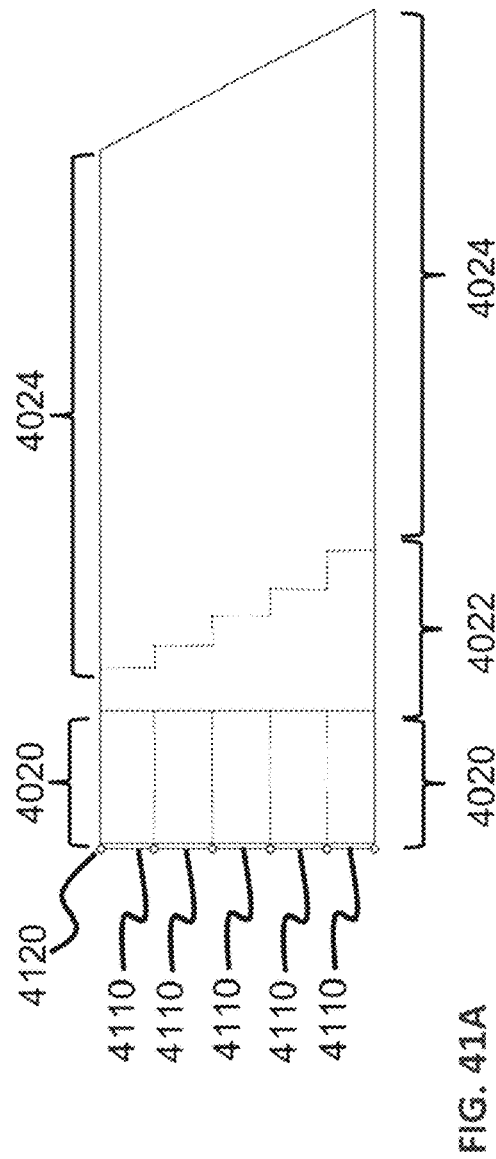
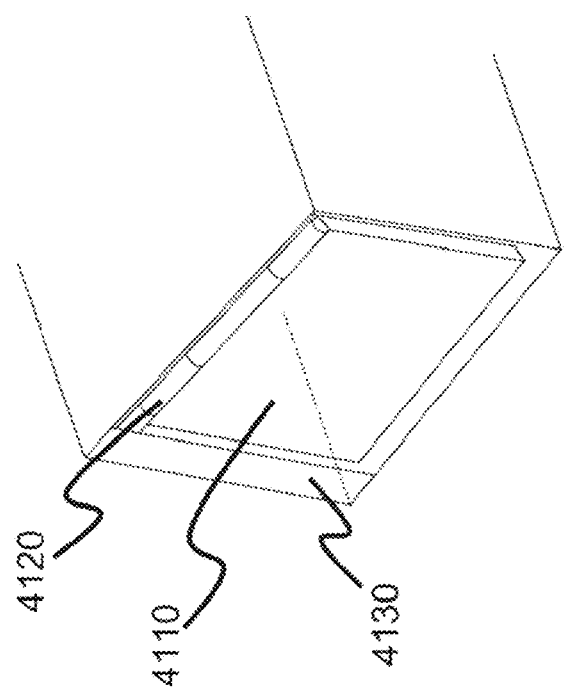
FIG. 41A
FIG. 41B

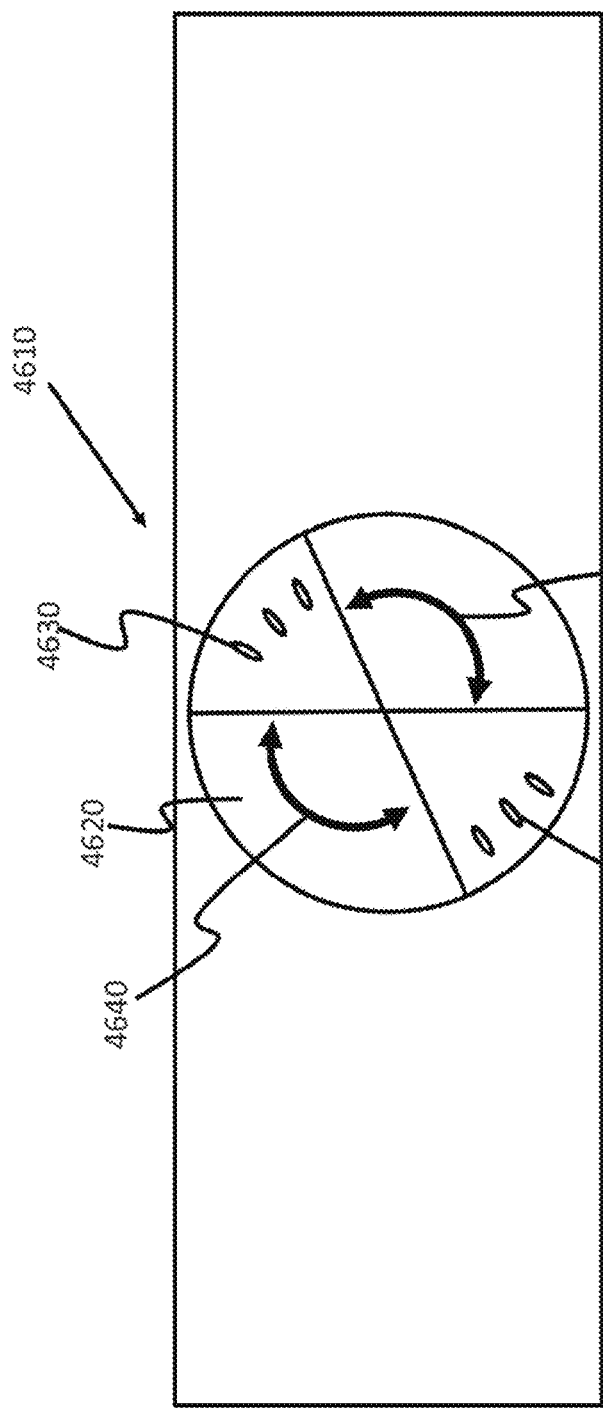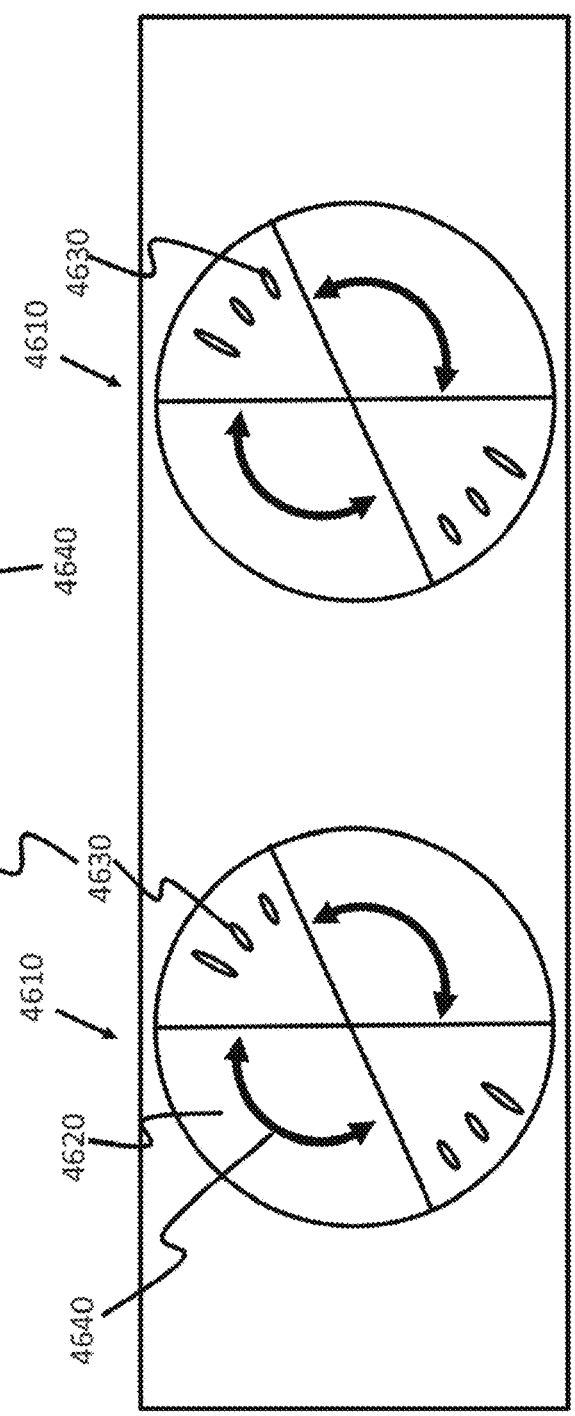

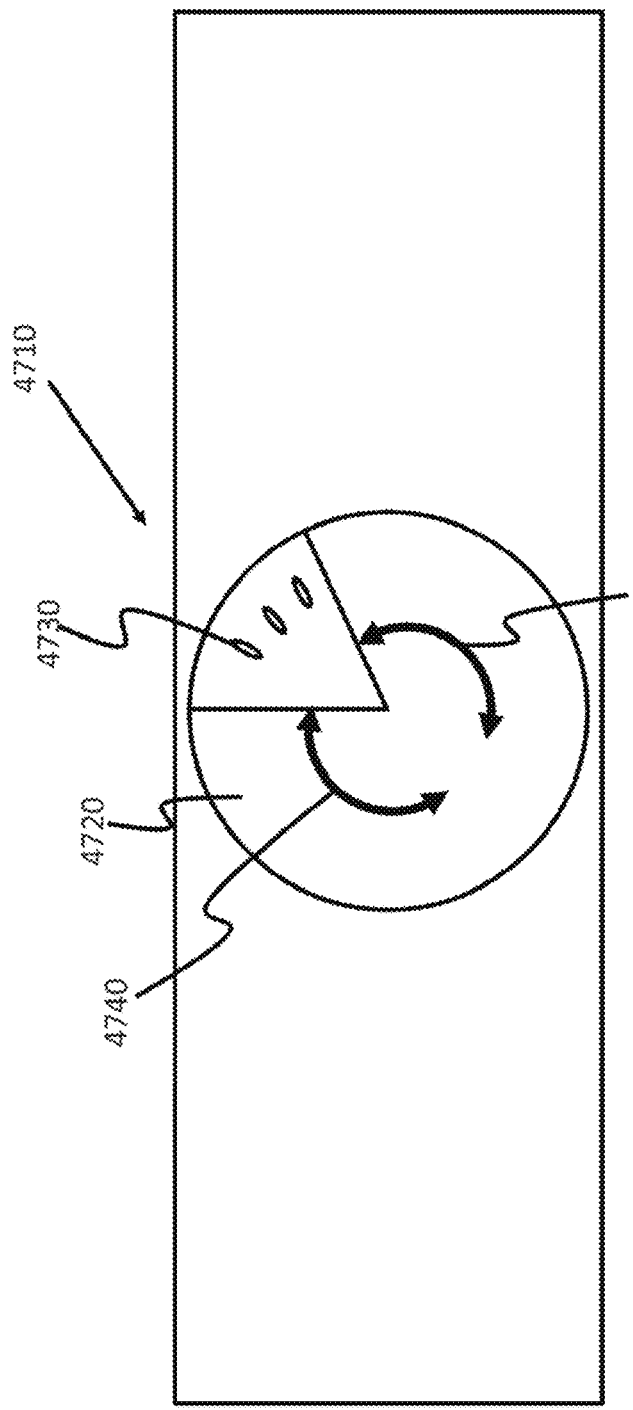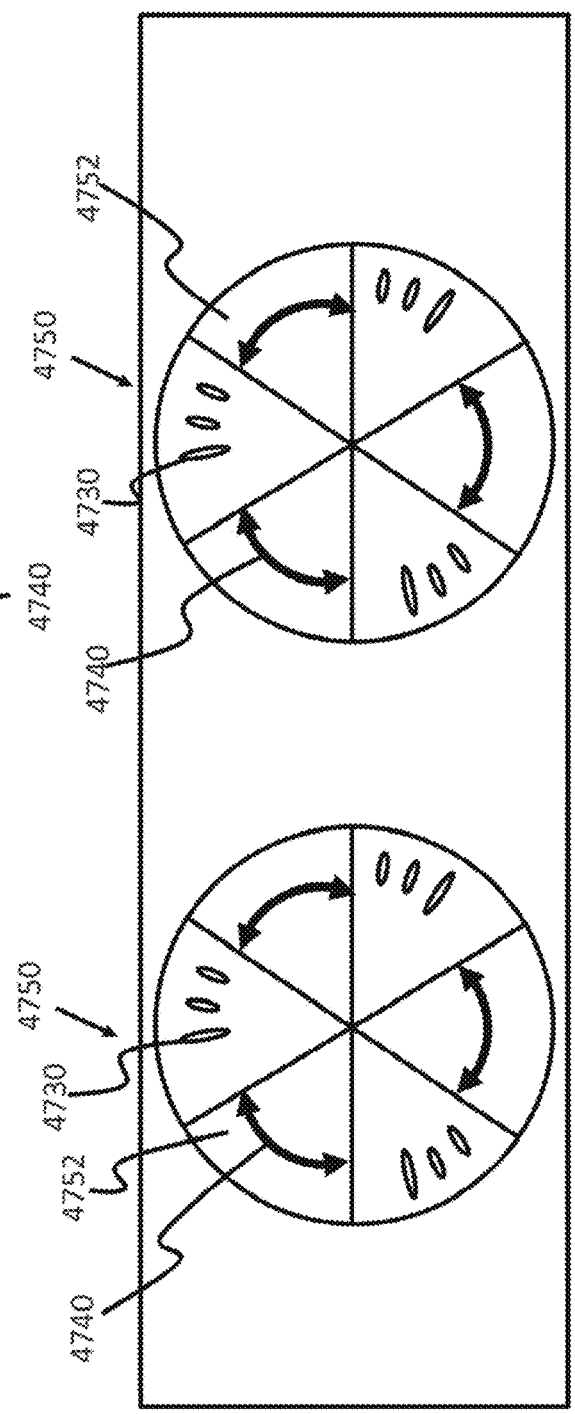

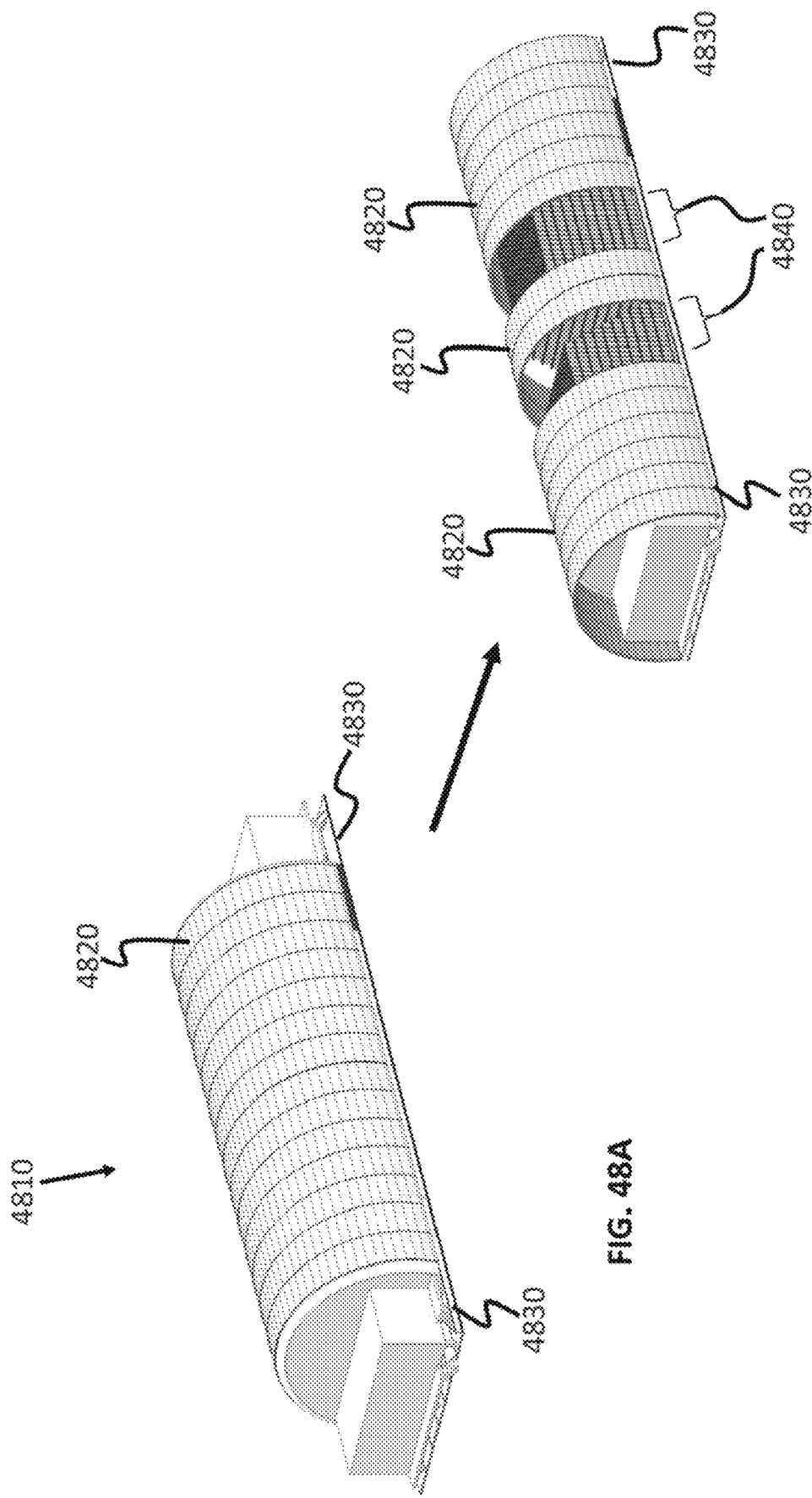

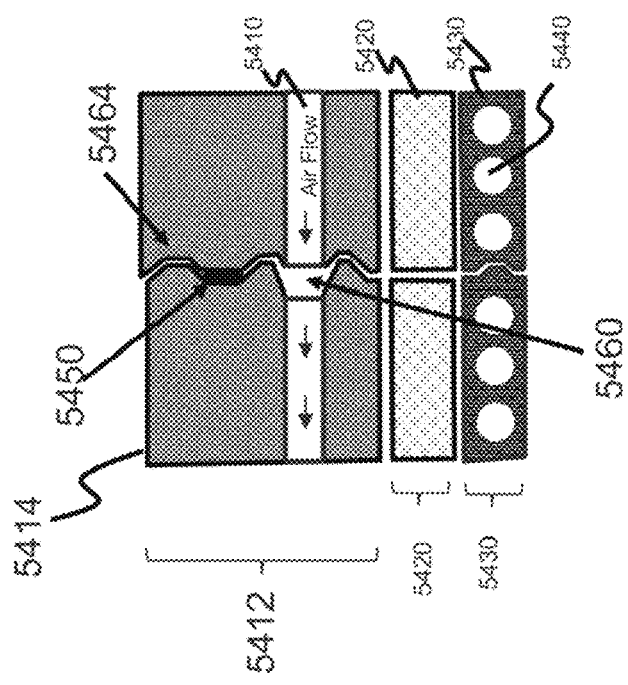
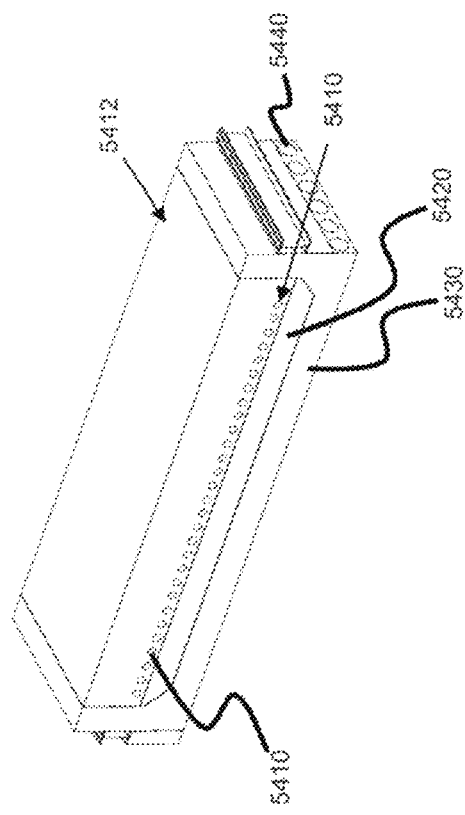
FIG. 54A
FIG. 54B

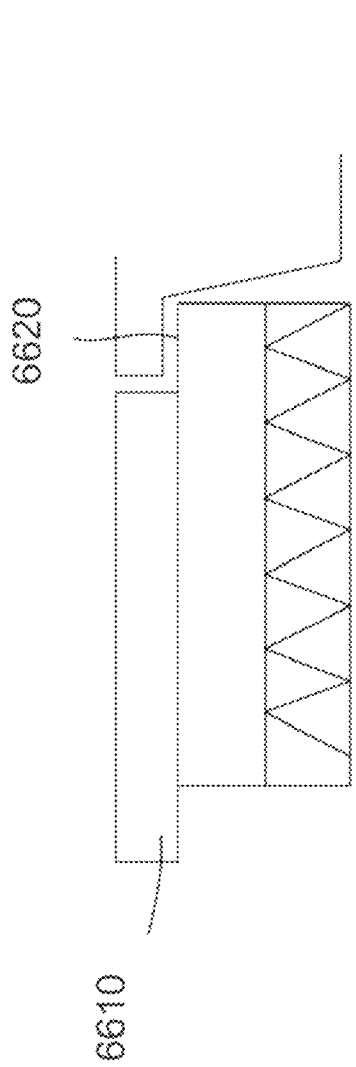
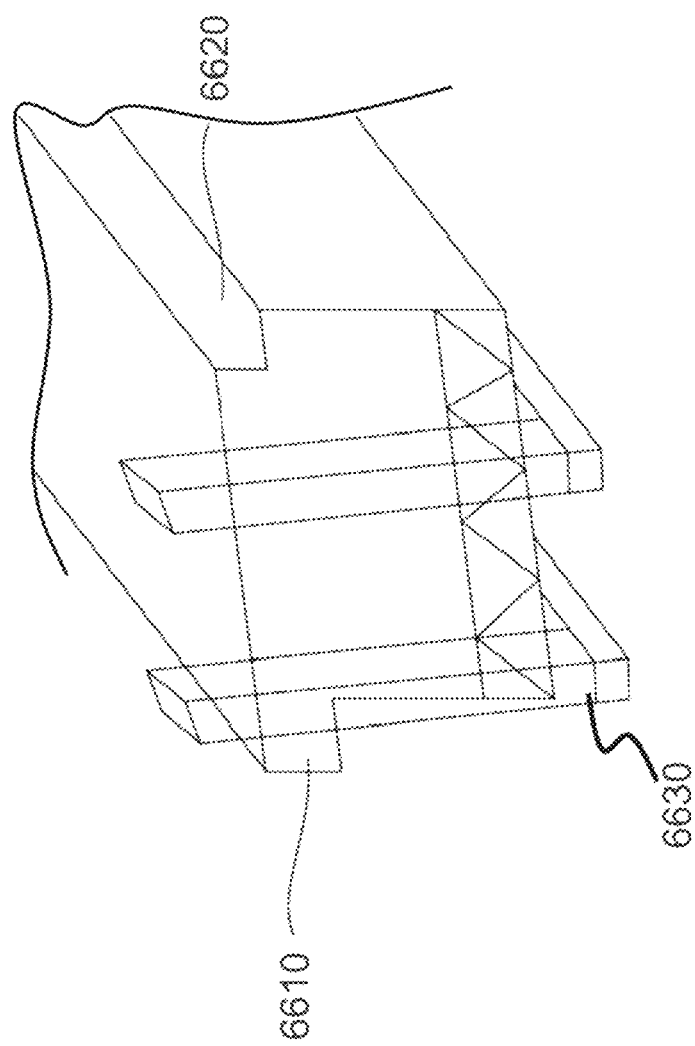

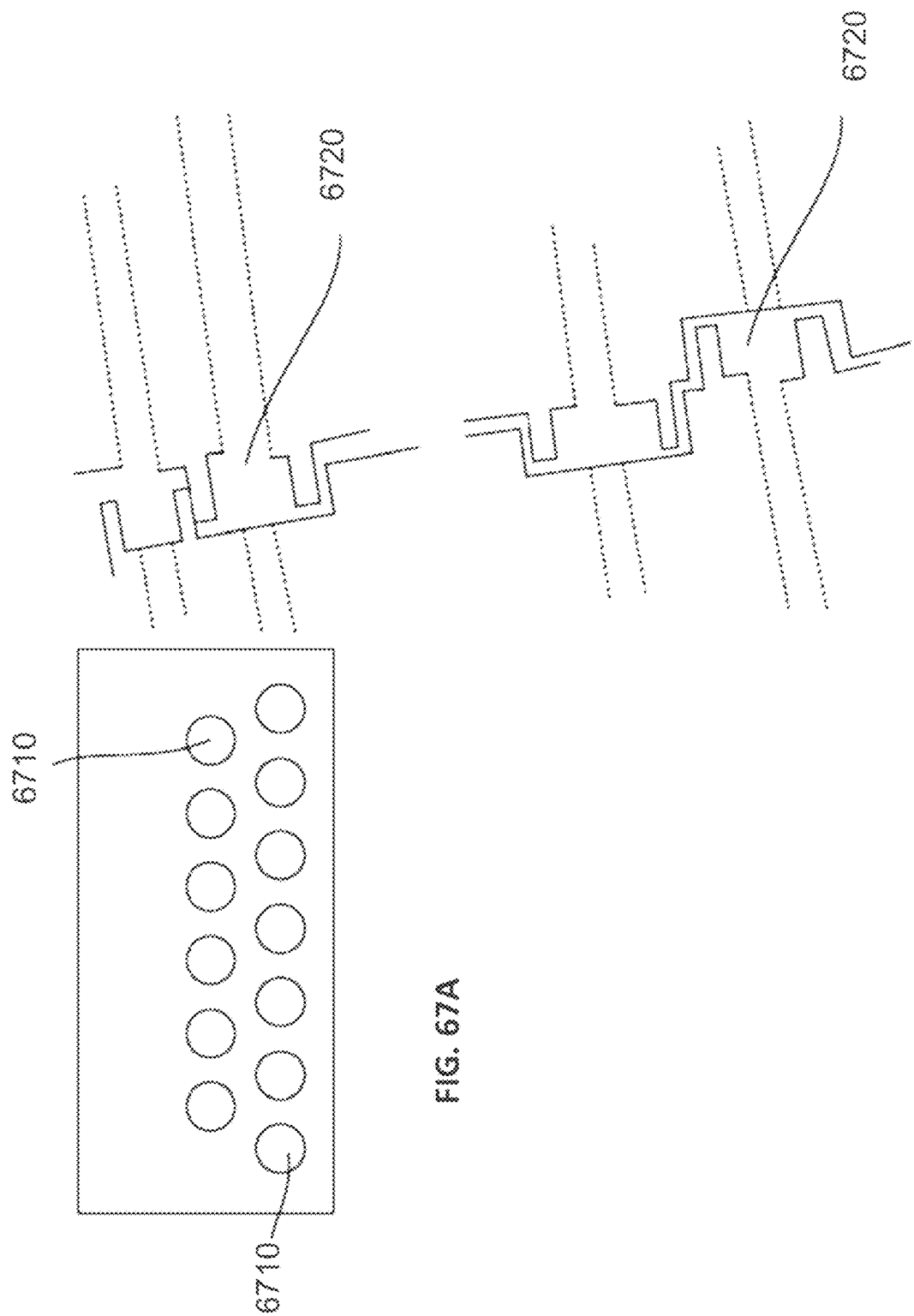

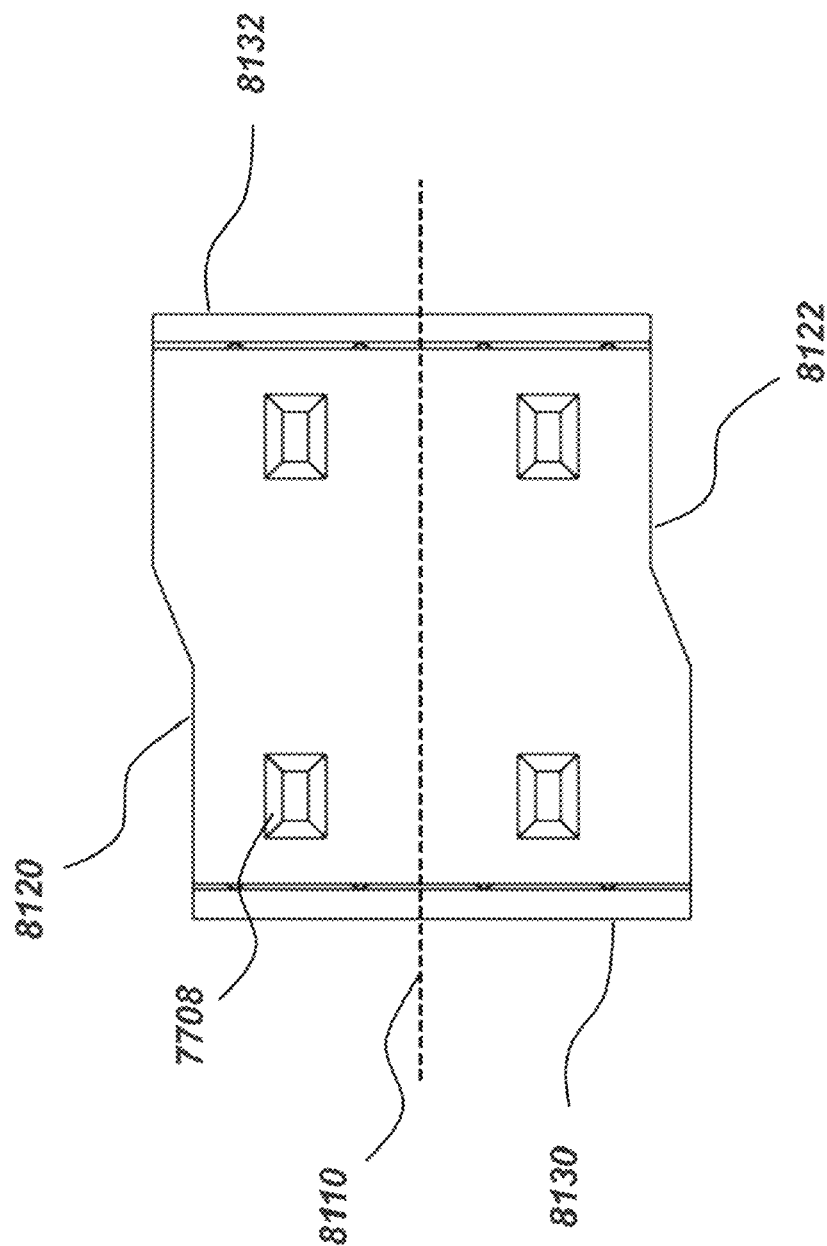

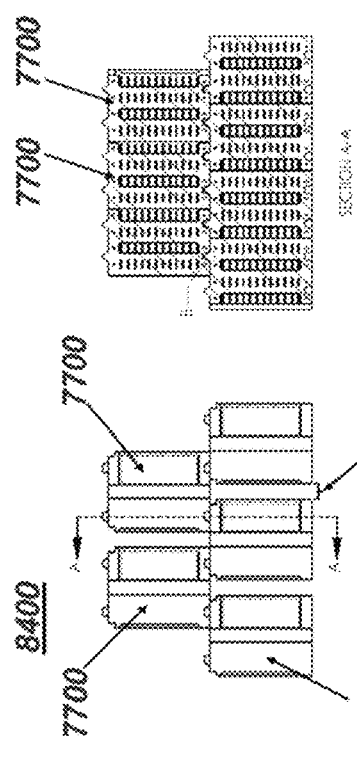
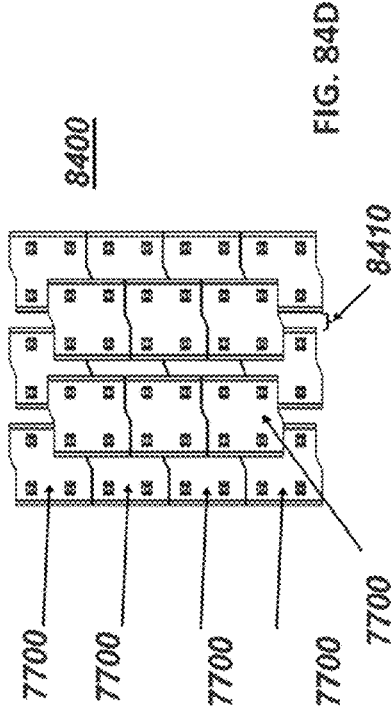
FIG. 84A
FIG. 84B
FIG. 84C
FIG. 84D

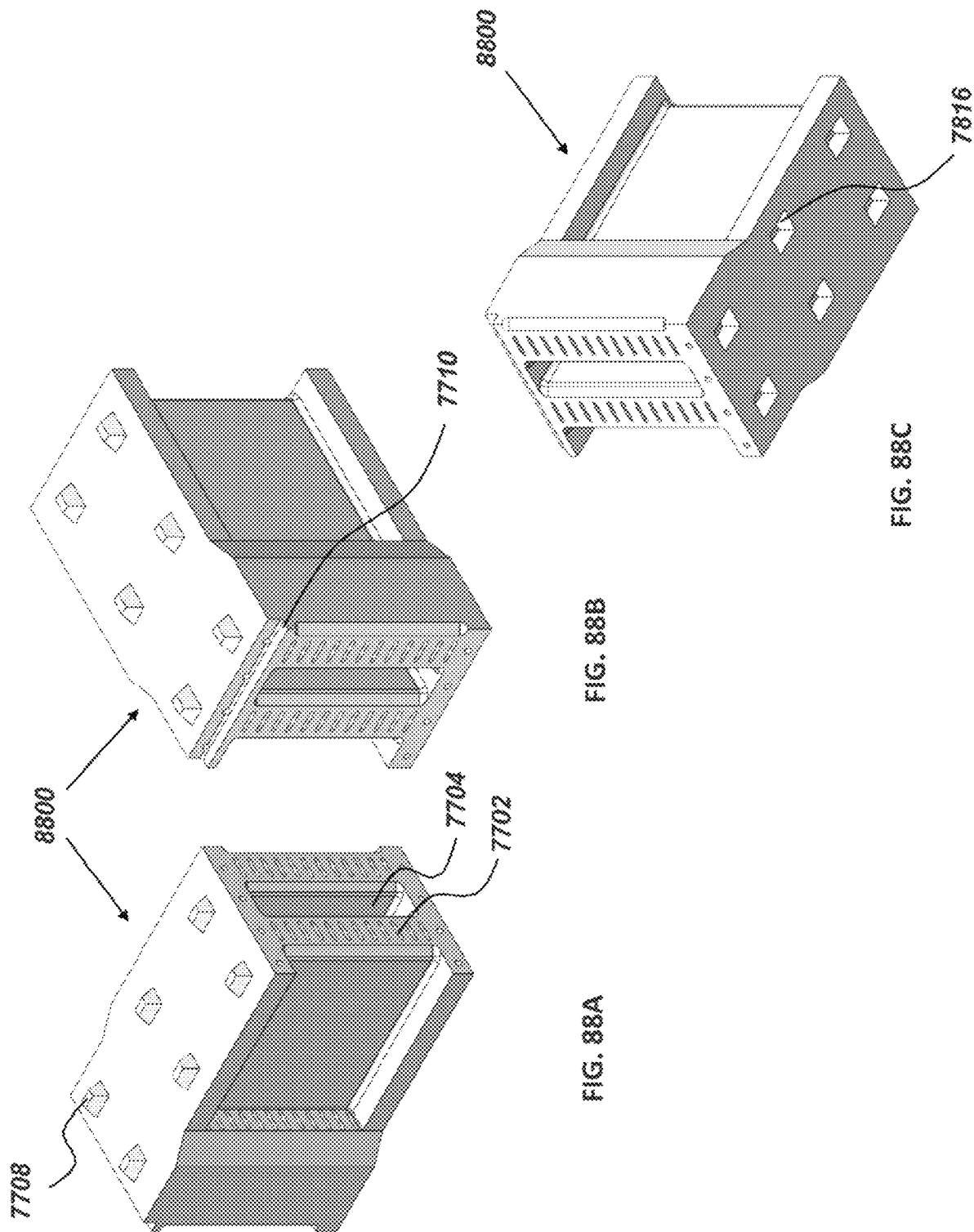

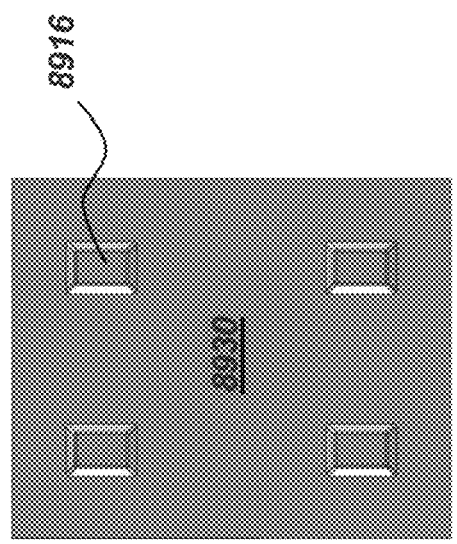
FIG. 90C
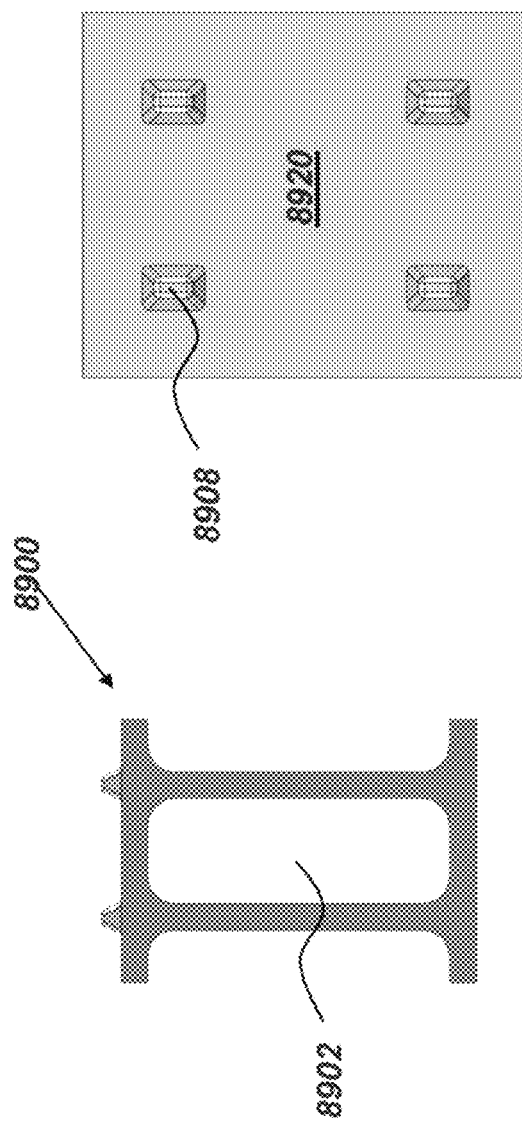
FIG. 90B
FIG. 90A

THERMAL ENERGY STORAGE SYSTEMS WITH IMPROVED SEISMIC STABILITY

CROSS-REFERENCE TO RELATED APPLICATIONS

This application claims priority to the following patent applications:

U.S. Provisional Patent Application No. 63/459,540 filed on Apr. 14, 2023;

U.S. Provisional Patent Application No. 63/578,139 filed on Aug. 22, 2023;

U.S. Provisional Patent Application No. 63/626,501 filed on Jan. 29, 2024;

U.S. Provisional Patent Application No. 63/627,523 filed on Jan. 31, 2024.

The foregoing patent applications are incorporated herein by reference in their entirety for all purposes.

BACKGROUND

Technical Field

The present disclosure relates to thermal energy storage and utilization systems. More particularly, the present disclosure relates to an energy storage system that stores electrical energy in the form of thermal energy, which can be used for the supply of hot air, nitrogen, argon, carbon dioxide ($CO_2$), steam, process gas, inert gas, hydrogen, or other heated fluids, for various applications including the supply of heat for power generation. More specifically, the present disclosure relates to using thermal energy storage systems to improve efficiency and reduce carbon emissions associated with processing materials or other industrial applications in all locations throughout the world.

Related Art

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into a storage medium, and then transferred at another time from the storage medium to an outlet. The rate of heat transfer into and out of the storage medium is limited by factors including the heat conductivity and capacity of the medium, the surface area across which heat is transferring, and the temperature difference across that surface area. High rates of charging are enabled by high temperature differences between the heat source and the storage medium, high surface areas, and the use of a storage medium with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the blocks closest to the heating wire are heated more than the blocks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a desire to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Storage of Intermittent Energy

Fossil fuels have driven the world economy since the industrial revolution; however, mankind has discovered that not only is there a limited supply of these energy resources, but also that the combustion of fossil fuels to extract their energy produces greenhouse gases and other pollutants that threaten planet-wide ecosystems. Specifically, such systems are inherently inefficient in their use of the energy locked up in chemical bonds because they emit innumerable tons of hot combustion gases out smokestacks into our atmosphere, directly causing global warming, indirectly causing global warming through the effects of greenhouse gas emissions on the increased absorption of sunlight by planet Earth, as well as the effects of the pollutants' contribution to the degradation of our planet through, for example, the washing of the Earth's various ecosystems in acid rain.

Energy sources that address this problem, such as solar energy, wind energy, and tidal energy are being developed to meet our need for renewable energy sources that do not generate these harmful greenhouse gases. One drawback that renewable energy sources have is that they are of an intermittent nature. The sun does not always shine; the wind does not always blow; tides are not always flowing. This has prevented these technologies from becoming replacements for fossil fueled energy sources, since industry requires power on demand, 24 hours a day, 365 days a year.

Therefore, what is needed is a way to store the intermittent energy that renewable energy sources provide in a closed loop to meet the constant power demands of industry without expelling heat and pollutants to the atmosphere. This has led to the development of green energy storage solutions, as well as the systems and methods for heat storage and extraction from structured solid blocks in thermal energy storage units as described herein.

One hurdle that lies between the conception and initial development of thermal storage solutions and their actual implementation is the interfacing of such solutions with existing industrial equipment to make use of existing assets and infrastructure. Consequently, what is needed are systems for the modularization of such thermal energy storage units that may be combined in various fashions to provide for customized solutions that meet the individual needs for retrofitting such fossil fuel fired power systems. Furthermore, there is a great need to enable the evaluation of thermal energy storage units as a green energy alternative to existing fuel fired boiler systems without redesigning and rebuilding existing industrial infrastructure. Along these lines, what is desperately needed are systems that allow for easily switching between fossil fuel energy sources and variable renewable electricity sources to evaluate the latter as replacements for existing fossil fuel fired energy sources. This would greatly help achieve the worldwide goals set forth in the Paris Climate Accord, in particular a 45% reduction in greenhouse gas emissions by 2030, with a net zero emission goal target set for 2050. In particular, systems and methods for the coupling of one or more thermal energy storage units to fuel fired boiler systems is needed, along with control systems that coordinate the operation of systems containing multiple thermal energy storage units. This coupling of two completely different energy sources allows for reversibly evaluating this new sustainable technology for the possible retrofitting or replacement of the fossil fuel based systems with a green energy supply, while retaining much of the capital equipment that is already paid for and in service.

III. Seismic Stability of Stored Thermal Energy Systems

Thermal energy storage (TES) systems can be deployed to solve energy storage issues at various locations around the world, including those in seismically active regions. Because thermal storage mediums can sometimes be in the form of heavy blocks of refractory materials, designing the TES system with features to secure those blocks and withstand seismic events will allow for greater availability of the TES system throughout the world.

SUMMARY

The example implementations advance the art of thermal energy storage and enable the practical construction and operation of high-temperature thermal energy storage (TES) systems that can charge by VRE, store energy in storage media, and deliver high-temperature heat. This Section of the Summary relates to the disclosure as it appears in U.S. patent application Ser. No. 17/668,333 (U.S. Pat. No. 11,603,776).

Aspects of the example implementations relate to a system for thermal energy storage, including an input (e.g., electricity from a variable renewable electricity (VRE) source), a container having sides, a roof and a lower platform, a plurality of vertically oriented thermal storage units (TSUs), inside the container, the TSUs each including a plurality of stacks of blocks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen, nitrogen, argon, other inert gases, and other gases, alone or in combination), and when one is mentioned, it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g., to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 27 is an exploded perspective view of various components for an enclosure for use with a thermal energy storage system according to at least one example implementation.

FIGS. 36A to 36C show various views of a gate and orifice openings for use in an air or gas distribution system according to at least one example implementation.

FIG. 38 shows a perspective view of one end of an air or gas distribution system according to at least one example implementation.

FIGS. 41A to 41B show various views of components for use in an air or gas distribution system according to at least one example implementation.

FIGS. 46A to 47B show various views of a rotary orifice plate system according to at least some example implementations.

FIGS. 48A to 48B are perspective views of an outer enclosure for use with a thermal energy storage system according to at least one example implementation.

FIGS. 54A to 54B show various views of modular support structures for use in a thermal energy storage system according to at least one example implementation.

FIGS. 66A to 66B show various views of a support structure according to at least one example implementation.

FIGS. 67A to 67B show close-up views of portions of a support structure according to at least one example implementation.

FIG. 81 illustrates a plan view of the thermal energy storage block according to the example implementations.

FIG. 84A illustrates a side view of a stacked assembly of thermal energy storage blocks according to the example implementations.

FIG. 84B illustrates a cross-sectional view of a stacked assembly of thermal energy storage blocks according to the example implementations.

FIG. 84C illustrates a close-up view of interlock features of the thermal energy storage block according to the example implementations.

FIG. 84D illustrates a plan view of a stacked assembly of thermal energy storage blocks according to the example implementations.

FIG. 88A illustrates a schematic perspective view of a thermal energy storage block according to the example implementations.

FIG. 88B illustrates a schematic perspective view of a thermal energy storage block according to the example implementations.

FIG. 88C illustrates a schematic perspective view of an underside of a thermal energy storage block according to the example implementations.

FIG. 90A illustrates a front view of a support block for a thermal energy storage block according to the example implementations.

FIG. 90B illustrates a plan view of a support block for a thermal energy storage block according to the example implementations.

FIG. 90C illustrates a view of the underside of a support block for a thermal energy storage block according to the example implementations.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
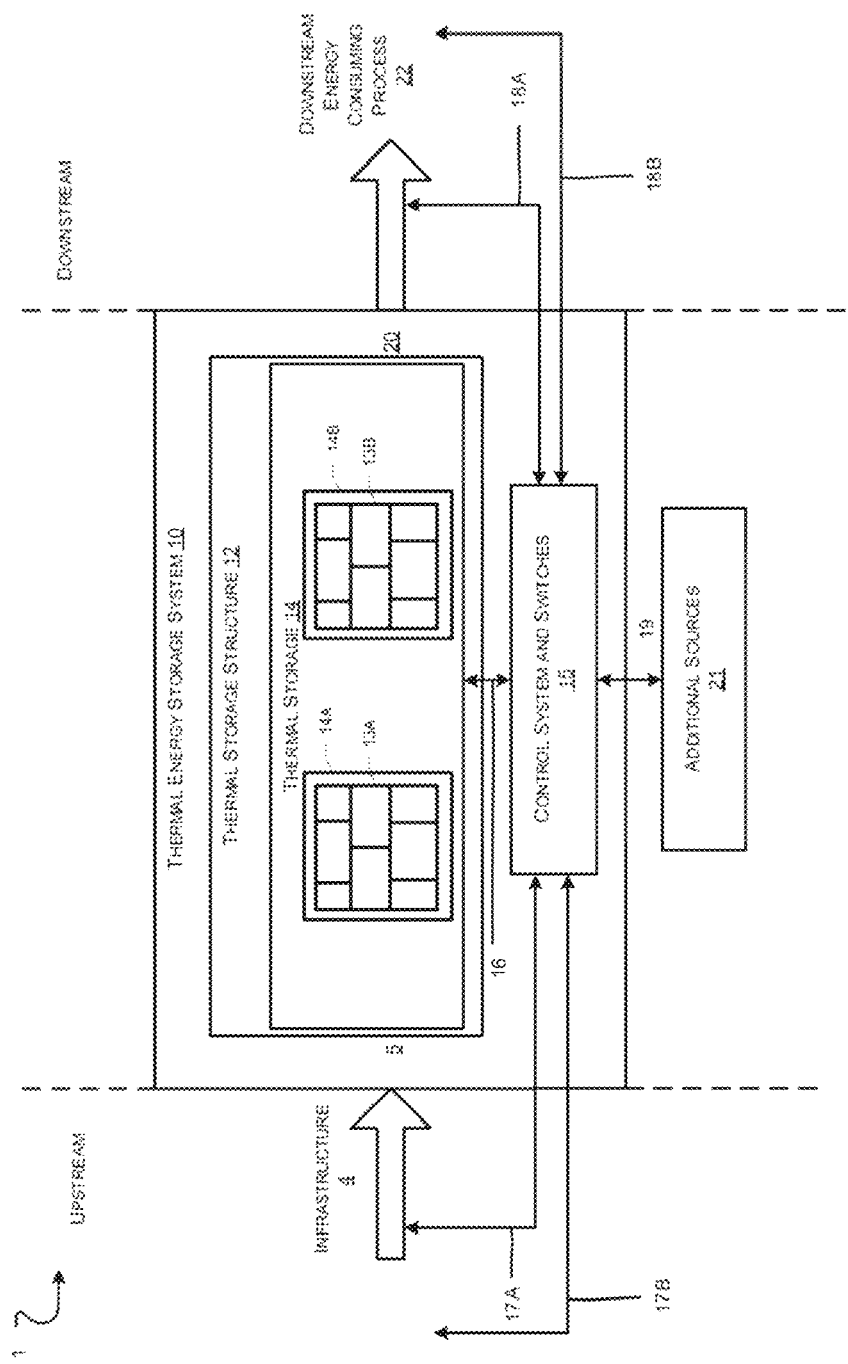
FIG. 1 illustrates a schematic diagram of the thermal energy storage system architecture according to the example implementations.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For case of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of a solid storage medium (e.g., 7B, 13A) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage medium within the assemblages may variously be referred to as thermal storage blocks, blocks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter portions of the solid storage medium, and absorbed and stored in the solid storage medium within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various implementations.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently store energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
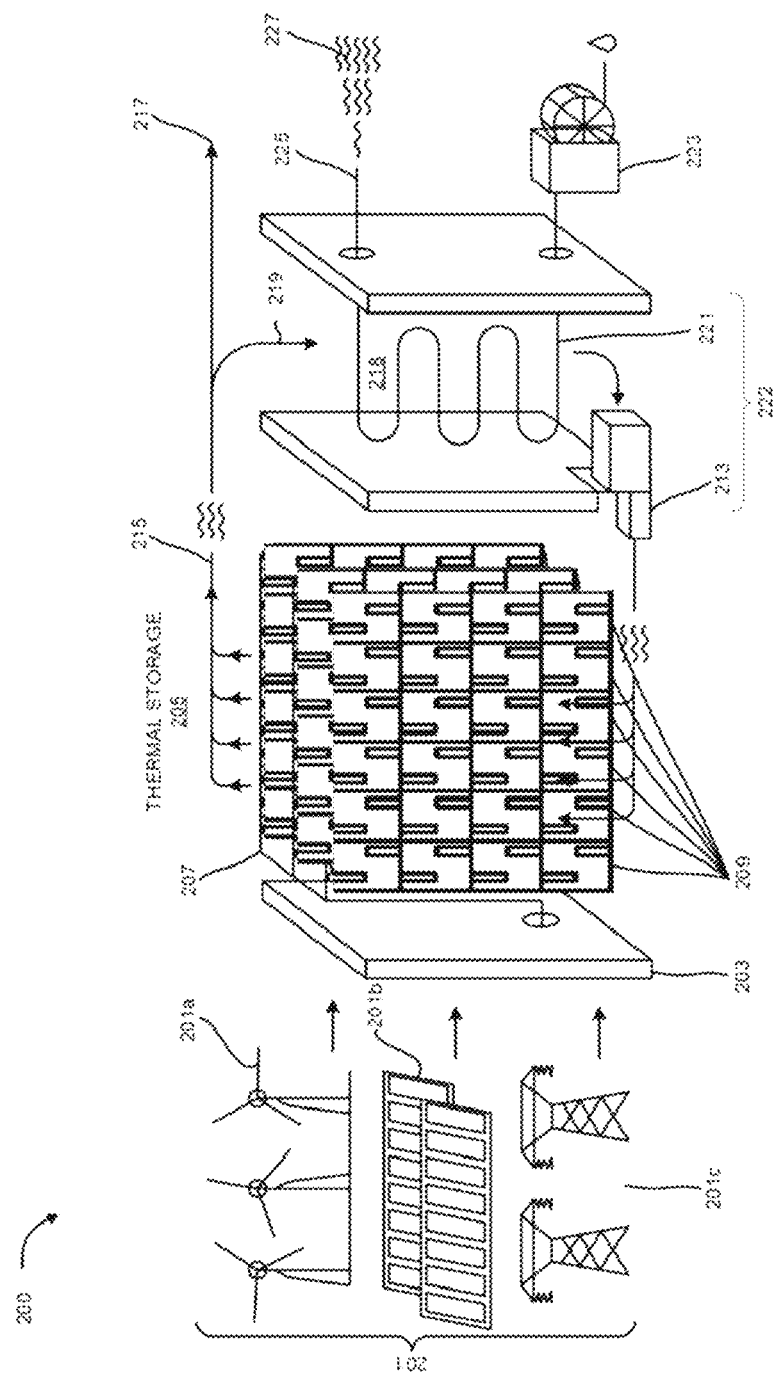
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201b also varies over time, depending on factors such as time of day, length of day due to the time of year, level of cloud cover due to weather conditions, temperature, other ambient conditions, etc. Further, the input electricity may be received from the existing power grid 201c, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage medium 209. Thermal storage components (sometimes called "blocks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by blocks in each of the arrays 209, with flow controlled by louvers. By the release of heat energy from the resistive heating elements 207, heat is radiatively transferred to arrays 209 of blocks during a charging mode. Relatively hotter block surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
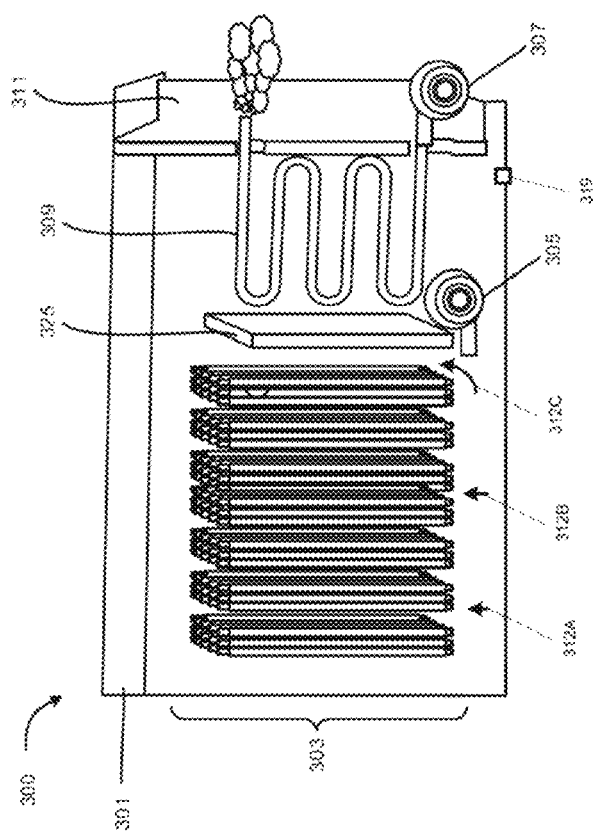
FIG. 3 illustrates a schematic diagram of a storage-fired once-through steam generator (OTSG) according to the example implementations.

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the block heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design challenging to implement. In many implementations, the steam quality is not 100% unless very special steam separators are installed in the drum. There is <1% frequently <0.1% water mist entrained in the steam. As is stated, the superheating further assures the high steam quality. The function of the superheater is to evaporate any mist and to heat the vapor above the evaporation temperature, the saturated steam temperature, which is the dew point at that pressure. The dew point is the temperature and pressure that as the steam cools, even slightly, a portion of the steam, (water vapor), condenses into liquid water.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
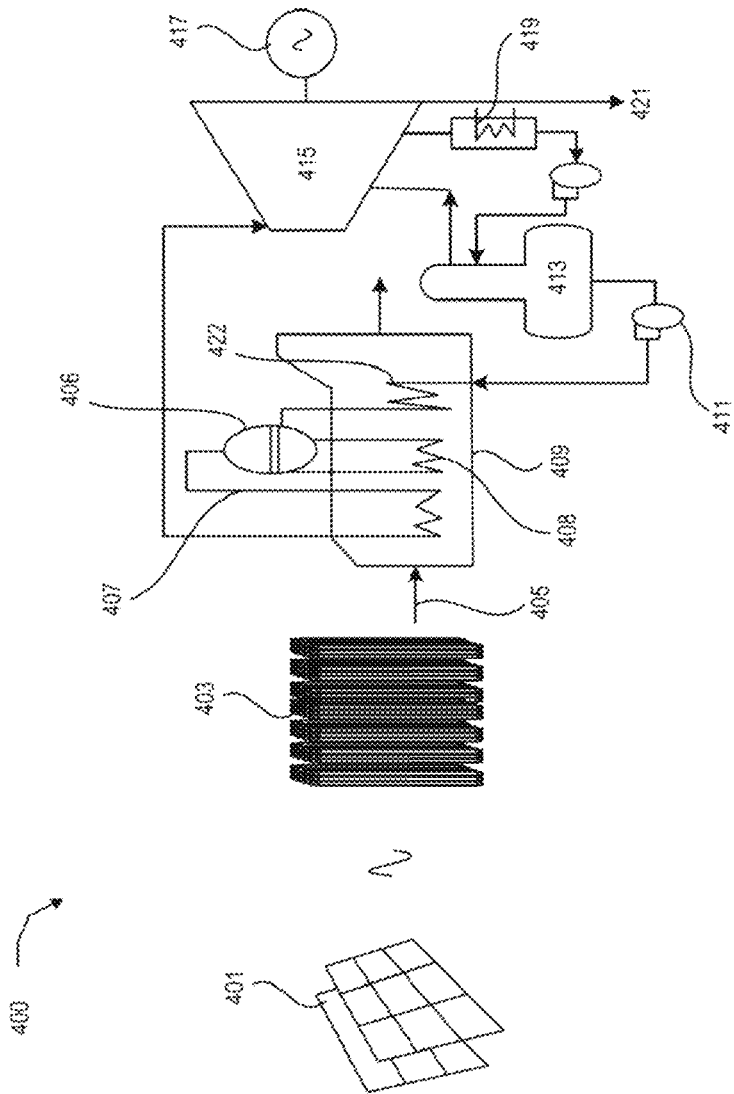
FIG. 4 illustrates an example view of a system being used as an integrated cogeneration system according to the example implementations.

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation. In many implementations, when superheated steam is used at least partially for mechanical power, the pressure is reduced through a turbine. This reduces the temperature even more than the pressure, and the temperature passes through the dew point and some of the steam condenses in the turbine. The water is detrimental to the turbine. Therefore, for co-generation or power projects, it may be desirable to add more heat to the steam to elevate the temperature to allow the temperature to drop and still be above the dew point for extraction of mechanical power without condensing water. For heating, as in distillation, the steam is saturated, as the condensation at high temperature delivers the most heat at the highest temperature.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner. The steam may drive a low-pressure letdown steam turbine to turn the pump and the exhaust steam may still have 90% of the energy for another use of the lower quality steam. It replaces the electric motor. Optionally, some implementations may use an inverse temperature cascade. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
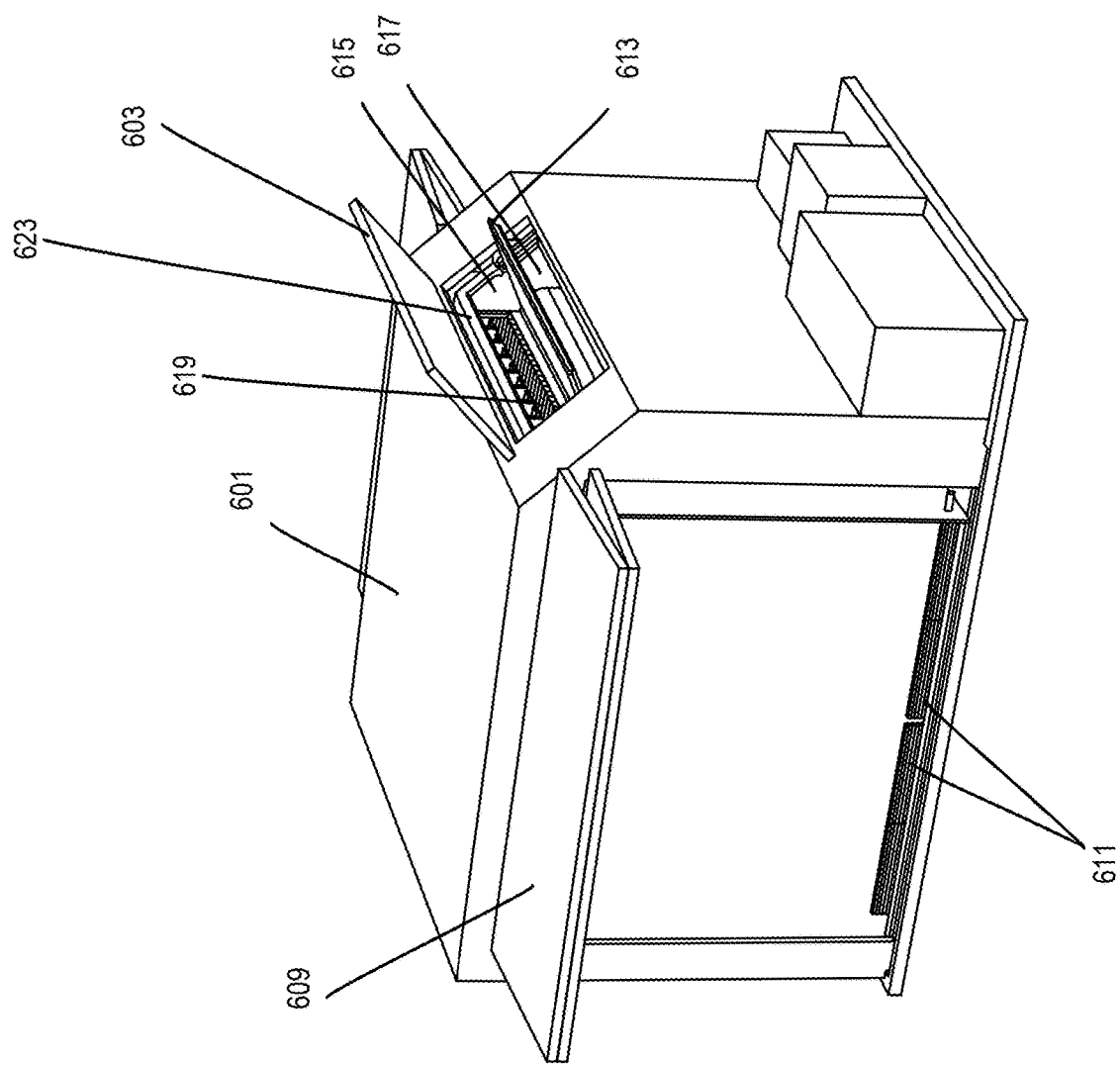
FIG. 6 provides an isometric view of the thermal storage unit with multiple vents closures open, according to some implementations.

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional super-heater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
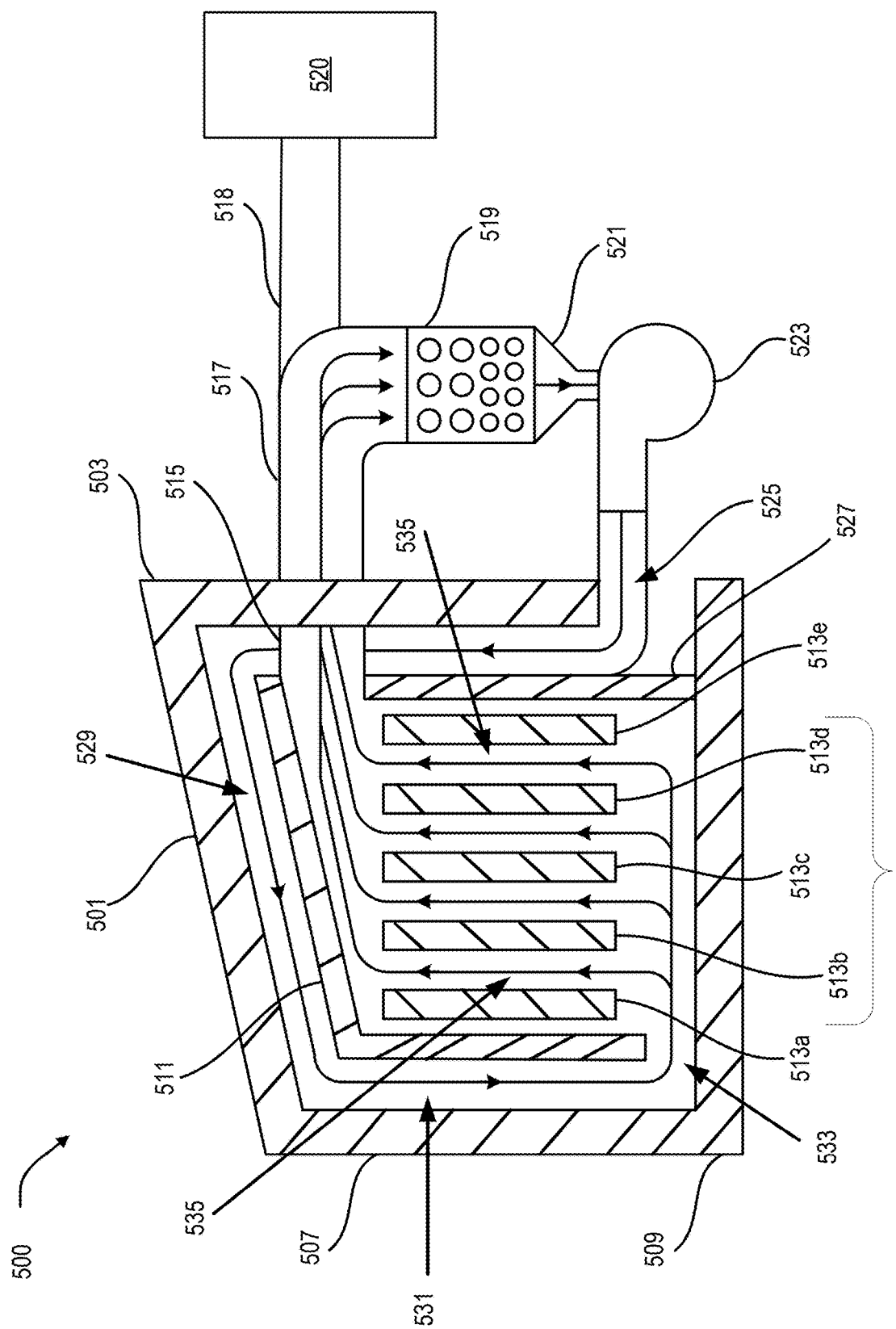
FIG. 5 illustrates dynamic insulation according to the example implementations.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of blocks in stack 513, the columns being represented as 513a, 513b, 513c, 513d and 513e. The heated fluid that is discharged from the upper portion of the columns of blocks 513a, 513b, 513c, 513d and 513e exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of blocks 513a, 513b, 513c, 513d and 513e and the air passages 535 are shown schematically in FIG. 5. The physical structure of the stacks and air flow passages therethrough in implementations described herein is more complex, leading to advantages.

In some implementations, to reduce or minimize the total energy loss, the layer of insulation 511 is a high-temperature primary insulation that surrounds the columns 513a, 513b, 513c, 513d and 513e within the housing. Outer layers of lower-cost insulation may also be provided. The primary insulation may be made of thermally insulating materials selected from any combination of refractory blocks, alumina fiber, ceramic fiber, and fiberglass or any other material that might be apparent to a person of ordinary skill in the art. The amount of insulation required to achieve low losses may be large, given the high temperature differences between the storage medium and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators-requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the blocks 513a, 513b, 513c, 513d and 513e within the housing so that the blocks 513a, 513b, 513c, 513d and 513e are not in contact with the outer surface 501, 503, 507 of the housing, and are thus thermally isolated from the housing by the primary insulation formed by the layer of cool fluid. The blocks 513a, 513b, 513c, 513d and 513e may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the blocks, which restricts the dissipation of thermal energy being generated by the heating elements and/or stored by the blocks into the outside environment or the housing, and preheats the fluid. As a result, the controlled flow of cold fluid by the fluid blowing units of the system may facilitate controlled transfer of thermal energy from the blocks to the conduit, and also facilitates dynamic thermal insulation, thereby making the system efficient and economical.

In another example implementation, the buoyancy of fluid can enable an unassisted flow of the cold fluid around the blocks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat desired to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in implementations for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Blocks and Heating Elements

A. Problems Solved by One or More Disclosed Implementations

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the blocks.

B. Example Solutions Disclosed Herein

In some implementations, thermal storage blocks (e.g., blocks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers but are not directly open to the heating element. The stack of blocks may be used alone or in combination with other stacks of blocks to form the thermal storage unit, and one or more thermal storage units may be used together in the thermal energy storage system. As the fluid blower circulates the fluid through the structure during charge and discharge as explained above, a thermocline may be formed in a substantially vertical direction; that is, the temperature differences are relatively small or minimal between regions of fluid in a substantially vertically oriented plane or virtual "slice" through the storage medium. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid medium system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats block material with high heater power loading, low and uniform exposed surface temperature, and long-distance heat transfer within the storage medium array via multi-step thermal radiation.

Innovative structures according to the present disclosure may comprise an array of blocks that form chambers. The blocks have structured air passages, such that in the vertical direction air flows upwards in a succession of open chambers and small air passages. In some implementations, the array of blocks with internal air passages is organized in a structure such that the outer surface of each block within the TSU core forms a wall of a chamber in which it is exposed to radiation from other block surfaces, as well as radiation originating from an electrical heater.

The chamber structure is created by alternating block materials into a checkerboard-type pattern, in which each block is surrounded on all sides by open chambers, and each open chamber has adjacent blocks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each block within such a checkerboard structure is exposed to open chambers on all sides. Accordingly, during charging, radiant energy from multiple heating elements heats all outer surfaces of each block, contributing to the rapid and even heating of the block, and reducing reliance on conductive heat transfer within the block by limiting the internal dimensions of the block.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed block surfaces are larger per unit of mass than in prior systems, meaning that incoming wattage per unit area is correspondingly smaller, and consequently thermal stresses due to block internal temperature differences are lower. And critically, re-radiation of energy-radiation by hotter block surfaces that is absorbed by cooler block surfaces-reduces by orders of magnitude the variations in surface temperature, and consequently reduces thermal stresses in block materials exposed to radiant heat. Thus, the radiation chamber design effectively enables heat to be delivered relatively uniformly to a large horizontally oriented surface area and enables high wattage per unit area of heater with relatively low wattage per unit area of block.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in block heat conductivity, or any cracks forming in a block that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media and localized peak heater temperatures are reduced by a large factor compared to previous designs.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the blocks from the bottom end of the cells to the upper end of the cells in the first section at the predefined flow rate, and then into the second section, such that the air passing through the blocks and/or heating elements of the cells at the predefined flow rate may be heated to a second predefined temperature, and may absorb and transfer the thermal energy emitted by the heating elements and/or stored by the blocks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., block) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the blocks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Implementations implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an implementation. Air temperature can be adjusted by recirculation/mixing, to provide inlet air temperature that does not vary with the state of charge of the blocks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various implementations releases low-pressure steam that is condensed to a liquid by a condenser 419, and then de-aerated using a deaerator 413, and again delivered to the HRSG 409.

III. Configurations for Thermal Energy Storage

Thermal energy storage (TES) systems can be deployed to solve energy storage issues at various locations around the world, including those in seismically active regions. Because thermal storage media can sometimes be in the form of heavy blocks of refractory materials, designing the TES system with features to secure those blocks and withstand seismic events will allow for greater availability of the TES system throughout the world.

Figures 7A, 7B:
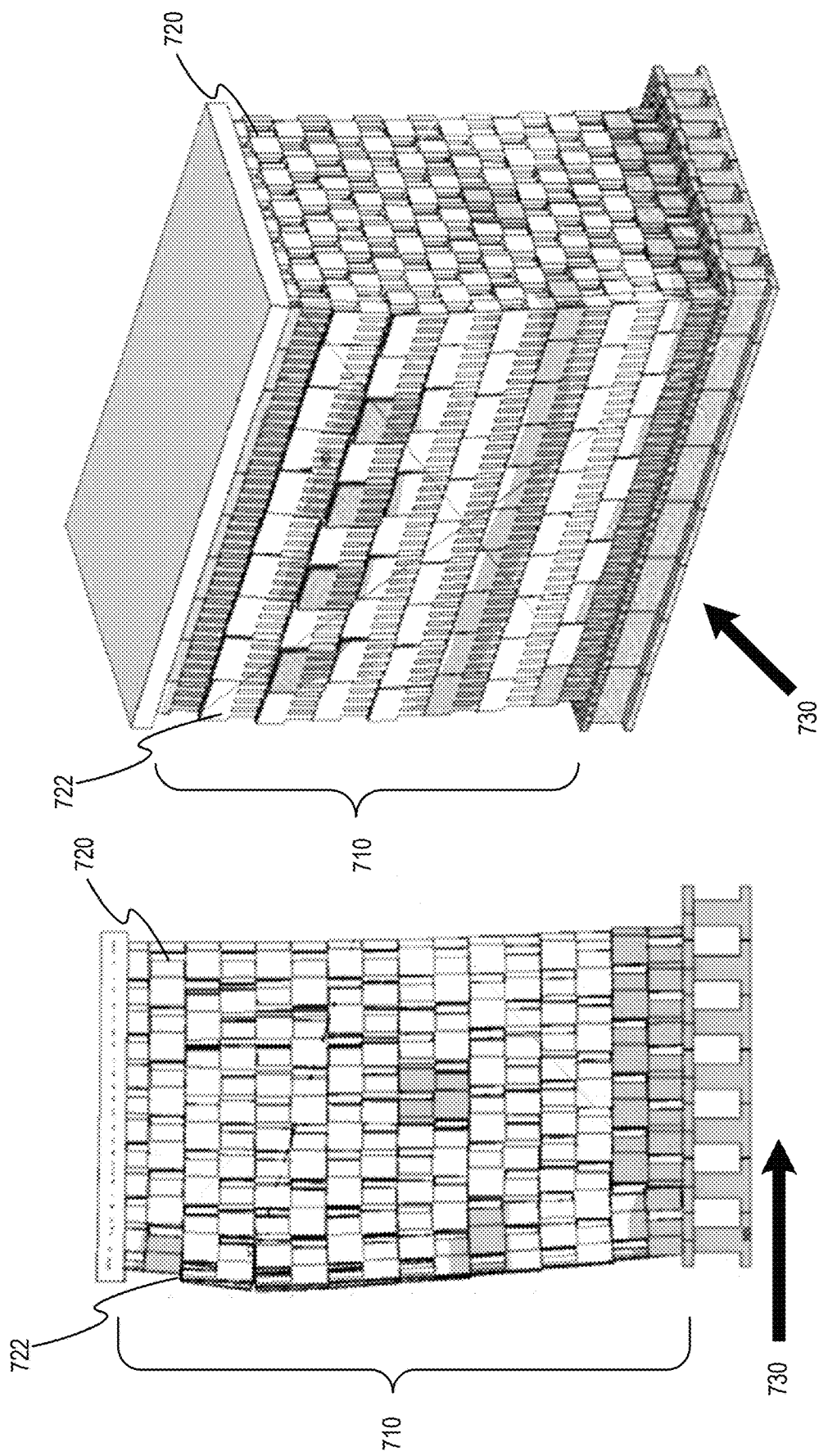
FIGS. 7A and 7B show side and perspective views of a thermal energy storage assemblage subject to seismic lateral acceleration according to at least one example implementation.

FIG. 7A shows a thermal energy storage medium 710 formed from multiple thermal energy storage blocks 720. The implementation of FIG. 7A shows that these thermal energy storage blocks 720 can be stacked multiple layers high to increase the thermal energy storage density for a particular footprint area of the thermal energy storage medium 710. As the stack of storage blocks 720 increases in height and energy storage density per footprint area, the risk of damage to the stack from a seismic event also increases. FIG. 7A shows one example where the entire stack of thermal energy storage blocks 720 is shifted and/or at least some individual thermal storage blocks 722 displaced from an interlocking configuration due to seismic acceleration in at least a first direction 730. FIG. 7B shows a perspective view of the thermal energy storage medium 710 of FIG. 7A with multiple thermal energy storage blocks 722 being displaced due to the seismic acceleration in at least a first direction 730.

It should be understood that FIG. 7A is a greatly exaggerated to more easily visualize a maximum displacement for seismic load with horizontal acceleration (Eh) acting in the horizontal direction 730. For the example shown in FIG. 7A, the maximum displacement in this implementation occurs at the boundary between the 6th and 7th layers of blocks, and for this particular implementation, has a peak value of 0.027 meters, or 1.05 inches. The maximum displacement varies from near zero at the bottom layer of blocks 720 to the maximum for blocks 722 at the top of level 6, and then reduces to about 0.010 meters (0.39 inches) at the cap 724 where the stack of thermal storage blocks 722 is restrained by the cross-bracing system (shown more clearly in FIG. 9). The displaced shape of the block stack at the maximum displacement can be seen most clearly in the end view of FIG. 7A when there is acceleration in direction 730.

Figure 8B:
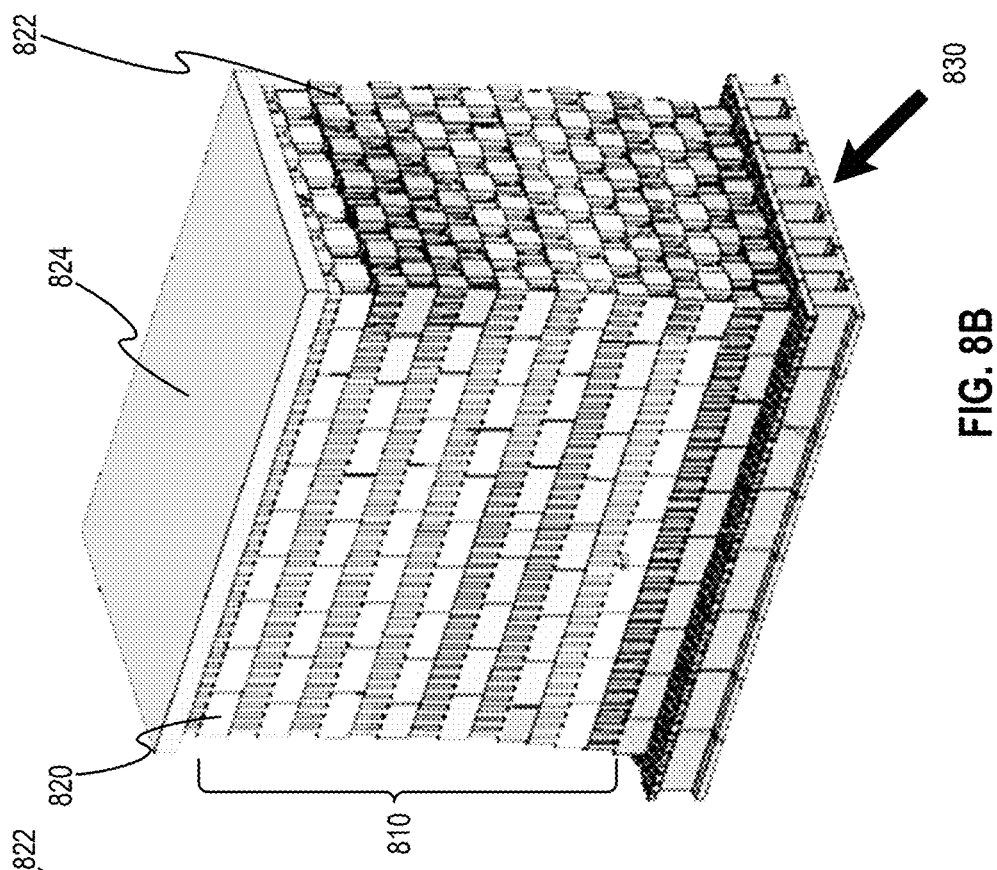
FIGS. 8A and 8B show side and perspective views of a thermal energy storage assemblage subject to seismic lateral acceleration according to at least one example implementation.
Figure 8A:
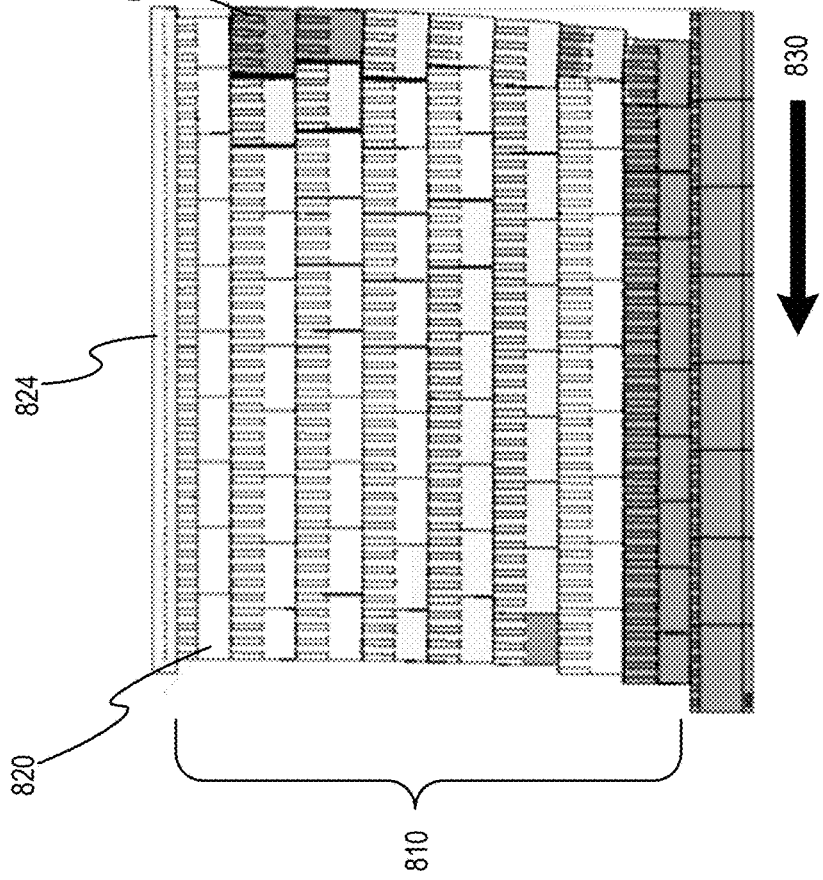

FIG. 8A shows another example of seismic acceleration on a thermal energy storage medium 810 formed from multiple thermal energy storage blocks 820, similar to those shown in FIG. 7A. It should be understood that FIG. 8A is also a greatly exaggerated image allow for to more easy visualization of a maximum displacement for seismic load with horizontal acceleration (Eh) acting in the horizontal direction 830. The thermal energy storage medium 810 may be supported on a layer of support blocks 840 that can provide fluid flow from below the thermal energy storage medium 810 or to provide thermal isolation of soil or other foundation from the thermal energy storage blocks 820.

FIG. 8B shows a perspective view of the thermal energy storage medium 810 shown in FIG. 8A with horizontal acceleration (Eh) acting in the direction 830. In the example shown in FIGS. 8A and 8B, the maximum value of displacement (0.024 meters, 0.94 inches) is approximately the same as in the lateral acceleration load case shown in FIGS. 7A and 7B, although in this current example, the maximum displacement occurs on the end of the stack at the boundary between the 7th and 8th layers of blocks 822. For this load case, the displaced shape of the block stack can be seen most clearly in the side view of FIG. 9A.

Figure 9:
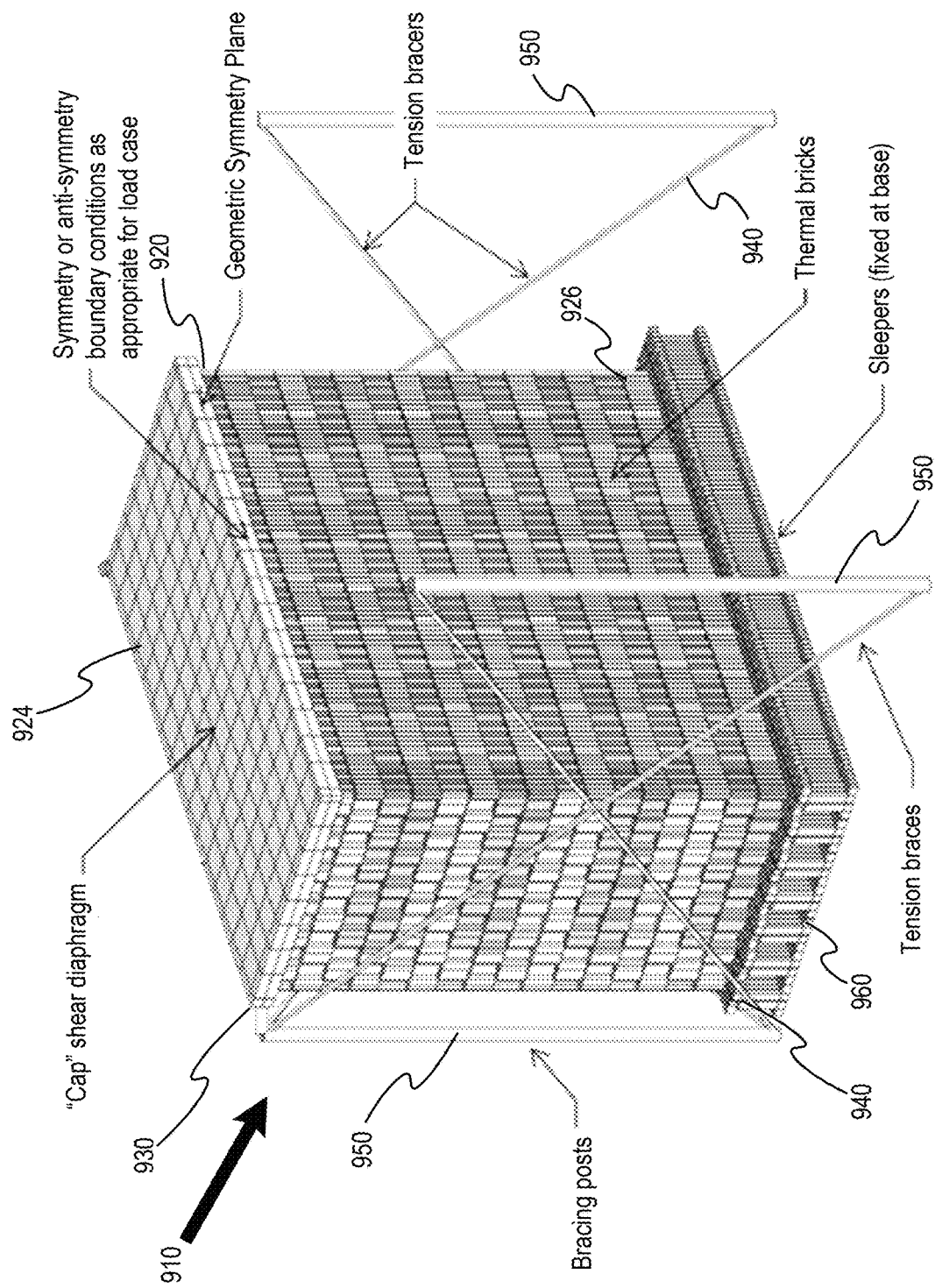
FIG. 9 is a perspective view of on a thermal energy system with seismic stability features according to at least one example implementation.

FIG. 9 shows that various features can be incorporated into the design of the thermal storage medium 910 to improve the structural stability of the stack of thermal energy storage blocks 920 when subjected to seismic acceleration. In one implementation, a top portion of thermal energy storage medium can be captured within a cap layer 924 that serves as a shear diaphragm to hold the upper layer of blocks together and provide a horizontal support point at the corners 930 where a second stability feature such as but not limited to column and cross-bracing system, which may include tension braces 940, is implemented to help stabilize the thermal energy storage medium. In some implementations, the capturing of a top portion of the thermal energy storage medium may be in the form of a perimeter support bracket that engages a peripheral portion of the thermal energy storage medium.

Figure 10:
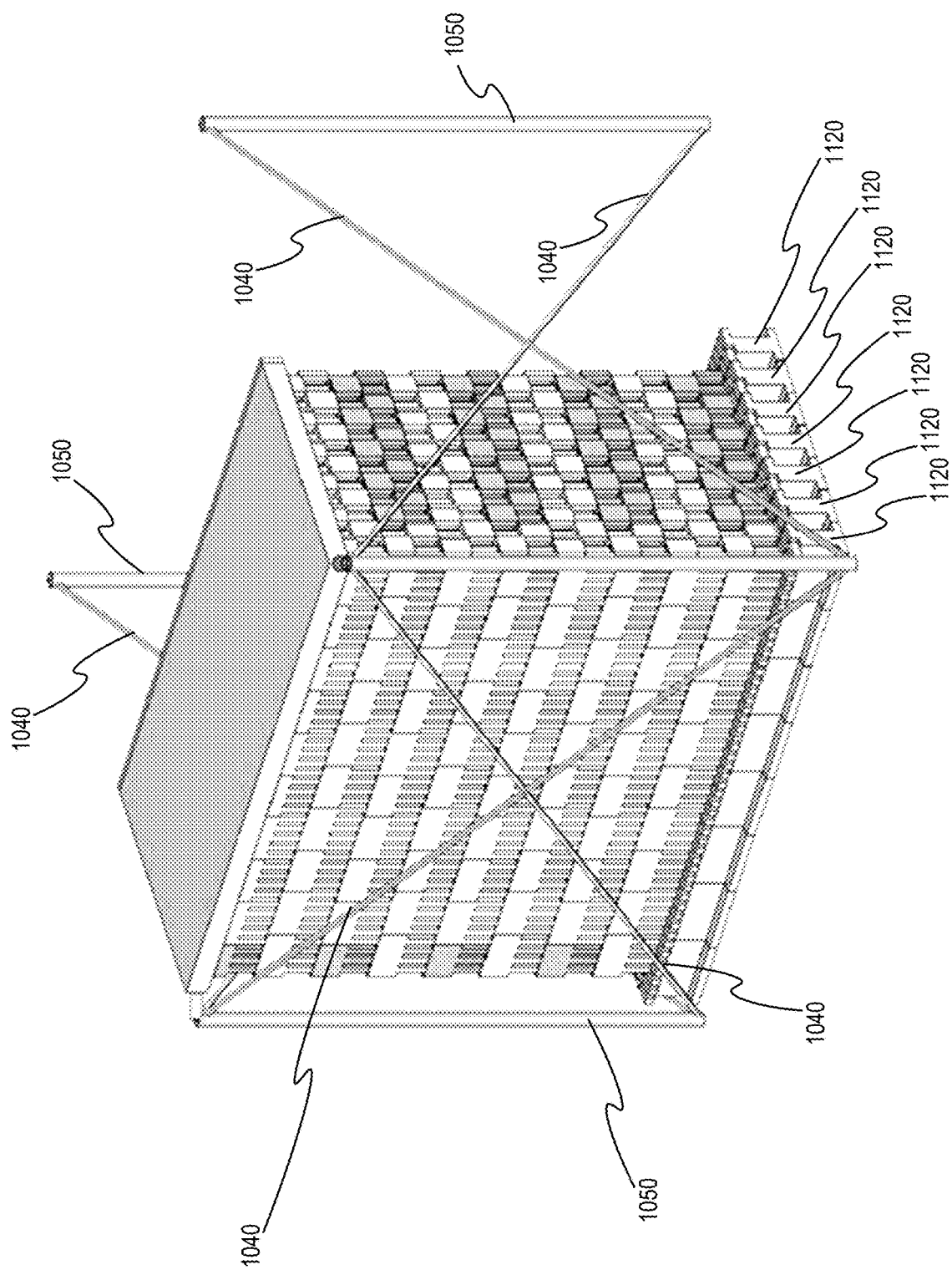
FIG. 10 is a perspective view of on a thermal energy system with seismic stability features according to at least one example implementation.

FIG. 10 show that the cross-bracing system may uses tension braces 1040 on two or more sides of the thermal energy storage medium 910. Some implementations may use more or fewer braces 1040. Some implementations may use tension wires, other non-rigid supports that can be tensioned, or a combination of rigid and non-rigid supports.

For at least some implementations, the stability of the stack depends in part on a system of posts 1050 at the corners of the stack(s) with cross-bracing, non-crossing bracing, or comparable structure between the posts on all four sides of the thermal storage medium. Some implementations may use more posts 1050. Some implementations may use fewer posts 1050. Some may use posts 1050 of different heights or some may use posts 1050 that are all of the same height. Some posts may be linear in shape, while other implementations may use bowed, curved, or other non-linear shape for the posts 1050. Optionally, some implementations may use non-post structures such as but not limited to I-beams, rectangular or trapezoidal beams, or other shaped structures for structurally connected on portion of the "cap" layer 1024 to the ground or other anchoring surface.

As seen in FIGS. 9 and 10, the tops of the stack or stacks may be tied together by means of a semi-rigid shear diaphragm "cap" 924 or 1024 that effectively captures the top layer of blocks and is capable of transferring horizontal loads at this level into the bracing system. The cap 924 or 1024 may be formed from multiple modular sections, or in some implementations, it may be a single continuous unit. The modular sections may be of the same size or they may be configured to be different sized or shaped. Some implementations may use a multiple tiles or blocks that interlock to form the top cap 924 or 1024. Some implementations may not cover the entire upper surface, but instead use bracketed structures or scaffold that provide circumferential support 1070 or sectional support 1072 but without covering the entire top surface.

While only one stack of blocks 720 is illustrated in FIGS. 7 to 10, some implementations may have two or more individual stacks standing side-by-side within one enclosure. In some implementations, the two stacks are connected at the top layer by a cap layer that acts as a shear diaphragm.

Figure 11:
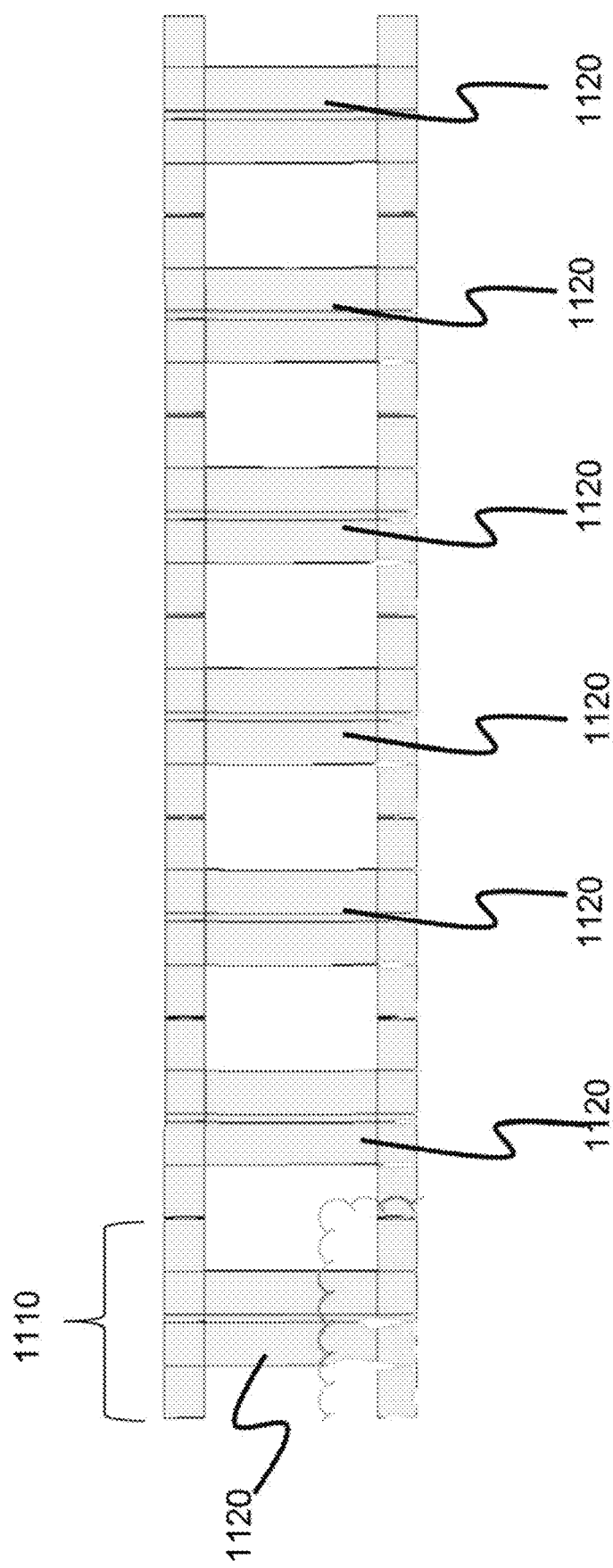
FIGS. 11 and 12 show various views of support blocks used with a thermal energy storage assemblage according to at least one example implementation.

FIG. 11 shows a side view of the support blocks 1110 beneath the thermal energy storage medium 910. In this implementation, the stack of thermal energy storage blocks 920 rests on multiple longitudinal "sleeper" beams 1120 that provide vertical support at the lowest level of blocks 926. The sleeper blocks 960 may rest on a vibration isolation system slab and are tied down to the slab with anchor bolts. In some implementations, nodes at the base of the sleeper beams are restrained, and the uplift and shear reaction forces at this interface could then be used to design the sleeper beam anchor bolts and check bearing pressures. In one implementation, the support blocks 1060 may be tied into the vibration isolation system slab using anchor bolts (or similar) to carry the seismic up-lift loads.

Figure 12:
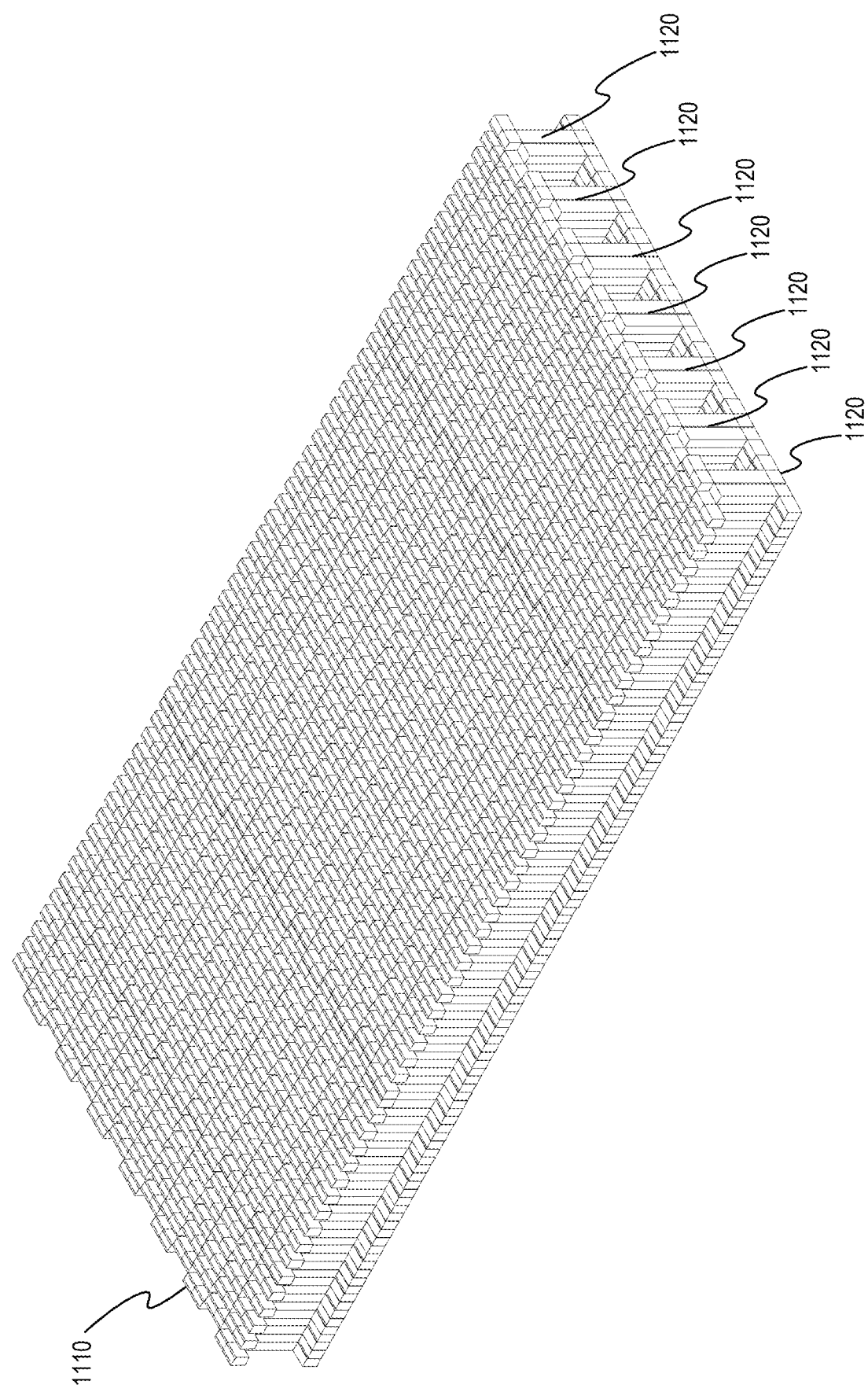

FIG. 12 shows a perspective view of the layer of support blocks 1110 that support the thermal energy storage medium. Although this implementation may use multiple support blocks, some implementations may use larger modular sections such as long beams or other sub-set sized pieces to define the larger support layer.

Figure 13:
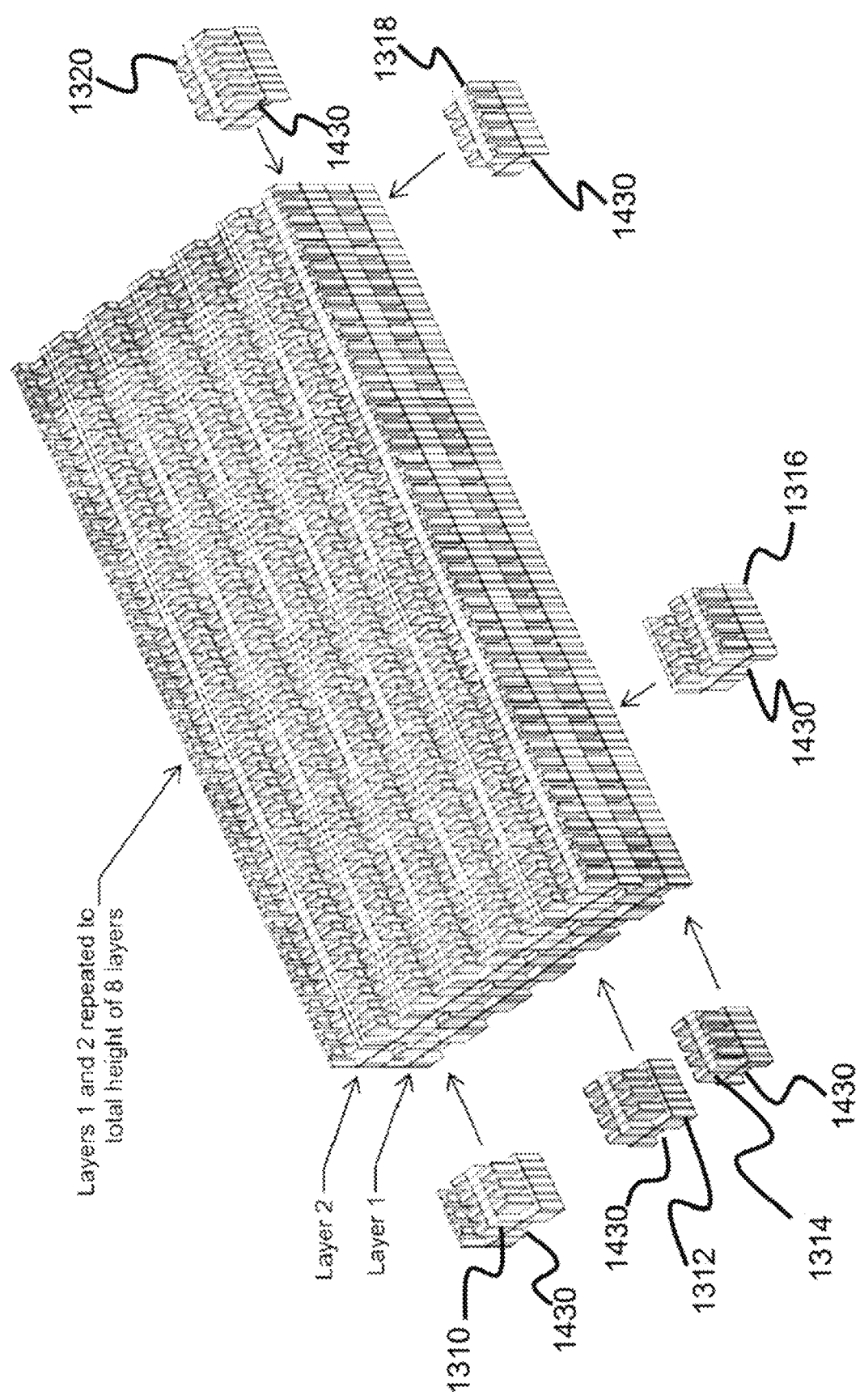
FIG. 13 shows a perspective view of two layers of thermal energy storage blocks according to at least one example implementation.
Figure 14:
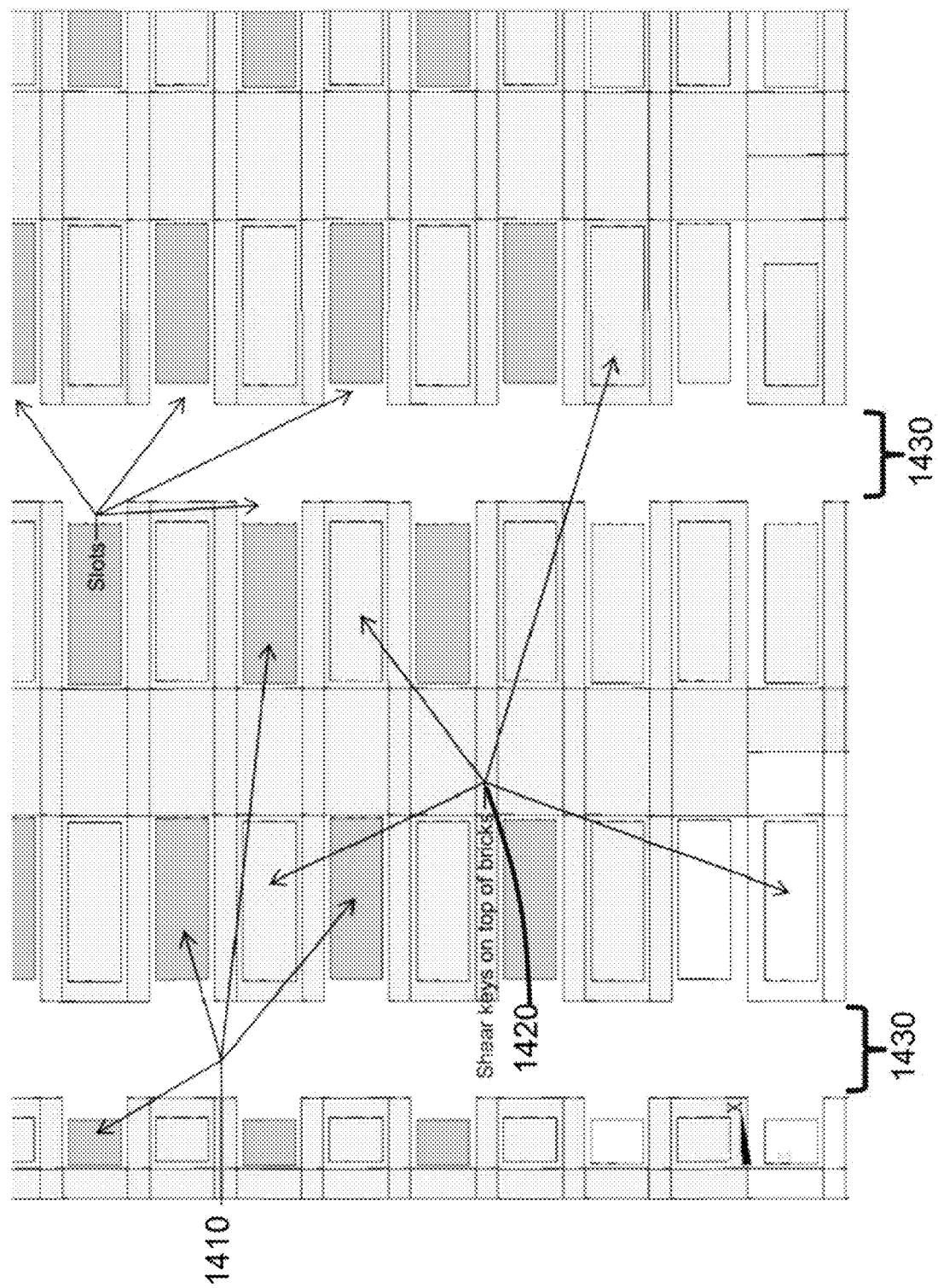
FIGS. 14 and 15 show close-up views of portions of thermal storage blocks and shear key features according to at least one example implementation.
Figure 15:
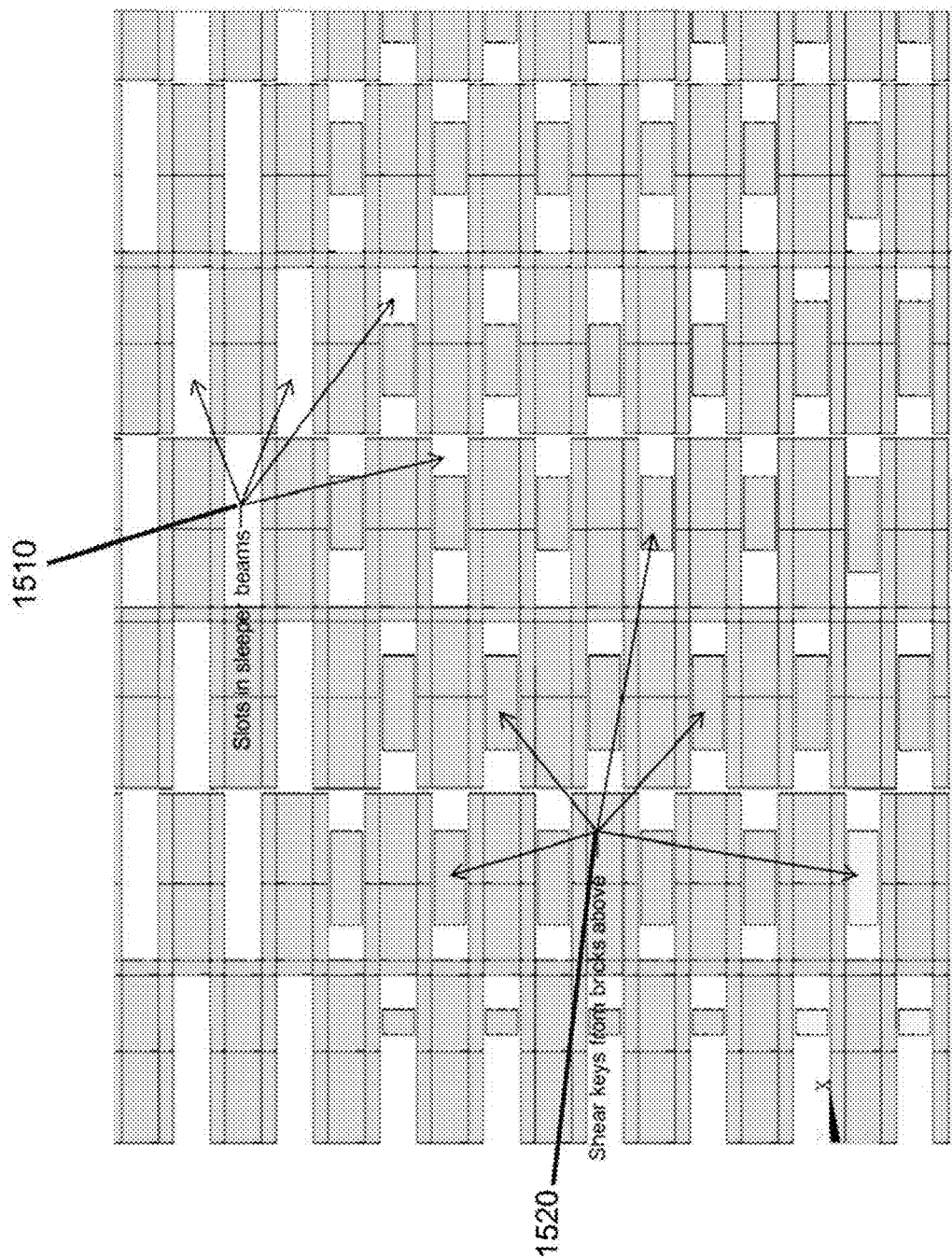

FIG. 13 shows one implementation where the stack of blocks is an assembly of only six individual block geometries 1310, 1312, 1314, 1316, 1318, and 1320. As seen in FIG. 13, some block geometries 1314 have fewer numbers of a cavities and structures. Some block geometries 1316 and 1320 have move cavities and features. In this implementation, these multiple block shapes are arranged into two unique block layer configurations, which are in sum stacked alternately one on top of each other to create the total block stack height of eight individual layers for this particular implementation. The two unique layer configurations and individual block geometries are used to provide further structural integrity as shown in FIGS. 14 and 15.

In addition to friction, horizontal sliding between blocks within the stack is limited by rectangular interlocking "shear keys" at the horizontal interfaces between each layer of blocks and at the top of the sleeper beams. FIG. 14 shows how these shear keys are positioned within corresponding slots at the horizontal interface of the blocks. FIG. 14 shows shear keys 1410 in blocks above and shows shear keys 1420 on top of blocks. FIG. 14 also shows that some blocks include gaps 1430 as part of the block geometry, allowing for insertion of heating elements or other components into the stack of blocks. FIG. 15 shows the shear keys at the interface with the top of the sleepers, where the gap is larger in the lateral direction. FIG. 15 shows slots 1510 in sleeper beams and shear keys 1520 from block above. Also, as seen in previous FIGS. 7 to 11, there may be a stagger in the block alignment at each layer that helps hold the stack together during horizontal acceleration loading.

Thermal Energy Storage Block for Horizontal Flow

Figure 16:
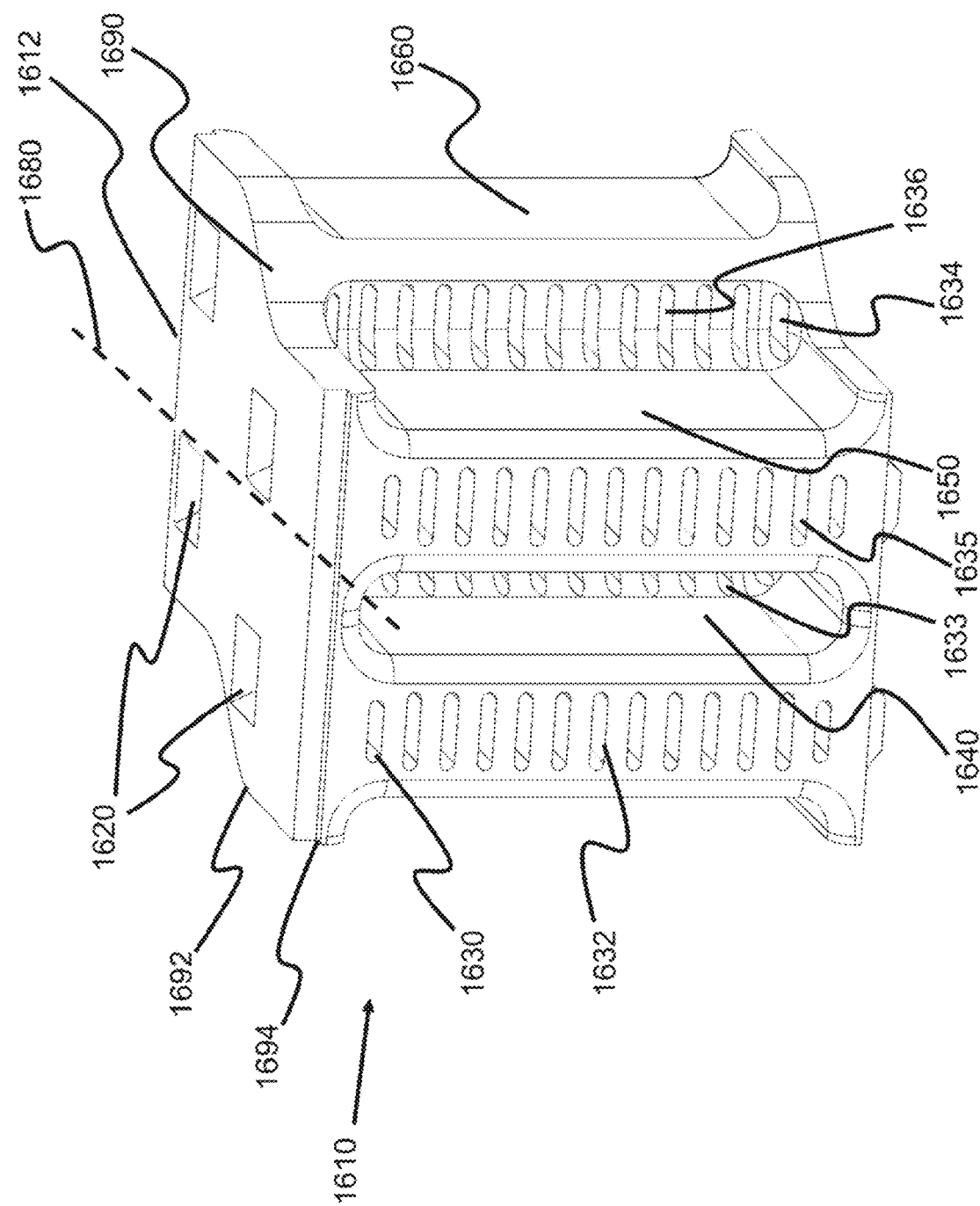
FIG. 16 is a perspective view of a thermal energy storage block according to at least one example implementation.

FIG. 16 shows one implementation of a thermal energy storage block 1610 configured for use in a system with horizontal air or fluid flow. This perspective view shows that there may be protrusions 1620 and/or indentations 1622 on the top and/or bottom surface of the block 1610 to facilitate aligning and interlocking block 1610 with an adjacent block above or below (not shown). The thermal energy storage block 1610 may include multiple horizontal flow channels 1630 and 1632 which can be of different size and/or shape. The block 1610 may include at least one radiation chamber 1640 for receiving thermal energy radiated to the thermal storage block 1610, wherein the chamber is in a horizontally offset column from flow channels 1630 and 1632. In one implementation, one or more of the horizontal flow channels 1633 of the block 1610 are in fluid communication with the radiation chamber 1640. In one implementation, the flow channels 1633 are shaped and sized similar to the layout shown for flow channels 1630 and 1632. In some implementations, the block 1610 may include two or more radiation chambers 1640 with multiple horizontal flow channels in fluid communication with each of the radiation chambers 1640. In FIG. 16, a second of the radiation chambers 1640 is located in the block 1610 to horizontally align with flow channels 1635, but opening on the opposite surface 1612.

FIG. 16 also shows that the storage block 1610 may have a wall 1650 that will form part of a surface of a radiation chamber when the storage block 1610 is placed against an adjacent block thermal energy block (not shown). The adjacent thermal energy storage block can have complementary features that when combined with those of block 1610 to define a radiation chamber similar to that of radiation chamber 1640, except that one portion is defined by one block and another portion is defined by an adjacent block.

The horizontal flow channels 1634 and 1636 open into this partial radiation chamber defined in part by wall 1650. Wall 1660 can also form a radiation chamber when connected to another storage block (not shown), again forming a radiation chamber similar to radiation chamber 1640. Of course, some implementations may have radiation chambers formed by adjacent storage blocks of different size or shape from the radiation chambers 1640; however, many implementations may have all of the radiation chambers be of similar size and shape.

As viewed from top-down, one implementation of block 1610 has an asymmetric perimeter shape relative to a longitudinal axis shown by dotted line 1680. The block 1610 has a perimeter with two sides having straight edges and two sides with shaped edges such as but not limited to the wave-shaped profile shown for edges 1690 and 1692. The asymmetrical shape facilitates the positioning of the block such that it is oriented correctly in the stack. The asymmetry also provides surfaces that interlock one block 1610 to an adjacent block 1610. The asymmetry further allows for air flow channel 1634 and 1636 to be incorporated into the block 1610. The block 1610 also includes at least one ledge surface 1694 that can be used for mounting heater element supports thereon. Optionally, the block 1610 may have multiple ledge surfaces 1694, typically on different edges of the block 1610. This allows for a ledge surface 1694 on one block to face a ledge surface 1694 on an opposing block while defining a gap therebetween, creating mounting surfaces for heater elements or other hardware (including, e.g., thermocouples or other temperature sensors) that may be inserted in the gap between the opposing blocks. Optionally, the ledge surface 1694 is a separate piece from the block 1610. Such a separate piece may be added to the block after manufacturing or during assembly onsite. The separate piece may be glued, mechanically attached, or otherwise integrated to the block 1610.

In some implementations, thermal storage blocks are made of a refractory material (e.g., castable materials) having high thermal conductivity and absorption capability. The block may be made of a predefined composition of any or a combination of alumina, aggregates like magnetite or olivine, and binders. The material selection, sizing, and fraction of aggregate in binder may be chosen to optimize strength, thermal conductivity, temperature range, specific heat, and/or cost. For example, materials of higher thermal conductivity reduce temperature differences for given heat flux, and enable the use of fewer, larger bricks. Binder materials may be chosen which set during casting, or may be chosen as materials which are thermally fired prior to use or which change composition once heated in use.

The blocks may be manufactured using a mold. More specifically, the material may be provided in a powder form that is mixed with water and/or other liquids, to achieve a consistency based on the amount of added liquid relative to the volume of power. The mixture is poured into a mold and sets in the mold for a period of time. The mold is removed, and the set bricks are formed. Alternatively, the blocks may be manufactured using a block press system, a block extrusion system, or 3D printing. Regardless of the method of fabrication, the block may be formed in a manner that reduces or eliminates unintended voids within solid block areas. The various features of the blocks (such as the flow channels, radiation chambers, protrusions, recesses, or other features) are formed from being pressed, extruded, cast, or combinations of these or other suitable manufacturing techniques from a refractory material and/or other thermal energy storage material.

Figure 17:
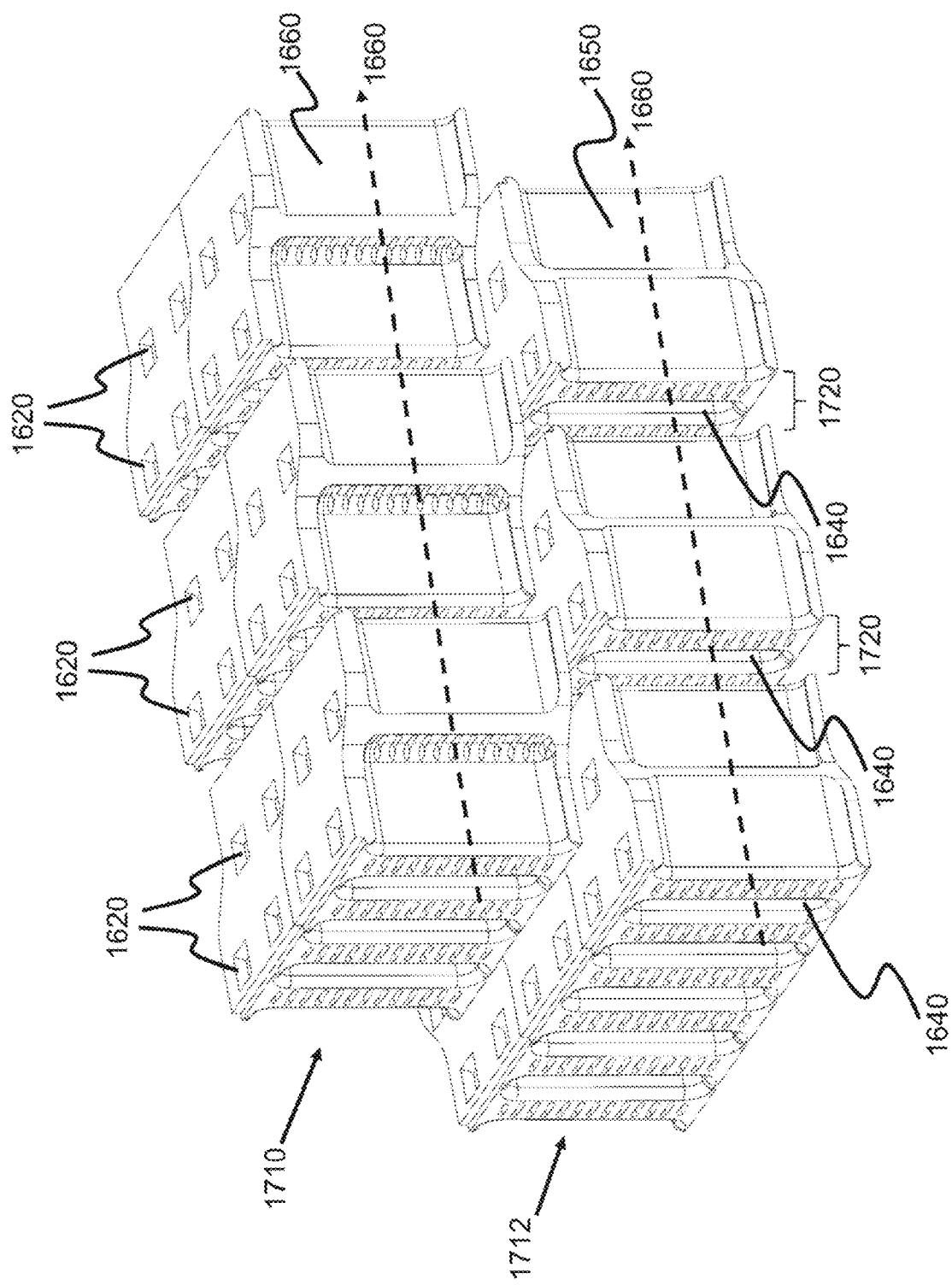
FIG. 17 shows multiple thermal energy storage blocks arranged in an interlocking configuration according to at least one example implementation.

FIG. 17 shows one implementation of multiple blocks 1710 and 1712 stacked in an interlocking manner. In this non-limiting example, the blocks 1710 on the upper layer straddle a gap 1720 between blocks 1712 on a lower level. In this example implementation, it can be seen that a block 1710 in one level is in contact four blocks 1712 of the lower level. Additionally, an example horizontal flow pathway 1714 through this assemblage of thermal storage blocks 1710 will traverse a radiation chamber 1640, a set of fluid flow channels 1633 or 1635 (not shown, but behind wall 1650 or 1660), a receiving channel provided by gap 1720 (including any heating element or other hardware in that receiving channel), and repeating in that pattern until the air or gas flow exits the thermal energy storage assemblage.

Interlocking the blocks 1710 and 1712 in this manner creates space such as for a heater element receiving channel at the gap 1720 between the rows of blocks 1712 in the lower level. By way of non-limiting example, the heater element that fits into the gap 1720 may be a heater wire or conduit shaped as a coil, a sinusoidal waveform, other wave-like shape, or other geometric shape as appropriate to fit in this receiving channel provided by gap 1720. This allows for the blocks to be interlocked while also creating space for other hardware that may be installed into the storage medium. In one non-limiting example, this gap 1720 is defined as part of the block-stacking process, where multiple blocks 1710 are engaged simultaneously by a pick-up a tool that lifts the blocks in a configuration that pre-spaces the rows apart when lifting multiple blocks into position. In this manner, at least two rows of blocks 1710 are placed at the same time so that they are simultaneously placed into the stack in manner that already pre-spaces the rows of blocks at a predetermined distance. This reduces the number of steps associated with assembly, thus making the stacking more efficient and maintains the gap 1720 in an accurate, predefined manner between rows of blocks. Optionally, some implementations may also allow the pick-up device to selectively de-select blocks that it does not want to lift into place, so that the number of blocks being lifted into the stack can be varied if there are configurations that desire few blocks in certain sections, such as when stacking an upper layer that may have few blocks in that layer. In one non-limiting example, this ability to de-select a block can be implemented through vacuum lifting systems that can selectively disengage itself from one or more blocks while maintaining vacuum connection to one or more other blocks.

Figure 18:
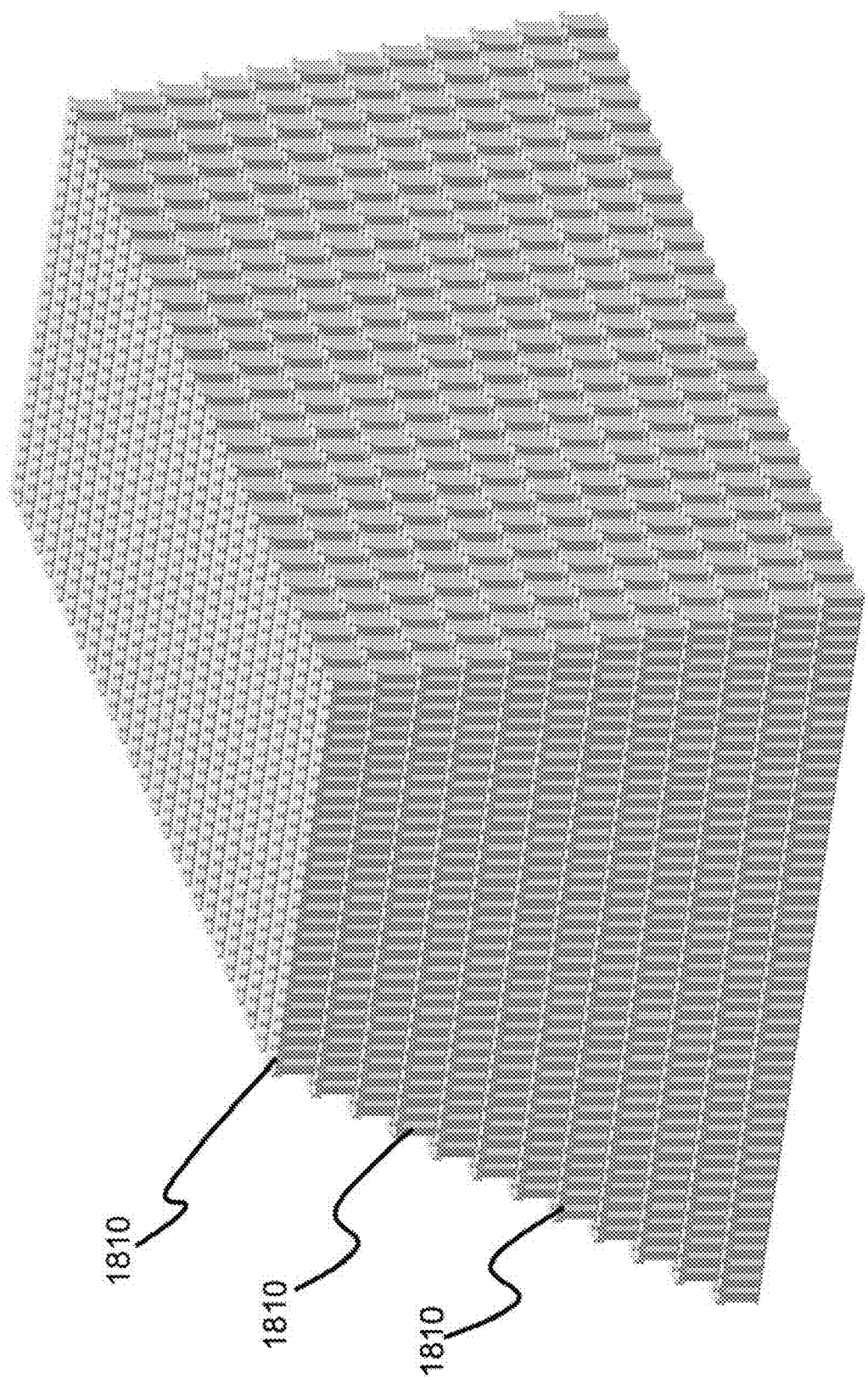
FIG. 18 is a perspective view of multiple thermal energy storage blocks stacked in a terraced configuration according to at least one example implementation.

FIG. 18 shows that the blocks 1810 can be stacked to have a cross-sectional profile selected from various geometrical shapes. For the implementation in FIG. 18, the cross-sectional profile has a ziggurat (terraced) shape. Other implementations may have a pyramid, a mesa, a flat-top pyramid, a trapezoidal, a rectangular, a square, or other geometric shape for the cross-sectional profile. By having the ziggurat shape, the stability of the stack of energy storage blocks is increased to better withstand lateral or other acceleration associated with seismic activity. FIG. 18 shows a terraced configuration with each layer having a smaller width or other lateral dimension than the layer below. This terraced configuration can be implemented along a longitudinal axis of the stack and/or along a latitudinal axis of the stack. Both ends of the stack may have the terraced configuration, or optionally, only one end will have the terraced configuration.

Figure 19:
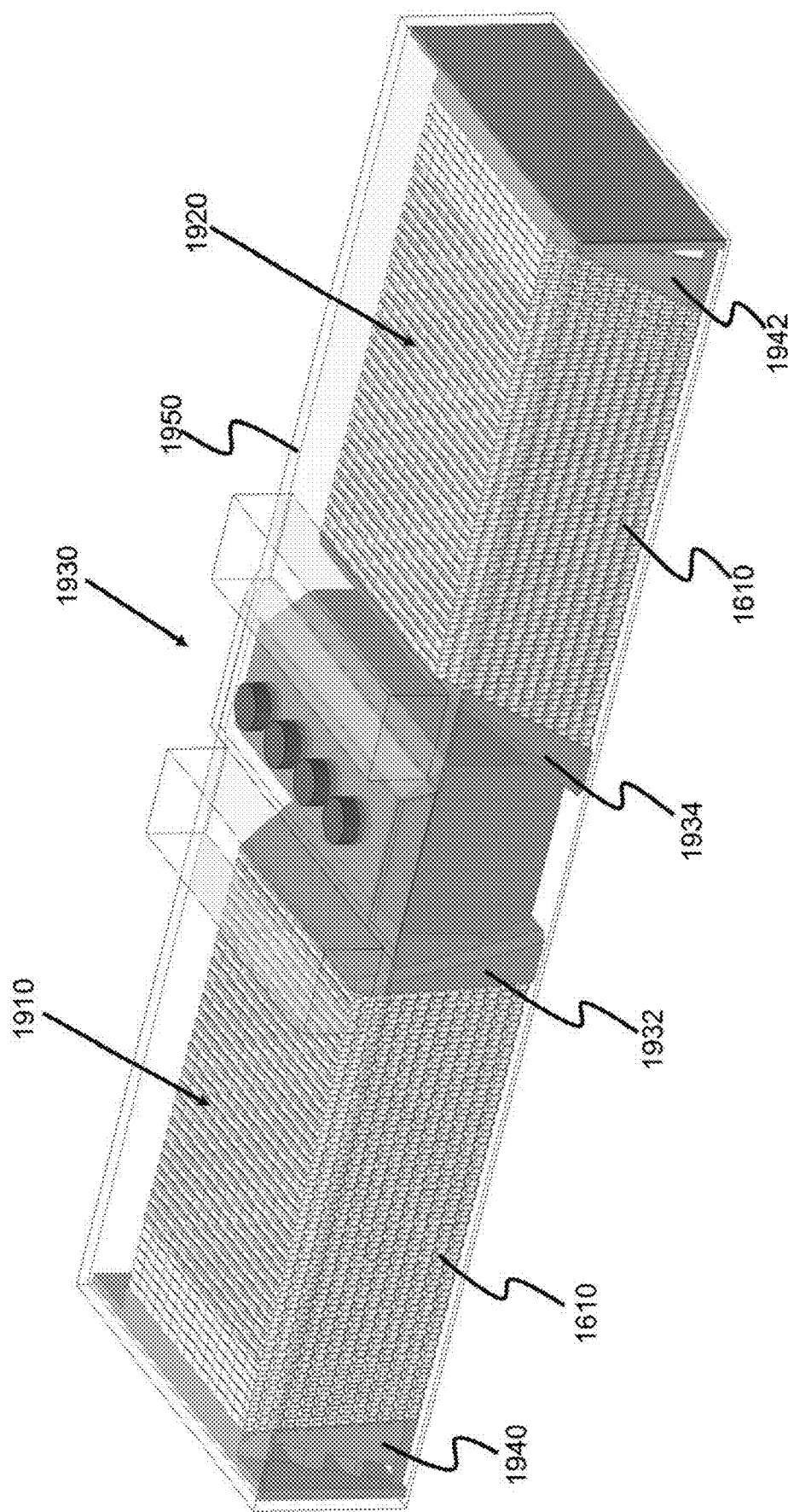
FIG. 19 is a perspective view of a thermal energy storage system with multiple thermal energy storage assemblages coupled to a common heat exchange assembly according to at least one example implementation.

FIG. 19 illustrates a configuration where multiple stacks 1910 and 1920 of thermal energy storage blocks share a common output such as to a heat recovery steam generator (HRSG) 1930 or other common hardware for accepting output from two or more thermal energy storage media or assemblages. This non-limiting example shows that there can be a plenum 1932 for accepting thermal output from assemblage 1910 and a plenum 1934 for accepting thermal output from assemblage 1920. Air or gas circulation can enter each assemblage through an intake plenum 1940 for assemblage 1910 and intake plenum 1942 for assemblage 1920. This also shows that the plenum can be the same or different shaped for the fluid inlet side of the thermal energy storage medium. It should be understood that for any of the implementations described herein, the circulation can be for air, carbon dioxide, nitrogen, argon, other noble gas, other gas, or single or multiple combinations thereof.

By way of non-limiting example, having a common steam generator 1930, heat exchanger, or heat extractor reduces the amount of hardware used to service multiple thermal energy storage assemblage, as compared to having separate steam generators for each individual thermal energy storage assemblage. Advantageously, this also allows the system to increase the amount of usable storage capacity by allowing for lead-lag discharging from the overall system. Thus, this configuration provides both lower hardware costs while increasing usable capacity for the combined system.

Some implementations may include an outer enclosure 1950 (shown in phantom) that covers the thermal energy storage medium therein. These enclosures can be made from sections of shaped material that can be interlocked together. The enclosures of this type can be configured to be able to withstand a pressurized environment therein, i.e. pressures above atmospheric pressure. Some implementations may contain two or more thermal energy storage assemblages within a single enclosure 1950.

Figure 20:
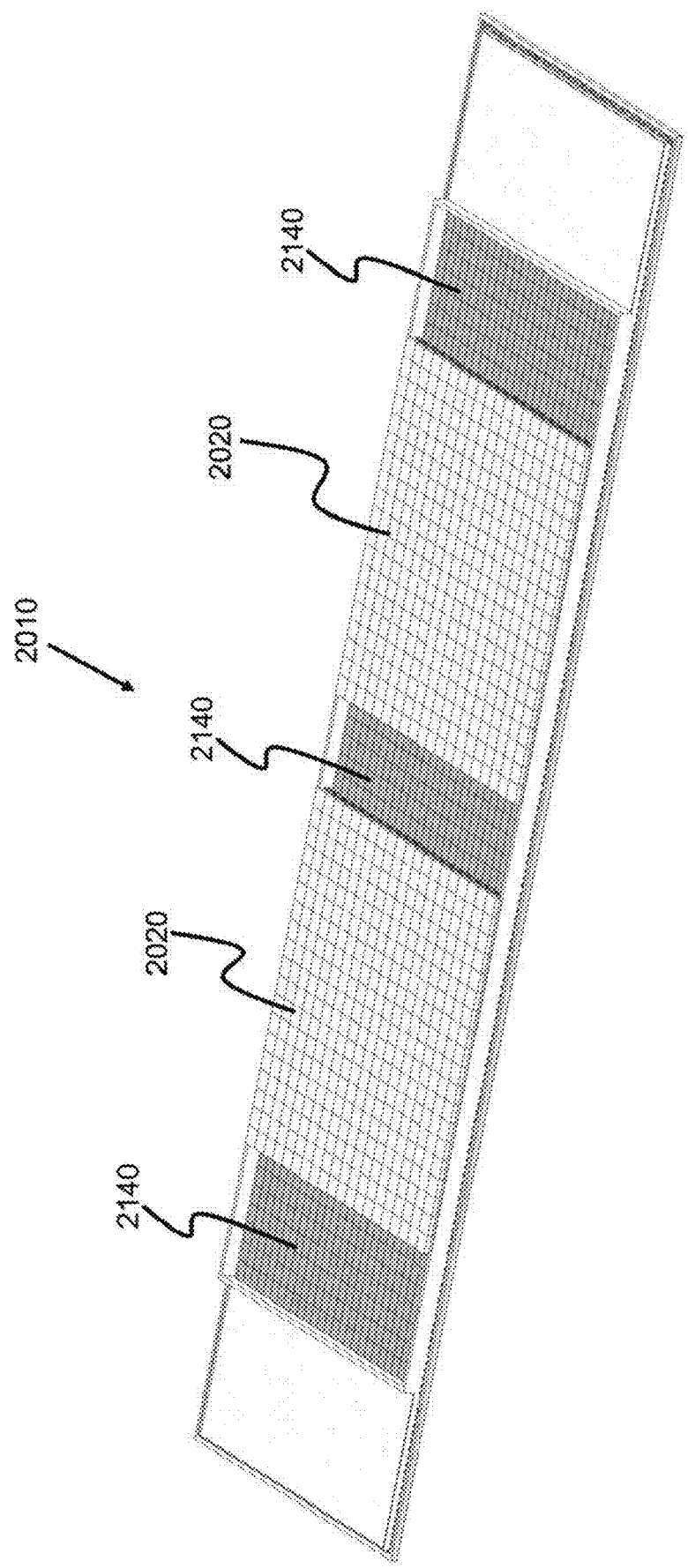
FIG. 20 shows a support structure for use with an assemblage of thermal energy storage blocks according to at least one example implementation.

FIG. 20 shows one implementation of base structure 2010 that can be used to support the thermal energy storage blocks 1710, 1810, or similar thermal energy storage medium such as assemblages 1910 and/or 1920. The entire base structure 2010 can be placed over a foundation of gravel, river gravel, crushed stone, or other suitable base material (not shown). In this implementation, there can be tiles 2020 at the locations where the thermal energy storage medium sits above the base structure 2010. Other features of the base structure 2010 will be described in more detail below.

Figure 21:
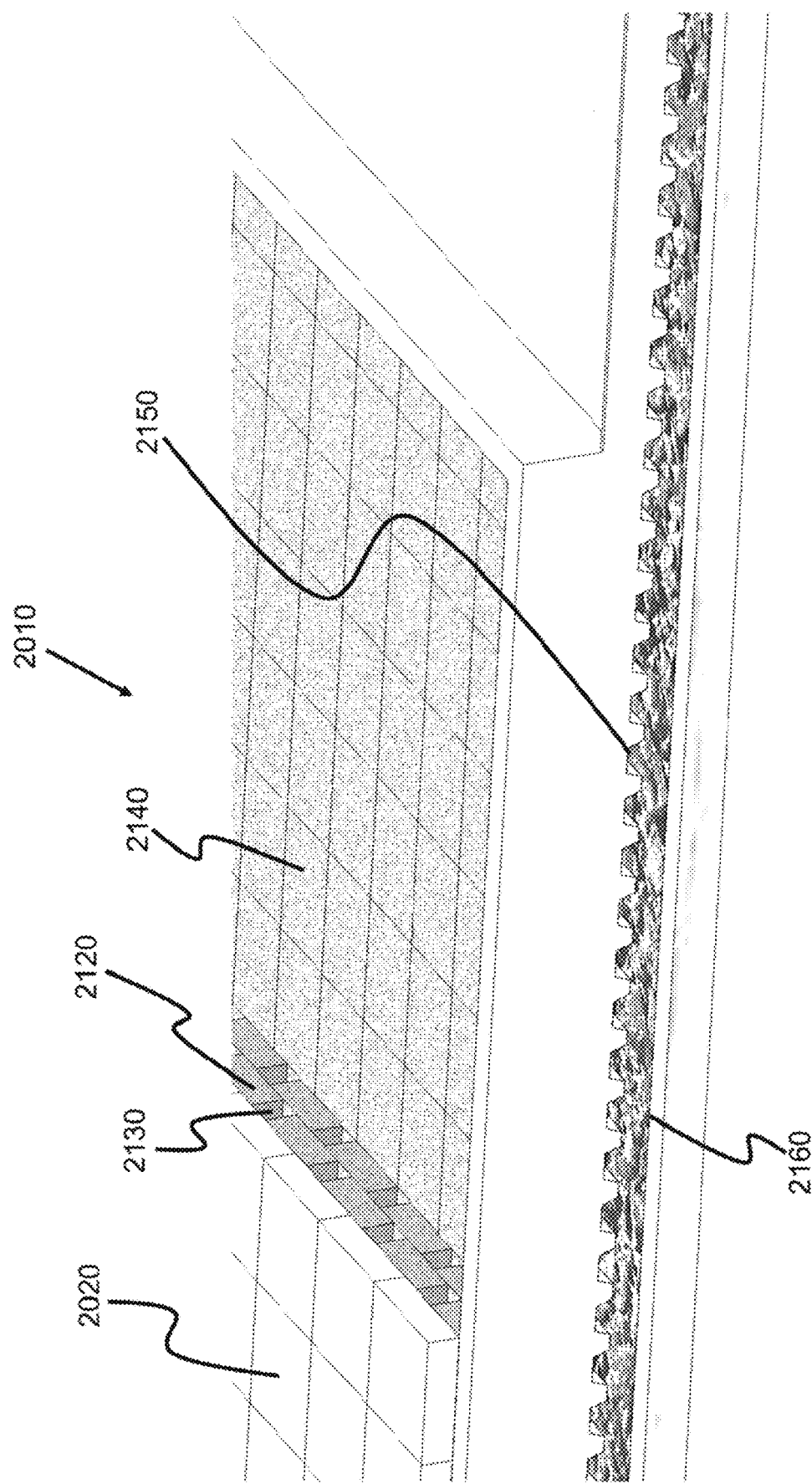
FIG. 21 is a close-up view of one portion of the support structure of FIG. 20 according to at least one example implementation.

FIG. 21 is a close-up view of one portion near one end of the base structure 2010. This implementation shows the tiles 2020, insulation material 2120, and fluid or air flow channels 2130 in the insulation material 2120. An additional insulation material 2140 may be included below the insulation material 2120. There can also be air flow channels 2150 formed in as part of the underside of the base structure 2010. A foundation 2160 formed from pebbles, other crushed material, concrete, or similar material can be positioned below the support material. In one implementation, Foamglas® from Owens Corning of Toledo, Ohio is used for insulation material. Optionally, some implementations may use calcium silicate for the insulation material. Optionally, some implementations may use a combination of one or both materials for insulation. In one implementation, the air or gas flow through channels 2130 is an active flow. Optionally, the air or gas flow through those channels 2130 may be passive flow. In one implementation, the air or gas flow through channels 2150 is an active flow. Optionally, the air or gas flow through those channels 2150 may be passive flow.

Figure 22:
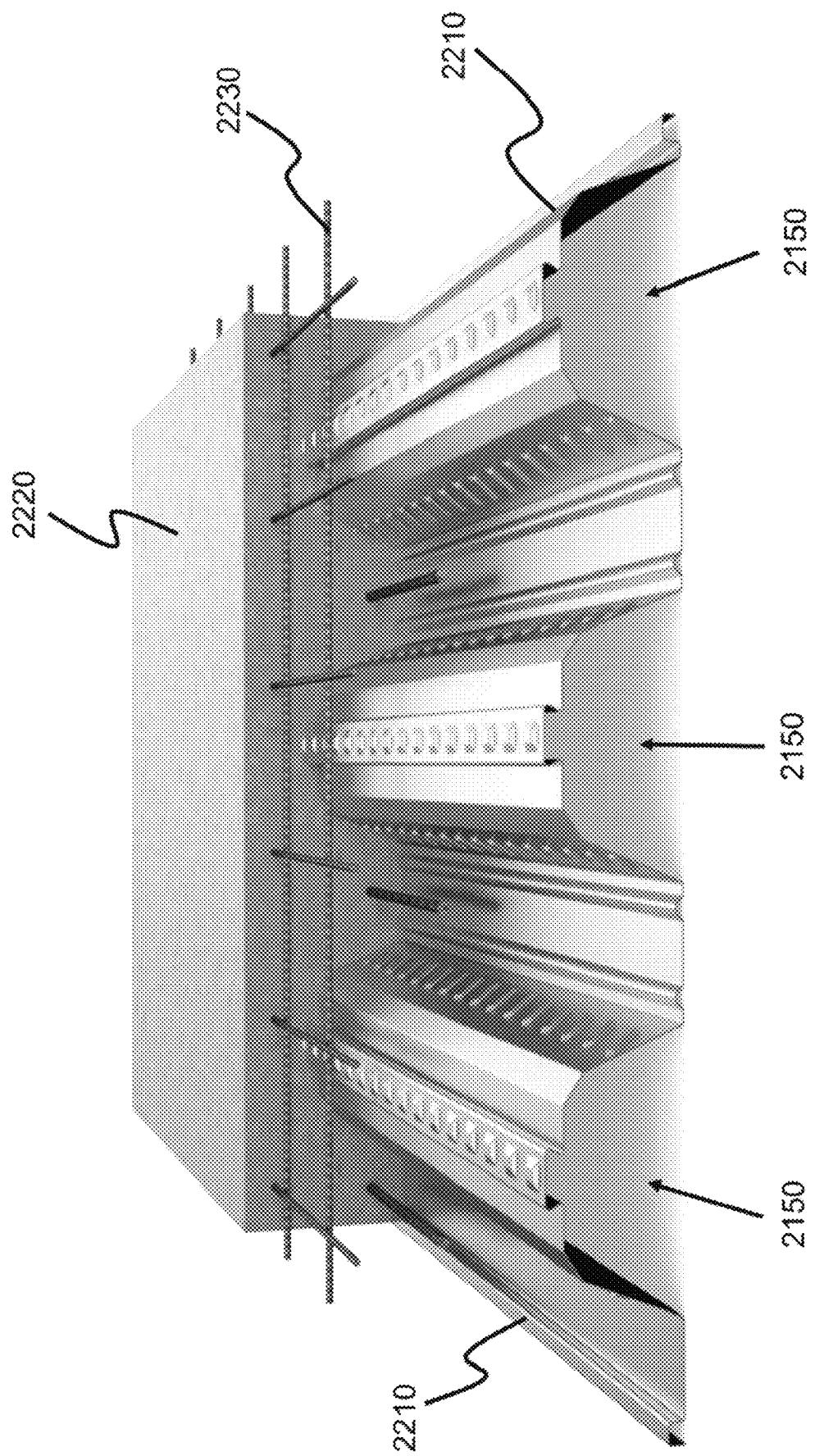
FIG. 22 is a close-up cross-sectional view of another portion of the support structure of FIG. 20 according to at least one example implementation.

FIG. 22 shows a perspective, cross-sectional view of the support material used in base structure 2010. As seen, the support material 2210 may be shaped to have channels 2150 therein. Above that, one implementation may use concrete 2220 or similar material that may include rebar 2230 or other structural reinforcement therein to fill the space above the structure for the base layer. Post-tensioning techniques as described for FIG. 55 may also be used to connect together multiple sections of the base structure 2010 with concrete 2220.

Figure 23:
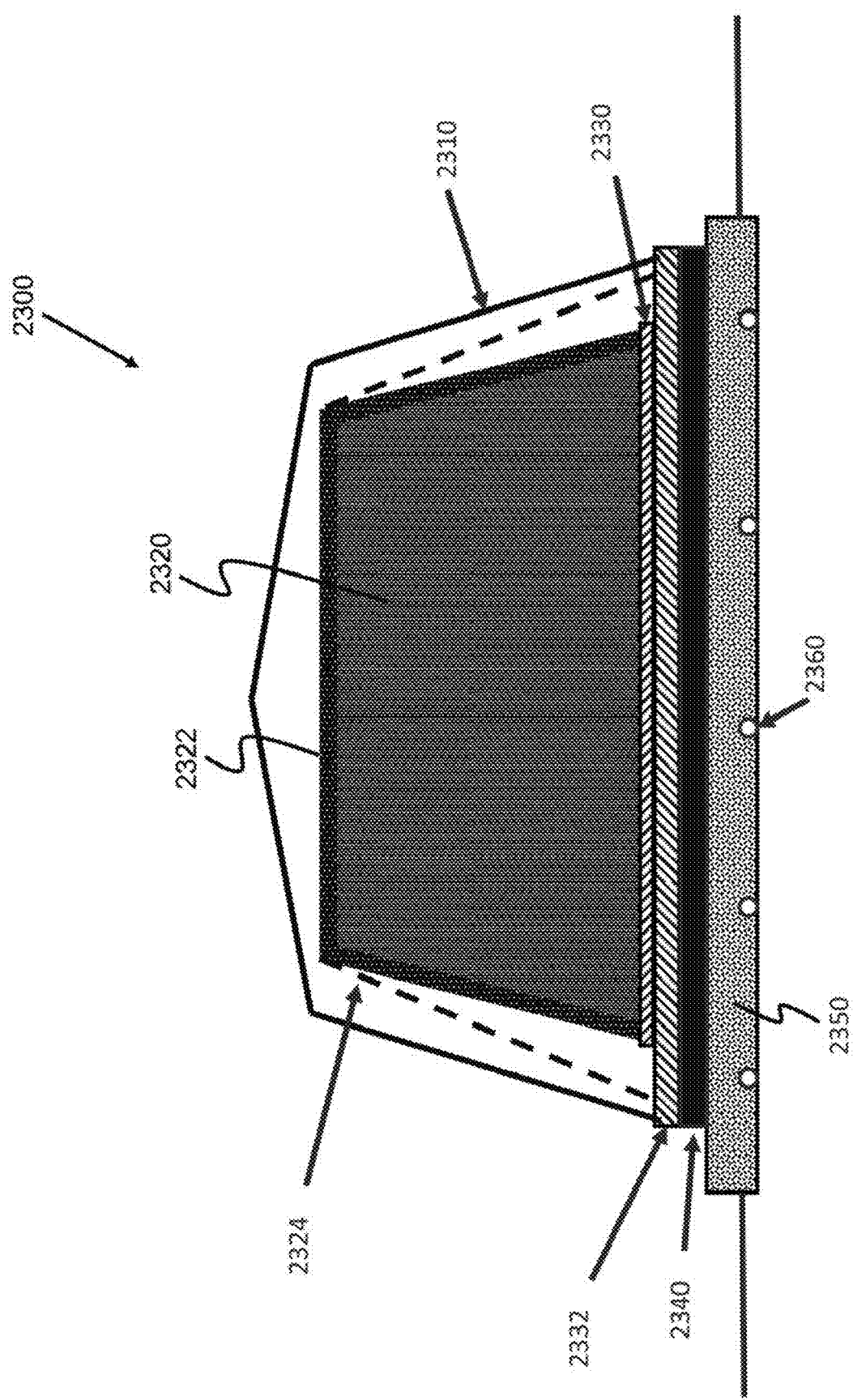
FIG. 23 shows a cross-sectional view of one end of a thermal energy storage system according to at least one example implementation.

FIG. 23 is a cross-sectional view of one implementation of a thermal energy storage system 2300. FIG. 23 shows an outer enclosure 2310 surrounding a thermal energy storage medium 2320. The outer enclosure 2310 may be floating structure, a movable structure, or the like. In one implementation, the storage medium 2320 is formed from multiple thermal storage blocks 1610 or 1710. There may be insulation layer 2322 over the storage medium 2320. Straps 2324 or tie downs can be attached to or otherwise coupled to the insulation layer 2322 to provide stability to the configuration. Optionally, some embodiments may use a bar or other structure across the top of the stack or on top of the insulation at the top of stack, and then then attach strap(s) to the bar or structure. This provides for strap attachment points that are more spaced apart from the heat associated with the thermal storage blocks of the stack. High temperature insulation such as but not limited to refractory tile 2330 can be placed below the thermal energy storage medium 2320. Another layer of insulation material 2332 of such as a combination of low and/or medium temperature insulation such as but not limited to calcium silicate insulation, Foamglas® insulation, and/or other suitable material can be positioned below the insulation 2330. Reinforced concrete and/or steel may be used for a base layer 2340, which can be similar to that shown in FIG. 22 with air channels 2150. The temperature of the base layer 2340 at the cool end may be in the range of about 70 to 80° C. A foundation 2350 of river rock, round river gravel, gravel, or similar material may form the bottom-most layer. The foundation 2350 may also include channels 2360 for air or fluid flow.

Figure 24:
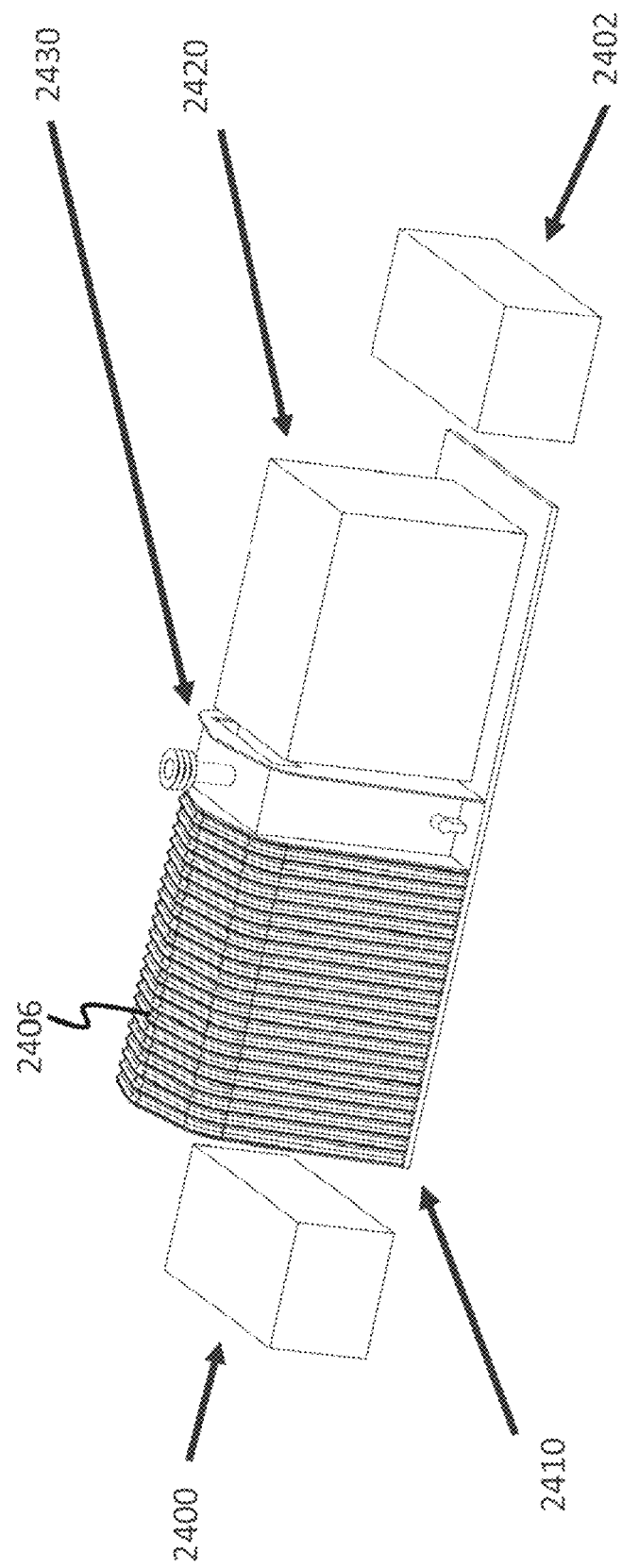
FIG. 24 is a perspective view of another thermal energy storage system with multiple thermal energy storage assemblages coupled to a common heat exchange assembly according to at least one example implementation.

FIG. 24 shows an overall system view showing that separate housings 2400 and 2402 can be used for electronics and other components to support each of the thermal energy storage assemblages. FIG. 24 shows one configuration with an enclosure 2406 over the storage assemblage, illustrating and one end of the assemblage with the enclosure removed for maintenance or the like. It should also be understood that some implementations can use different thermal storage block assemblages 2410 and 2420 which feed a common heat exchanger such as a common steam generator 2430.

Figure 25:
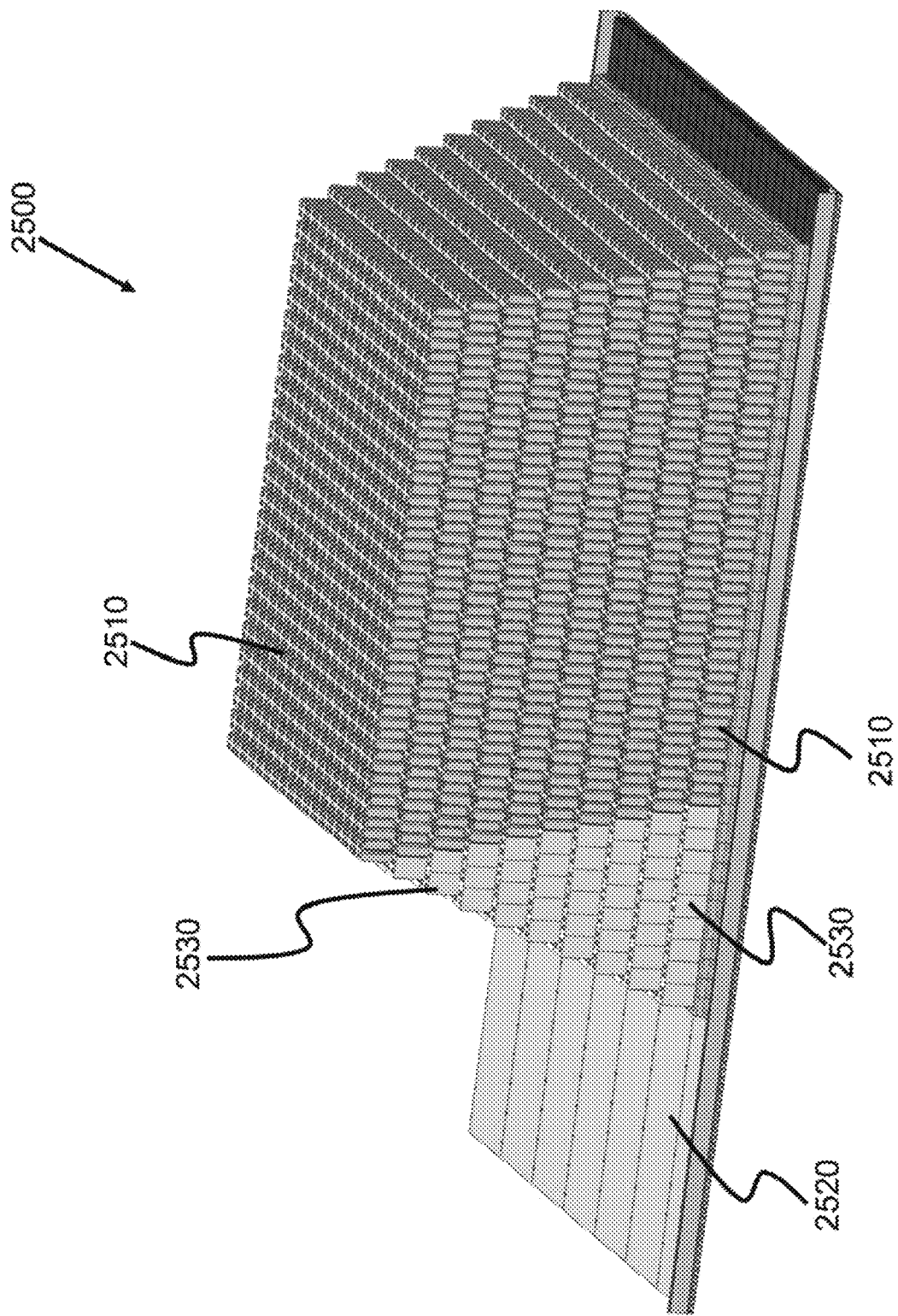
FIG. 25 shows multiple thermal energy storage blocks arranged in a terraced configuration on a support structure according to at least one example implementation.

FIG. 25 depicts a thermal storage medium 2500 that uses multiple thermal energy storage blocks 2510 on a base 2520. In this implementation, the stack of thermal energy storage blocks 2510 is configured in a pyramid-shaped (ziggurat) stack, which provide improved stability from seismic movement. In one example, a ziggurat shape is terraced where each level has a smaller dimension than the level beneath it. In this particular example, some of the blocks 2530 are support blocks provided to complete the ziggurat shape at the inlet end and blocks 2530 are not heated by heating elements. In at least some implementations, the stability of the ziggurat stack substantially reduces the need for a dedicated base isolation. Optionally, some implementations could still include a base isolation with the stack of thermal energy storage blocks. The base isolation has the function of reducing the connection between earth movement in the center of gravity of the stack of thermal energy storage blocks 2510. Specifically, the base isolator reduces the friction of the stack and the reduction can be more than 50%. So it is a significant reduction in the earth forces, but it comes at the cost of additional cost and lead time to include this additional hardware with the storage medium.

During a seismic event, the movement of the earth is both irregular in terms of velocity and direction. This means that from any direction, the earth could move and cause a momentum that would tend to impact blocks in the storage stack, such as shaking off a corner block, a block along the top side, and so on from the stack of storage blocks. By using a pyramid or ziggurat shape sloping inward, the center of gravity is lower in the middle of the mass of the storage medium. If the stack was a rectangle, then the corners are farther away from the center of gravity, and because of that rectangular shape, the force on the particular block on the corner or similar location is increased. By having four sides sloping, the system is more resistant against all the irregularities caused by earth movement. Optionally, for implementations with few sides having a pyramid-style sloping configuration, the side(s) with the slope will be more resistant to irregularities caused by earth movement. First, the ziggurat shape lowers the center of gravity which shortens the moment from the earth up to center of gravity and therefore makes the stack of storage blocks more stable. In a seismic zone, a high center of gravity mass which is not fastened together as one homogeneous piece, such as one that can tear itself apart, requires a base isolator, which may physically be two slabs configured to allow the top slab to slide relative to the bottom slab.

The stack can withstand higher G factors with a ziggurat compared to a rectangle. The ziggurat shaped stack is more self-stable and as a result can withstand more seismic movement than a rectangular shaped stack.

In one implementation, the thermal storage medium 2500 may sit on gravel or other base material. Optionally, some implementations may use river rock gravel to facilitate movements of any support structure sitting above the river rock gravel. Optionally, still other implementations may include further components such as but not limited to rubber or polymer blocks or fragments used in conjunction with the gravel. The material composition used in the foundation can help isolate the metal raft or support structure above the foundation from seismic ground movement, thus improving seismic stability.

Optionally, some implementations may use hold-down straps or other attachments to a surrounding structure, ground, or base surface to enhance seismic stack stability by increasing the co-efficient of friction between blocks and provide one or more anchor points for the entire stack. Some implementations of the stack may also be enhanced by stronger blocks at one or more locations in the stack such as but not limited to the corner of the stacks. The pyramid shape may feature sloping sides at either end or multiple ends, providing support and stability for the active thermal energy storage blocks while maintaining a compact structure. Optionally, an interlocking design of the thermal storage blocks allows for improved assembly and disassembly of the stack. Simplifying disassembly of just specific sections of the stack array can enable flexible maintenance and repair operations. In one example, the temperature range of the stack the material may be in the range of about 25° C. to 1000° C.

Figure 26:
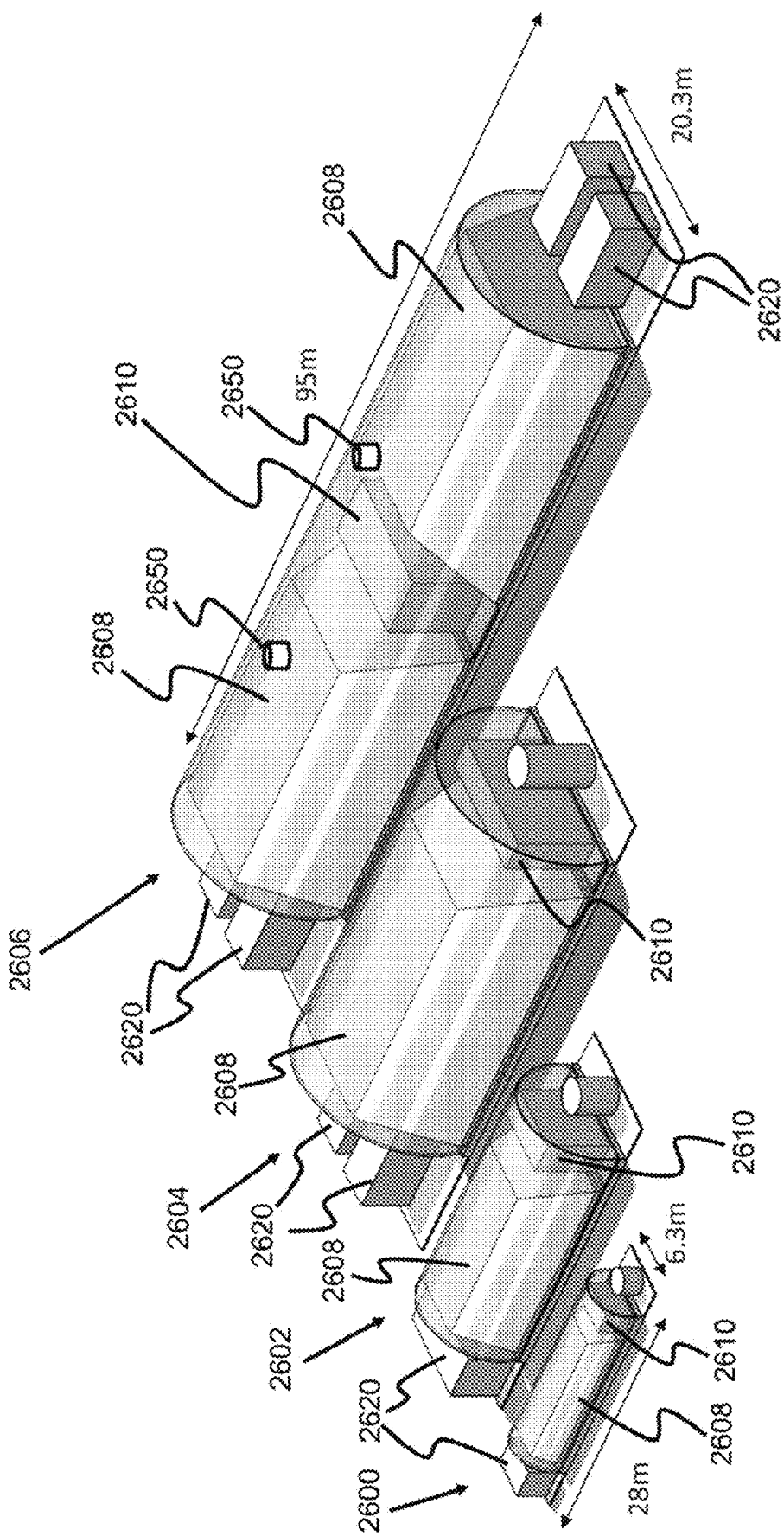
FIG. 26 shows multiple thermal energy storage systems of different storage capacities and configurations according to at least one example implementation.

FIG. 26 shows a variety of different sized enclosures 2600, 2602, 2604, and 2606 housing one or more thermal storage assemblages 2608 therein, each with a "hot" end 2610 for thermal output and another end with electrical hardware 2620. Although the implementations in FIG. 26 show a ziggurat stack configuration for the thermal storage medium, it should be understood that other geometric configurations are not excluded herein. Enclosure 2606 houses two storage assemblages therein with a common "hot" end 2610, such as but not limited to a common steam generator, ducting, plenum, or the like. Electrical hardware 2620 may be located at the same end or a different end of the thermal storage medium. The enclosures 2600, 2602, and 2604 can be enlarged to use two thermal storage assemblages similar to that in enclosure 2606, wherein the multiple thermal storage assemblages are configured end-to-end to share a hot end 2610 for gathering output from the thermal storage assemblages. This end-to-end configuration can double the storage capacity within a thermal storage system while using only a single set of hardware for thermal output. Implementations with more than array stack can be used for lead/lag discharge, which makes possible a deeper discharge and greater storage capacity with the same apparatus. The two stacks can be discharged with unequal fluid flow in each stack. The stack with the higher flow will cool sooner and may cool down to near the usable air temperature to make steam while the other stack is still hotter. Now the air from the lagging stack can be blended with the air from the cooler stack to make a larger mass flow with a lower temperature to continue to make steam. This is most pronounced at deep turndown air flows. This design allows for greater efficiency of storage than one bigger stack of thermal storage blocks.

It should be understood that in at least some implementations, the enclosures 2600 to 2606 housing the stack of thermal storage blocks may be formed from modular, movable sections to facilitate assembly and disassembly for maintenance and repair operations. Such an example is shown more clearly in FIGS. 48A-48B. There may be movable or fixed walkways over the enclosures to provide access various portions of the enclosure. Some implementations may include thermal vent port(s) 2650 may also be included to provide thermal exhaust capabilities to the enclosure 2600 to 2606. The thermal vent ports 2650 may be located to correspond to at least one of the thermal storage assemblages within the enclosures 2600 to 2606.

FIG. 27 shows various components of an outer structure of the enclosure. FIG. 27 shows that roof components 2700 may be compactly stored and shipped in a container 2702 with an openable top for case of transport. Once transported on-site, the roof components 2700 may be assembled into arch or other shaped sections 2710 to form modular sections of the outer structure. In one example, the roof sections 2700 may be made of insulation such as but not limited to rockwool (mineral wool insulation) with metal. In another example, the outer structure 2720 may be made of an insulation material such as but not limited to cellular glass insulation such as Foamglas® with ribs 2722 and support structures. Foamglas® is available from Owens Corning of Toledo, Ohio. The outer structure 2720 may be made of modular panels 2724 of insulation and support structure to assemble the larger roofing sections. Various components of the thermal energy storage system configured for modularization and containerization. The components in such a configuration can be built in prefabricated subsections that are transported for assembly or construction on-site.

Figure 28A:
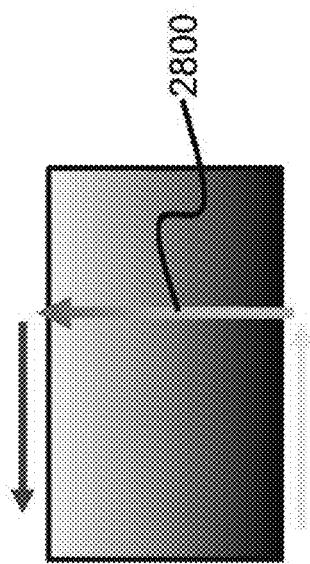
FIGS. 28A and 28B show side cross-sectional views of thermal energy storage systems with vertical and horizontal flow, respectively, according to at least one example implementation.
Figure 28B:
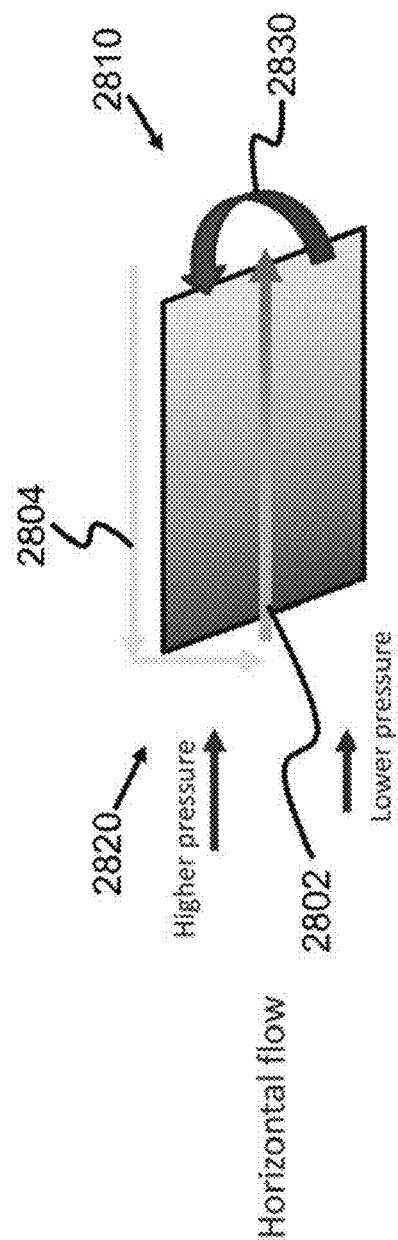

FIGS. 28A-28B show a thermal profile within a thermal storage medium based on a vertical fluid flow 2800 in FIG. 28A and a horizontal fluid flow 2802 in FIG. 28B. In FIG. 28B, the cooler air or gas 2804 around the thermal energy storage assemblage is drawn or flows into the assemblage at the inlet end 2820. When air or fluid is heated, it typically results in reduced density and rises. In a vertical flow as shown in FIG. 28A, this helps to maintain the thermocline profile due to buoyancy forces which keeps hotter air or fluid rising. For example at low flows, a hot spot area has air or fluid that is expanding, is more buoyant, and thus that area will flow faster. In a vertical flow, this all tends to help maintain the thermocline profile.

In a horizontal fluid flow as shown FIG. 28B, the buoyancy forces work against maintaining a stable horizontal thermocline profile, particularly at low or zero flows. In FIG. 28B, hot air column at the hot end 2810 of thermal energy storage (TES) system has less density than a column of air of the same height at the cool end 2820. This buoyancy force at the hot end 2810 results in the hot air flow backwards along the top of the stack and cool air flowing forwards in the bottom of the stack, creating a reverse flow as indicated by arrow 2830. Again, this is particularly applicable at low flow or zero flow scenarios. This creates a situation where if the TES is restarted, the heater elements (oriented vertically in the stack) will overheat at the top of the stack before the cooler air or fluid at the bottom of the stack reaches a desired temperature. This is because the air/fluid and blocks at the top of the stack is already hotter than those at the bottom. This is problematic in scenarios where it is desirable to have a "bottle-up" capability (shutdown for say 12 hours or other time period but retain heat in the TES) or a turn down situation when flow is very low or approaches shutdown. During bottle-up, some implementations may seal off ends at the inlet to prevent reverse flow, which will dramatically slow the rate of reverse flow. In one example of undesired reverse flow, the temperatures at the top of the stack may be at about 1000° C. while the bottom of the stack may be at 200° C.

Figure 29:
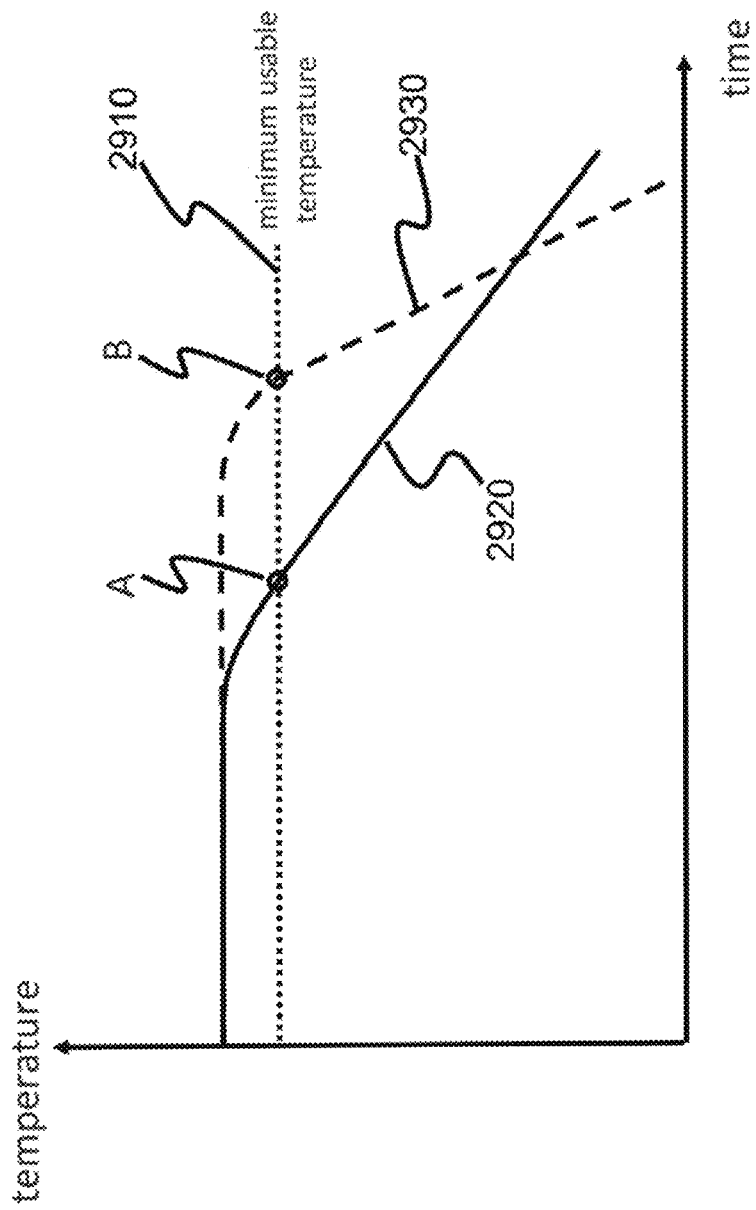
FIG. 29 is graph showing thermal output over time for various thermal energy storage systems according to at least one example implementation.

As seen in FIG. 29, not only does this reverse flow create issues when restarting the TES system, it also results in an earlier drop in usable thermal output, resulting in an earlier shutdown of the TES system. At the outlet, the mixture of low temperature air and high temperature air may result in in a mixture that is not warm enough to do anything with at the outlet. FIG. 29 shows a graph of temperature of thermal output from the TES versus time. A minimum usable output temperature is shown as dotted line 2910. The reverse flow causes more cool air or fluid to mix with the thermal output indicated by solid line 2920. At point A, the cooler mix drops below the minimum usable temperature threshold 2910 earlier than thermal output 2930 from a TES system that maintains the thermocline profile. By maintaining the thermocline profile and reducing reverse flow, the less cool air or fluid is mixed in the output, resulting in thermal output 2930 not dropping below the minimum usable temperature threshold 2910 until point B, which is later in time than point A and results in more time for usable thermal output to be obtained from the TES unit.

Figure 30:
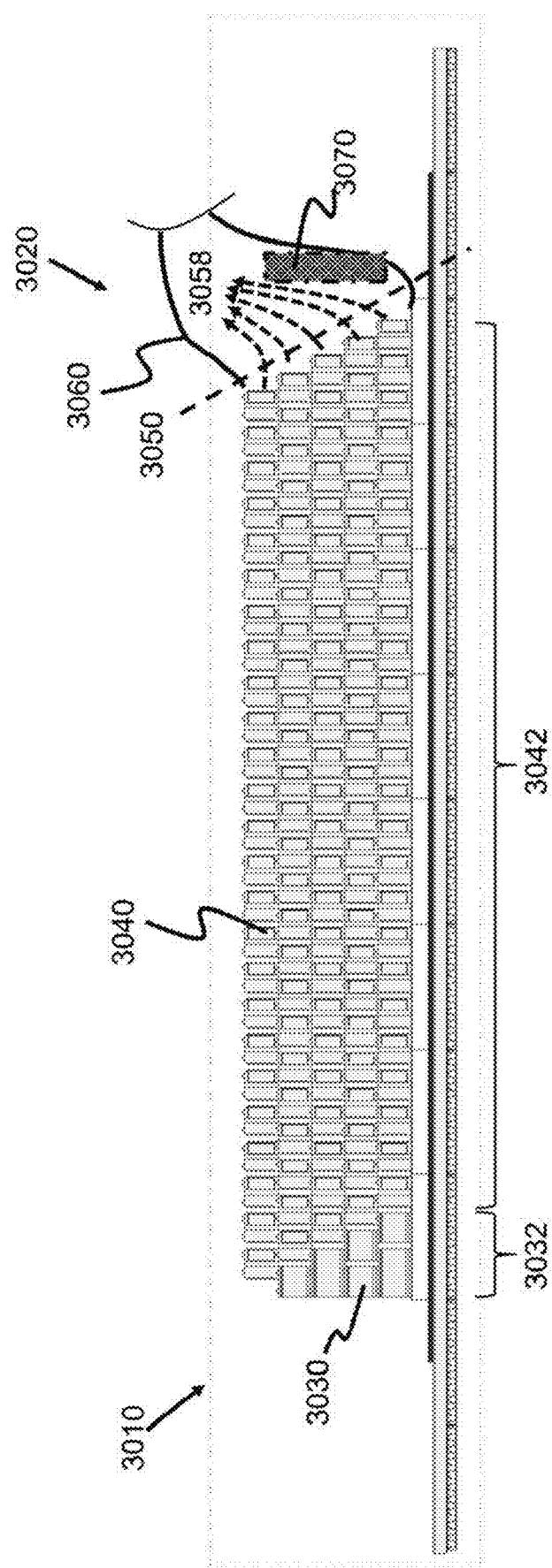
FIG. 30 shows a side view of multiple thermal energy storage blocks according to at least one example implementation.

FIG. 30 is a side-view showing a horizontal flow system that eliminates a top outlet and a bottom inlet that each extend across the entire thermal storage medium. A horizontal system reorients the flow path where cold air or fluid comes back on one side 3010 while hot air or fluid comes out the other side 3020. This advantageously results in a very short hot duct (not shown) at 3020 coming towards the steam generator at one end of the thermal energy storage unit. Although in one example, the duct would be made of material that could withstand output temperatures of about 900° C. to 1500° C., the length of the duct is reduced as it is located at one end of the TES unit, instead of spanning an entire length of the TES. The support blocks are also reduced from spanning the entire TES to effectively one section of angled stack of non-heating blocks 3030 at cool end 3010.

FIG. 30 also shows that the active storage blocks over area 3042 are not stacked purely vertically. There is a section of blocks over area 3032 to support the overhang of the active blocks 3040. The blocks 3030 are typically non-heat storing and mainly structural, but other configurations are not excluded. The blocks 3030 may be of different lengths so that the end face has a squared-off surface instead of a staggered surface.

FIG. 30 shows thermal storage medium that, in one example, has a ziggurat (terraced) shape. The terraced configuration can have sloping sides at both ends or either end. FIG. 30 shows an example with a sloping side at outlet end 3020 and a vertical side 3010 at the other end. There may be some mechanism or structure at the vertical end 3010 to hold it down the stack of thermal storage blocks for seismic or other stability reasons. This is more easily achieved at the inlet side 3010 which is operating at cooler temperatures due to the inflow of incoming air or fluid. This reduced temperature allows for use of mechanisms such as pull downs or straps that melt or degrade as they would if they are at a hot end on side 3020. As seen the side view of FIG. 30, there is an interlock between blocks 3040 but the blocks 3040 are not directly on top of each other. This can result in a hot face at end 3020 that slopes "backwards" as indicated by dotted line 3050 relative to a vertical plane, which can be advantageous. The hot side 3020 with temperatures that may be 1000° C. or higher, creates a difficult environment for putting metal or straps on that end. Thus, having the active blocks 3040 slope backwards relative to vertical is advantageous as it provides structural stability without necessarily relying on external supports or tie downs to provide structural stability at a high temperature zone.

For the thermal storage medium, one or more implementations are configured where the heated path lengths are the same. For example, a reverse slope could also be configured on the cool end 3010, which creates a longer physical path length on the bottom. The heated path lengths, however, can be maintained the same through use of one or more non-heated blocks 3040.

In this sloped configuration, the thermocline is configured to have a similarly sloped configuration relative to vertical. By keeping the path lengths the same and the pressure drops the same, the thermocline can be controlled to have a desired angled or non-angled profile throughout the storage medium and at the thermal outlet. The stacking of the blocks in this pattern with the interlocks symmetrical on both ends renders not only the stack inertial homogeneity but also seals the layers horizontally by vertically closing the gaps between the course below.

The convective portion 3058 of the thermal output from the outlet end 3020 can be collected in a plenum 3060 or other duct work for collecting hot air, hot gas, hot fluid, or other thermal output from the thermal energy storage system. In some embodiments, there may also be structure(s) for collecting the radiative portion of the thermal output. Such structures any include but are not limited to radiation absorbing pipes, conduits, or other structure(s) 3070 carrying water, steam, gas, or other media for receiving thermal energy radiated from the hot outlet surfaces of the thermal energy storage system that oppose the structure 3070. Optionally, there may be shutters, louvers, or other structures between the hot surface and the structures 3070 to regulate the amount of radiation received by the radiation receiving structures 3070.

Flow Balancing to Maintain Thermocline Profile

Referring back to FIGS. 28A and 28B, one method for maintaining the thermocline profile in the TES system is to adjust flow to provide higher pressure in one or more upper sections of thermal storage medium while having a lower pressure in one or more lower sections of the thermal storage medium. This can be achieved through one or more various techniques such as valves, louvers, orifice plates, or other regulator to control incoming flow to the one or more sections of the thermal storage medium. Some implementations may use heating elements that can be controlled in one or more sections to adjust heating in a preferential manner that heats the cooler section(s) of the thermal storage medium more than hotter sections of the thermal storage medium. Some implementations may combine one or more techniques for maintaining a thermocline profile in the thermal storage medium. Some implementations may combine one or more techniques for reestablishing the thermocline profile in the thermal storage medium if it is lost because of a longer shutdown of the steam production while there is heat in the storage unit but without the parallelism of the thermocline and the lines of heaters in the control circuits.

For implementations that address the pressure gradient issue by adjusting pressure, the TES can be configured to discretely adjust pressure at every level with a system like that which can essentially adjust the inlet for a certain target pressure that can counter the buoyancy effect creating reverse flow. As mentioned, a variety of devices can be used to achieve this target pressure, such as an orifice plate, a louver, or a valve that can continuously open or close.

If the temperature is known, then the pressure gradient is also known in the vertical direction at the outlet. In one implementation, the system attempts to keep the pressure difference the same from inlet to outlet across all of the layers. One implementation achieves this through active control by measuring and monitoring the pressure drop at multiple locations in the thermal storage medium. The system can add more pressure drop (closing the valve, orifice, or louver more) than the one on top. This implementation uses multiple active sensors and multiple independent control valves. Optionally, some implementations may have controllable fluid movement devices such as blower for each layer or for groups of layers to adjust pressure drop through those layers.

In another implementation, the system can link valves and sensing to use fewer sensors and fewer actuating valves. In one non-limiting example, there could be a louver at every height or layer in the thermal storage medium. One could have a pressure sensor at the bottom portion of the thermal storage medium and a pressure sensor at the top portion. This implementation could use two actuators (one at the bottom, one at the top) and link all of the louvers via electrical or mechanical mechanism to a controller at the top, a controller at the bottom, and two actuators. Using this linked sensing and valving, the system could achieve a desired pressure gradient across the thermal storage medium.

Further implementations may be configured to reduce mechanical complexity and tolerance issues with mechanical mechanisms such as valves, louvers, etc. . . . operating at close to a closed condition.

In a high turn-down scenario where air or fluid flow is very low, a louver or valve may be in an almost-closed condition to create the desired pressure drop because not much air or fluid is flowing across the louver or valve. Operating a mechanical apparatus at an almost-closed condition exposes the system to risks associated with differential thermal expansion, tolerance issues, or similar factors that could result in the louver or valve being unexpectedly completely closed, instead of being almost-closed. This introduces some complexity and risk when managing such an active system.

Orifice Plate Air Distribution Mechanism

Figure 31:
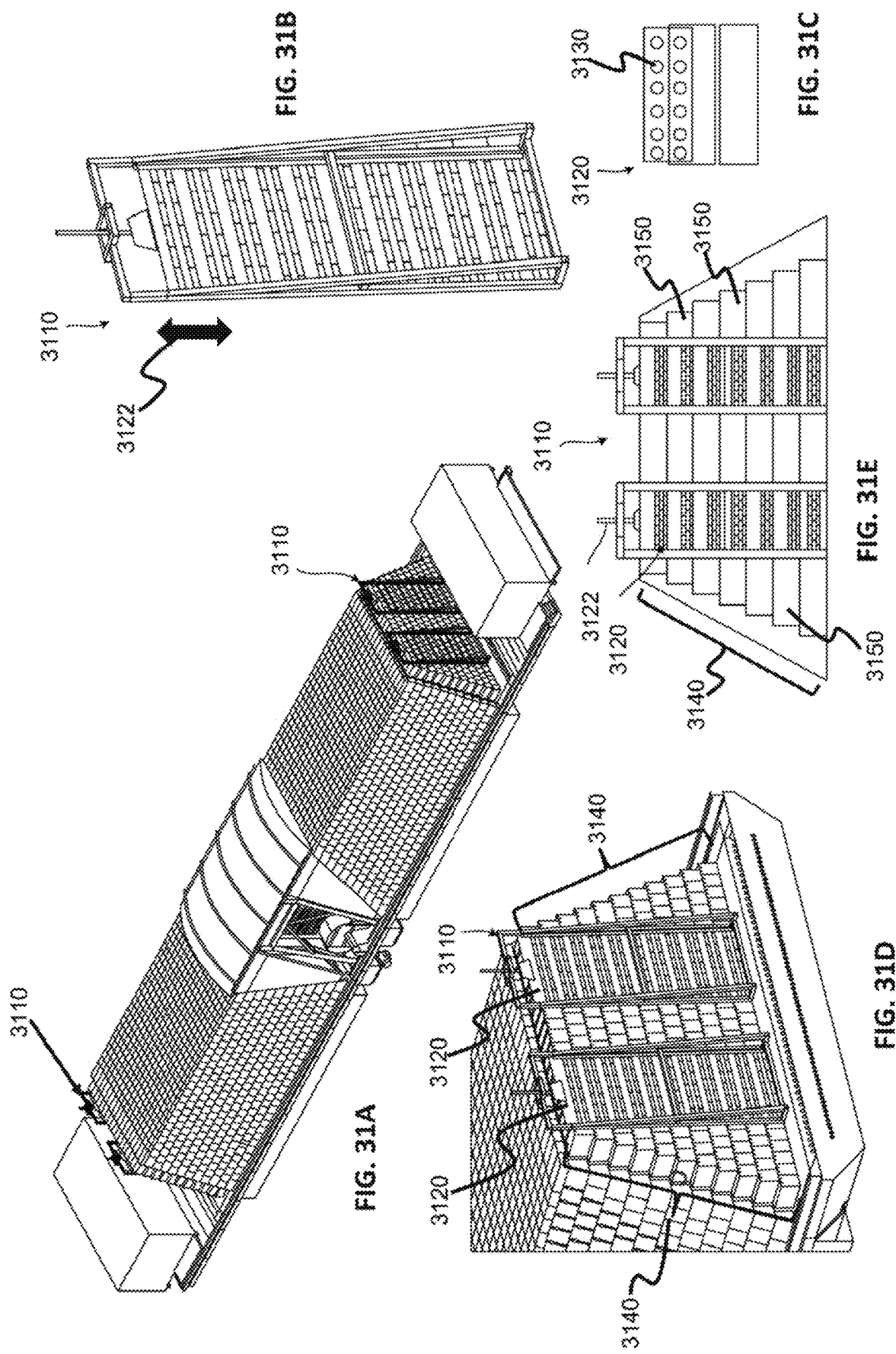
FIGS. 31A-31E show various views of an air or gas distribution system for use with a thermal energy storage system according to at least one example implementation.

FIG. 31A shows one implementation of an air distribution mechanism (ADM) 3110 for addressing the reverse air flow issue associated with a horizontal configuration at thermal system bottle-up (no flow) or turn down to very low flow. As seen in FIG. 31A, the ADM 3110 may be located at one end of the TES and regulates flow rates through the thermal storage medium. This implementation can address some of the complexity and tolerance issues by using an orifice plate 1620 with multiple orifices 1630 of different sizes therein.

In the example shown in FIG. 31B, the orifice plate 3120 can be lifted or lowered as indicated by arrow 3122 to expose one or more orifices 3130 that adjusts the pressure drop at the inlet side of the TES system. By lifting or lowering exposes the desired orifice size to adjust air or fluid flow on the inlet side as shown in FIG. 31C. In one implementation, a single orifice plate 3120 is moved relative to the thermal storage medium to adjust air or fluid flow. Relative motion between the plate 3120 and the plate with openings 3130 allows for motion of either plate relative to each other for covering or uncovering the openings 3130. In some implementations, multiple orifice plates may be used. Orifice sizes may vary from layer to layer based on desired pressure drop at that layer in the thermal storage medium.

In one implementation, feedback for controlling air or fluid flow may be in the form of data from temperature sensors along the hot face at end 3020. In one example, the goal is to align this with the thermocline so that all of the temperature sensors are dropping at the same rate towards discharge. The orifice plate 3120 may use long metal pieces (possibly 10 meters long, single piece) that might expand due to thermals. The system operates in an environment where the temperature is changing causing the orifice plate 3120 to expand or contract. With a long metal piece, if a top portion of the orifice plate 3120 is much hotter than a lower portion, then the top portion is expanding and pushing "down" on the rest of the plate relatively, changing alignment between orifice and layer sections in the thermal storage medium. In the implementation of the orifice plate 1620 with discrete positions and the discrete orifices with some buffer or dead zone between orifices, the differential thermal expansion will not change the flow even if positioning is slightly off. This creates a system that is robust, even when dealing with changes associated with thermal expansion. In other implementations of the multiple orifice plate 3120, to fine-tune the flow, there could be inserts to change the size of the orifice 3120 or the orifice 3120 could be ground down to be larger as systems are fine-tuned at each deployment site. There are tolerances in the thermal storage blocks which could result in a desire to fine-tune the orifices 3120 based on the actual thermal storage block used at the deployment site.

As seen in FIG. 31D, this implementation of the ADM 3110 uses two orifice plates 3120 which feed a manifold 3140 that routes air flow to the various levels of thermal storage blocks receiving air or gas flow from the ADM 3110.

FIG. 31E shows an implementation that has the manifold 3140, where each level of thermal storage block has its own level 3150 in the manifold 3140 for receiving air from the orifice plates 3120. In some implementations, each level 3150 is fluidity isolated from another level 3150 so that air flow through each level of thermal storage blocks can be fine-tuned for the desired pressure drop in that level of storage blocks. In this manner, the ADM 3110 can control air flow across an entire level of thermal storage box without having the orifice plate 3120 be the same width as the width of the storage blocks in that level. This makes the size of the orifice plate 3120 more manageable in terms of materials and size of the actuator used to move the orifice plate 3120 into various open or closed configurations.

Figure 32:
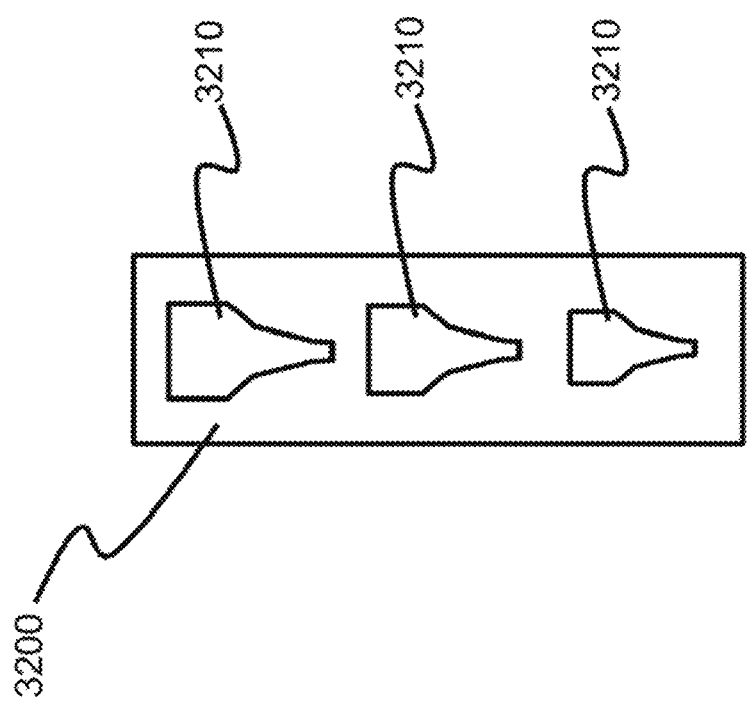
FIG. 32 shows an orifice plate with a shaped orifice for use with an air or gas distribution system according to at least one example implementation.

FIG. 32 depicts an orifice plate 3200 with shaped orifices 3210 for adjusting air or fluid flow. In this example, the style of valve is still a gate that is raised or lowered to change cross-section or cross-sectional area of a single opening. The difference from plate 3120 is that the gate raising or lowering exposes different cross-sections of the same orifice 3210, whereas plate 1620 operates by exposing entirely discrete orifices. The varying cross-sections of orifice 3210 adjusts the exposed opening to adjust the pressure drop. The different cross-sectional shape of orifices 3210 can change the shape of the opening at any single point and continually change the flow cross-section by raising or lowering the plate 3200 to achieve a desired target pressure. This variable cross-section implementation can be implemented in a mechanically controlled configuration such as with a front plate and a back plate made of the same material so that the thermal expansion is the same. Optionally, the system can overcome tolerance issues by using feedback from the hot end at side 3020 to adjust the gate rise or fall to compensate.

A good thermocline is desirable due in part to the interaction between the heater wires. In this non-limiting implementation, the system is able to control a vertical "plane" of wires. In one implementation, heater wires are not individual controlled to reduce switch and sensor costs but are switched or controlled in groups. Controlling these various vertical planes of heaters, as long as the thermocline stays parallel to these planes of heaters as the thermocline moves through, then the system is able to safely control the heater. If the thermocline starts to drift and is no longer parallel to the angle of the heater wires, the top of the heater wire is in a hot area and the bottom of the heater wire is a cold area. This results in a situation where one cannot turn on the heater wire assembly because the top heater wire will overheat if the assembly is turned on because the upper area is at a higher initial temperature. This results in a system that will need to be thermally reset before putting more power into the thermal storage. This illustrates why in this non-limiting example why it is desired that the thermocline does not break down and stays parallel to each other as it moves through the system.

With regards to wire position within the thermal storage medium, in one implementation, the first of the radiation cavities starts after the first column of thermal storage blocks. The first heating wire positioned with a full block in front of it. The thermal storage blocks are designed to be heated from both sides, so with only a wire on one side, the other side of the thermal storage block stays cool, especially with the air blowing on the side of the block away from the heating wire.

Structured Thermal Energy Storage Medium

The connection as the end 3020 may be a common plenum or duct across all of the layers, which means that these layers communicate even if thermal air or fluid flow is not going vertically through the stack itself to communicate. The system uses a structured medium such as the thermal storage blocks and prevent air or fluid from moving vertically between "layers". The system having a structured medium creates substantially horizontal planes and prevents air or fluid from moving up and down between planes in the thermal storage medium. The layers communicate at the end plenums, where air comes out here at the bottom of the hot end and moves back in towards the cold end, creating reverse flow.

Other Air or Fluid Distribution Systems

Figure 33:
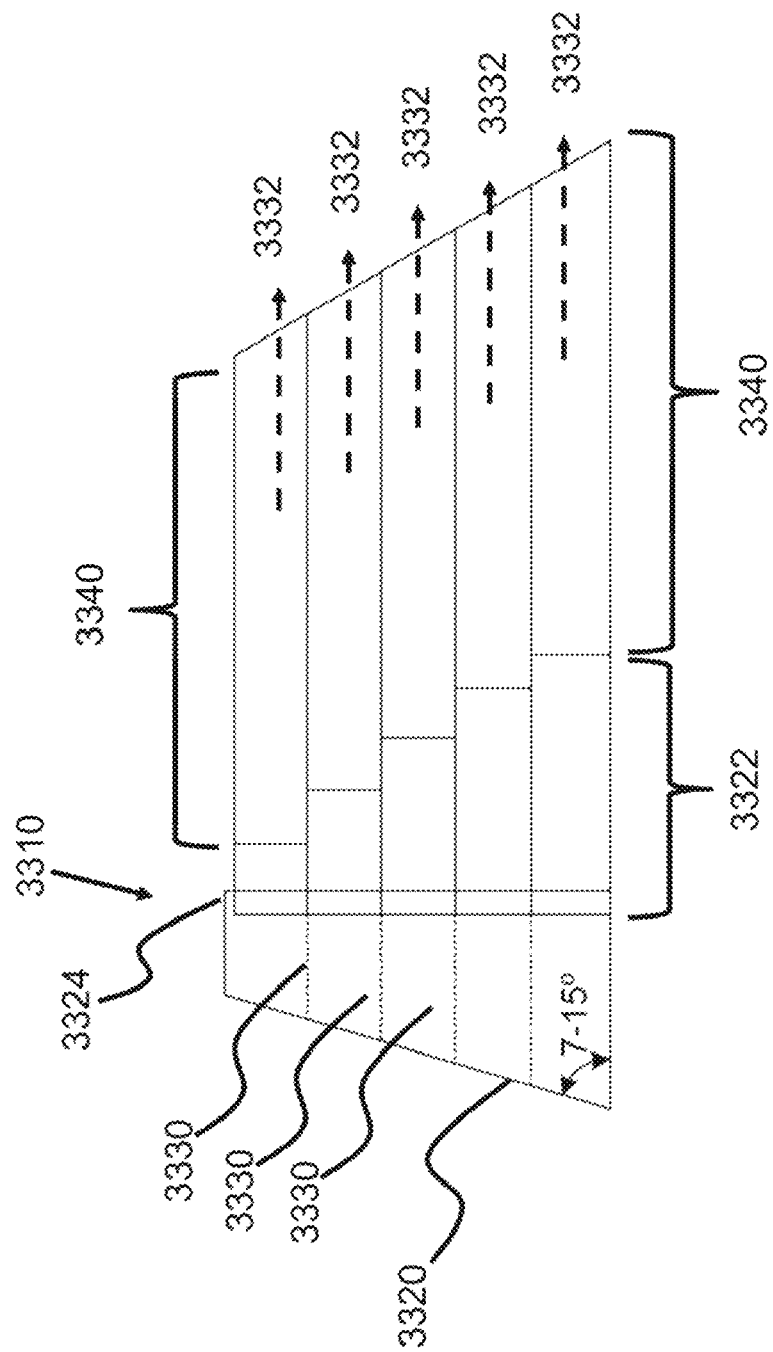
FIG. 33 is a side cross-sectional view of a thermal energy storage system with an air or gas distribution system according to at least one example implementation.

FIG. 33 shows an air or fluid distribution system (ADS) 3310 with an angled front surface 3420 of the ADS. This angled configuration (between about 7° to 15° in one implementation) at the cool, inlet end of the thermal storage medium can assist with sealing the inlets of the ADS system, particularly at bottle-up when there is no flow. The column pressure at the lowest level of blocks is the greatest, whereas it is the least at the top level. There may be an overlap area between the ADS 3310 and the support blocks 3322 at area 3324. Each layer in the ADS 3310 may be fluidically separated from each other as indicated by the dashed lines 3330. In this manner, air or fluid flow indicated by dashed line 3332 for each level can be individually tuned for the appropriate output for that level and/or for a desired output from the system. The ADS system allows for regulating the flow output from channels with different physical lengths. The heated sections of thermal storage blocks are indicated by bracket 3340. As seen in FIG. 33, the heated portion of the thermal storage blocks can be shifted at each level so that the length of the heated section 3440 is maintained to be about the same length at each level in the thermal storage medium.

Figure 34:
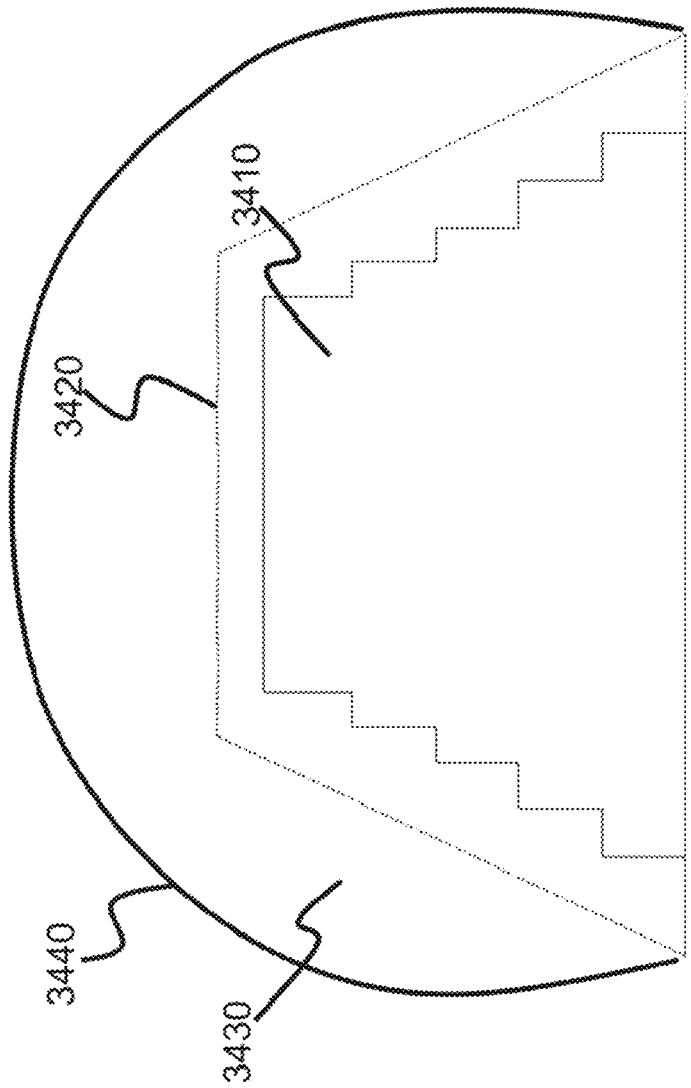
FIG. 34 shows a cross-sectional view from one end of a thermal energy storage system with an air or gas distribution system according to at least one example implementation.

FIG. 34 is a cross-sectional view of one end of the thermal storage medium 3410. In one implementation, the ADS gates are sized to be within the bounds of the insulation layer 3420, so as not to inhibit air or gas flow in the space 3430 between the insulation layer 3420 and a housing 3440.

Figure 35B:
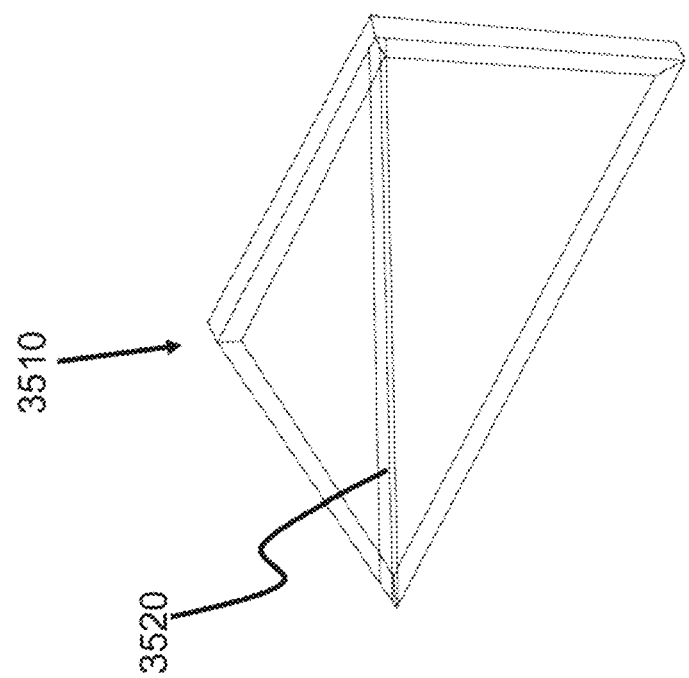
FIGS. 35A and 35B show various views of a gate for use with an air or gas distribution system according to at least one example implementation.
Figure 35A:
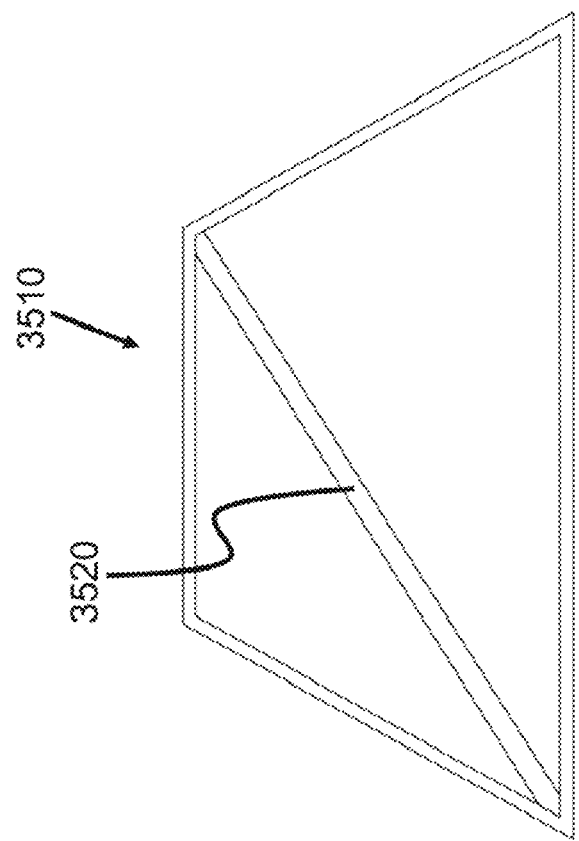

FIGS. 35A and 35B are various perspective views of one implementation of a gate 3510 for use with the ADS. The gate may include one or more structures including cross-bracing 3520 for mechanical stability and strength across the gate surface. In one example, the gate 3510 may be made of high alloy metal, carbon steel, or similar with an insulation material such as calcium silicate over at least one side of the metal surface. Some implementations may include perimeter framing or reinforcement so that the gate maintains its shape and does not warp during high pressure conditions. Some examples may include air holes in the gates that may be distributed in a predetermined or other pattern in the gate material.

FIG. 36A shows another implementation of a gate 3610 for use with the ADS. In this example, air or gas flow for the entire cross-section of the thermal storage medium is managed by one single gate 3610. In an "up" position as shown in FIG. 36A, the gate 3610 does not exceed the outline or periphery defined by the insulation 3620 around the thermal storage blocks, as indicated by the dotted lines. FIG. 36A shows the gate in an open position and that the orifices 3630 may be staggered vertically and/or horizontally to align with openings in the thermal storage medium. Where a portion of the gate aligns with an obstructed portion of the thermal energy storage block, no orifices are placed in that portion of the gate.

FIG. 36B shows a close-up view of the orifices 3630 and their configuration in the ADS. As discussed, relative motion between the gate 3610 and the orifices 3630 can cover and/or uncover the orifices 3630 as desired to create the appropriate pressure drop for that level of the thermal storage blocks. As seen in FIGS. 36A and 36B, there are rectangular openings 3632 in the gate that are there to uncover all or portions of the orifices 3630 when the gate 3610 is lifted to an appropriate height. The flow through the orifices 3630 can be metered by using one or more orifices 3630 of appropriate size for that level of thermal storage blocks such that a desired profile of an isotherm in the thermocline is maintained throughout the thermal energy storage medium. In one non-limiting example, this is desirable so that heating elements at a top portion of the thermal storage medium do not overheat. Overheating may prevent the entire heating element from being actuated as heating elements in a higher portion cannot be activated because they are already near an overheat temperature due to an imbalanced thermocline profile with the thermal storage medium is hotter at the top and cooler at the bottom.

FIG. 36C shows that the gate 3610 may move up or down relative to the thermal storage medium to open or close the orifices 3630. In one implementation, the gate 3610 is designed to fail into a closed configuration in case of power loss or loss of control signal.

Figure 37A:
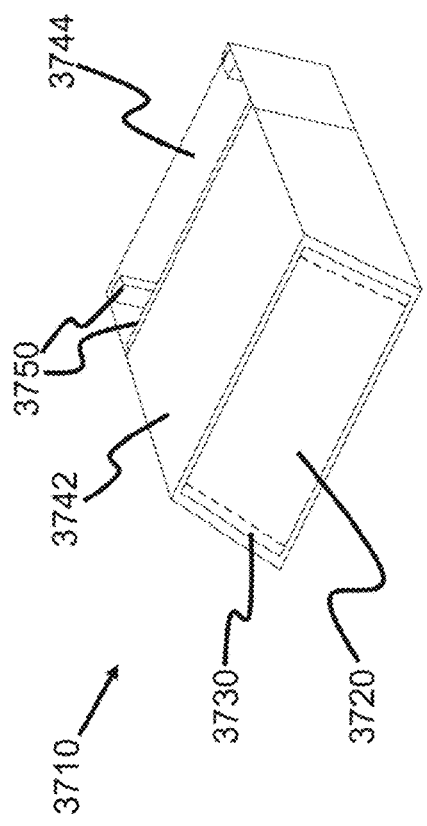
FIGS. 37A to 37B show various views of components for use in an air or gas distribution system according to at least one example implementation.

FIG. 37A is a perspective view of one module 3710 of the ADS with a cavity 3720, insulation 3730 (shown by dotted line), and support structure 3740 for attachment to the thermal storage medium. In this implementation, there may be one module 3710 per level of thermal storage blocks in the thermal storage medium. The system may include a metal framed structure 3740 with a cavity 3720 for an orifice array. There may be a refractory lining 3730 within the cavity of the framed structure 3740 with a carbon steel exterior. An upper portion 3742 of the frame may be metal alloy sheet with or without a refractory lining. The framed structure 3740 may have an interlock portion 3744 shaped to engage with blocks in the thermal storage medium. Optionally, there may be insulation 3750 in the portion of the framed structure that interlocks with the thermal storage blocks. In on implementation, there is a one of these framed structures per level of thermal storage blocks. Optionally, some implementations may have more of these structures per level of thermal storage blocks. Optionally, some implementations may have one structure that regulates flow to two or more levels of thermal storage blocks. Optionally, some implementations may have more than one of the structures for managing flow to at least some portion of one level of thermal storage blocks.

Figure 37B:
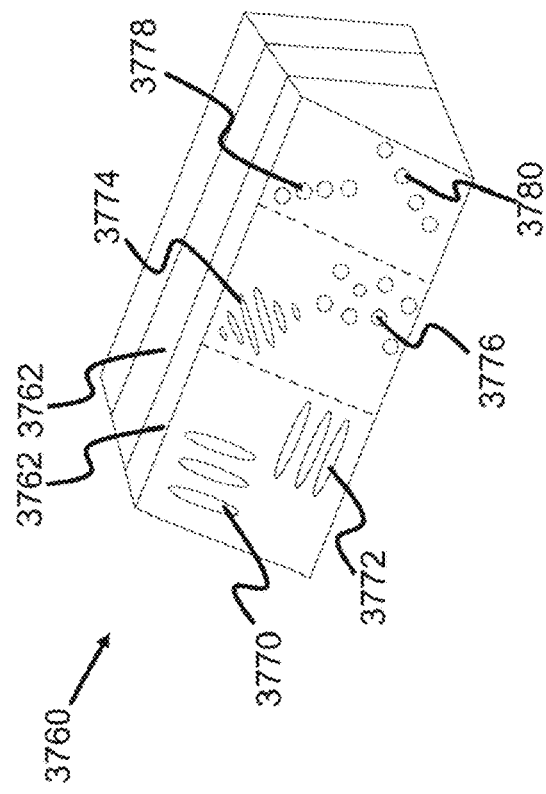

FIG. 37B is a perspective view of an orifice array 3760 that is received in the cavity 3720 of the ADS module 3710 shown in FIG. 37A. In this example, multiple different orifice shapes are shown on the orifice array. It should be understood that the orifice array 3760 can use all one type of orifice shape/size or single or multiple combination of orifice shapes/sizes for each orifice array. In one implementation, this is orifice array 3760 may be laminated or single-piece ceramic fiberboard 3762, calcium silicate insulation with orifices, or other suitable insulative material with orifices. FIG. 37B shows six examples of orifice arrangements. A first arrangement has multiple vertically aligned slots 3770. A second arrangement has multiple horizontally aligned slots 3772. A third arrangement has multiple diagonally aligned slots 3774 of small size to larger size and then to small size. A fourth arrangement has a number of slots 3776 arranged in an evenly distributed pattern. A firth arrangement has a number of slots 3778 arranged in a diagonal line. A sixth arrangement has a number of slots 3780 arranged in a different diagonal line.

FIG. 38 shows one example of how an ADS assembly 3810 may attach to the thermal storage medium 3812. There may be support structure such as bolt-on framing or strap down structures 3820 to stabilize the ADS and turn it into its own self-supporting structure. In this implementation, each of the framed structures 3830 such as but not limited to those of FIG. 37A are stacked on top of each other to form the ADS. As seen in FIG. 38, each of the framed structures can be of different size such as of different width to be compatible with the width of the thermal storage blocks aligned to receive air or fluid flow from that portion of the ADS. This modular system allows for the ADS portions 3830 to be selected based on the size of the thermal storage medium being deployed at any particular location, without being constrained to pre-built, fixed size ADS assemblies.

Figure 39A:
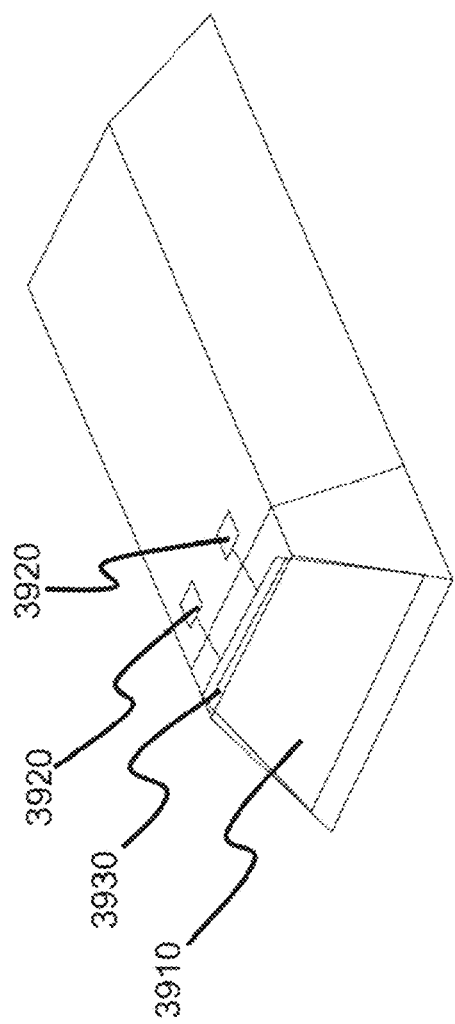
FIGS. 39A to 39B show various views of components for use in an air or gas distribution system according to at least one example implementation.

FIG. 39A shows one implementation of actuators and controls for use with the gate 3910 of the ADS. In this implementation, one or more linear actuators 3920 such as but not limited to ball-screw linear actuators are used to created relative motion between the gate and the thermal storage medium. A structural beam 3930 may be positioned across the top or other portion of the gate to connect the gate to the one or more actuators. In some embodiments, a single actuator 3920 can be used to lift or lower the ADS gate 3910. Optionally as seen in FIG. 39A, multiple linear actuators 3920 can be used for lifting or lowering the ADS gate 3910.

Figure 39B:
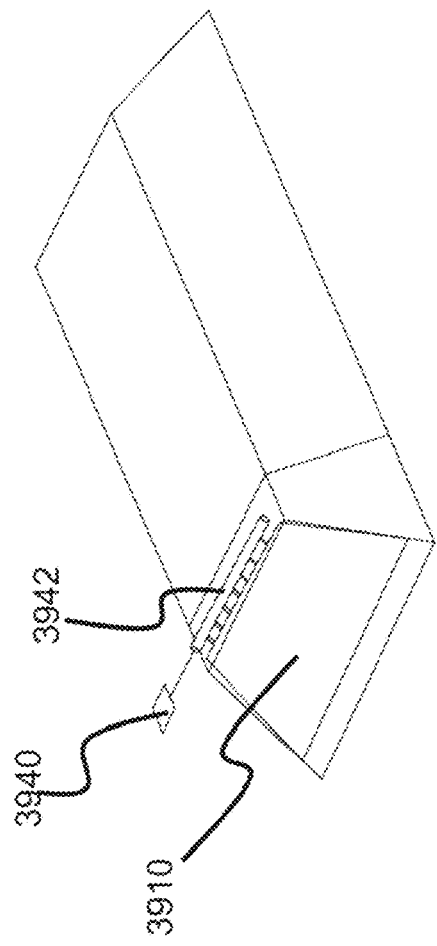

FIG. 39B shows another implementation of actuators and controls for use with the gate 3910 of the ADS. A 90 degree actuator 3940 is used to rotate a shaft 3942, which translate rotational motion to linear motion via linkages. In one implementation, many linkages can be used to improve reliability and reduce the risk of single point failures. Other types of actuators can be used in place of or in combinations with the actuators herein to create the desired relative motion of the gate.

Figure 40A:
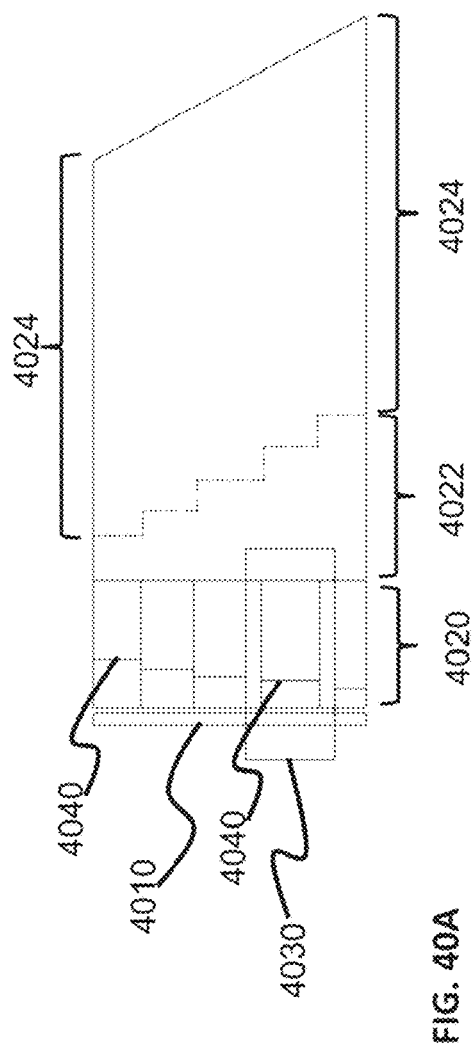
FIGS. 40A to 40B show various views of components for use in an air or gas distribution system according to at least one example implementation.

FIG. 40A depicts one implementation of the ADS gate 4010 that slides from a first position to a second position to uncover the orifices in the ADS. The covering and uncovering the orifices meters the flow through the thermal energy storage medium. In this implementation, the ADS has a vertical outer surface instead of a sloped outer surface. The length of the cavities 4020 in the ADS are also the same, instead of varying in length. The support blocks 4022 and thermal storage blocks 4024 are also shown. Although this implementation uses a vertical motion for opening and closing the orifices, it should be understood that motion in other directions such as horizontal or other angle relative to vertical are not excluded in at least some implementations. For case of illustration, the fluidic isolation between the different levels (such as shown in FIG. 33) in the thermal storage assemblage is not shown in FIG. 40A.

Figure 40B:
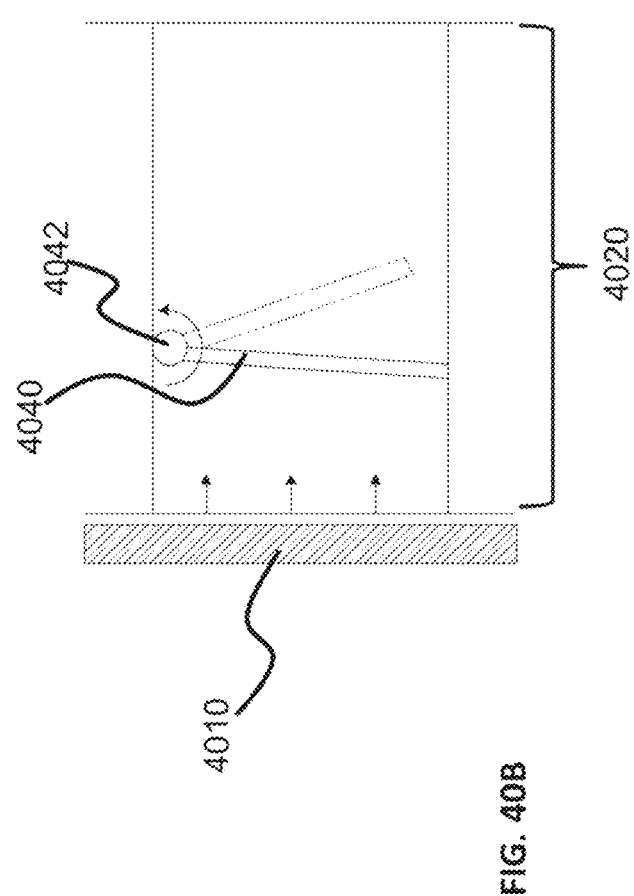

FIG. 40B shows a close-up cross-sectional view of one portion 4030 of the ADS. This implementation includes a horizontally hinged door 4040 similar to a "doggy door" that functions as a thermal radiation to shield the gate on an outer portion of the ADS from direct thermal radiation from the thermal storage medium. The hinged door 4040 may be formed of a structurally reinforced insulation material that moves to an opened position when there is air or fluid flow from the gate. The hinged door 4040 returns to a closed position when the air or fluid flow drops below a threshold level. Although this implementation has the hinge 4042 that top, it should be understood that configurations with hinges in the side, the bottom, or other location in the cavity can also be suitable. Some may use a shutter-type valve, iris-type valve or other typed valve for regulating exposure to the thermal radiation of the thermal storage medium.

FIG. 41A shows a side cross-sectional view where the gate is removed and the hinged doors 4110 are used to both meter air or gas flow and/or act as a thermal radiation shield. FIG. 41A shows that the hinged doors 4110 or "doggy doors" may be positioned at one per level and configured in an array format. Although this implementation has the hinge 4120 at the top, it should be understood that configurations with hinges in the side, the bottom, or other location in the cavity can also be suitable. Some may use a shutter-type valve, iris-type valve or other typed valve for regulating exposure to the thermal radiation of the thermal storage medium. In this implementation, there is one hinged door 4110 per level of thermal storage blocks.

FIG. 41B shows a close-up perspective view where the hinge 4120 can be coupled to an actuator that can open or close the door at various angles. The inside surface of the hinged door may be covered with an insulating material to withstand thermal radiation from the thermal storage medium. The sides of the framed structure in the ADS may also include insulating material 4130 inside the framed structure to minimize heat transfer to the outer environment.

Figure 42:
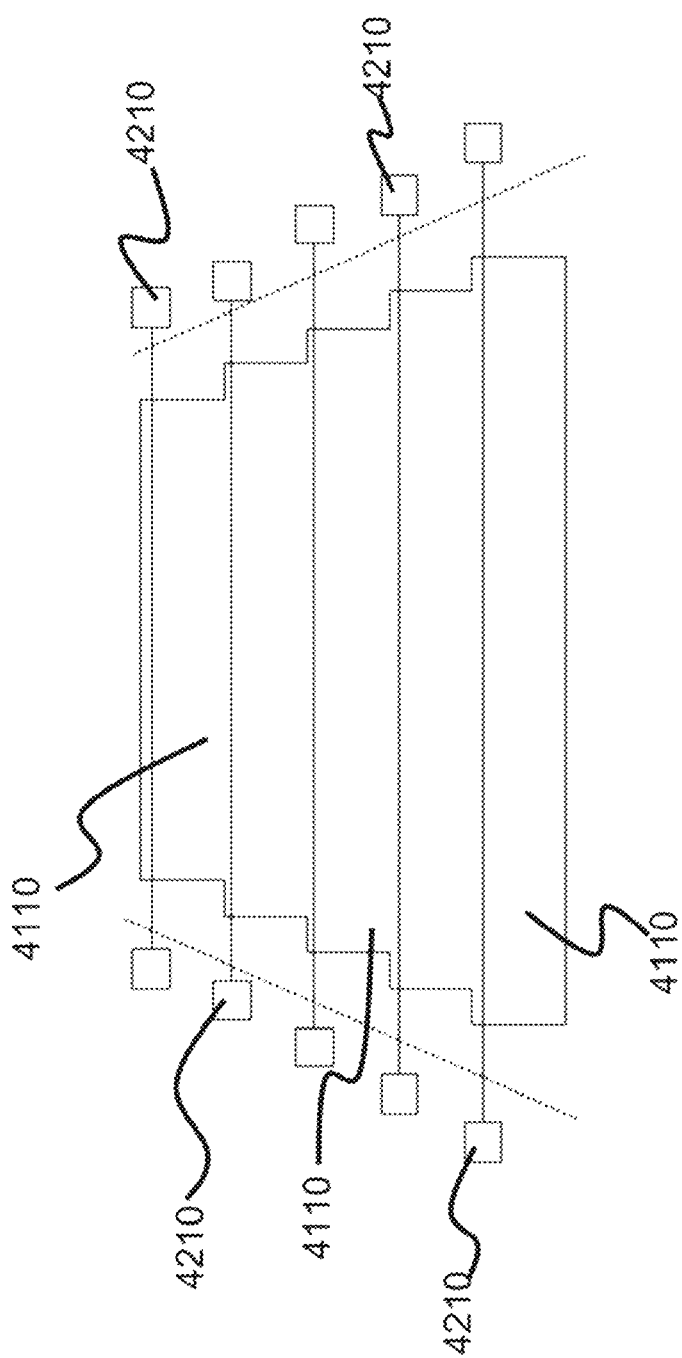
FIG. 42 shows an end view of an air or gas distribution system according to at least one example implementation.

FIG. 42 depicts an end-on view of the gate assembly with doors 4110 of FIGS. 41A and 41B from one end of the thermal energy storage system. The system may have multiple actuators 4210 for each of the hinge gates at each level of the thermal energy storage system for redundancy. In one implementation, all of the actuators 4210 are connected to the same control system, allowing them to act in unison. It is also shown that the actuators 4210 may be positioned outside the insulation boundary of the thermal energy storage medium. This may help keep the actuators 4210 at an operable temperature range. Optionally, at least some portion of the actuator may be included within the boundary area for those components that can withstand higher temperatures.

Design of Orifice Plates

Figure 43:
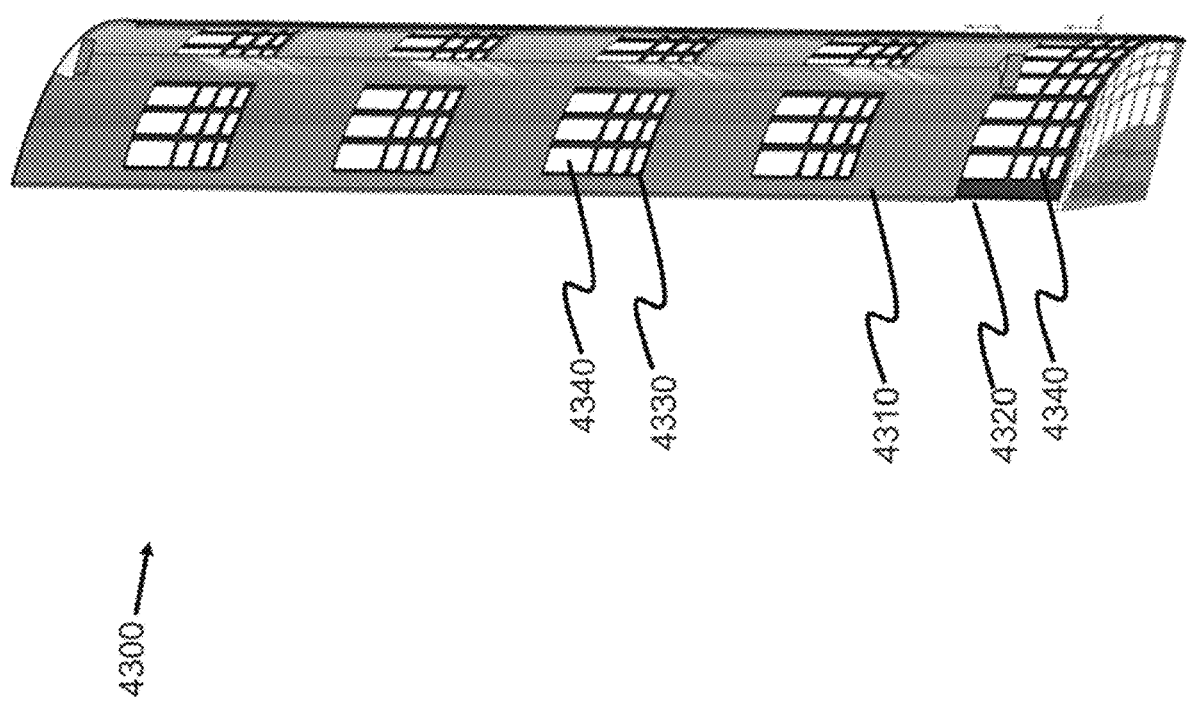
FIGS. 43 to 45 show various views of an orifice plate system according to at least one example implementation.
Figure 44:
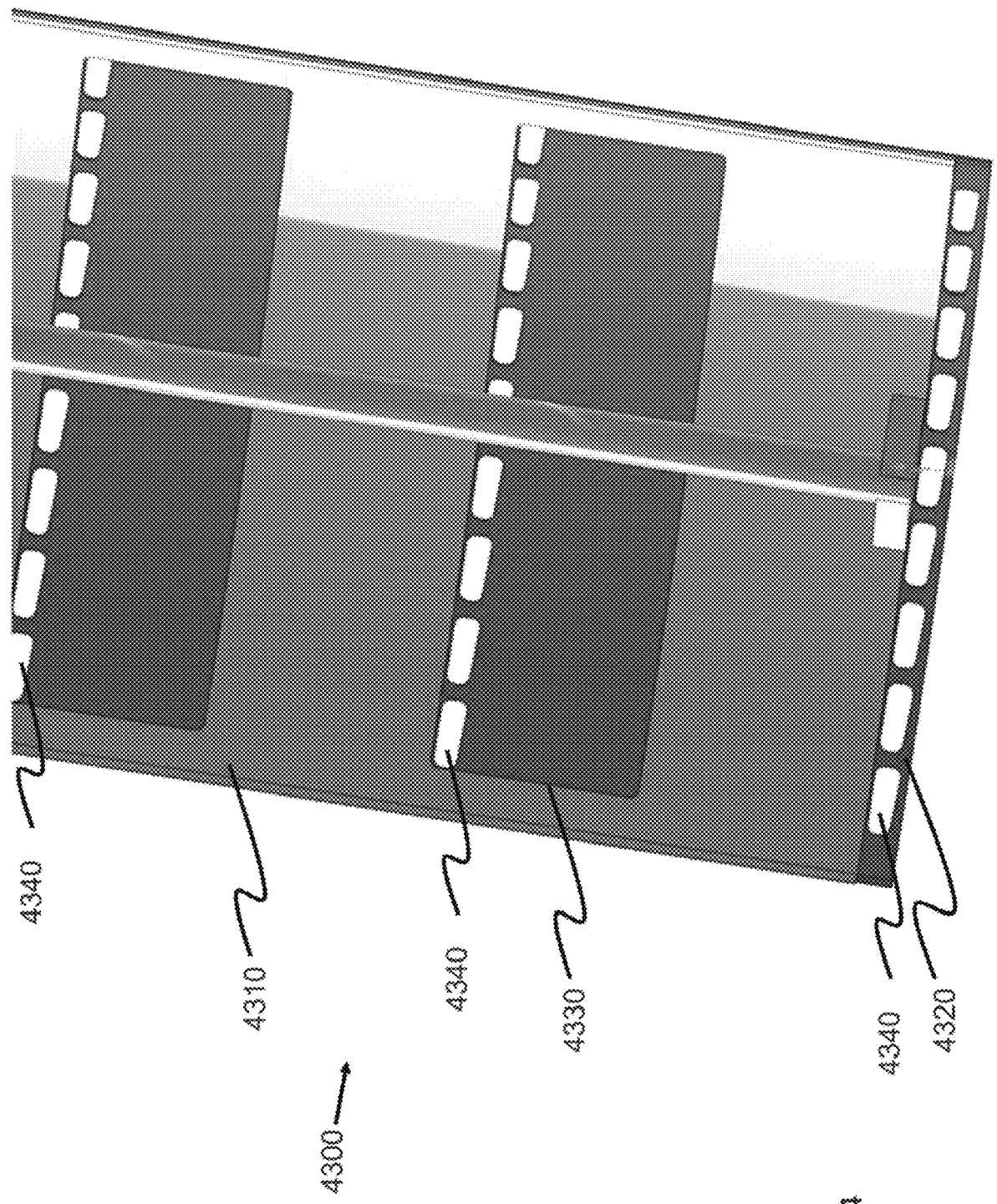

FIG. 43 shows a still further implementation of an air distribution system 4300, similar to those shown in FIGS. 31 to 42. In this example, there are two portions 4310 and 4320 that are movable relative to each other to change the amount of gas or fluid flow into each layer of the thermal storage medium. Portion 4310 has the larger openings 4330 while portion 4320 has a number of smaller openings 4340 of different size and/or shape. Gas or fluid flow through the air distribution system 4300 is controlled by the number of openings 4340 that are "uncovered" by openings 4330 to allow flow therethrough.

Figure 45:
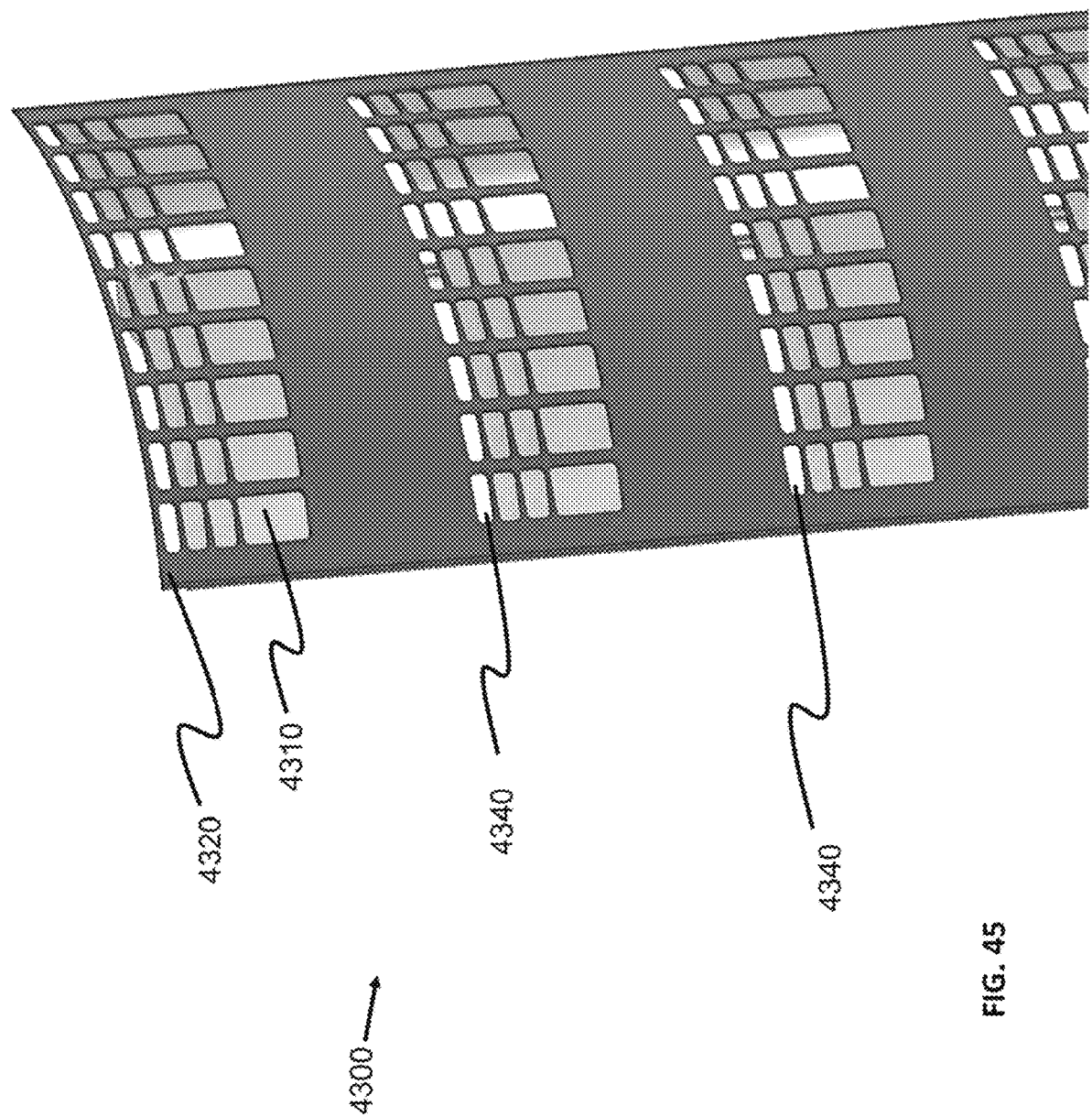

FIG. 45 is a close-up view of one section of the air distribution system 4300 where each of the larger openings 4330 is in a more closed configuration with only one row of smaller openings 4340 allowing flow through the air distribution system. In this configuration, most of the openings 4330 are in a closed configuration except for gas or fluid passing through each set of openings 4340.

FIG. 45 shows a view from the other side of the air distribution system 4300 more clearly illustrating a configuration where most of the openings 4340 are not exposed in openings 4330. Again, only a single row of openings 4340 are exposed per opening 4330 in this configuration. It should be understood that other implementation could vary the number of openings 4340 being exposed in each 4330 and that they do not all need to be allowing the same amount of flow as shown in FIG. 46.

FIG. 46A shows a still further implementation wherein rotary motion of orifice plates is used. This can be used in place of the linear moving orifice plates or in combination with one or more the linear motion orifice plates. The rotary orifice plate assembly 4610 is implemented as one or more plates 4620 that rotate relative to another adjacent plate to cover or uncover openings 4630 by relative rotary movement of either the plate 4620 or of the plate with openings 4630 as indicated by arrows 4640. The two adjacent plates are is slidable contact with each other. It should be understood that the plate in front, the plate in back, or both plates may rotate to provide the desired relative rotary motion to open or close the orifices. In one implementation, there may be one or more of the rotary orifice plate assemblies 4610 per level of thermal energy storage blocks in the thermal energy storage system. FIG. 46B shows an implementation with two rotary orifice plate assemblies 4610 per level of thermal energy storage blocks. With multiple rotary orifice plate assemblies, mechanical linkages such as gears or other components can be used to connect rotary orifice assemblies together, reducing the number of actuators or motors required to open or close multiple rotary orifice plate assemblies. In one implementation, these linkages connect orifice plate assemblies that are in one horizontal plane. Optionally, in some implementations, the linkages connect orifice plate assemblies that are in one vertical plane. Optionally, the rotary orifice plates may be configured to fail to a closed condition such as through the use of springs or other return force such that a power failure in the overall system will return the ADS to a closed state. Although this embodiment shows two sets of openings in the rotary orifice plate assembly, it should be understood that some implementations may use only one set of openings. Optionally, some implementations may use two or more sets of openings, with corresponding number of cover portions for opening and closing such sets of openings.

It should be understood that the size and/or shape of the openings 4630 are exemplary and non-limiting. Some implementations may use multiple openings 4630 of different sizes and/or shapes. Optionally, some embodiments may have openings 4630 that are different sized or shaped based on what level of thermal storage blocks are being fluidically coupled to the orifice plate assembly 4610. Optionally, the openings 4630 may be spaced differently on the plate 4620 so that different pressure drops are implemented based on fine tuning of desired fluid flow or gas flow in that level of storage blocks in the thermal storage medium.

FIGS. 47A and 47B show other implementations of rotary motion of orifice plates are used. This can be used in place of the linear moving orifice plates or in combination with one or more the linear motion orifice plates. The rotary orifice plate assembly 4710 is implemented as one or more plates 4720 that rotate relative to another plate to cover or uncover openings 4730 by relative rotary movement of either the plate 4720 or of the plate with openings 4630 as indicated by arrows 4740. In one implementation, there may be one or more of the rotary orifice plate assemblies 4710 per level of thermal energy storage blocks in the thermal energy storage system. In one implementation, the rotary orifice plate assembly 4710 feed into a manifold similar to the manifold 3140 that can be sized to interface with all inlets into the storage assemblage. The manifold 3140 and the manifold herein can be configured so that each level of the storage medium remains fluidically isolated from inlets to other levels in the manifold as well.

FIG. 47B shows an implementation with two rotary orifice plate assemblies 4750 per level of thermal energy storage blocks. Each of the orifice plate assemblies 4750 have three sections of openings 4730. With these additional sections of openings 4730, this configuration may provide for a more even distribution of openings across the orifice plate assembly.

Outer Enclosure

FIG. 48A shows that the outer enclosure 4810 may be made of modular sections 4820 that can be separated into individual, movable sections to provide for access to the thermal storage medium, enabling flexible maintenance and repair operations. In one implementation, the enclosure sections are movably mounted onto rails to allow for unbolting and rolling movement that provides access to all locations within the enclosure. The housing at either end of the stack are sized such that modular section(s) of the outer enclosure can slide over them without interfering with the motion of the modular section(s). There may be extra length of rail 4830 that extends to or past the housings to allow the modular section(s) 4820 to roll over the housing and/or beyond.

FIG. 48B shows an opened configuration for the outer enclosure 4810 that shows gaps 4840 created by sliding apart the module section 4820. The gaps 4840 can be created allow for access to interior portions of the thermal energy storage system for maintenance, replacement, and/or upgrade purposes. FIG. 48B shows that gaps 4840 can be created at two different locations. Optionally, one larger gap can be created instead of two or more smaller gaps 4840.

Figure 49:
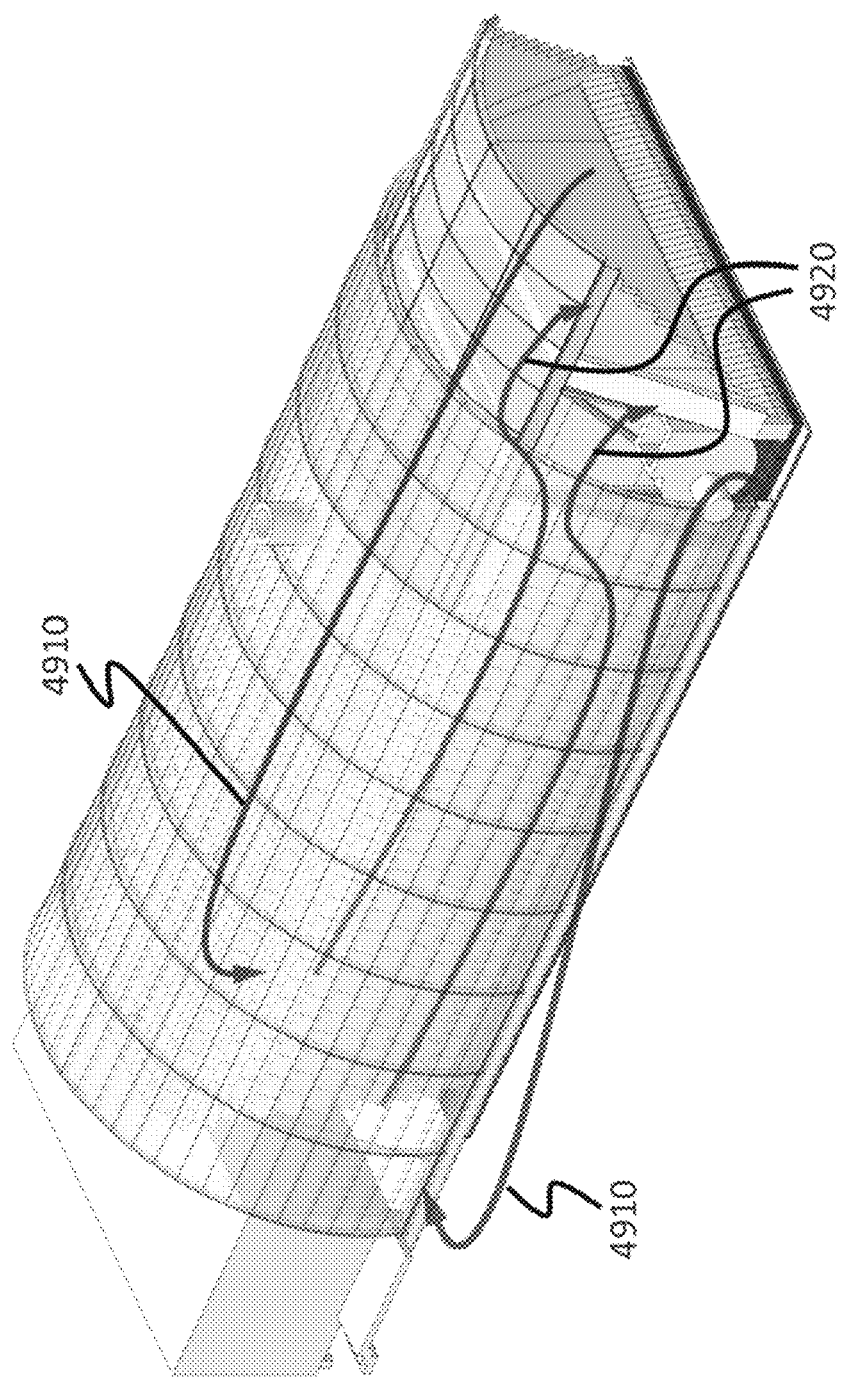
FIG. 49 shows air or gas flow in at least one portion of a thermal energy storage system according to at least one example implementation.

FIG. 49 shows airflow layout that may occur within the enclosure. Cooler air or fluid 4910 may be circulating around the thermal storage medium, while air or fluid 4920 is heated within the thermal storage medium. As seen in FIG. 49, at least one portion of the fluid is drawn in at a lower portion below the stack. Optionally, one implementation uses ducts to route air or fluid within the TES system. Another implementation uses head space within the enclosure between the thermal storage medium and the outer enclosure to route air or fluid flow in the TES system.

In one implementation, the outer housing functions as a pressurize container or enclosure. For example, the outer enclosure may be configured to withstand internal pressurization (in one example, about 2 psi); coupling hoops hold the enclosure sections to the rails when the system is pressurized. Although this example uses 2 psi, it should be understood that lower or higher pressures can also be implemented. The positive pressure facilitates configurations where thermal output is designed as part of a direct air, direct gas, or direct fluid system, where the direct air, gas, or fluid is used directly in the thermal process versus being used as part of a steam generator and then using the steam to drive a process. The pressurization can be implemented through gas or fluid blower systems for pressurizing the enclosure. Some implementations may use induced draft blows to assist in gas or fluid flow through the system. During operation, the temperature inside the outer enclosure may be about 150° C. or higher. During an upset condition, this temperature can be as high as 270° C.

Figure 50:
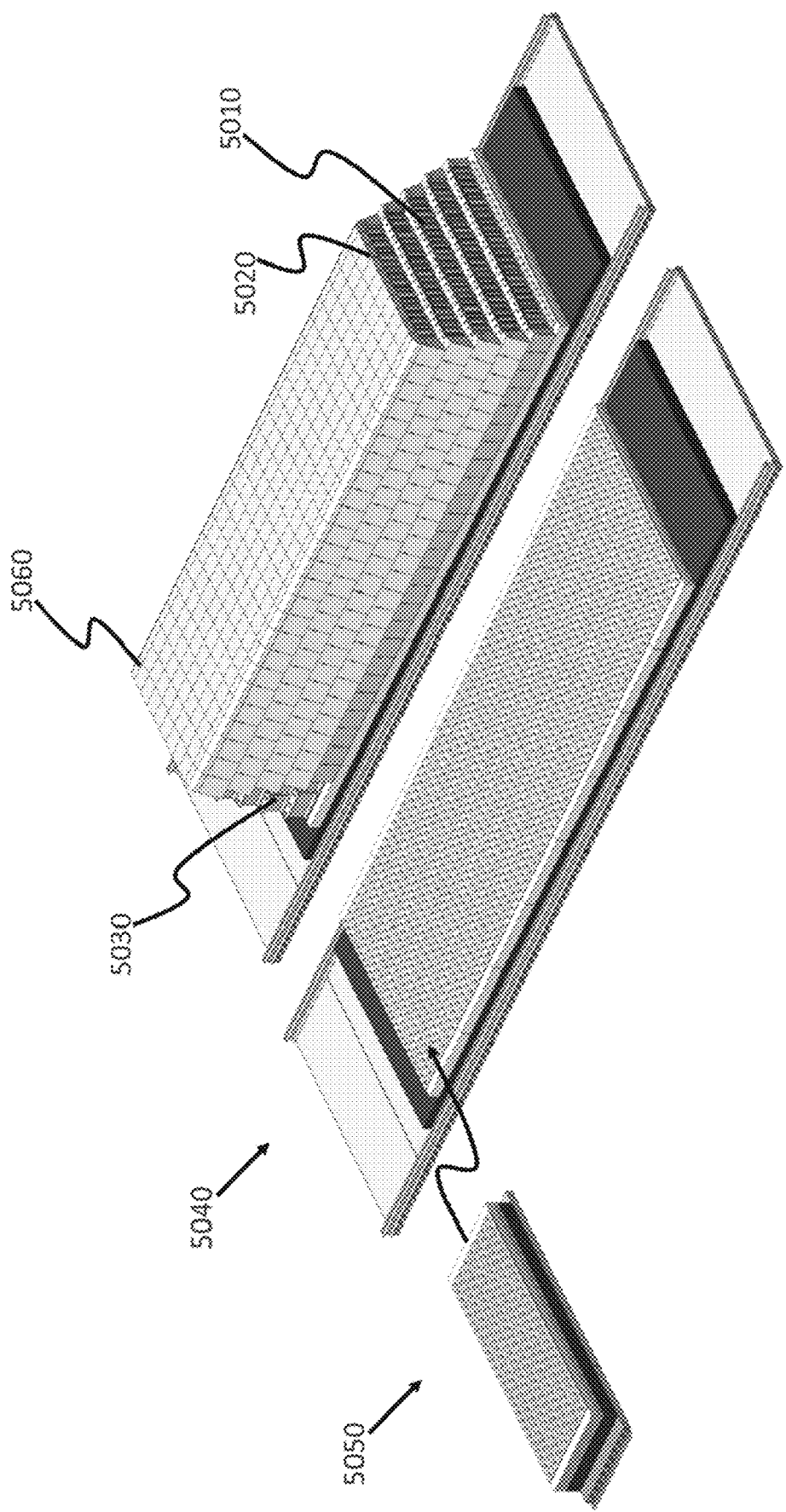
FIG. 50 shows perspective views of various components of a thermal energy storage system according to at least one example implementation.
Figure 51:
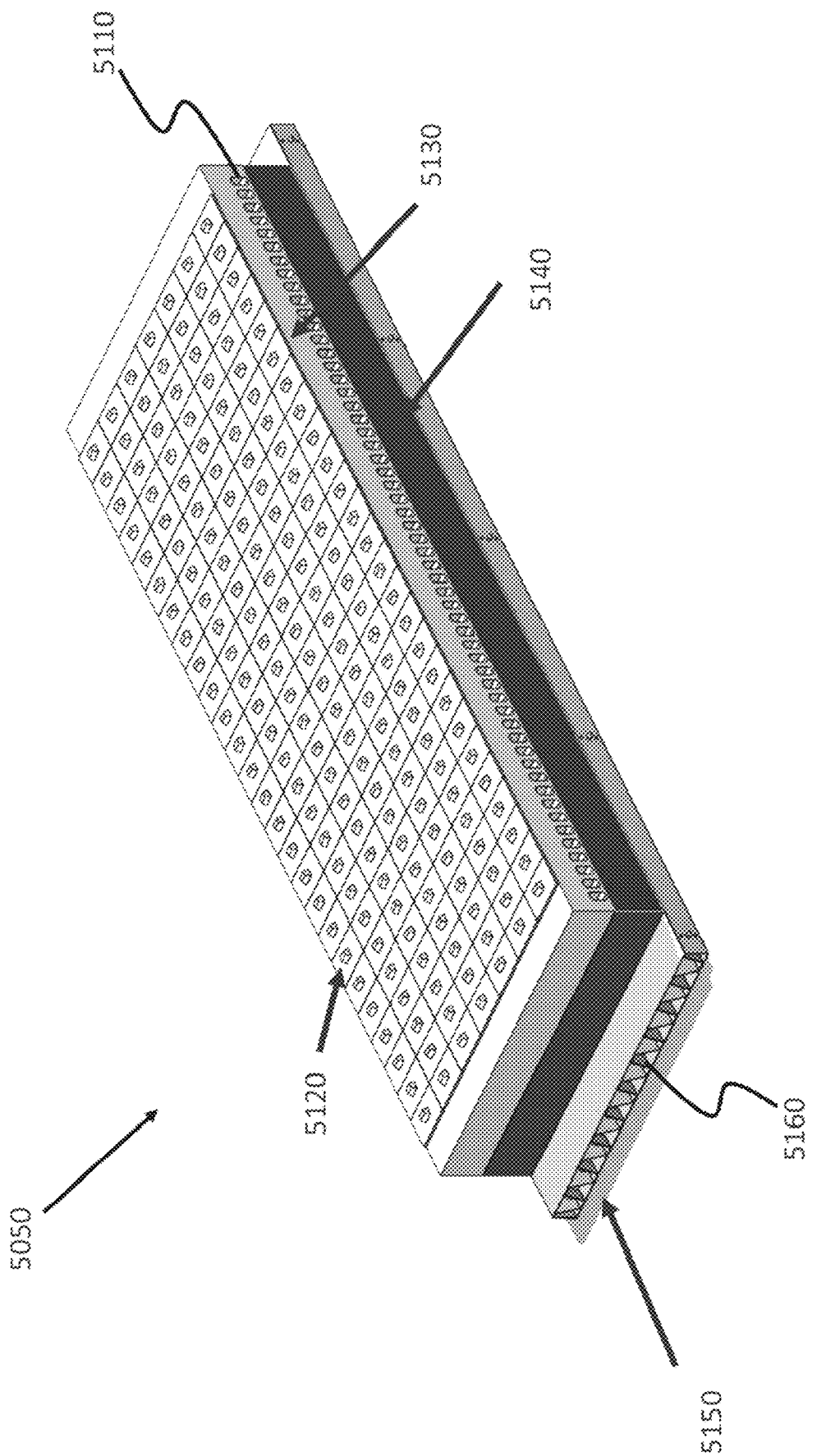
FIG. 51 is close-up perspective view of a modular support structure for use in a thermal energy storage system according to at least one example implementation.

FIG. 50 is a perspective view of several components of the TES system. The TES system may include heated thermal energy storage blocks 5010, insulation blocks 5020, non-heated support blocks 5030 (see example in FIG. 30), and a base support 5040 comprising multiple components. FIG. 51 shows that some components of the base support 5040 may be provided in sections or modules 5050 to facilitate transport to the development site.

In some implementations, a strap or other support structure can be attached to insulation or other material surrounding the thermal energy storage medium. This could occur at the inlet or cooler end 5060 of the storage medium. Some implementations may use the strap on both ends of the thermal energy storage medium. Optionally, some implementations may place a strap on the cooler end of the storage medium. Optionally, some implementations may place the strap on the end that does not have a pyramid side profile. In one implementation, the thermal energy storage medium rests on top of a layer of a first insulation material, a second insulation material that may include air flow channels, a raft structure, and then a bed of base material such as but not limited to gravel.

FIG. 51 provides an enlarged view of the section or module 5050 used for one portion of the base support 5040. The base support section may include a first insulation layer 5120 that uses refractory tile, a second insulation layer that includes air channels 5110, and a third insulation layer that may use insulation such as but not limited to calcium silicate insulation, or other suitable insulation which may or may not include air channels in the insulation material. A fourth insulation layer 5140 may be cellular glass thermal insulation or other suitable insulation. The insulation materials may be coupled by glue or other suitable attachment. All of this is provided on a platform 5150 such as a metal layer that is configured to include air channels 5160. The platform 5150 can attach to other adjacent platforms by bolts or other suitable attachments. The air channels 5110 and air channels 5160 are arranged in non-parallel configurations. In one implementation, the air channels 5110 are orthogonal to the air channels 5160. Although the channels 5110 are not limited to any particular arrangement or pattern in the second insulation layer, one implementation places the channels 5110 closer to the third insulation layer than the first insulation layer so as to preferentially cool the interface between the second and third insulation layers.

Figure 52:
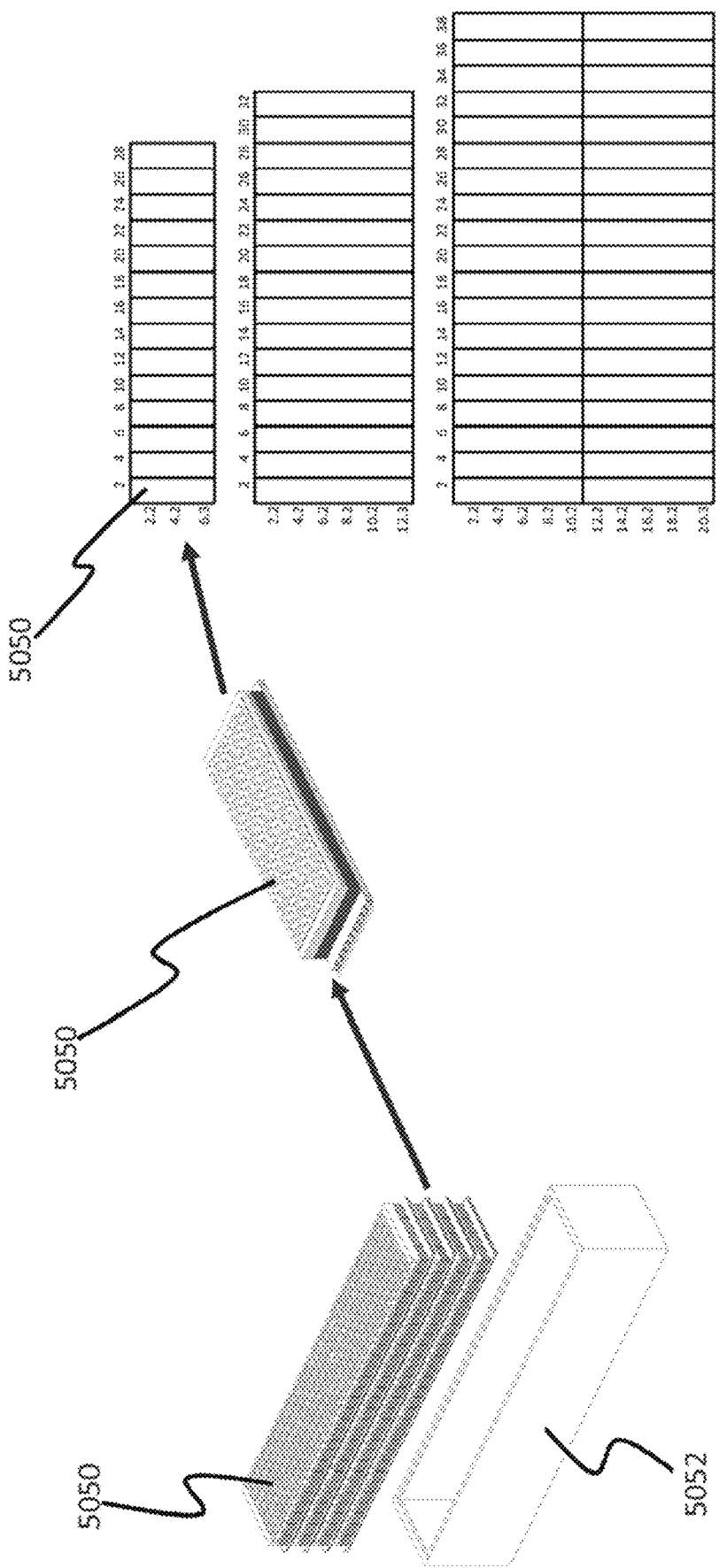
FIGS. 52A to 52B show various views of modular support structures for use in a thermal energy storage system according to at least one example implementation.

FIG. 52A shows that components such as module 5050 may be stacked and containerized in an industry compliant shipping container 5052 for transport from factory to the deployment site. The modules 5050 may be manufactured at a factory or other off-site location so that each module 5050 is produced in a controlled setting and can quickly assembled at the deployment site.

FIG. 52B shows that a component such as module 5050 can be arranged in different patterns to accommodate different sized TES systems. Some implementations may use a single row of modules 5050 for the In one implementation, the base support may be a raft designed as "equipment" not a building. It may sit on gravel rather than requiring foundation. Optionally, all or portions of the base support sits on a foundation. The base support may have a modular design that allows all portions to fit into standard ocean or truck shipping containers. In one implementation, the base support is designed to fit within common shipping container sizes for case-of-shipping internationally. The modules of the base support may be designed for fast assembly. In one implementation, the modules are positioned on site by cranes and connected with "post-tensioning" or other rapid assembly process. The base support may be designed to support the different sections of the TES system: specific pieces for below block stack, e-house, and center sections. The base support is designed with a wide range of sites mind. In one implementation, the base support is designed to thermally isolate the thermal storage medium the ground. The base support may be configured to have minimal impact on pad below, including reduced soil heating and soil loading. The base support is designed with seismic issues in mind with vertical, axial, and transverse structural integrity features. This can minimize adverse effects of ground waves on the thermal storage medium and center section. The base support can provide a single support for the entire system: the E-house, stack of thermal storage blocks, and all input/outputs. In one implementation, systems such as electrical, water in, steam out, and auxiliary will all be routed and connected to the base support such as the raft. The base support such as the raft may provide the main support structure and sealing surface for the outer enclosure. The raft can also support the rail or other hardware to provide for movement of rail and other sections of the outer enclosure for maintenance and upkeep purposes.

Figure 53:
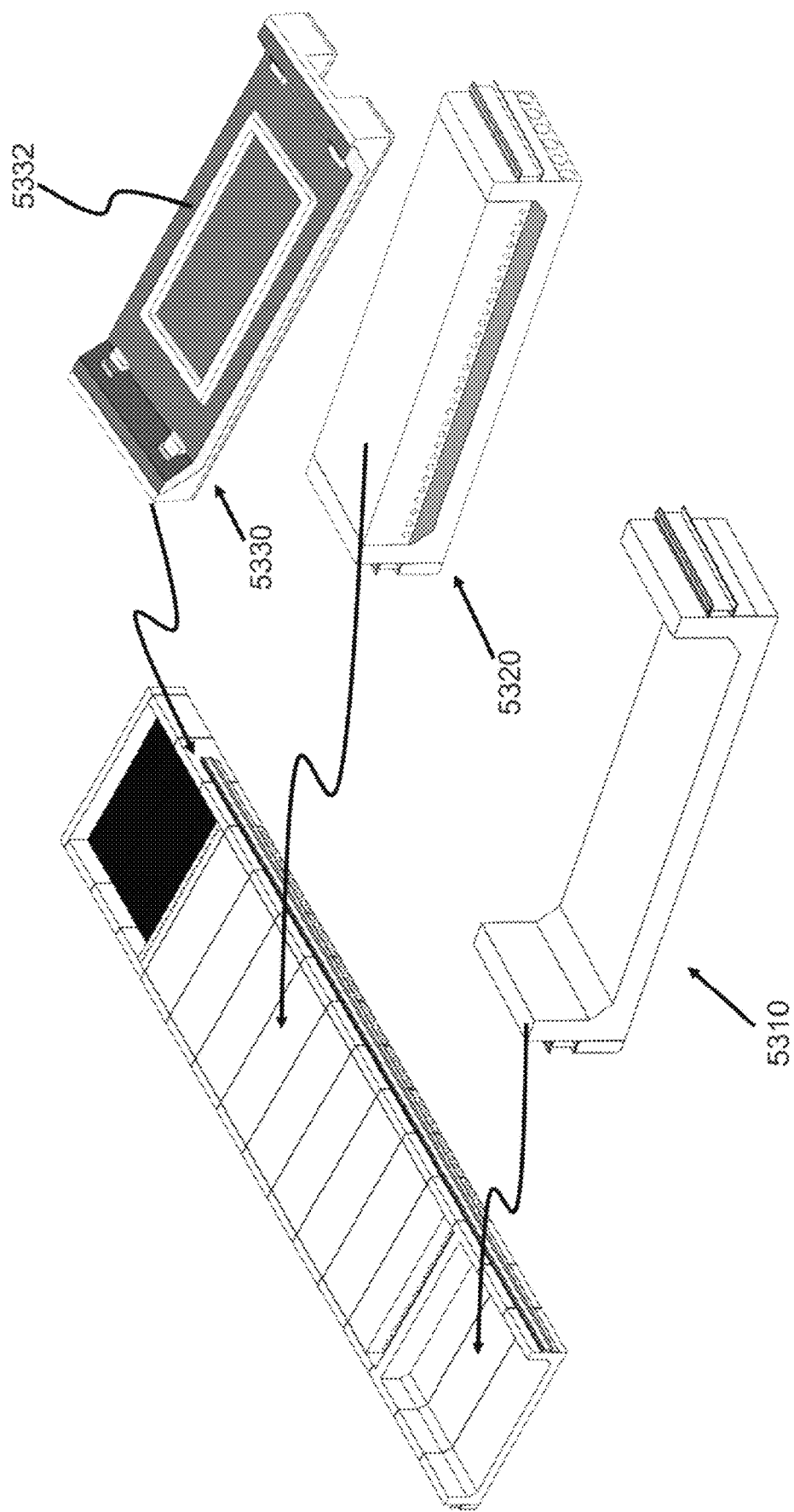
FIG. 53 shows modular support structures for use in a thermal energy storage system according to at least one example implementation.

FIG. 53 depicts how different modules of the base support varies based on the type of equipment being supported above it. Module 5310 supports a housing for electrical hardware and may be very basic with a structure made of material such as concrete, steel, or a combination of such materials. Module 5320 supports the thermal storage medium or assemblage and has multiple layers of insulation and air or fluid flow channels to minimize heating of the ground layer below this base support. Module 5330 supports hardware such as a steam generator that receives the thermal output from the thermal storage medium. Module 5330 may include specific structure to transfer load of the hardware to the base portion of the module. Module 5330 may also include insulative material 5332 to minimize heat transfer to a ground layer below that module 5330.

In addition to selecting materials/thicknesses of insulating materials, the geometry takes into consideration the function of the raft, including one or more of the following: between Platform sections, layers may interlock with key/insulation to limit heat lost between platforms; tolerances and/or the assembly operation may be configured to ensure that the tolerance of the pre-cast concrete base and the insulating layers above are in alignment; the tiles supporting the thermal blocks may be fused to the raft, such that the block cannot move relative to the raft, as it is desired that the block stack/blocks do not walk or move during heating/cooling.

FIG. 54A shows how modular sections of the base support may interface together. At the insulation layer, material can be added to minimize heat loss between platforms and allow for vented airflow between modules. As seen in FIG. 54A, there may be an air flow or fluid flow channel 5410. The flow channels 5410 form a bypass pathway that allows air flow under the TES, acting as additional insulation underneath the thermal storage blocks. The flow in these channels 5410 may be an active flow. This may be in addition to other bypass pathways that may extend around the side and/or top of the stack of thermal storage blocks. This air flow in channels 5410 is desirable as it helps to keep the soil and other material below the stack from overheating, which could result in settling and/or compaction of the soil and interfere with the structural stability of the TES. The air or fluid flow could be active (e.g. driven by a blower) or passive in this cooling operation. Also, the illustrated configuration has a large stack of material with the pathways from channels 5410 towards the bottom of the insulation layer 5412, so that the cooling is not directly next to the lowest level of blocks near surface 5414 (which could draw heat away from those blocks). The layer 5412 may be a homogenous layer of one insulating material, or optionally, it may be multiple layers of same or different materials. The layer 5412 functions as an insulating refractory and vented slab. In this example implementation, there is a layer 5412 that is receiving heat, and towards the bottom, the pathways act cool more at the interface at the bottom of layer 5412, adjacent to the next layer of insulation 5420. This material in layer 5420 is high-insulation, high-density, and high-strength. The base 5430 may also include additional channels 5440 that provide further cooling. The base 5430 may be formed from concrete, steel, other suitable metal, or a combination thereof.

FIG. 54A also shows that at the interface between modular sections, there may be a cooling channel plenum 5460 to account for any offsets or alignment issues between the flow channels 5410 between modules. There may also be alignment keys 5464 to help guide adjacent modules into proper alignment.

In one implementation, the air or fluid flow channels 5440 may utilize passive flow through those channels. This further set of channels 5440 is located beneath the insulation layer 5420. This set of air channels 5440 has a chimney side and an inlet side, where the heated air will rise by buoyancy through the chimney side and thus draw in cool air from the inlet side. In one implementation, an inlet channel may be on a right side of the TES, while an outlet channel with the vertical channel or chimney is on the left side, or vice versa. The chimneys can be positioned alternatingly on the cool side and the hot side along the length of the TES system. These channels may run perpendicular to the active cooling channels. Optionally, they may be at other angles relative to the active cooling channels. These channels are shorter to allow for the passive flow to move sufficient air, although blowers or other active flow devices may also be used. This flow helps prevent hot spots from occurring, and provides passive safety protection due to air or fluid that is drawn in, preventing the overheating of underlying soil or other material. The chimney may be configured to exhaust to the ambient environment or to recycle the air to some use, including feeding back into the TES system. There may be a temperature gradient in the channel, but this design will maintain temperatures within an acceptable temperature range for the materials above and/or below the channels 5440.

Structural warming that causes overheating of the soil would eventually bake out the water from the soil. This would then reduce the soil load-bearing capability. Structural systems are designed to account for soil temperature, which is dependent upon the location. In typical soil in most areas, at some depth there is moisture. As that moisture leaves the soil, the structure of the clays or other soil materials that supported that soil changes, and soil cracks will open. As the cracks open, the soil shrinks. When the soil heats up and drives out the organics, water is driven out as well. The structure in the soil (specifically, for example, clay), is has a disc-like structure. When the soil contains water, the soil maintains a horizontal and vertical spacing. When water is driven out of the soil, soil particles agglomerate and they no longer have the bearing strength, which could result in collapse of structure such as the foundation above the soil.

To mitigate soil agglomeration, thermal insulation such as that shown in FIG. 54B between a heated material and the soil slows down the rate at which heat passes through it. If the soil underneath has to pass the heat away from where it was being heated in the middle, then it is a long pathway, resulting in a heat bubble high temperature soil underneath a central portion of the foundation. As discussed below, one or more features are provided to dissipate thermal energy before it reaches the soil.

In some implementations, a high-density sand additive is included in the low thermal conductivity refractory material, e.g. cement used in this base support. A high specific heat is desirable in the base support as it provides a longer time before the refractory material reaches a temperature that desires cooling by air flow to keep the base support at temperature ranges that do not adversely impact the ground layer below such base support. The storage area materials able to withstand high temperatures will also allow the system to serve single-shift operations where the thermal energy storage system is not actively outputting heat 24 hours a day, but only a portion of that time. The "sand" can specifically be Olivine, Barite Sg 4.48, or other mineral particles. The heat storage capacity Q can be calculated as $Q = V \cdot \rho \cdot c \cdot \Delta T$, where:

V is the volume of the material;
$\rho$ is the density of the material;
c is the specific heat; and
$\Delta T$ is the change in temperature.

This means that the quantity of heat per unit volume is not a function only of density, and increased density alone can be misleading, especially when the transportation cost is considered.

FIG. 54A shows an insulation gasket 5450 at the junction between adjacent base support structures. This insulation gasket 5450 prevents the leakage of cooler external air into the thermal energy storage medium. The insulation gasket 5450 also prevents the leakage of thermal energy or heated gas from the thermal energy storage medium into the gaps between the base support structures. The gasket may span the height of the refractory layer and may have openings or holes in the gasket so as to not block the openings 5410, as shown in FIG. 54B.

Figure 55:
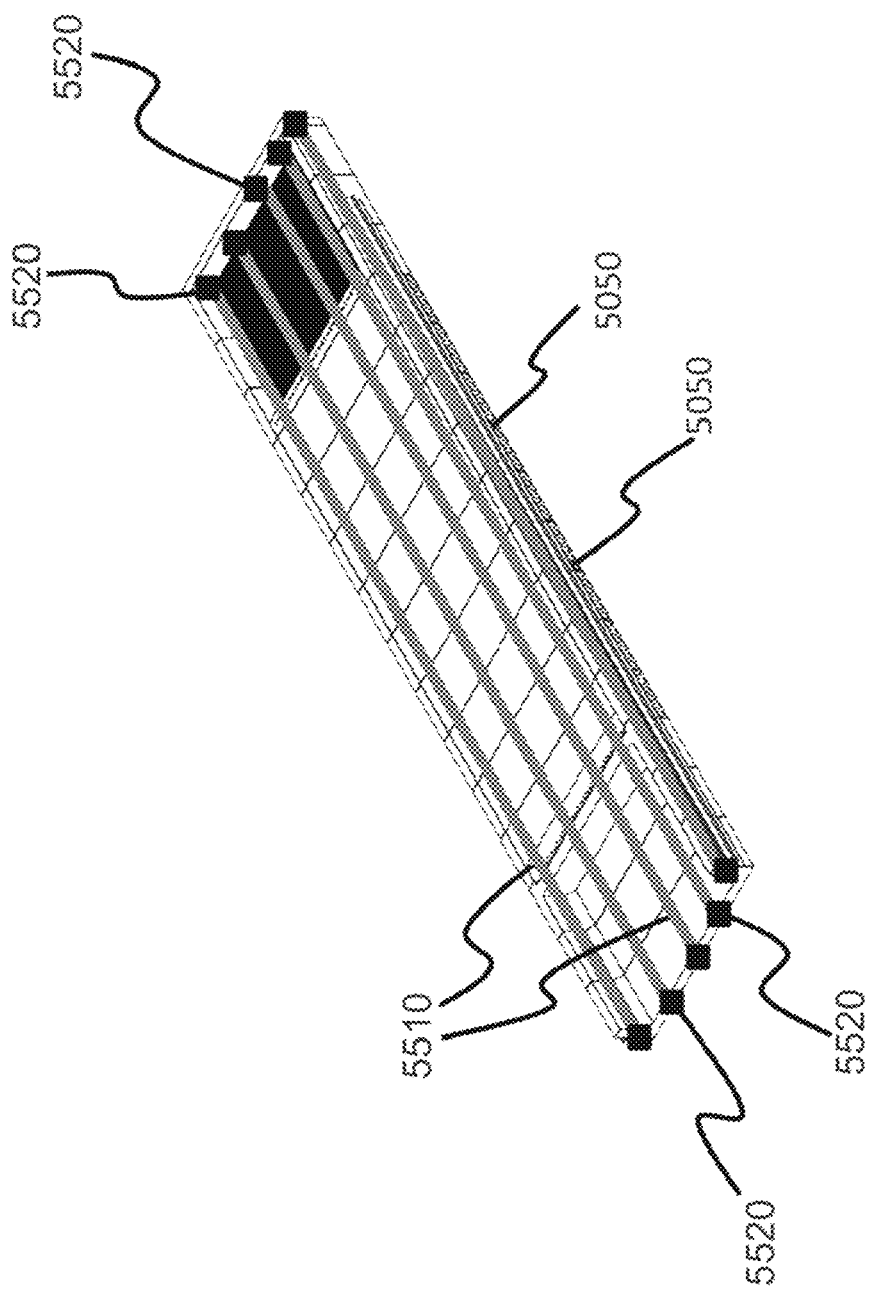
FIG. 55 shows a perspective view of a support structure with post-tensioning features according to at least one example implementation.

FIG. 55 depicts one implementation for coupling multiple modules of the base support together using a post-tensioning technique using tensioning rods or cables 5510. This is used to couple all of the individual raft or base support sections 5050 together to provide improved structural rigidity to the system. Post-tensioning uses a method of prestressing in which the tendons or cables are tensioned after the concrete has hardened, and the prestressing force is primarily transferred to the concrete through the end anchorages 5520.

Figure 56:
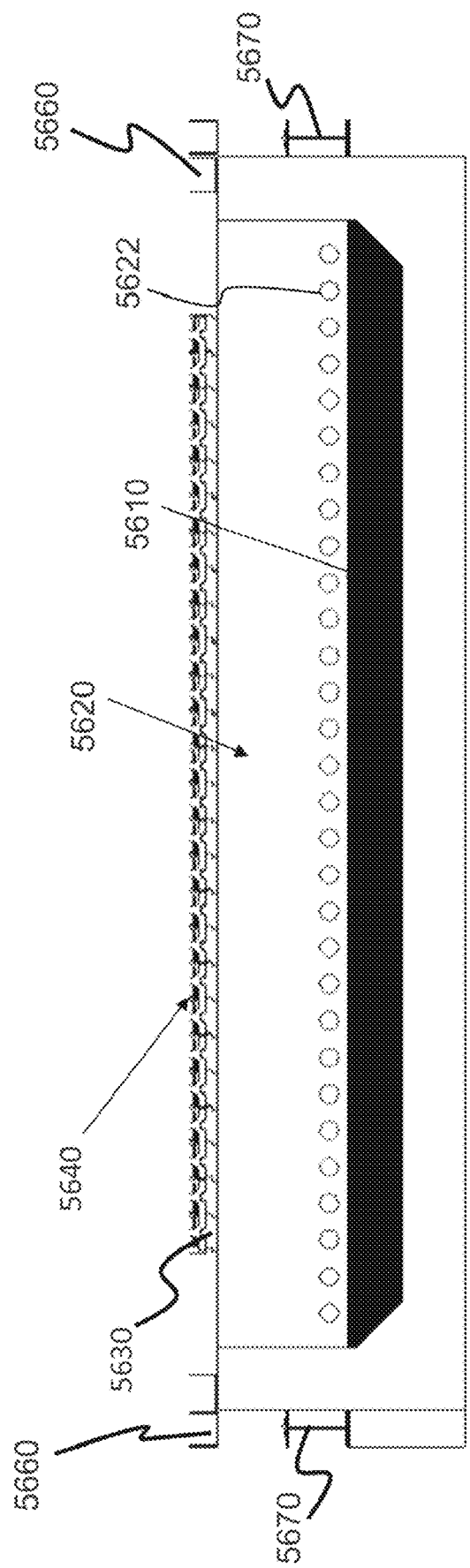
FIG. 56 shows an end-on view of a modular support structure for use in a thermal energy storage system according to at least one example implementation.

FIG. 56 shows a cross-sectional view of an implementation of insulation and support layers beneath the thermal storage medium. FIG. 56 also shows the temperature conditions that may be faced by each of the layers. Of interest is the second insulation layer 5610 that is adjacent (in this configuration, below) the first insulation layer 5620 with the active air or fluid channels 5622. The layer 5610 is a layer of high-value/high-performance insulation such as cellular glass insulation like Foamglas® insulation. Unfortunately, Foamglas® insulation 5610 can only withstand temperatures up to 400° C., preferably about 300° C. or below. This high-quality insulation 5610 can be used in the current implementation because the active insulation with air or gas channels 5622 above it brings the temperature of the heat down to a range acceptable for this high-quality layer. This high-quality layer provides insulation at a given level with much less thickness than other insulators, thus reducing the height (or depth into the soil) of the bottom of the TES system. Optionally, some embodiments may be configured without active air flow channels 5622, and instead rely on a thicker layer of insulation 5620 for resisting any downward thermal heat conduction towards the ground layer. There may be tiles 5630 with protrusions or recesses for interfacing with the bottom layer of the thermal energy storage assemblage 5640. The support structure 5650 can be configured to support the various insulation layers above it. Tracks 5660 for the movable modular components of the outer housing (not shown) and/or channeling 5670 for electrical cables may also be connected to the support structure 5650.

Figure 57:
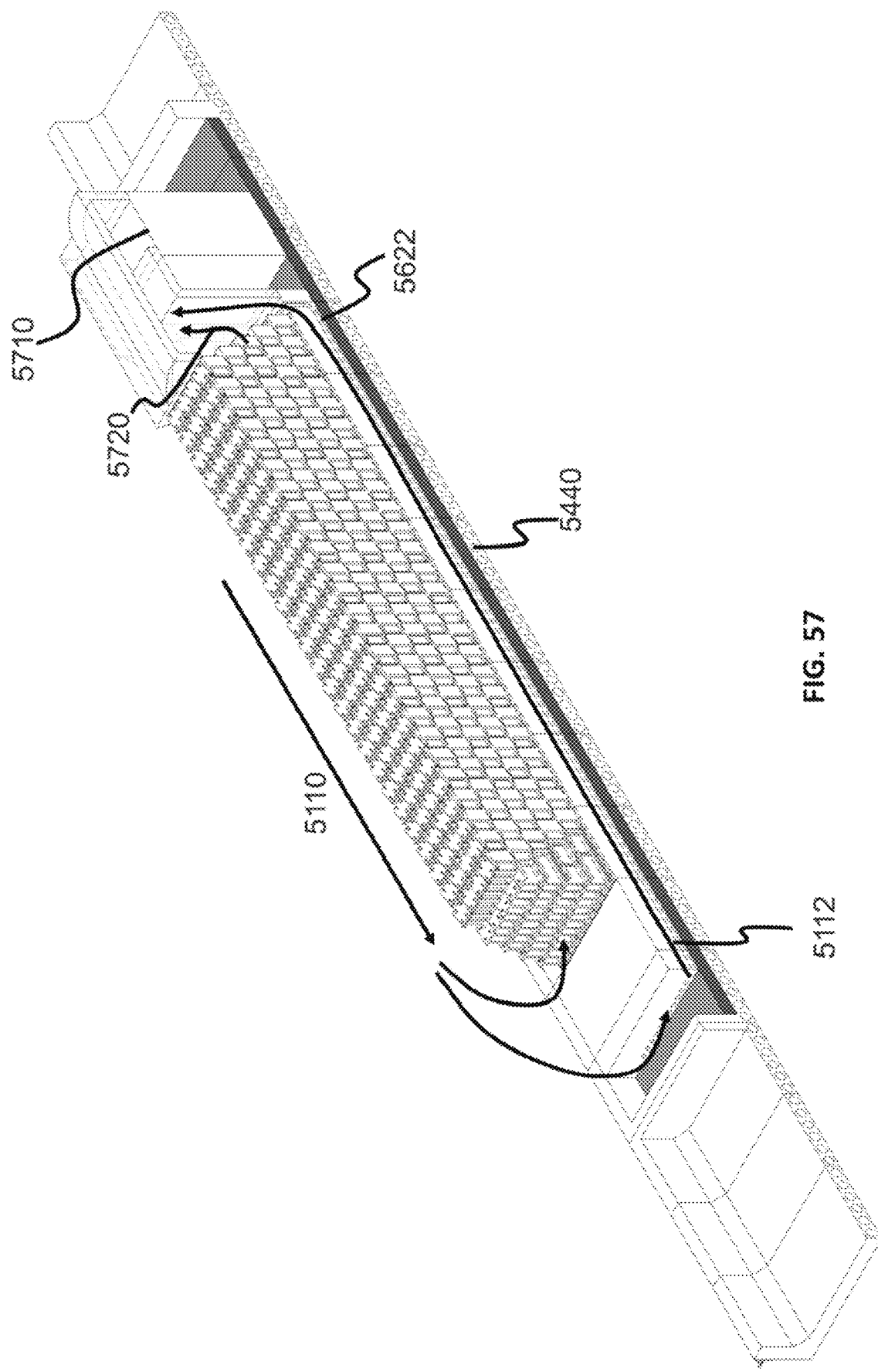
FIG. 57 is a perspective view of a cross-section of portions of a thermal energy storage system according to at least one example implementation.

FIG. 57 shows that the active cooling channels 5622 of FIG. 56 can be configured and shaped to direct the fluid flow to the heat exchanger of the steam generator. This flow of air or fluid mixes with output from the thermal storage assemblage, and the mixture goes into the heat exchanger 5710 or other equipment receiving the thermal energy from the thermal storage assemblage. FIG. 57 is a cross-sectional view showing one implementation of air flow within the TES system active cooling in the base support. Relatively cool air or fluid flows over the top of the thermal storage medium as indicated by arrows 5110 before a portion enters the thermal energy storage assemblage and another portion 5112 enters active cooling channels 5622 and flowing under the thermal storage medium as indicated by arrows 5020 and then eventually combining with the output 5720 from the thermal energy storage assemblage and flowing together into the heat exchanger 5710.

Figure 58:
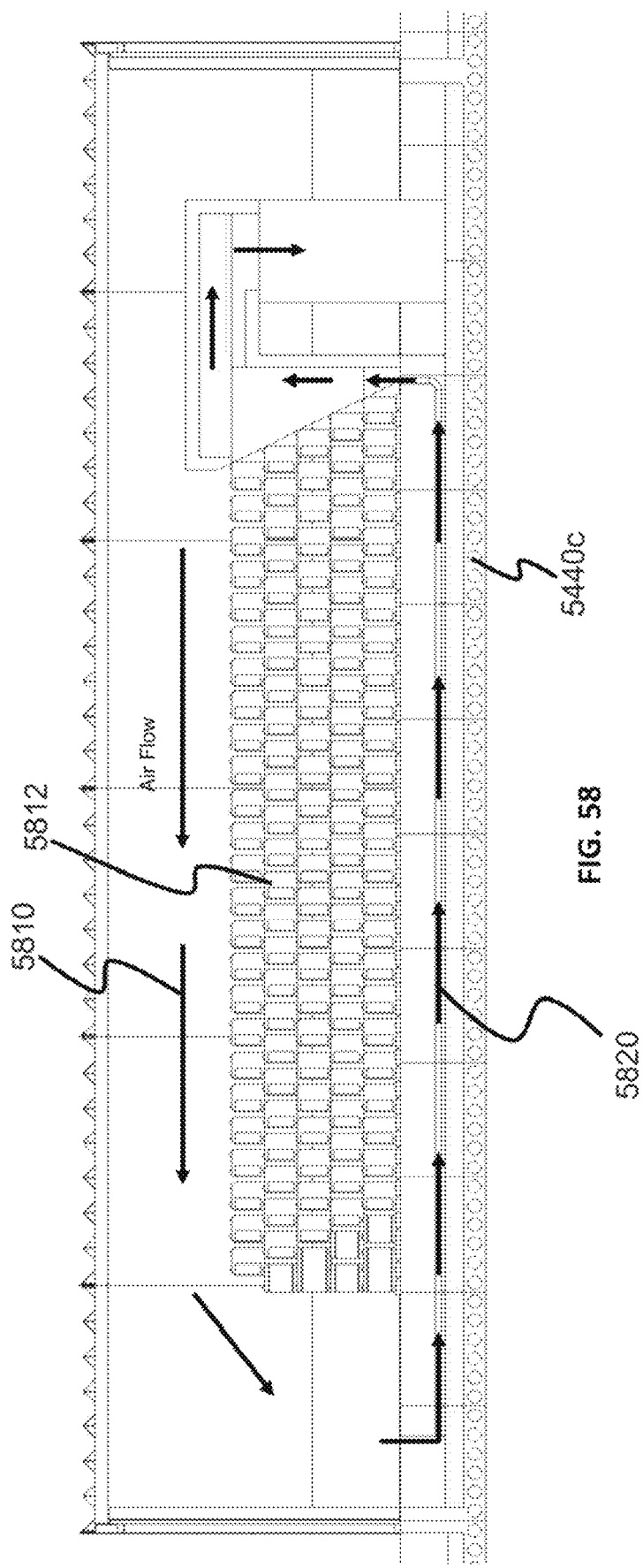
FIG. 58 shows a side, cross-sectional view of a thermal energy storage system according to at least one example implementation.

FIG. 58 shows a cross-sectional view along a longitudinal axis of the TES system. FIG. 58 shows that at least a portion of the air or fluid flows through the active cooling channels 5622 as indicated by arrow 5810 runs along the bottom of the thermal storage medium and then turns upward at the hot end to enter air or fluid entering a heat exchanger or other hardware receiving thermal energy from the thermal energy storage medium. For ease of illustration, the portion or air or fluid flowing through the thermal energy storage assemblage 5812 is not shown in FIG. 58. FIG. 58 also shows the additional cooling channels 5440 that are positioned in a layer below the cooling channels 5820, and may be aligned along an axis non-parallel (optionally substantially orthogonal) to the channels 5820.

It should be understood that there may be one or more rows of inlet air or fluid flow channels and one or more rows of upward-facing outlet openings from the air or fluid channels 5820. Such openings redirect the air or fluid flow in a direction towards a heat exchanger or other apparatus that will receive thermal energy from the thermal storage assemblage. There may also be additional air or fluid flow channels 5440 in other layers of the thermal insulation.

Electrical Layout

Figure 59:
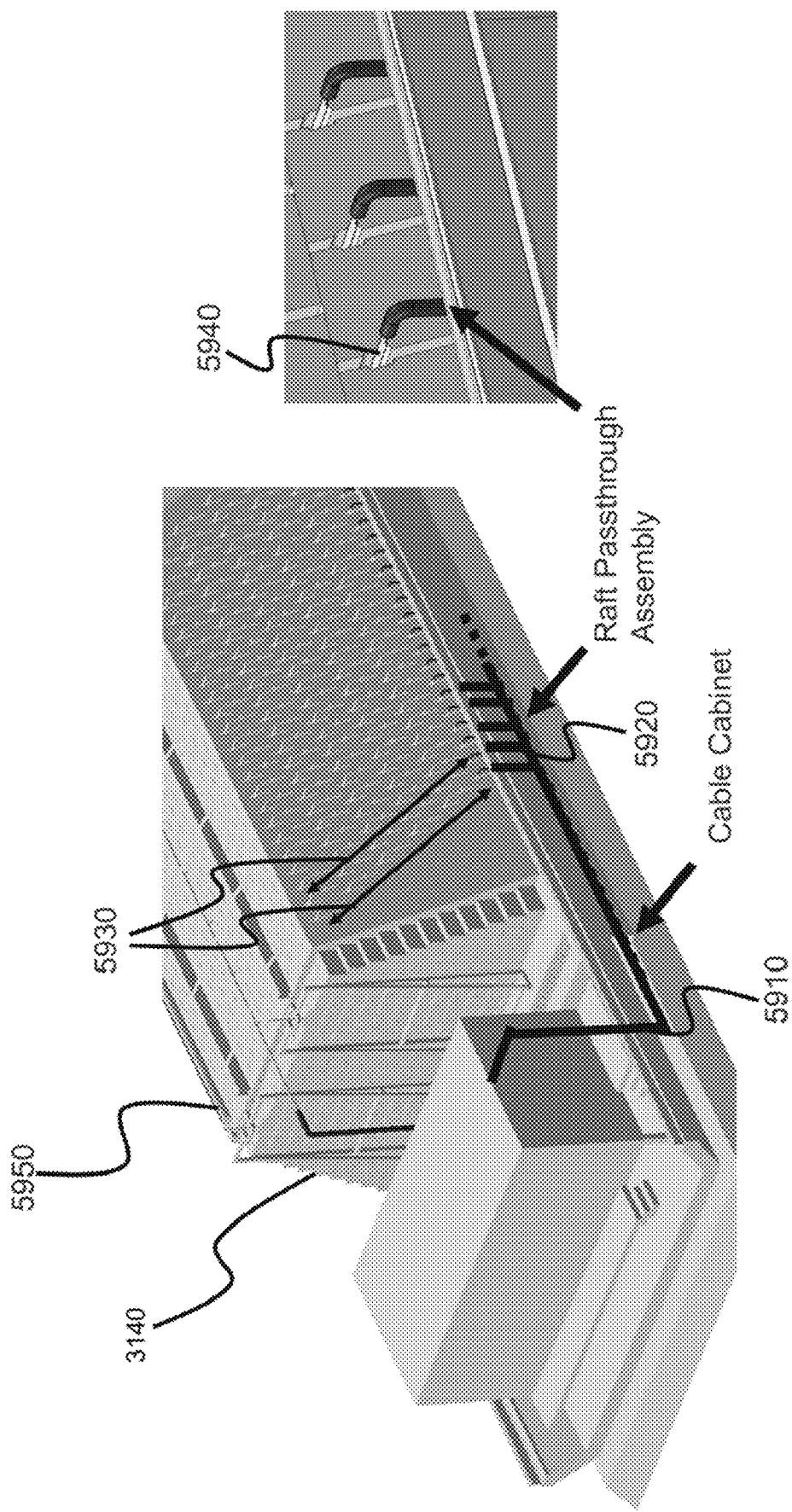
FIG. 59 shows various views of one end of a thermal energy storage system and electrical components according to at least one example implementation.

FIG. 59 shows that the base support such as the raft can support electrical wiring to supply power to the electrical hardware and/or heater elements of the TES system. FIG. 59 is a perspective view of one implementation of electrical cable routing in the TES. Electrical wiring 5910 extends from the electrical hardware and can be routed through one or more passthroughs 5920 in the base support such as the raft to extend outward to connect to heating elements within the thermal energy storage medium. FIG. 59 also illustrates that in one implementation, the heating elements may be wired to extend along an axis that extends upward through the thermal storage medium as indicated by arrow 5930. There may be electrical connectors 5940 that extend outward from the thermal energy storage medium, which allows for coupling to power from electrical hardware located outside the thermal energy storage assemblage. FIG. 59 also shows a quarter turn valve 5950 that functions as a thermal exhaust port between the outer housing and the thermal energy storage assemblage.

Figure 60:
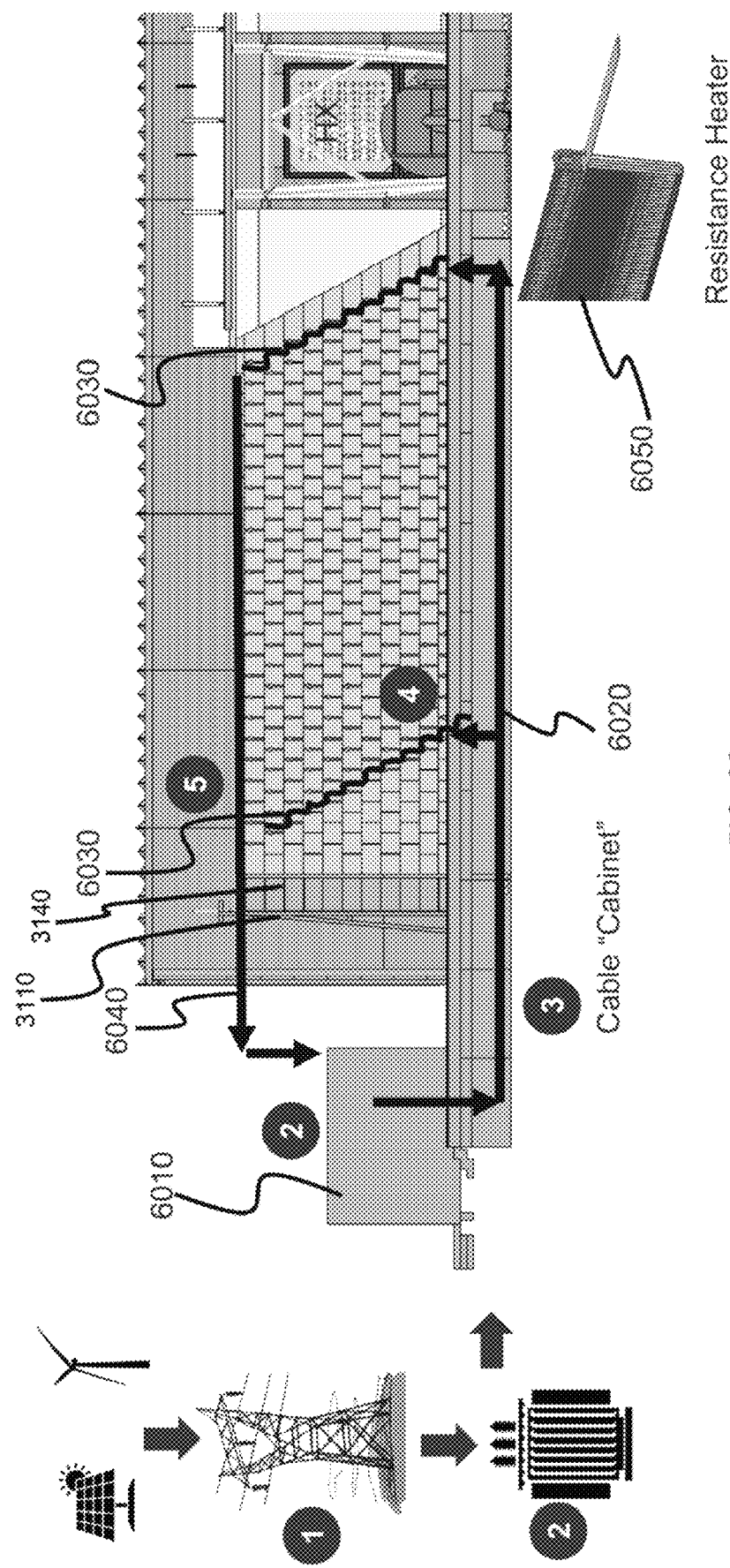
FIG. 60 shows a thermal energy storage system and various electrical components according to at least one example implementation.

FIG. 60 depicts one implementation of an electrical system for use with the TES system. Electrical power from the grid, local power generation, and/or renewable energy source(s) provide electricity to the electrical hardware 6010 of the TES system. A cable cabinet or other pathway(s) 6020 routes electrical wiring under, over, and/or around the thermal energy storage medium. The wiring may extend upward relative to the thermal energy storage medium as indicated by lines 6030. Although only two lines 6030 are shown, it should be understood that there may be wiring corresponding to each "column" (substantially vertical subset) of heating elements in the thermal storage assemblage. Return wiring 6040 then completes the circuit by connecting back to electrical hardware 6010 as appropriate. In one implementation, there may be a heater element such as resistance heater 6050 that is connected to wiring along lines 6030 that then extend into the thermal storage assemblage.

Figure 61:
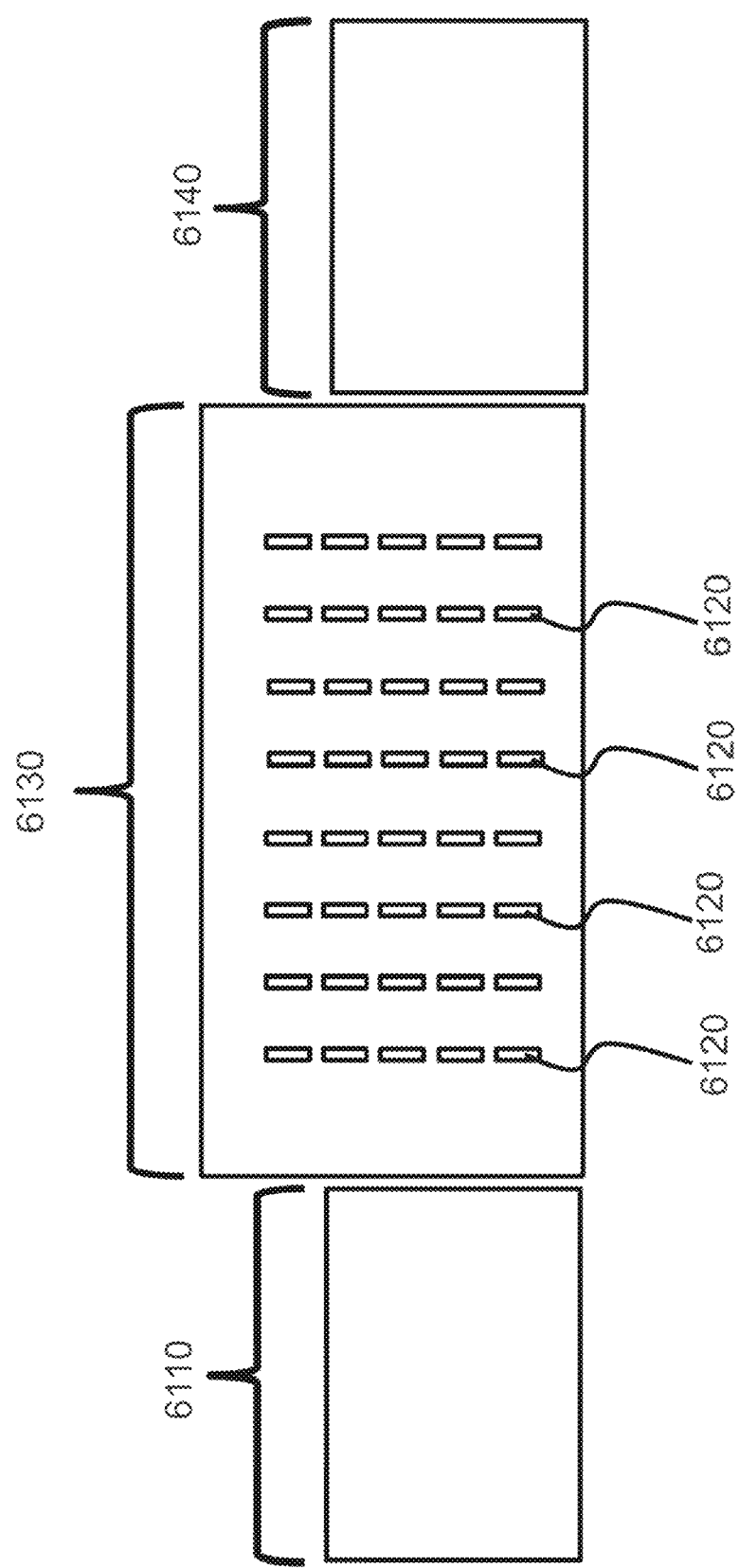
FIG. 61 is a schematic of a thermal energy storage system and various electrical components according to at least one example implementation.

FIG. 61 shows a schematic of various components of one implementation of the electrical layout for the TES system. FIG. 61 shows that the electrical system layout numerous electrical systems, controllers, and subsystems in group 6110. The electrical systems and controllers in group 6110 can control the heaters 6120 of the thermal storage system 6130 which may include an upper plenum, a stack or assemblage of thermal storage blocks, and a base of sleeper blocks supporting those items. Various down-stream systems for using the thermal energy from the thermal storage system 6130 such as a steam generator and related components may be in group 6140.

Base Layer Insulation

Figure 62:
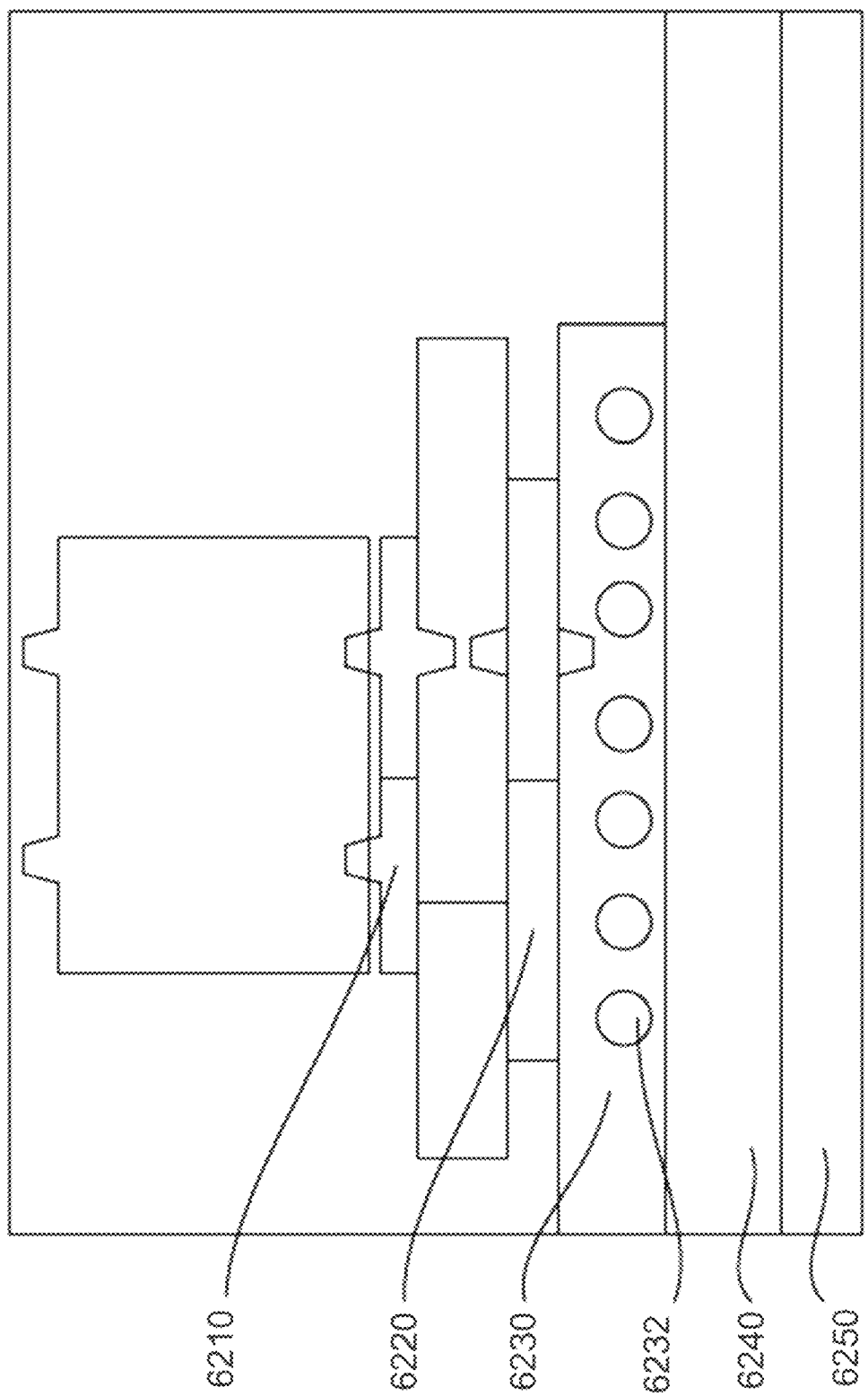
FIG. 62 shows a cross-sectional view of a thermal storage block positioned over a support structure with various insulation or cooling components according to at least one example implementation.

FIG. 62 is a cross-sectional view of one implementation of the insulation stack beneath the thermal energy storage medium. In one implementation, insulation stack comprises at least four layers. Layer 6210 may be tiles that sit directly under the thermal storage blocks and have stabilization features to hold the blocks in place. Tiles of layer 6210 may have a design feature that holds them in place or be mortared to the remainder of the raft. Layer 6220 may include insulating materials that reduce thermal conductivity. Layer 6230 may include a vented slab layer, which allows some bypass air in channel 6232 to cool the floor. In one example, the temperature of air or fluid in the channel 6232 may be in the range of about 150° C. to 200° C. Layer 6240 may be an insulating material, which lowers the temperature to 80° C. or lower at the interface between the layer 6240 and the ground or soil layer 6250. Currently, layer 6240 may include Foamglas® insulation or other cellular glass thermal insulation. The thermal conductivity of layer 6240 may be any of: about 0.1 W/mK or less; about 0.4 W/mK or less; about 0.35 W/mK or less; about 0.3 W/mK or less; about 0.2 W/mK or less; or about 0.15 W/mK or less.

Figure 63:
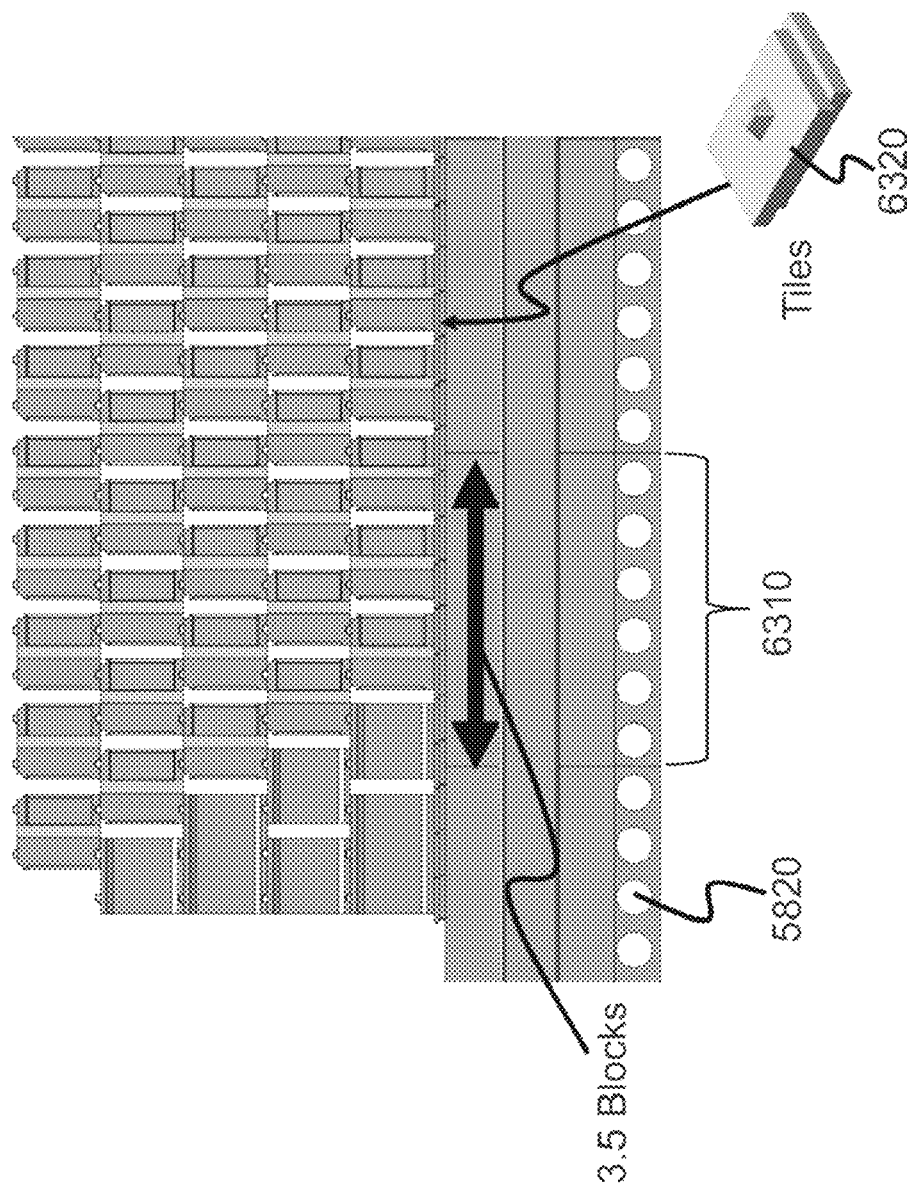
FIG. 63 shows a cross-sectional view of one end of a thermal energy storage assemblage according to at least one example implementation.

FIG. 63 shows a side cross-sectional view of a thermal storage assemblage over a base support. In this embodiment, each platform 6310 of the base support is designed to extend over the width of several (here, about 3.5) thermal storage blocks. Optionally, each platform is designed to support a predetermined number of blocks at the interface where the platform and blocks engage one another. The location of the tiles 6320 below the thermal storage blocks 6330 is configured so that the blocks 6330 can be positioned adjacent one another.

Figure 64:
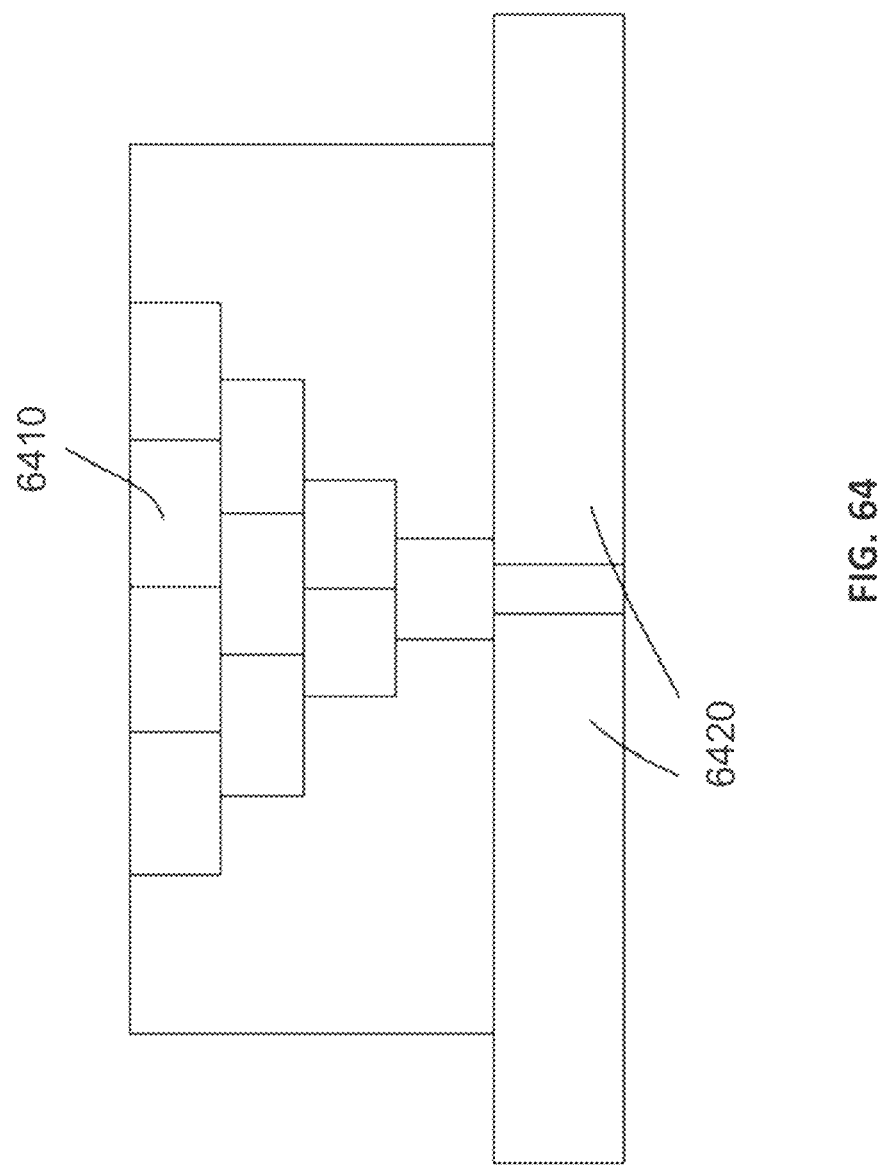
FIG. 64 is a schematic representation of a staggered configuration of thermal storage blocks over an interface of the support structure according to at least one example implementation.

FIG. 64 shows an implementation where the thermal storage blocks 6410 are stacked in a configuration where the seams between blocks 6410 are staggered. The platform-to-platform seam staggering of the thermal storage blocks 6410 can help stabilize the stack over the platforms 6420. Furthermore, for platform integration, platforms 6410 can be laid next to each other and pushed together. Post-tensioning allows all pieces to be collected quickly.

Figure 65:
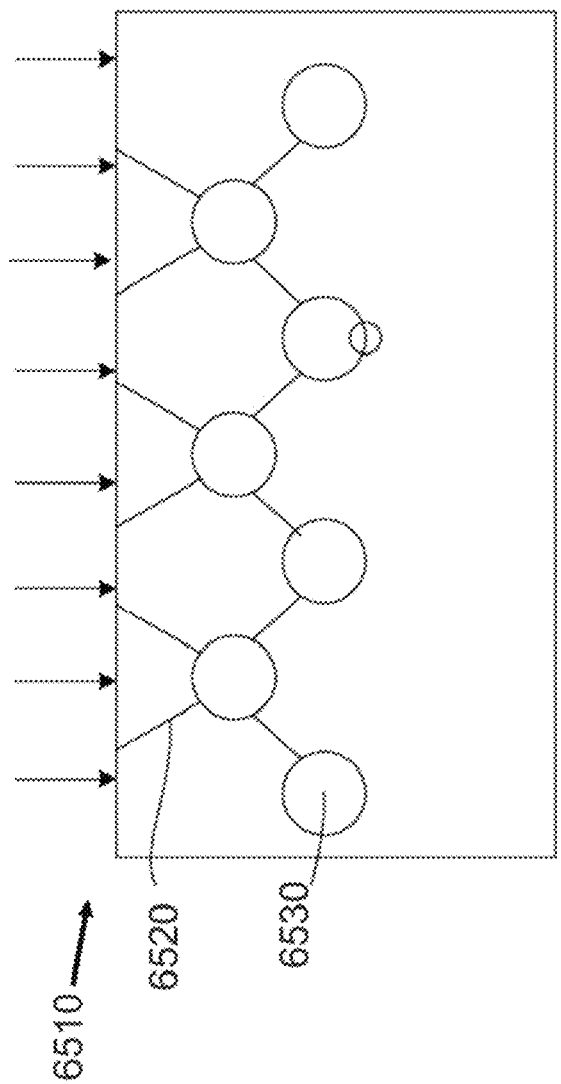
FIG. 65 shows a cross-sectional view of one portion of a support structure with preferential cooling pathways according to at least one example implementation.

FIG. 65 shows is cross-sectional view of an insulation layer 6510 that includes preferential thermal transfer pathways 6520 such as but not limited to a network of metal plates, metal traces, or segments that direct heat along particular thermal pathways to heat sink or cooling areas such as to the air or fluid channels 6530. As an example implementation, if insulation layer 6510 is incorporated into the base support as part of layer 5620, excess heat is channeled more preferentially to areas of the layer 5620, such as the air flow channels, that will then direct that heat outwards and away from the base support. This will minimize heat transfer into the ground layer.

FIG. 66A shows that the sections of the base support may have an offset portion 6620 and an overhang 6610, provided to facilitate placement and interlocking with adjacent sections. This can include implementations to provide overlap and limit or block air flow between platforms of the raft. This may involve staggering layers of the platform to block radiation or a fluid pathway between platform layers. FIG. 66B shows that some implementations may add stiffness by adding lifting bars 6630 that extend through a portion, potentially a substantial portion or the entire length, of the platform. These can have offsets designed therein; the lifting points are optionally positioned at some distance from the assemblage so as not to cause rubbing with the thermal storage blocks.

FIG. 67A shows that there may be multiple rows of channels 6710 in one or more insulation layers. FIG. 67B shows how the channels may have larger openings at the interfaces 6720 between platform sections, to compensate for any misalignment due to manufacturing and/or assembly issues. These implementations may use cooling channels, which may be in the form of single vented slab with multiple layers. There may be "plenums" (enclosed volumes where air or fluid passes and/or is mixed with other air or fluid) at the point of passthrough, to ensure no loss of air or other issues due to misalignment. Some implementations may use a "breathing channel" (air flow passage) through the floor. During discharge, it pull in ambient air. During charge, the channel will expel air (which is at the point essentially at the temperature of the return water); the floor will help extract energy from this flow and further reduce losses.

Figure 68:
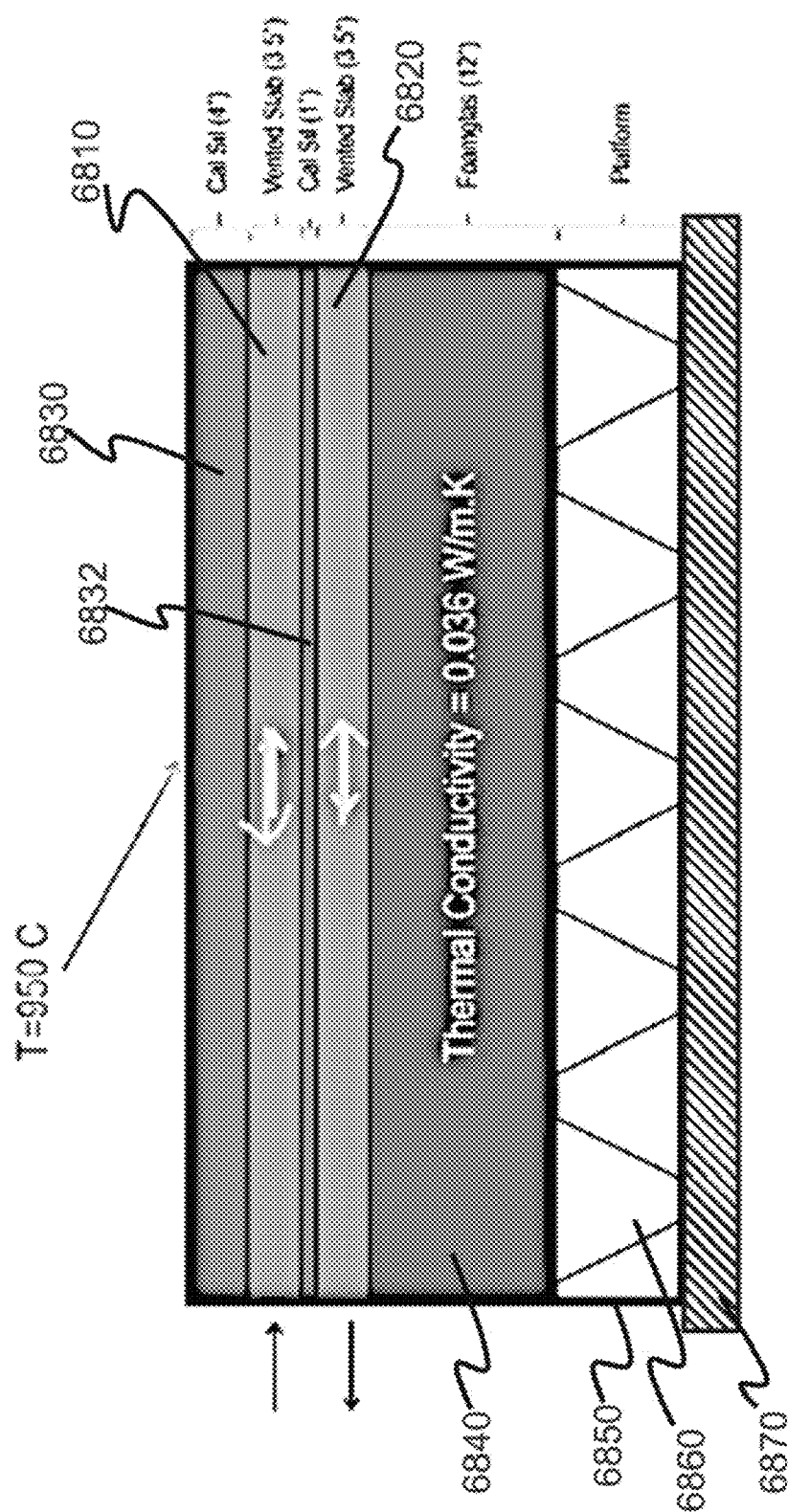
FIG. 68 shows a cross-sectional view of a support structure with multiple air or gas flow channels according to at least one example implementation.

FIG. 68 shows a cross-sectional view where there may be multiple vented layers 6810 and 6820 above or below other insulation layers. In one implementation, the flow in the vented layers 6810 and 6820 may all be in the same direction. Optionally, in some implementations, the flow in the vented layers 6810 and 6820 may be in opposite directions. Specifically, the implementation of FIG. 68 shows that there is a first layer of insulation 6830 such as but not limited to calcium silicate or other suitable insulation, a second layer of insulation 6832 of similar material to the first layer 6830 and positioned adjacent (in this embodiment, below) the vented layer 6810, and a third layer of insulation 6840 adjacent (in this embodiment, positioned below) the vented layer 6820. The third layer 6840 can be made of Foamglas® insulation and/or other cellular glass thermal insulation. Having two active flow channels 6810 and 6820 can ensure that more heat is channeled away from the system before that thermal energy reaches the third layer 6840. The thermal conductivity of the third layer 6840 may be in the range about 0.035 to 0.037 W/mK. Below the third layer 6840 may be a support structure 6850 with air or gas flow channels 6860 therein for additional cooling so that temperatures are low (e.g. in the range about 30 to 40° C.), to reduce thermal energy that reaches a ground layer or soil layer 6870.

Thermal Exhaust Port

Figure 69B:
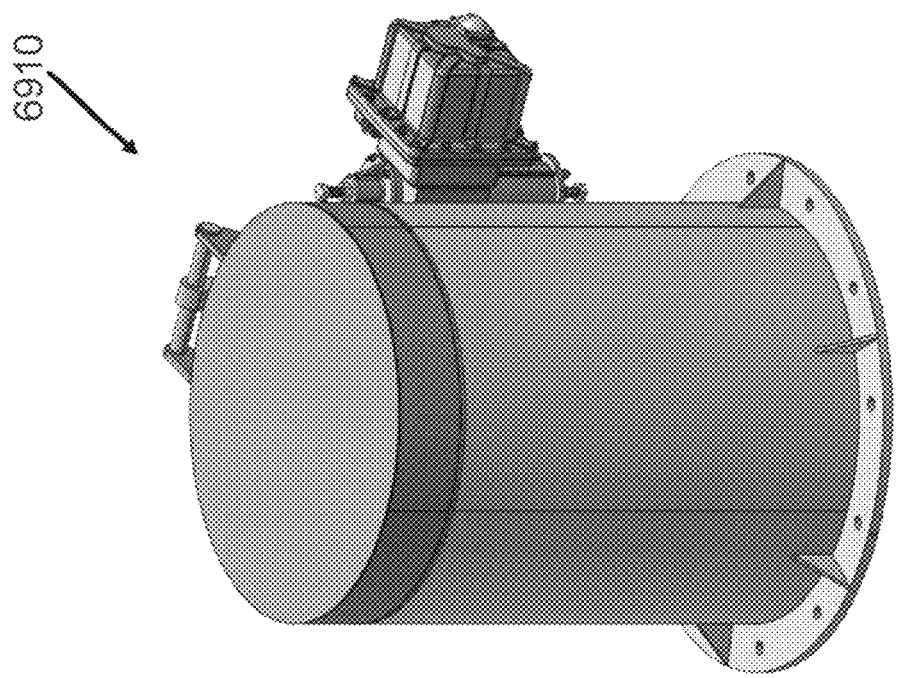
FIGS. 69A to 69B show schematic and perspective views, respectively, of a thermal exhaust port according to at least one example implementation.
Figure 69A:
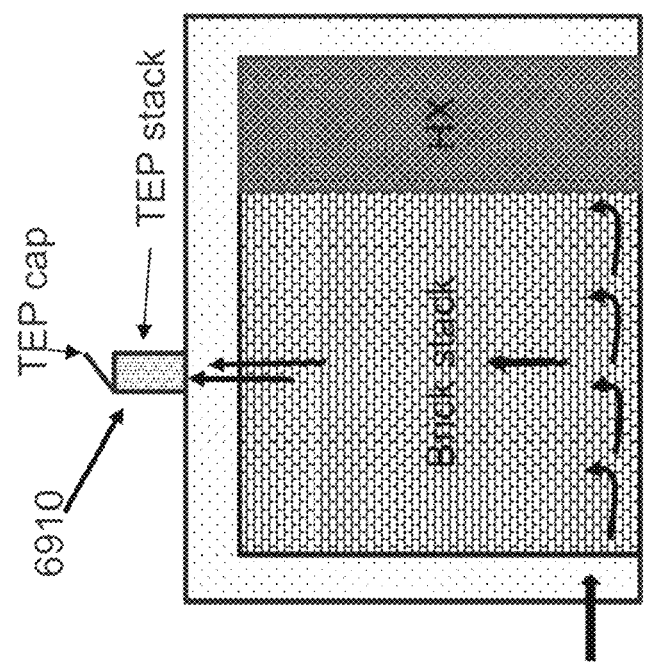

FIG. 69A shows a cross-sectional view of one implementation of a TES system with a thermal exhaust port (TEP) 6910. The TEP 6910 can allow for exhausting of the heated air or fluid in the TES system should a rapid shutdown or cooling be desired for proper system operation. The TEP is optionally configured to automatically open in the event of a power outage, as described for the failsafe venting system described in the above-mentioned U.S. Pat. No. 11,603,776.

FIG. 69B shows an enlarged perspective view of one implementation of the TEP 6910.

Figure 70:
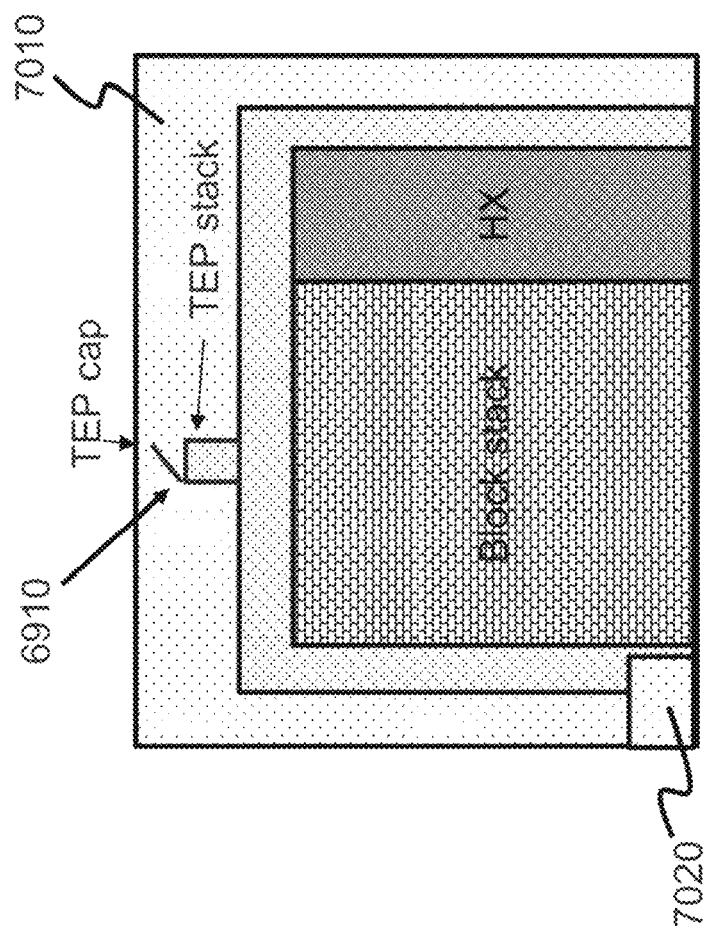
FIG. 70 shows a system where the thermal exhaust port opens to another sealed enclosure according to at least one example implementation.

FIG. 70 shows still further implementation where the TEP 6910 exhausts to another enclosure 7010 that is sealed from the external environment. The enclosure 7010 may have one or more portions along outer wall 7020 that are thermally conductive to release heat from gas or fluid in the enclosure 7010, but still fluidically sealed from the ambient environment. This creates a sealed thermal exchanger with pathways from within thermally insulated area to sealed non-insulated areas with heat dissipation fins or zones. After a desired, predetermined temperature is reached, cooler air or fluid is brought back into the inner enclosure through a pump, valve, or pathway 7020. This allows for lead-lag operation with cool-down in a sealed environment.

The sealed thermal exchanger allows nitrogen, argon, other noble gases, or still other fluids or gases to be used in the TES that would otherwise be cost-prohibitive if released into the ambient environment. Allowing external air to enter the TES may also be undesirable if the TES has a heater or other components that would degrade or malfunction if exposed to ambient air. Optionally, the heater element in the TES may be a graphite heater. Running the system in a sealed environment comprising nitrogen, argon, or other noble gas or inert environment allows for graphite heaters to be used in the TES system, which in turn means storing heat at higher temperatures such as 1300° C. or higher, which in turn results in being able to store 60% more heat in the same size TES, or can store same heat in a much smaller footprint TES running at higher temperatures. Although only one TEP is shown, it should be understood that multiple TEP units may be used to provide the desired cooling of the TES system. Of course, other types of valves or ports could be used as TEP 6910 such as but not limited to a quarter-turn valve or other suitable valve.

The raft or base support structure may have features that will integrate and be part of the "bottle-up" protection system when there is little to no flow through the thermal storage assemblage. In one implementation, there will be air passages that connect with the outer-structure air passages (the cavity within the sheet metal panels and mineral wool insulation layer) to the opposite side of the raft, venting to the larger space within TES system. Adjacent air passages in this bottle-up protection feature will have air flow in the opposite direction—in other words, the next section of air passage or cavity in the outer structure. This will create balance in the air flow.

In one implementation, recharging of the TES system after a shutdown or bottle-up can be performed using a control scheme with a horizontal segmentation of the power input. This is desired for the graphite elements in each circuit, because the resistance of the graphite is greater than for some metallic heater elements. In one example, an eleven-element series loop of seven parallel wires used for the metal element becomes five sets of parallel graphite loops of two or three elements in series. Each parallel loop has the same resistance. In more detail, each of 24 thyristors is followed by at least three switches, each on a parallel circuit of two or three elements in series controlling the top seven elements. The bottom four elements are directly connected as two circuits of two elements in series without any switches. All five circuits have the substantially same resistance. Restart with a deteriorated thermocline is with the top three circuits switched off. Optionally, other implementations may use other numbers of circuits switched off. When the bottom circuits achieve the same temperature as the middle circuit, it also is activated and likewise for the top two circuits to bring all the blocks to the same temperature when charged.

Again, if the thermocline has degraded, the bottom loops are powered more than the top loops and each inclined row of blocks becomes the same temperature when the charging is complete. In this example, there is no need to waste energy to prepare to restart charging. This combination of the thermal vapor lock and the use of parallel elements with horizontal heating controls eliminates the need for any cool down of the stack and the boiler's need for either the emergency stack or the roof cooling.

The thermal vapor lock eliminates emergency heat dump and energy waste to protect the boiler. If the parasitic loss increase is too great to be acceptable with this thermal vapor lock, a damper may be installed on the discharge of the fan that locks the plenum in; this, with the "bottle up" of the cool end of the block stack; and the building cooling by the active insulation effect, no emergency stack used. Optionally, a standby, much lower capacity, feed water pump may be used to keep the boiler idling.

Heating Element Wiring Configuration

Figure 71:
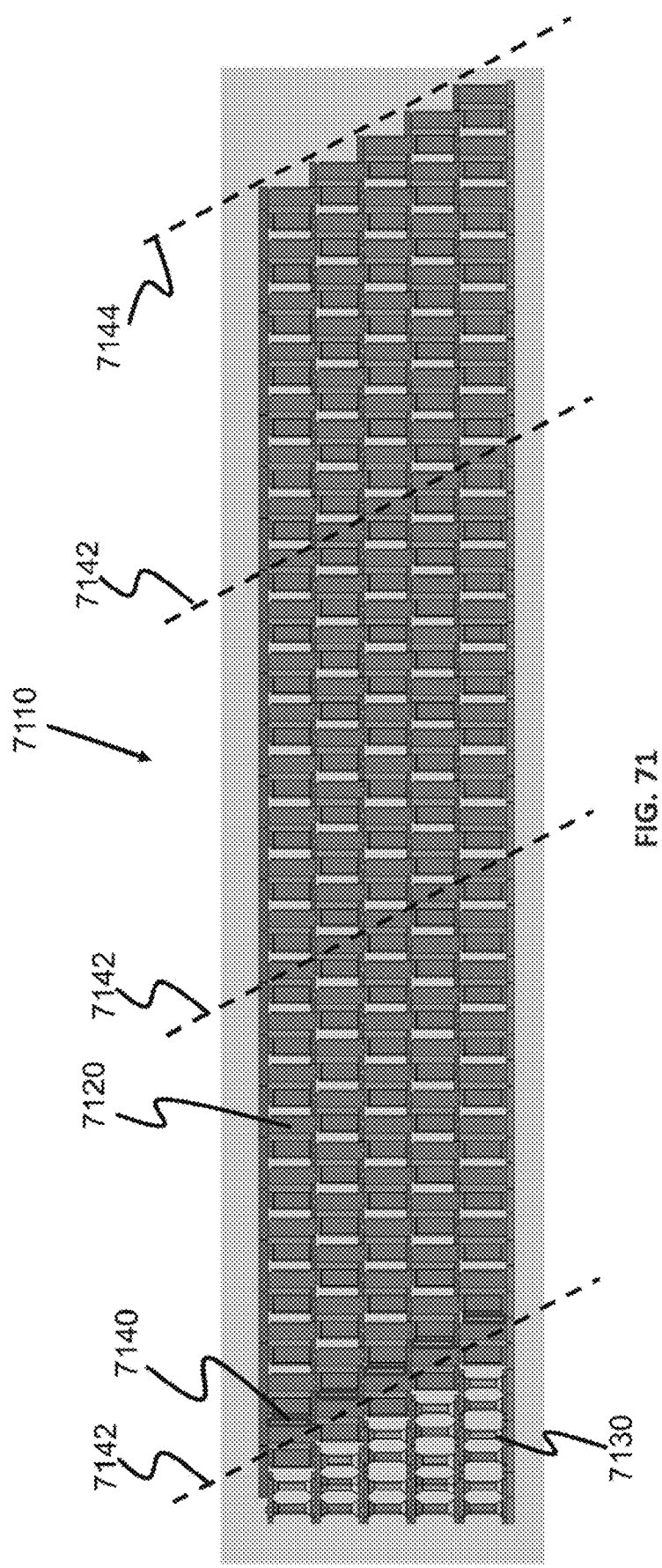
FIGS. 71 and 72 show side views of thermal energy storage assemblages according to at least some example implementations.

FIG. 71 shows a side cross-sectional view of a thermal storage assemblage 7110 that includes multiple thermal energy storage blocks 7120 and multiple support blocks 7130 that are not adjacent to heating elements 7140. The heating elements 7140 are aligned to be activated in an orientation substantially consistent with dotted line 7142 (only one set of heater elements 7140 is shown, for case of illustration; it should be understood that all gaps or receiving channels between thermal storage blocks 7120 could be filled with a heating element 7140). The dotted line 7142 is aligned to be substantially parallel to the fluid isotherm for a desired substantially horizontal thermocline in the thermal storage medium. By having the heating elements 7140 aligned parallel with the fluid isotherm which is at an angle (either a nonparallel angle such as shown in FIG. 71 or optionally a substantially orthogonal angle) of the thermocline, the system can avoid imbalances that could create issues with heater element activation in the storage medium, such as some heater elements overheating due to one portion of heating elements along line 7142 being too hot relative to other heating elements along the same line. As seen in FIG. 71, the line 7142 of the heater elements can be substantially parallel to the line 7144 that aligns with the outlet face of the thermal storage assemblage; this is the case no matter what angle the outlet face lies at, including a substantially right angle relative to a longitudinal dimension of the thermal storage assemblage (which is substantially parallel to the thermocline). Thus, in this implementation, the angle of the isotherm of the thermocline matches the orientation of the heater elements.

Figure 72:
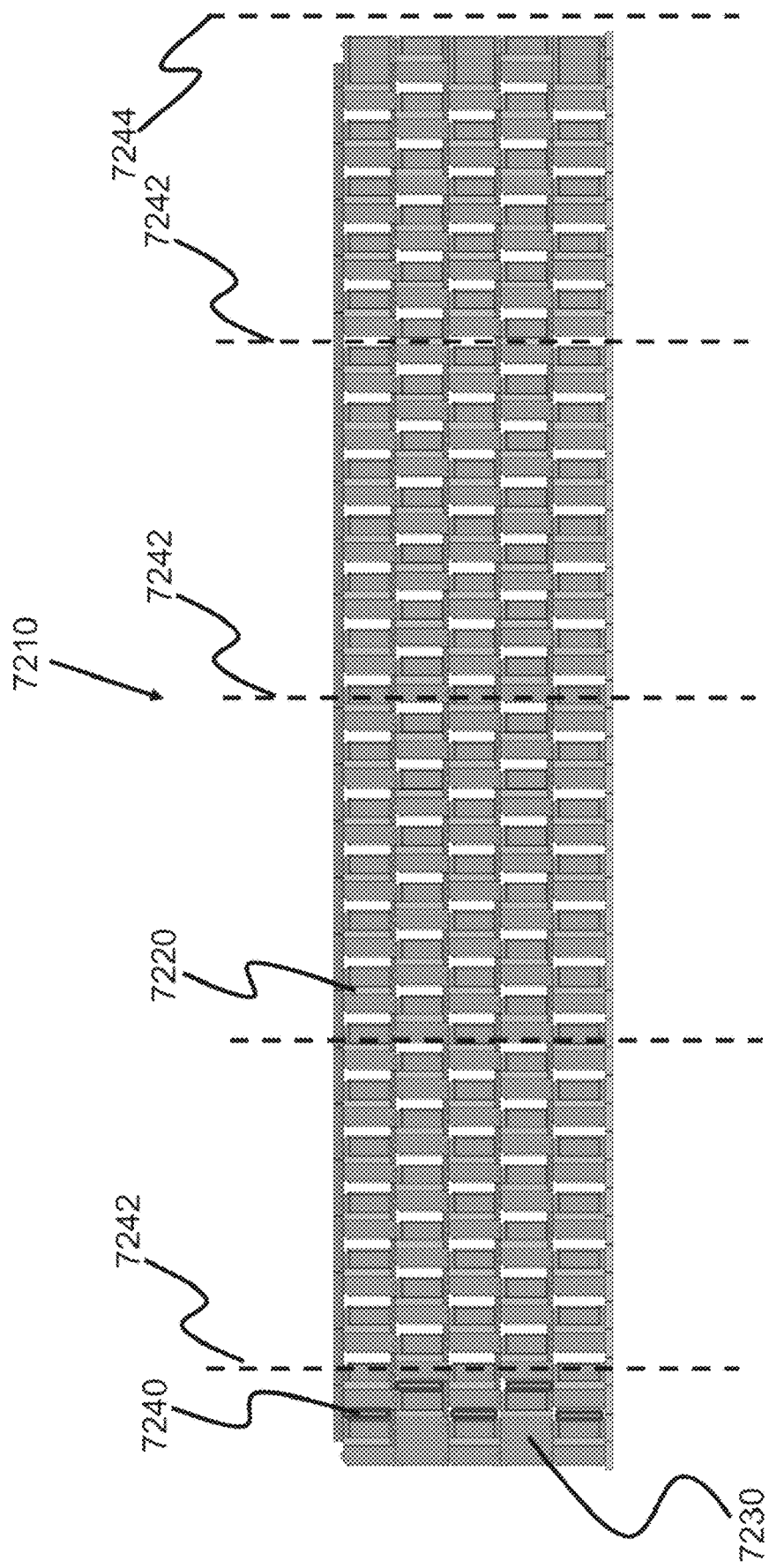

FIG. 72 shows another implementation of a thermal storage assemblage 7210 that includes multiple thermal energy storage blocks 7220 and multiple extended blocks 7230 that are not adjacent to heating elements 7240. The extended blocks 7230 are of longer length than blocks 7220 so as to create a squared-off surface for end of the assemblage of blocks. Without the extended blocks 7230, the ends of the thermal storage medium may have a jagged contour due to the alternating stacking of thermal storage blocks.

In this implementation, the heating elements 7240 are wired to be in an overall vertical configuration as indicated by dotted line 7242, even with the alternating zig-zag pattern of the heating elements 7240. In this manner, the angle of the isotherm of the thermocline throughout at least a majority of the thermal storage medium matches the orientation of the heater phases. As seen in FIG. 72, the line 7242 of the heater elements can be parallel to the line 7244 that aligns with the outlet face of the thermal storage medium.

The resistive heaters may be controlled such that the stacks are heated in a selective manner. For instance, when the system is not being charged for some time, a vertical thermocline may develop (e.g. due to buoyancy of hot air being discharged from the exit end of the assemblage, which rises and heats the higher portions; this can happen even if horizontal flow channels are fluidically scaled off from one another). In this case, the lower portions of the stack may be selectively heated if the lower portions are not yet at a desired temperature, i.e. there is not a fluid vertical isotherm. Other selective heating modes may be used; for example, if the assemblage is at a substantially uniform temperature (e.g. starting from a cold state), forward portions of the assemblage (closer to the discharge exit) may be preferentially heated to higher temperatures then more rearward portions, in a graduated fashion to generate a thermocline from the fluid entrance end to the discharge end. This "primes" the thermocline. As air or other fluid is passed through the assemblage, the desired horizontal thermocline will be created (if starting from a cold state) or, if primed by differential heating, reinforced and increased. Thus, the controllers may control the different portions of the stacks separately. This can be accomplished by providing different amounts of total power to the different heaters in a given time, e.g. by turning the heaters in different locations on and off for different durations to generate the differential heating. The controller may set the power, temperature and the timing of the heating for the layers of the stack based on sensor feedback, measurements of resultant steam generated, and/or other empirical measurements, and/or based on system simulations.

Fault Tolerant Heating Element

Figure 73:
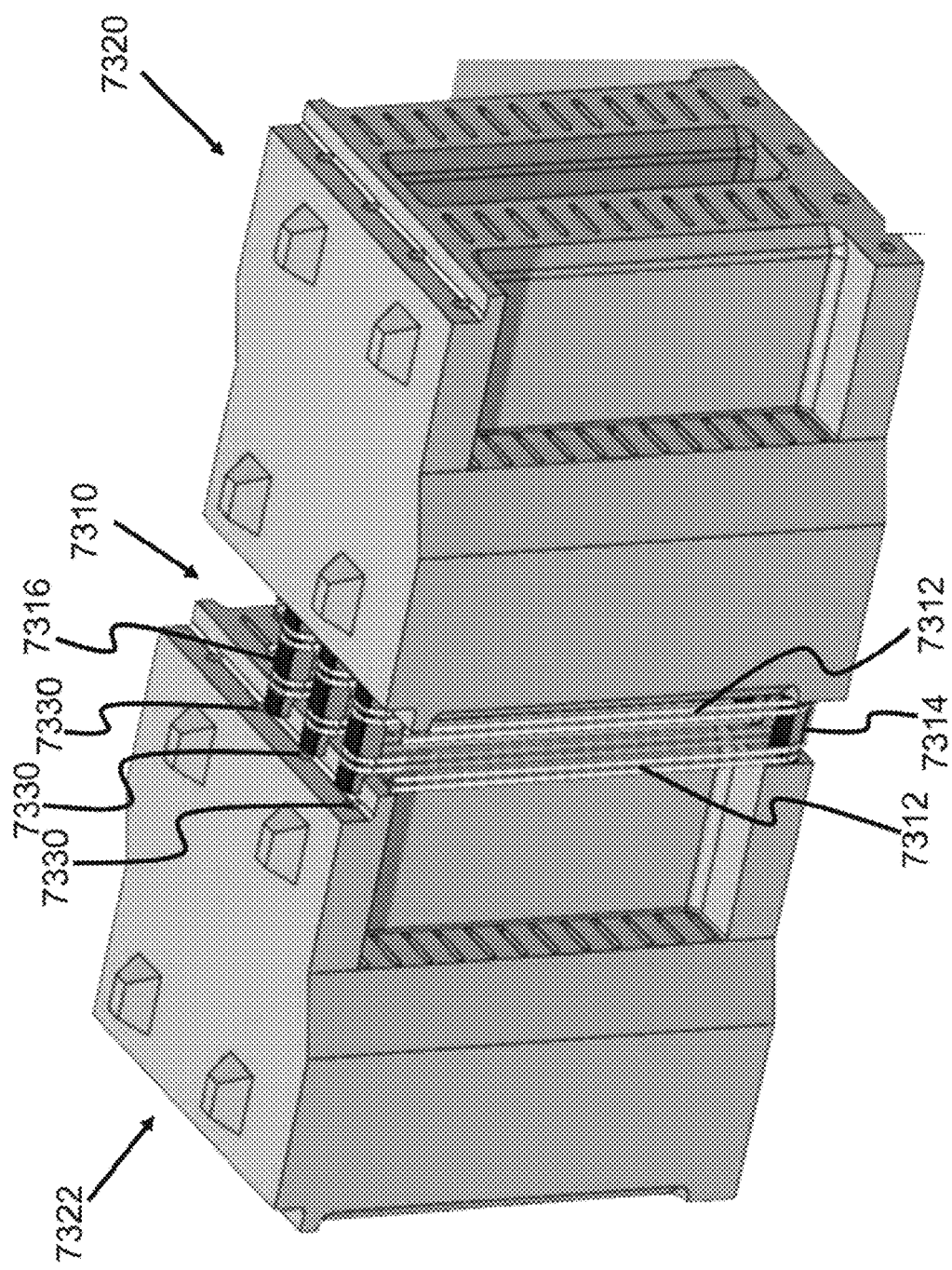
FIG. 73 shows a perspective view of portions of a thermal energy assemblage according to at least one example implementation.

FIG. 73 shows one implementation of a heating element 7310 positioned between two or more thermal storage blocks 7320 and 7322. The heating element 7310 includes one or more heater wires 7312 and one or more wire supports 7314 and 7316. In one implementation, one of the wire supports 7314 supports multiple heater wires 7312. It should be understood that in some implementations, the heater wires 7312 can loop over the one or more supports 7314 in a repeating or wave-like manner. The one or more wire supports 7314 can be positioned so as to not block the air or gas flow openings 7330 in the thermal storage blocks 7320. FIG. 73 shows only a portion of the heating element 7310. For case of illustration, not all of the wire supports 7314 and heater wires 7312 are shown. It should be understood that the heating element 7310 can be configured to extend across the entire space between the blocks 7320 and 7322, repeating the pattern of heater wires 7312 and wire supports 7314 and 7316 in the manner shown in FIG. 73.

In one non-limiting example, the one or more heater wires 7312 maybe made of a material that is electrically resistive to produce heat. Optionally, some implementations may use a material such as graphite that can also produce heat when electricity is channeled through that material. Of course, other suitable materials that can produce thermal energy when electricity is channeled through the material may be used. Still further, other types of material that generate heat or provide thermal energy without the use of electricity may be used. For example, some implementations may use conduits carrying molten salt, hot steam, or other high temperature material in the space between the thermal blocks 7320.

Figure 74:
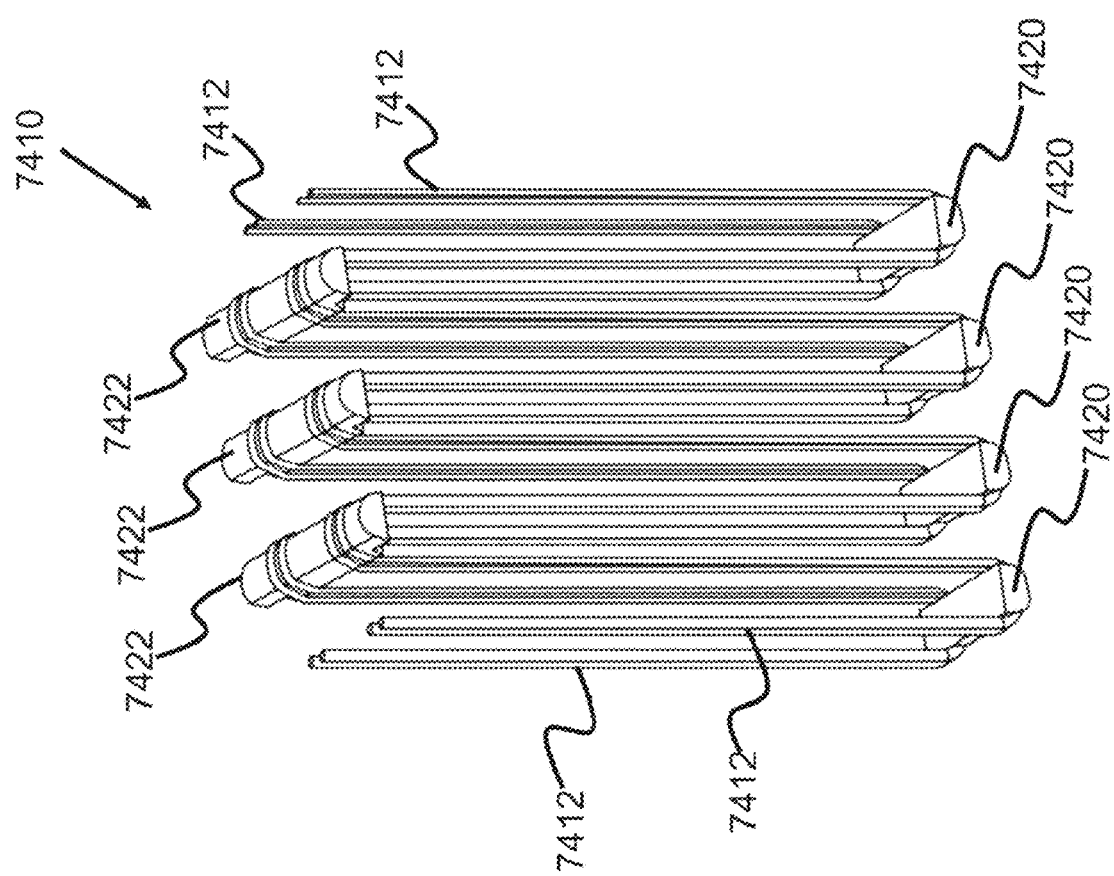
FIG. 74 one configuration of heater elements supported by support structures according to at least one example implementation.

FIG. 74 shows an implementation of a heater element 7410 to increase the fault tolerance of the heater element. In this example, all four wires 7412 each carry one quarter of the full circuit. If there is break, a gouge, or other fault in one of the four wires 7412, then the remaining wires 7412 will carry the full load, increasing the temperature in each wire and shortening the lifespan in those wires. The hotter wires may also start to overheat the thermal storage blocks 7320 around the wires, which could create undesirable hot spots in the thermal energy storage system.

In this implementation, a bottom heater element support 7420 may be made of a conductive metal or other material, such as a conductive ceramic. Optionally, the support 7420 may be made of a ceramic material (whether or not conductive) with a metal bus bar or connector that electrically connects all of the heater wires 7412 together. In this manner, the bottom metal heater element support 7420 rebalances the voltage potential of all four wires if there is fault in one or more of the heater wires 7412. This localizes the fault to the section of heater wire where the fault occurred and minimizes the distance to the nearest metal bottom heater element support 7420. Optionally, only some but not all bottom wire supports 7420 are electrically conductive or carry conductive bars or other connections. All or some portion of these electrically conductive bottom wire supports 7420 may be stamped, forged, or otherwise formed from an electrically conductive material such as but not limited to high temperature steel, iron alloy, FeCrAl, or other suitable electrically conductive material. Optionally, one or more of the top heater wire supports 7422 may also include a portion of metal or other conductive material as described above for accommodating any fault in the heater wires. Thus, in at least some implementations, instead of only single circuits, the heating element 7410 can be configured with parallel circuits in at least some portions of the heater element, creating redundancies to automatically electrically circumvent any defects in a heater wire that might otherwise cause undesired overheating in one or more parts of the thermal energy storage system.

Figure 75B:
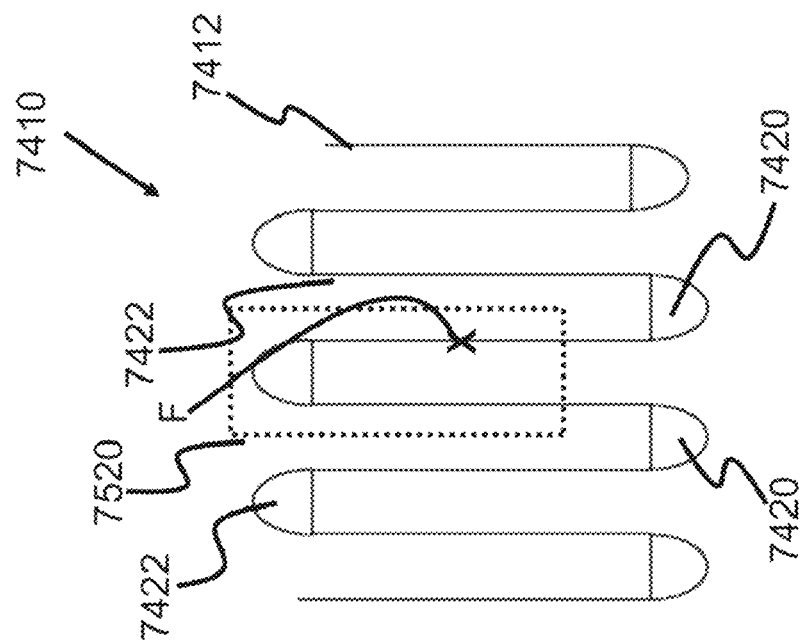
FIGS. 75A to 75B show end and side schematic views of heater elements with fault tolerance according to at least one example implementation.
Figure 75A:
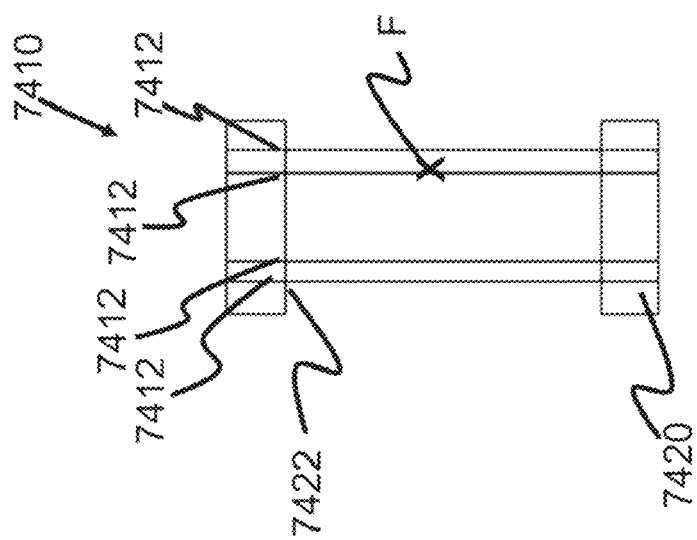

As seen in FIGS. 75A and 75B, in this manner, a fault F in any one of the heater elements 7410 does not disable the entire length of the heater element, since the heater element support 7420 with electrical conductivity provides one or more electrical pathways for rebalancing the voltage potential. FIG. 75A shows an end view of the heating element 7410, while FIG. 75B shows a side view of same heating element 7410. The fault F in this configuration will be limited to impacting the heater wires 7412 in the area noted by dashed-line box 7520 in FIG. 75B. The electrically conductive wire supports 7420 will provide parallel pathways around the fault F, rebalancing the voltage potential. This minimizes that amount of overheat that may result from three heater wires handling the electrical load instead of four heater wires, which may result in more heat in those heaters wires as they are carrying more electrical load than if all four wires were fully functioning and the electrical load is spread across all four wires. Without the redundancy provided via the electrically conductive wire support 7420, the area impacted by excessive heating related to carrying the load on three heater wires versus four heater wires would be a much larger area that that shown by dashed-line box 7520.

Figure 76:
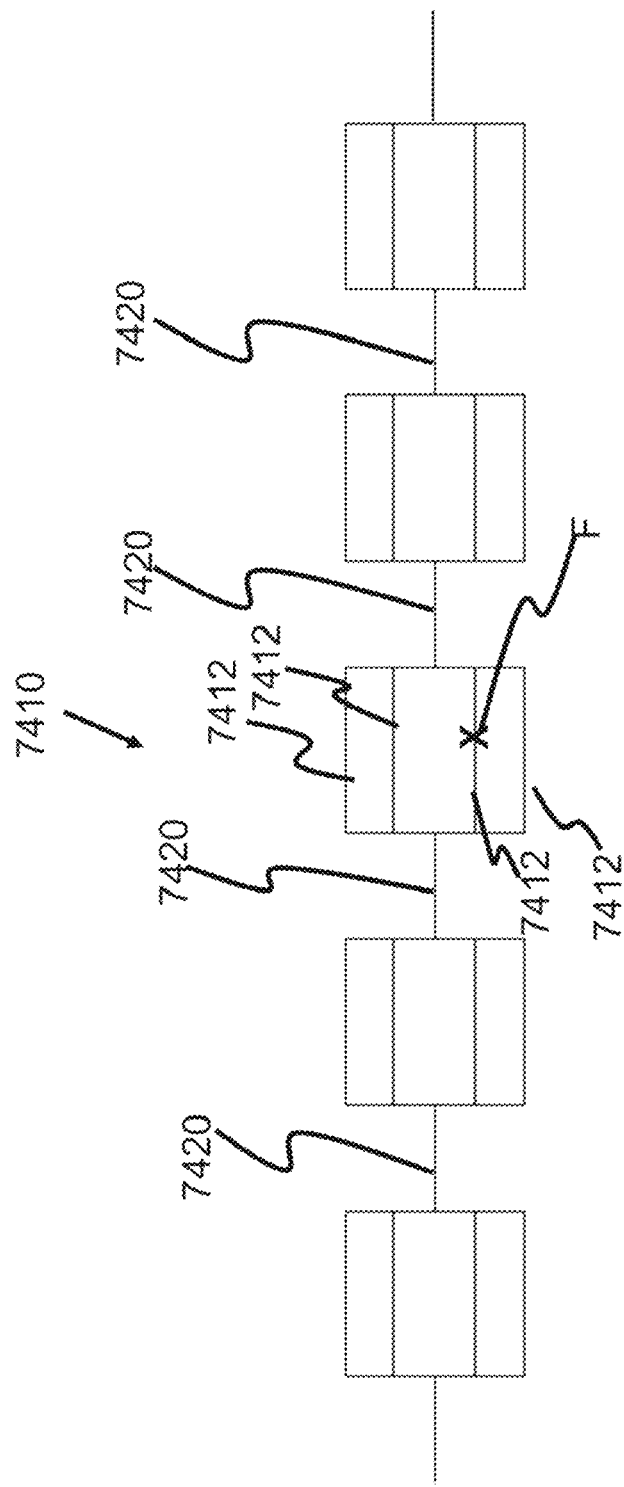
FIG. 76 is top-down schematic view of heater elements with fault tolerance according to at least one example implementation.

FIG. 76 is a top-down, schematic view of the heating elements 7410 and shows a configuration for directing electrical flow around any fault F in one or more heater wires 7412 through connection in the electrically conductive wire support 7420. Specifically, FIG. 76 shows how an electrically parallel configuration provided by the electrically conductive wire supports 7420 allows for rebalancing of the voltage potential around any fault F that may occur in the heater wires 7412. Having the ability to operate the thermal storage system even when there may be gouges or faults in the heater wires 7412 allows for greater periods of time between maintenance of the system, and allows for the system to operate in a functional manner prior to taking the system off-line for repairs.

Thermal Storage Blocks

Referring now to FIGS. 77 to 98, aspects of the example implementations relate to thermal energy storage blocks and associated support blocks and support slabs for use in thermal energy storage systems for various industrial applications.

The structure and shape of the thermal storage blocks is configured for repeated heating and cooling, for the purpose of storing energy. When implemented in a thermal energy storage system, energy input is provided in the form of electrical energy, which heats wires, filaments, rods, other solid conductive materials, or other types of materials to emit radiant thermal energy. The energy output is in the form of heat delivered to a circulating gas or to a conduit carrying a gas or fluid introduced at one portion of a structure incorporating the blocks, and which leaves another portion of the structure at a higher temperature.

The blocks may be in the form of one or more cast, pressed or extruded shapes, and arranged so as to have an alternating sequence along both vertical and horizontal axes. The structure includes a plurality of open radiation cavities (also referred to as radiation chambers) and blocks, with the blocks including air passages having at least one dimension which is much smaller than the other two dimensions. The passages are open to the radiation chambers and are internally exposed to a radiating surface heated by electrical resistance. In the chambers, heat is transferred by thermal radiation from relatively hotter surfaces to relatively cooler surfaces according to the Stefan-Boltzmann law, according to which the total energy radiated per unit surface area of a black body per unit time (the radiant exitance) is proportional to the fourth power of the body's temperature. Thus, heating (i.e. charging) the thermal energy storage system by radiation is rapid and efficient. This is described in detail in the above-mentioned U.S. Pat. No. 11,603,776.

Figure 77:
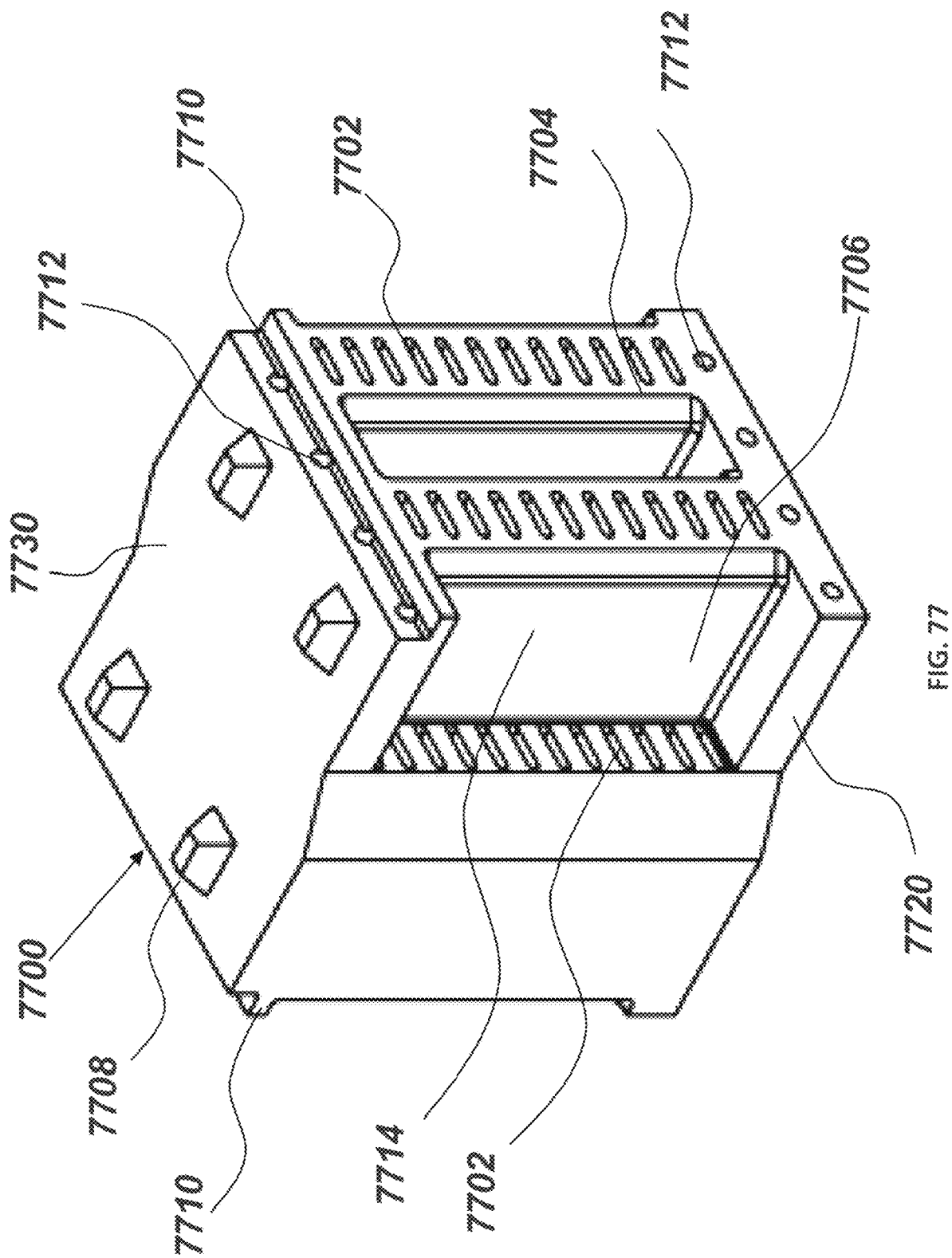
FIG. 77 illustrates a schematic perspective view of a thermal energy storage block according to the example implementations.

FIG. 77 shows a schematic perspective view of a thermal energy storage block 7700 according to one implementation. The block 7700 is formed of a thermal storage material, which may be concrete and/or other refractory materials.

The block 7700 includes fluid flow slots 7702, or channels, provided a first direction (horizontally) through a portion of the block. The plurality of the fluid flow slots 7702 may be shaped so as to be wider than they are tall and may have a substantially constant cross section along their length. The fluid flow slots permit the passage of a fluid therethrough, such as air, nitrogen, argon, carbon dioxide ($CO_2$), steam, process gas, inert gas, hydrogen, or other fluids.

Additionally provided are thermal radiation cavities 7704 formed in the block, defining a space into which thermal energy may radiate onto exposed surfaces of the block, from adjacent electrical heaters, to transfer thermal energy thereto. The thermal radiation cavities 7704 each extend from the lower solid base portion 7720 of the block to the upper solid platform portion 7730, in a second direction perpendicular to the first direction. By virtue of extending into the block, the thermal radiation cavities provide a large surface area onto which thermal energy may radiate from adjacent heater elements (not shown), to transfer thermal energy to the material of the thermal energy storage block with high efficiency.

Thermal radiation cavities 7704 are provided in opposing faces of the block, in a staggered, or offset, configuration, with their openings provided on the two opposing faces. Consequently, a face of the block into which fluid flows into or out of is defined by an alternating arrangement of fluid flow slots 7702 and thermal radiation cavities 7704.

A partial thermal radiation cavity 7706 is also formed by a recessed side wall 7714 of the block 7700. The partial thermal radiation cavity 7706 becomes a full radiation cavity when the block 7700 is placed adjacent to another of the blocks 7700. In particular, the side wall of an adjacent block 7700 forms the remaining wall to make the partial radiation cavity a full radiation cavity.

A set of fluid flow slots 7702 extends from, and is in fluid communication with, each of the thermal radiation cavities 7704, including the partial thermal radiation cavity 7706. Consequently, the set of fluid flow slots and the respective thermal radiation cavity together define fluid flow pathways through the energy storage block. Such pathways are generally in the first direction (horizontal).

The block 7700 includes one or more integrated ledges 7710. The ledges 7710 can be used to support heater elements in a gap between rows of thermal storage blocks 7700, in proximity to the thermal radiation cavities, as discussed in further detail below.

The block 7700 also includes apertures 7712 through the upper solid platform portion 7730 and through the lower solid base portion 7720 of the block 7700. These apertures 7712 may be the same or different sizes and/or shapes relative to the other fluid flow slots 7702 in the thermal energy storage block 7700. The differently sized openings are selected such that overall, the flow rates are substantially the same between different pathways. The apertures 7712 can also be sized to be smaller to avoid passage of air through any features such as recesses in the block that would interfere with fluid flow. The apertures 7712 allow for excess heat in an otherwise solid section of the storage block to be dissipated to reduce structural stress that might occur if that solid section were to retain too much heat, relative to the rest of the thermal storage block. The apertures may extend through the entirety of the block, thereby defining a fluid flow pathway through the block, from one side of the storage block to another side of the storage block. In an alternative implementation, the upper solid platform portion 7730 and through the lower solid base portion 7720 of the block 7700 are closed, without apertures or pathways through them, for increased structural strength.

Figure 78:
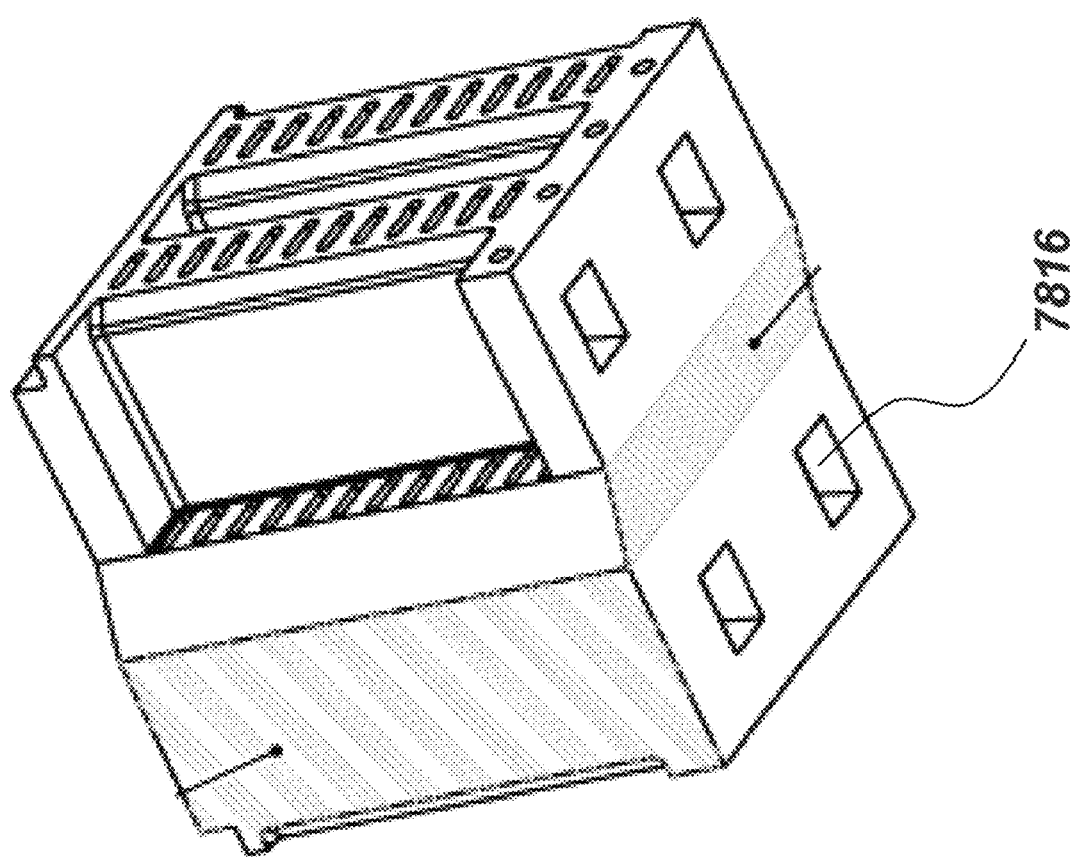
FIG. 78 illustrates a perspective view of the underside of the thermal energy storage block according to the example implementations.

FIG. 77 also shows interlock features 7708 provided on the upper surface of the upper solid platform portion 7730 of the block 7700. As shown in FIG. 78, corresponding interlock features 7816 are provided on the underside of the lower solid base portion of the block 7700, and which are configured, or shaped, to be engaged by the interlock features 7708 provided on the upper surface of the block 7700. Consequently, the blocks may be stacked, with the interlock features 7708 on the upper surface of one block engaging a corresponding interlock feature 7816 on the underside of a block above. The interlock features resist side-to-side movement and can also maintain alignment when there is vertical movement.

The interlock features may be in the form of protrusions (or lugs) 7708 and recesses 7816. As shown in FIGS. 77 and 78, the interlock features are arranged in a regular pattern, such as in a square or rectangular arrangement on each surface. The spacing between the interlock features is provided so as to permit a staggered and overlapping stacking arrangement (as discussed further below).

Figure 79:
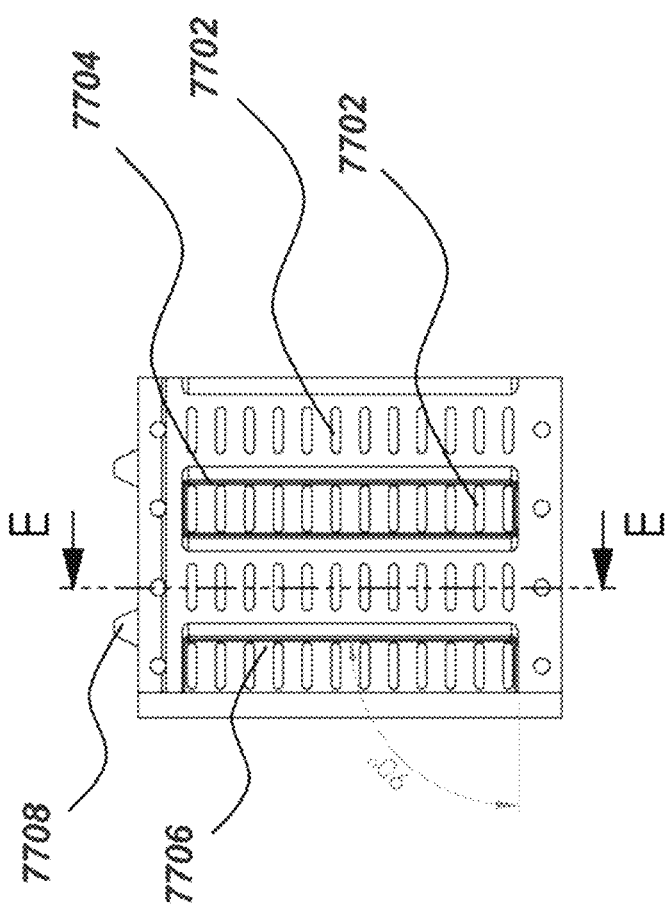
FIG. 79 illustrates a front view of the thermal energy storage block according to the example implementations.

FIG. 79 depicts a front view of the thermal energy storage block 7700. As explained above, this face of the block, which fluid flows into or out of, has by an alternating arrangement of columns of fluid flow slots 7702 and thermal radiation cavities 7704. As shown, there are also fluid flow slots 7702 extending from the far end of the radiation cavity 7704, from within the block 7700 to the opposing face of the block 7700. Consequently, the opposing face of the block to that depicted in FIG. 79 has essentially the same appearance as the face that is shown.

Figure 80:
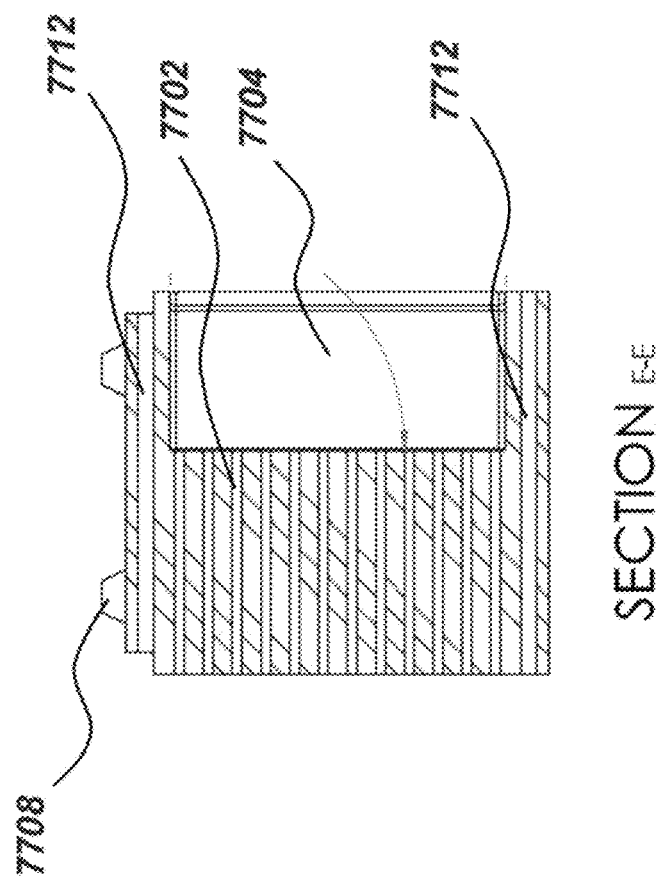
FIG. 80 illustrates a cross-sectional side view of the thermal energy storage block according to the example implementations.

FIG. 80 shows a cross-sectional view of the block along section E-E as shown in FIG. 79. As shown in FIG. 80, the fluid flow slots 7702 extend from, and are in fluid communication with, the respective thermal radiation cavities 7704. The apertures 7712 also extend through the entire depth of the block, thereby defining a further fluid flow pathway through the block.

FIG. 81 depicts a top view of the block 7700. As viewed from above, the block 7700 has an asymmetric shape relative to a longitudinal axis shown by dotted line 8110. The block 7700 has two sides with straight edges 8130, 8132, and two shaped edges 8120 8122 having a shape such as, but not limited to, a wave-shaped profile or a zig-zag profile. In other words, the edges 8120 and 8122 may have a cutaway portion in diagonally opposite regions.

Figure 82A:
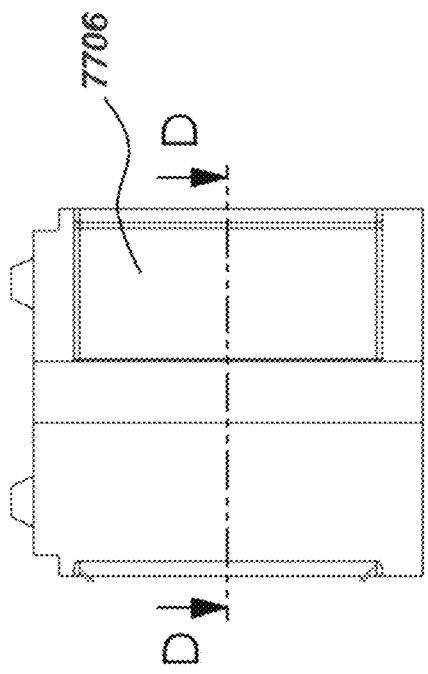
FIG. 82A illustrates a side view of the thermal energy storage block according to the example implementations.

FIG. 82A shows a side view of the block 7700, corresponding to the block 7700 as depicted in FIG. 79 rotated by 90 degrees about a central vertical axis. The partial thermal radiation cavity 7706 at one side of the block is shown.

Figure 82B:
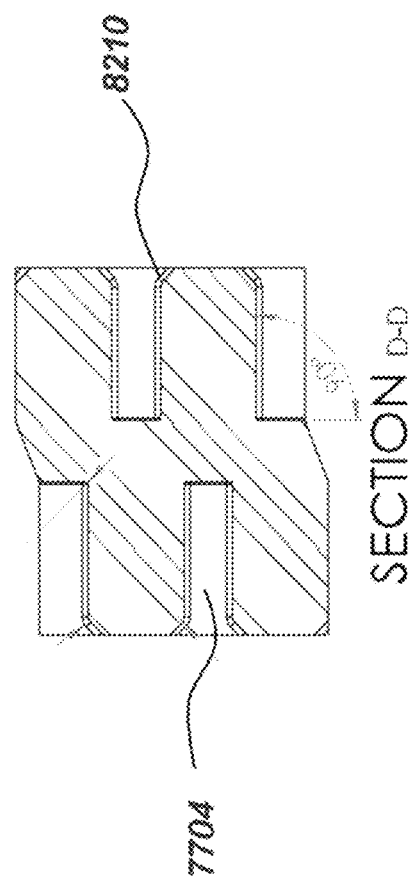
FIG. 82B illustrates a cross-sectional plan view of the thermal energy storage block according to the example implementations.

FIG. 82B shows a cross-sectional view of block 7700 along line D-D as indicated in FIG. 82. The cross-section is between the fluid flow slots 7702, such that the slots 7702 are not visible in the cross-sectional view. The cross-sectional view shows the staggered arrangement of the thermal radiation cavities 7704 on opposing sides of the block 7700. The thermal radiation cavities 7704 extend into the body of the block 7700. As shown, the cavities may extend to close to halfway into the depth of the block. The thermal radiation cavities 7704 may also be provided with an opening 8210 that widens. Such openings 8210 assist with funneling fluid into the cavities and ultimately into the fluid flow slots 7702.

Figure 83A:
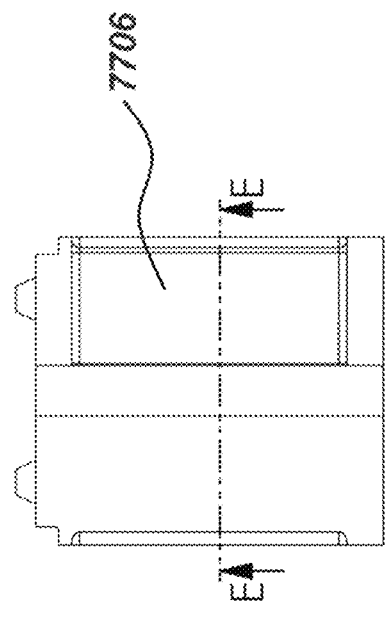
FIG. 83A illustrates a side view of the thermal energy storage block according to the example implementations.
Figure 83B:
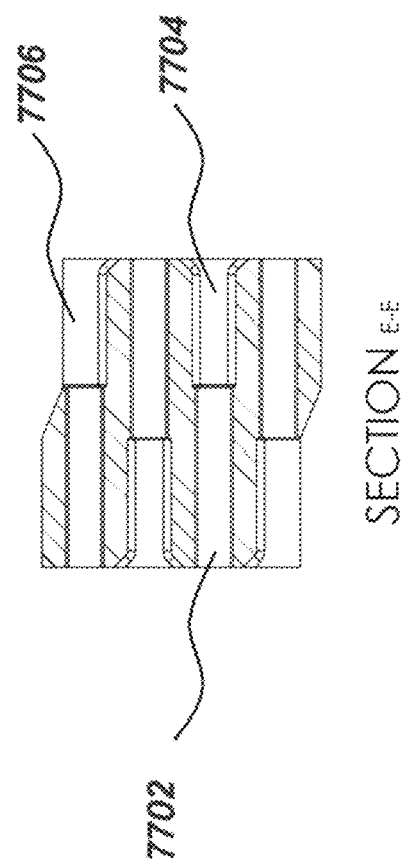
FIG. 83B illustrates another cross-sectional plan view of the thermal energy storage block according to the example implementations.

FIG. 83A shows a side view of the block 7700, corresponding to the view shown in FIG. 82A. FIG. 83B shows a cross-sectional view of block 7700 along line E-E as indicated in FIG. 83A. This cross-section is at a different height to that of the cross-section depicted in FIG. 82B. In this case, the cross-section intersects a layer of fluid flow slots 7702. As shown, the fluid flow slots 7702 extend from the rear of each of the thermal radiation cavities to the opposing face of the block, such that the thermal radiation cavities 7704, 7706, and the fluid flow slots 7702 together define fluid flow pathways through the block.

FIG. 84A shows a side view of a stacked assembly 8400, or structure, of blocks 7700. Each block 7700 is shown from the side view, as depicted in FIGS. 82A and 83A, with the fluid flow slots (not shown) extending horizontally. From the illustrated side view, there are gaps 8410 between each of the blocks 7700 in a row. The blocks in the layer above are staggered, or laterally offset, relative to the blocks 7700 in the row below.

FIG. 84B shows a cross-sectional view of the assembly along line A-A as shown in FIG. 84a. As shown in this cross-section, there are no gaps between adjacent blocks in a row in the same layer, as the blocks tessellate.

FIG. 84C shows a close-up view of the region labelled as "B" in FIG. 84B. As shown, a protrusion 7708 on the upper surface of a block 7700 in the lower layer engages a recess 7816 in the underside of a block 7700 in the layer above in the stacked arrangement.

FIG. 84D shows a plan view of the stacked assembly 8400. The blocks 7700 are arranged to tessellate to form rows in a first direction, and to have gaps 8410 between each such row in a given layer, in a second direction perpendicular to the first direction. The blocks 7700 in the layer above are laterally offset in both the first direction and a second direction (perpendicular to the first direction), such that they straddle the gaps 8410. As a result, the gaps 8410 in adjacent layers of the stack are also offset. Each block 7700 in the layer above engages four different blocks 7700 in the layer below. Consequently, the recesses 7816 of a given block 7700 in the upper layer are engaged by protrusions 7708 on four different blocks 7700 in the layer below.

Figure 85:
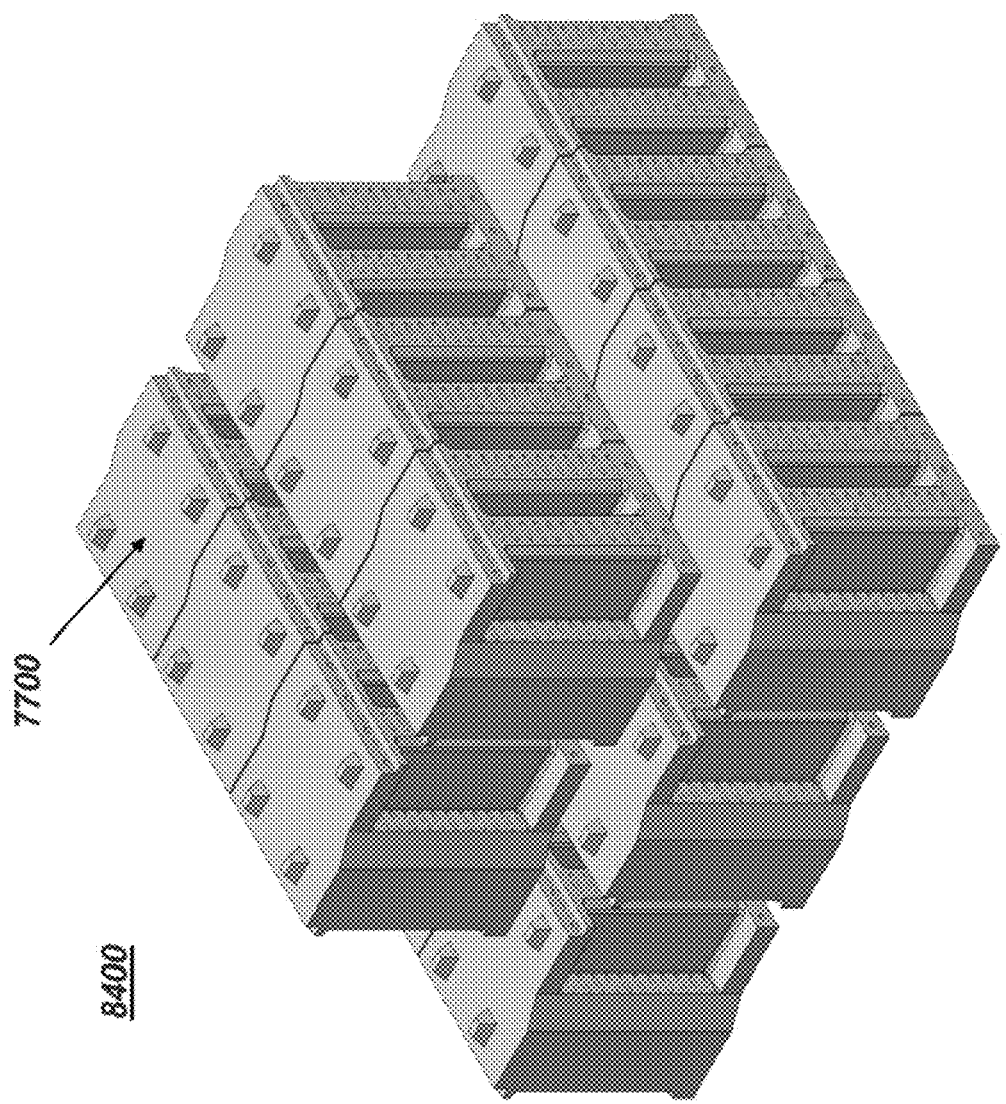
FIG. 85 illustrates a perspective view of a stacked assembly of thermal energy storage blocks according to the example implementations.

FIG. 85 shows a perspective view of the stacked assembly 8400, in which the offsetting, tessellation and gaps between the blocks 7700, as explained above, are shown.

Figure 86:
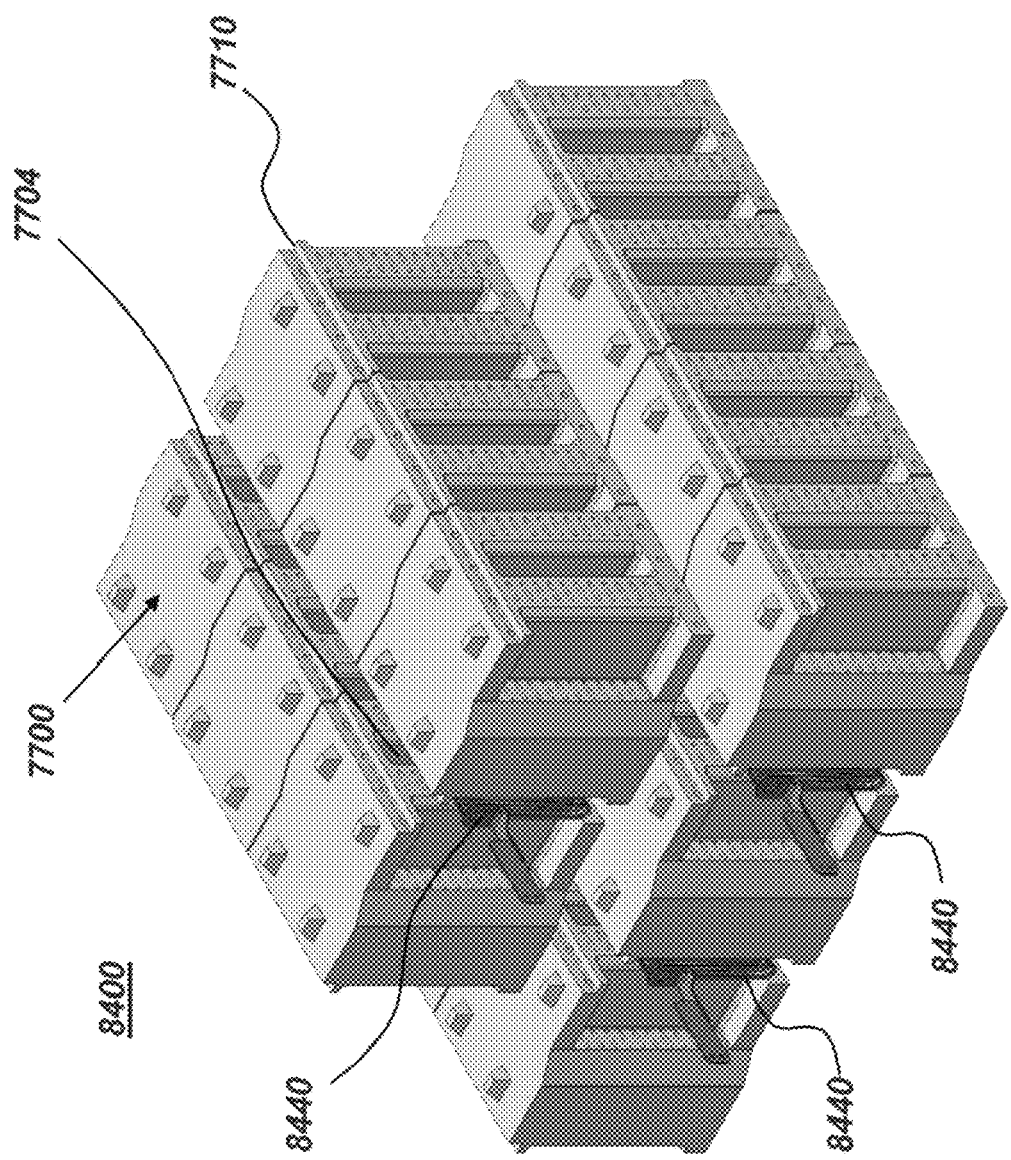
FIG. 86 illustrates a perspective view of a stacked assembly of thermal energy storage blocks including heating elements according to the example implementations.

As shown in FIG. 86, the gaps between the adjacent rows of blocks are provided to accommodate electrical heating elements 8440, in order to transfer thermal energy to the blocks for storing therein. The electrical heating elements 8440 are arranged so as to be adjacent to the thermal radiation cavities 7704. The heating elements 8440 may be arranged to span a row of thermal energy storage blocks 7700. The heating elements can be held by a support structure (not shown) that engages the integrated ledges 7710 in the blocks. The support structure (not shown) may span the gap between rows of blocks so as to engage the integrated ledges 7710 on both sides of the gap.

Figure 87:
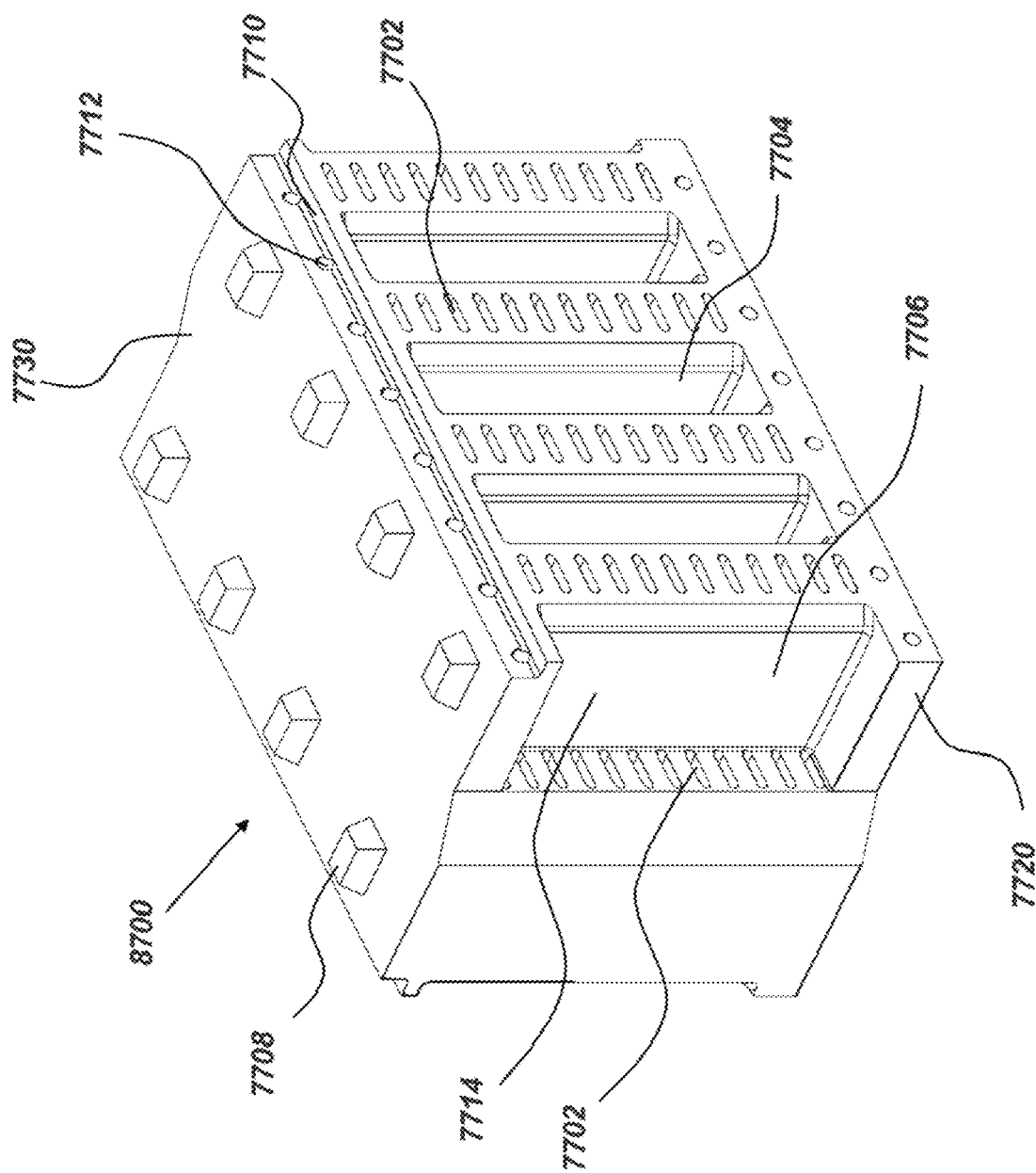
FIG. 87 illustrates a schematic perspective view of a thermal energy storage block according to the example implementations.

FIG. 87 shows an alternative implementation of a block 8700. The block 8700 has corresponding features to block 7700 as described above. Corresponding features of the block are labelled with like reference numerals. The block 8700 is provided in a wider format than block 7700. In particular, the wider block 8700 has additional rows of thermal radiation cavities 7704 and fluid flow slots 7702. As visible on the illustrated face, there are three thermal radiation cavities 7704, one partial radiation cavity 7706, and four sets (or columns) of fluid flow slots 7702. Corresponding cavities 7706 are slots 7702 are also formed in the opposing face (not shown). A given block 8700 is provided with 8 protrusions 7708 on its upper surface, and 8 corresponding recesses (not shown) on its underside. The wider format of block 8700 allows for fewer blocks to be used in forming a stacked assembly, of a given thermal storage capacity, than when smaller blocks (such as block 7700) are used.

FIG. 88A-88C shows another alternative implementation of a block 8800. The block 8800 has corresponding features to block 7700 as described above. Corresponding features of the block are labelled with like reference numerals. The block 8800 is provided in a deeper format than block 7700. From a front view, the block 8800 corresponds to block 7700, in terms of the number of thermal radiation cavities and columns of slots. With the deeper structure, the fluid flow slots 7702 and thermal radiation cavities 7704 also are required to extend further, between the opposing faces of the block, which are separated by a greater distance. The block 8800 is provided with 6 protrusions 7708 on its upper surface and 6 corresponding recesses 7816 on its underside, as shown in FIG. 88C.

Figure 89B:
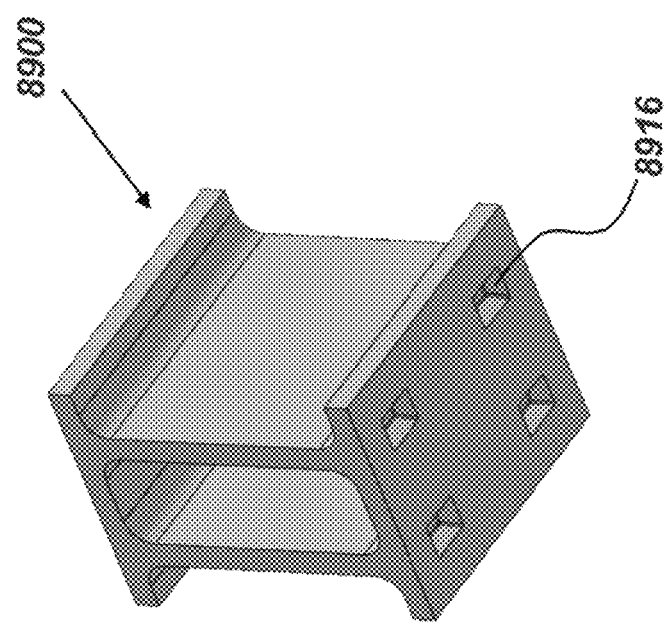
FIG. 89B illustrates a schematic perspective view of an underside of a support block for a thermal energy storage block according to the example implementations.
Figure 89A:
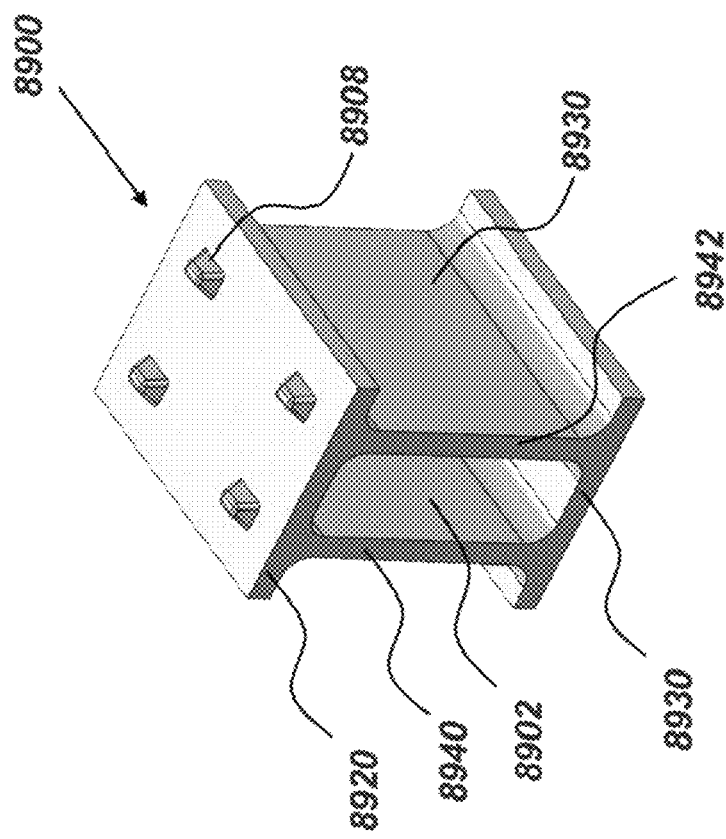
FIG. 89A illustrates a schematic perspective view of a support block for a thermal energy storage block according to the example implementations.

FIGS. 89A and 89B show perspective views of a support block 1000, or sleeper, for supporting the thermal energy storage blocks described above. The support block 1000 is designed to provide fluid flow from below the thermal energy storage blocks, and to provide thermal isolation of the thermal energy storage blocks from a surrounding medium. In particular, the thermal energy storage blocks may be heated to high temperatures that cannot be tolerated by the surrounding medium or structure.

As shown in FIG. 89A, the support block 8900 is provided with an upper platform portion 8920, an opposing base portion 8930, and a hollow channel 8902 between the upper platform portion 8920 and the base portion 8930. The hollow channel 8920 defines a fluid flow pathway through the support block, to allow fluid flow around a stacked structure of thermal energy storage blocks.

First and second opposing support walls 8940, 8942 extend between the upper platform portion 8920 and the base portion 8930. The hollow channel 8902 is bound by the upper platform portion, the base portion, and the first and second opposing support walls.

The side walls 8930 of the block are recessed, or indented, such that, in use, one or more further hollow channels are formed when the support block is placed adjacent to another of said support blocks, thereby defining one or more further fluid flow pathways. In other words, the upper platform portion 8920 and the base portion 8930 laterally extend beyond the support walls 8940, 8942, to create a recessed region which forms a partial channel.

The support block 7700 is also provided with interlock features in the form of protrusions 8908 on the upper surface of the upper platform portion of the support block. Such protrusions 8908 correspond in their form and purpose to those of the thermal energy storage block, as described above. The protrusions 8908 and can engage recesses 7816 in an underside of a thermal energy storage block, and thereby support a thermal energy storage block on the upper platform portion of the support block 8900. As depicted, 4 protrusions may be provided in a square or rectangular arrangement.

As shown in FIG. 89B, the support block 8900 may also be provided with interlock features on the underside of the base portion 8930 of the support block 8900. Such interlock features can be in the form of recesses 8916 which are configured, shaped and arranged, to be engaged by the protrusions 8908.

FIG. 90A shows a front elevation view of the support block 8900. As shown, the hollow region 1002 provides a fluid flow pathway extending through the support block.

FIG. 90B shows a plan view of the support block 8900. As shown, protrusions 8908 are arranged in a grid on an upper surface of the upper platform portion 8920 of the support block 1000.

FIG. 90C shows a view from the underside of the support block. As shown, recesses 8916 are arranged in a grid on an underside of the base portion of the support block 8900.

Figure 91:
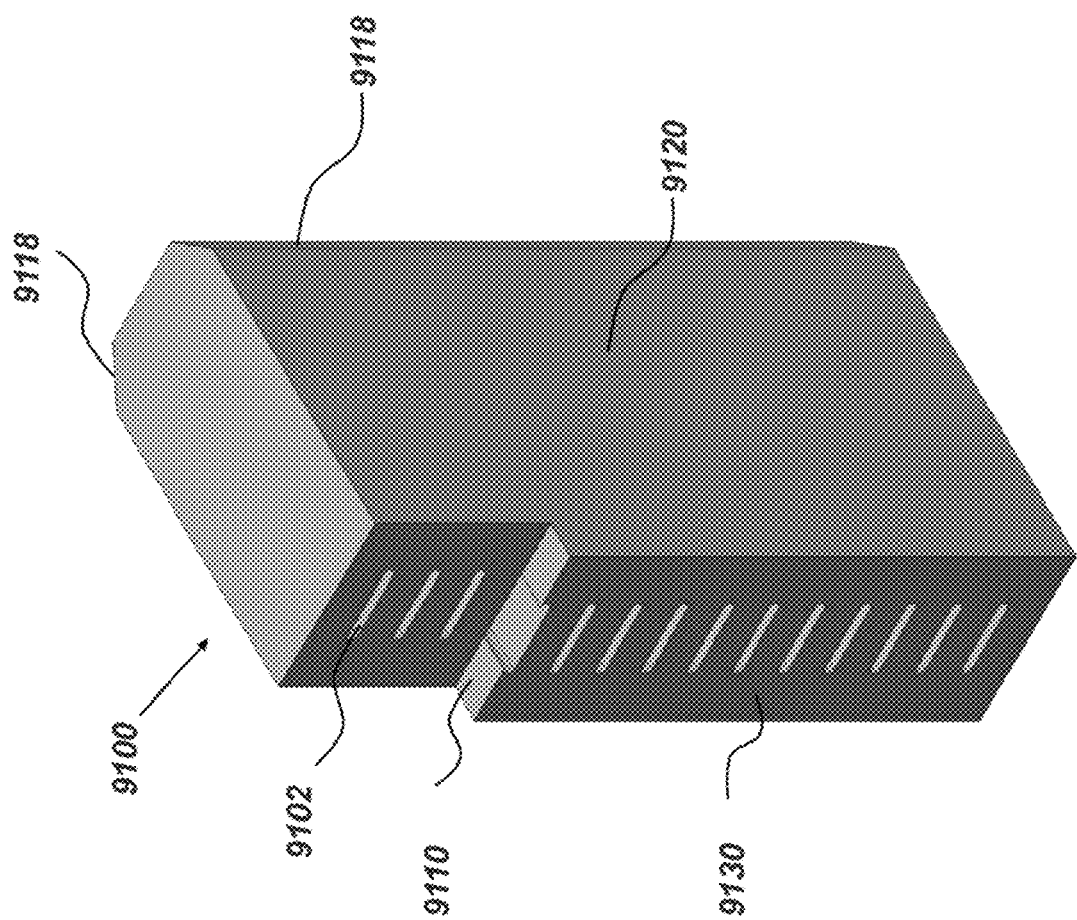
FIG. 91 illustrates a schematic perspective view of a thermal energy storage block according to the example implementations.

FIG. 91 shows a perspective view of another implementation of a thermal energy storage block 9100. This implementation facilitates faster manufacturing, in view of the simpler design. In particular, thermal radiation cavities are formed by an arrangement of a plurality of the blocks 9100 (as discussed below), instead of being formed in an individual block itself.

The block 9100 is formed in a generally parallelepiped, or cuboid, shape. A plurality of fluid flow slots 9102 extend in a first (horizontal) direction through the block 9100, and thereby define fluid flow pathways through the block 9100, in a similar manner to the fluid flow slots described above. The block 9100 is also provided with two chamfered edges 9118, which extend in a second (vertical) direction, perpendicular to the first direction. The chamfered edges 9118 are provided so that, in use, the block 9100 is configured to abut at least another of the blocks 9100 with the respective chamfered edges engaged to define a thermal radiation cavity.

The block 9100 also includes an integrated ledge 9110 configured to support heater elements, in a similar manner to the integrated ledges described above.

The chamfered edges 9118 are both provided on edges between a front face of the block 9100, into which the fluid flow slots 9102 are formed, and a side face 9120 of the block 9100, which may be a relatively wide face. The integrated ledge 9110 is provided in the opposing front face 9130 of the block 9100, into which the fluid flow slots are formed. The block 9100 is symmetric about a vertical plane which lies in the first and second directions, has its normal in a third direction perpendicular to the first and second directions, and which intersects the two front/end faces through their respective centers.

Figure 92:
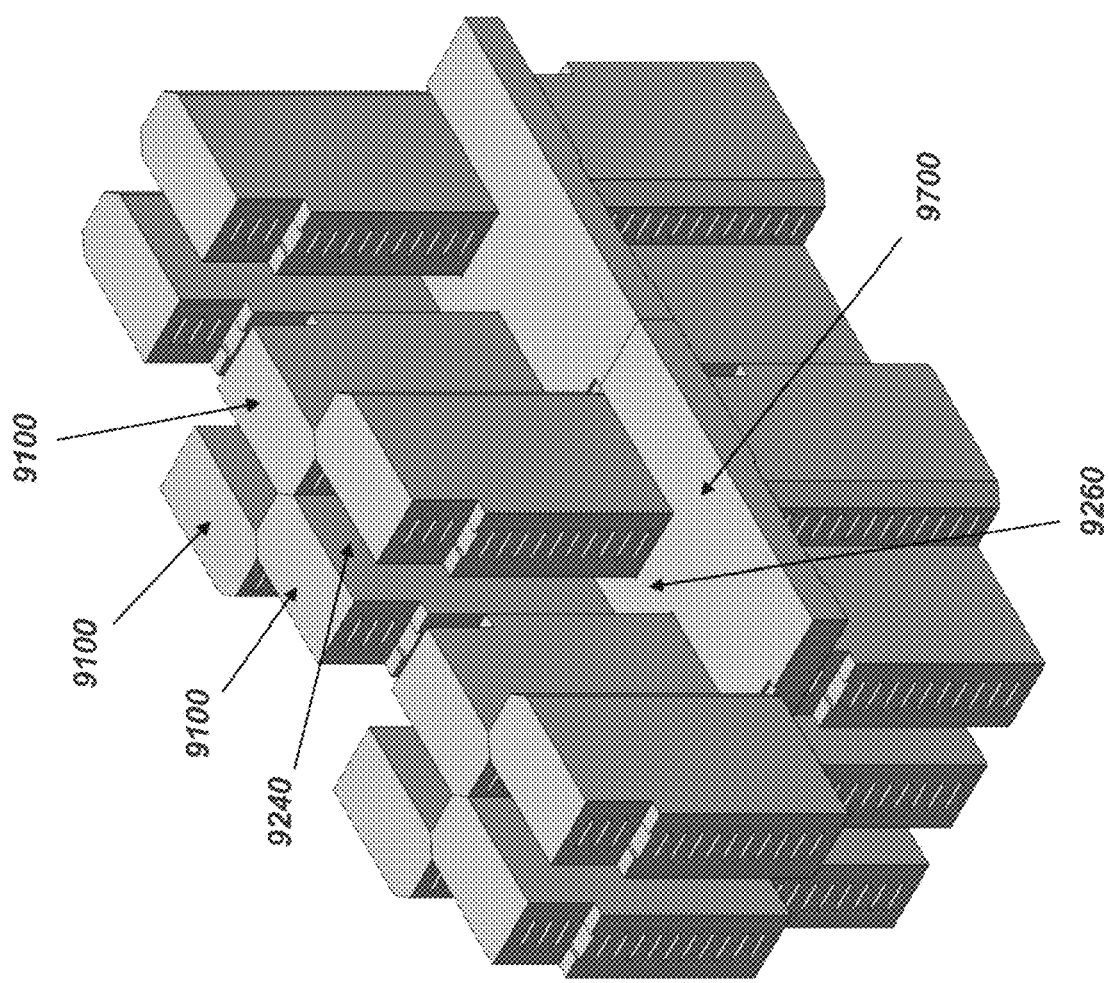
FIG. 92 illustrates a perspective view of an assembly of thermal energy storage blocks arranged on support slabs according to the example implementations.

FIG. 92 shows an assembly of blocks 9100 arranged on support slabs 9700. The support slab is described in further detail below. The blocks 9100 on the support slabs 9700 are arranged in pairs of rows extending in the third direction (perpendicular to the first and second directions, and parallel to a surface of the slabs 9700), with gaps 9240 provided between the side faces 9120 of the blocks 9100 in a given row. The next row in the pair of rows is provided directly adjacent, and facing the first row, but offset in the third direction so as to align with the gaps 9240, and so that the chamfered edges engage. As a result, the gaps 9240 form thermal radiation cavities, bound by the front/end face of one block 9100 and the side walls of two other blocks 9100. Such radiation cavities 9240 are in fluid communication with the fluid flow slots 9102 which extend through the block 9100 in the first direction. Consequently, the thermal radiation cavities 9240 together with the fluid flow slots 9102 define fluid flow pathways through the assembly. A corresponding arrangement of blocks 9100 is also provided on the underside of the slabs 9700.

Figure 93:
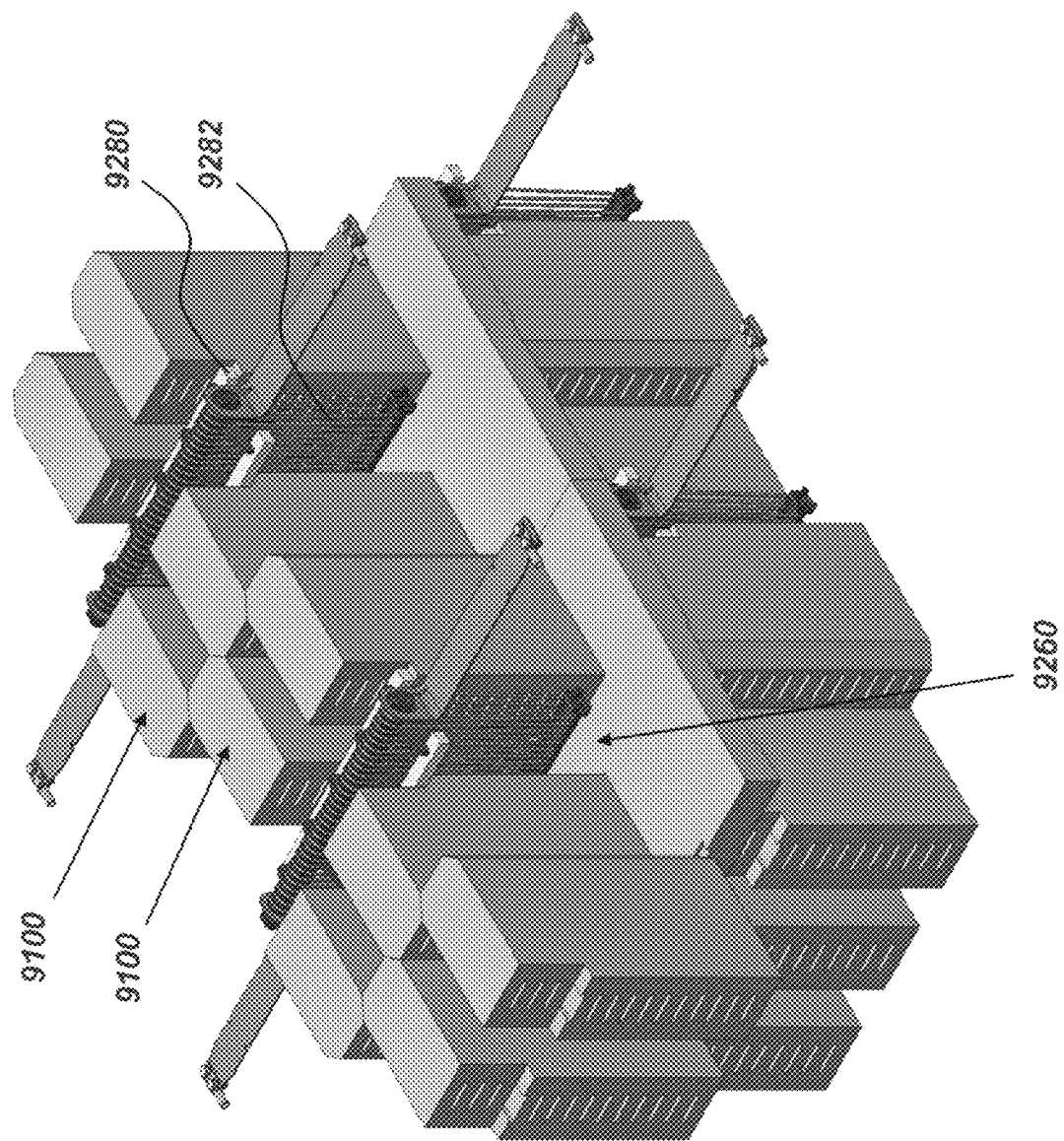
FIG. 93 illustrates a perspective view of an assembly of thermal energy storage blocks arranged on support slabs with heating elements according to the example implementations.

Pairs of rows of blocks 9100 on the slabs 9700 are arranged with a gap 9260 in between, and with their respective ledges 9110 facing one another. As a result, as depicted in FIG. 93, electrical heating elements 9282 may be positioned in the gaps 9260 between pairs of rows of blocks 9100, so as to be adjacent to the thermal radiation cavities 9240, to radiate thermal energy therein, and thereby store thermal energy in the blocks 9100. The heating elements 9282 are held by a support structure 9280 which engages the integrated ledges 9110 in the blocks.

Figure 94:
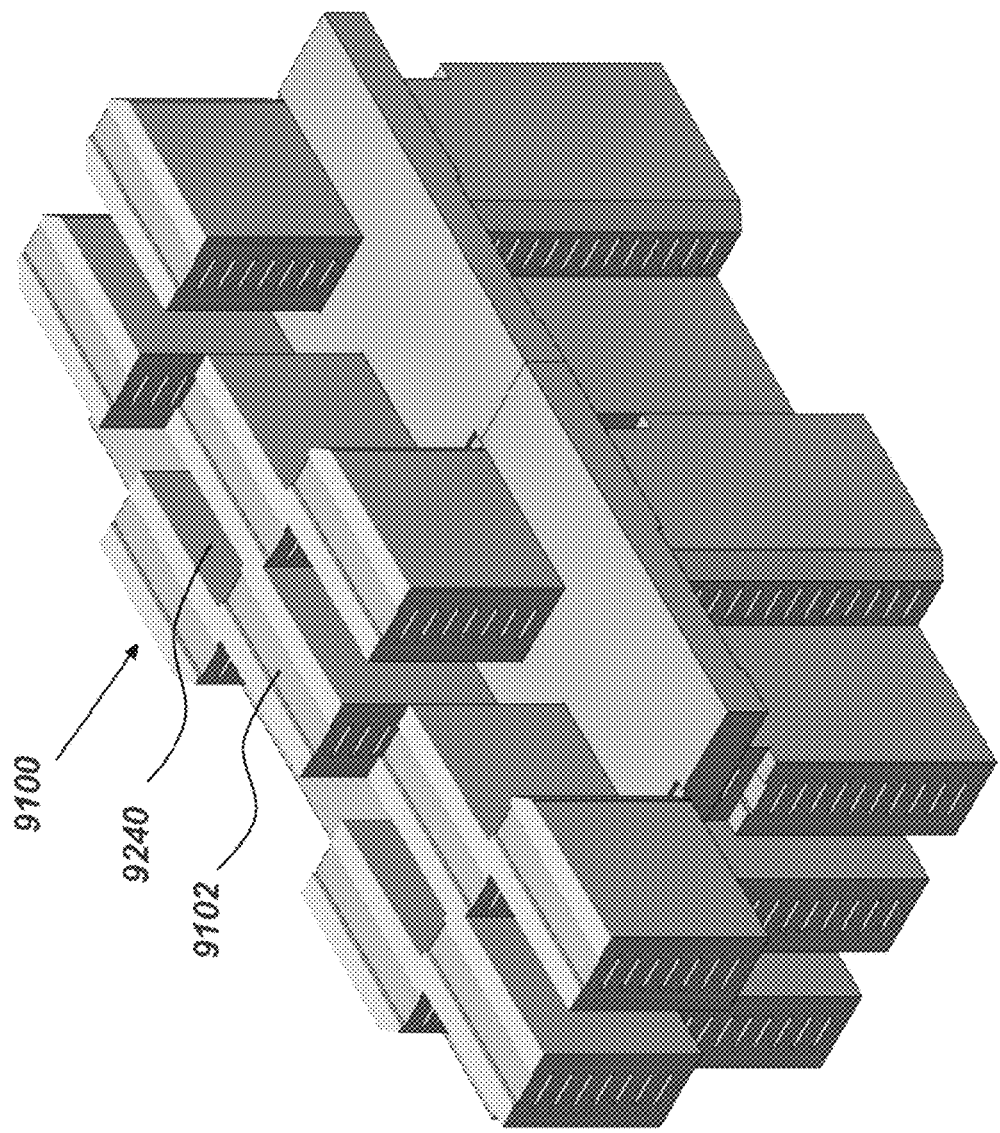
FIG. 94 illustrates a cross-sectional perspective view of an assembly of thermal energy storage blocks arranged on support slabs according to the example implementations.

FIG. 94 shows a perspective cross-sectional view of the arrangement depicted in FIG. 91. The cross-section shows the fluid flow slots 9102, in the form of a channel, extending horizontally through the block 9100, and in fluid communication with the thermal radiation cavity 9240.

Figure 95:
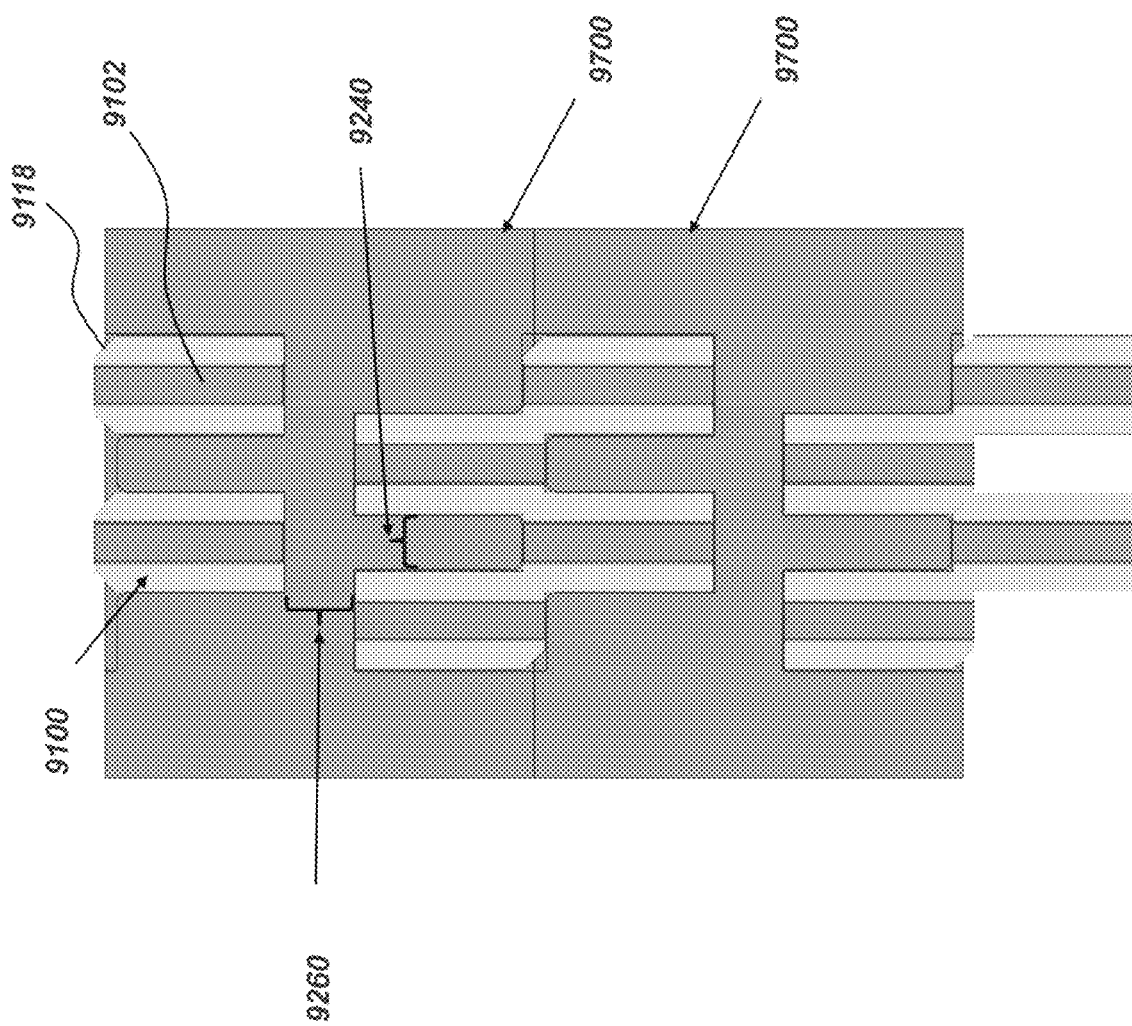
FIG. 95 illustrates a plan view of an assembly of thermal energy storage blocks arranged on support slabs according to the example implementations.

FIG. 95 shows a plan view of the arrangement of blocks 9100 described above. Each of the gaps 9240, 9260 between the rows and the blocks are shown, and the engagement of the chamfered edges 9118 is also depicted.

Figure 96:
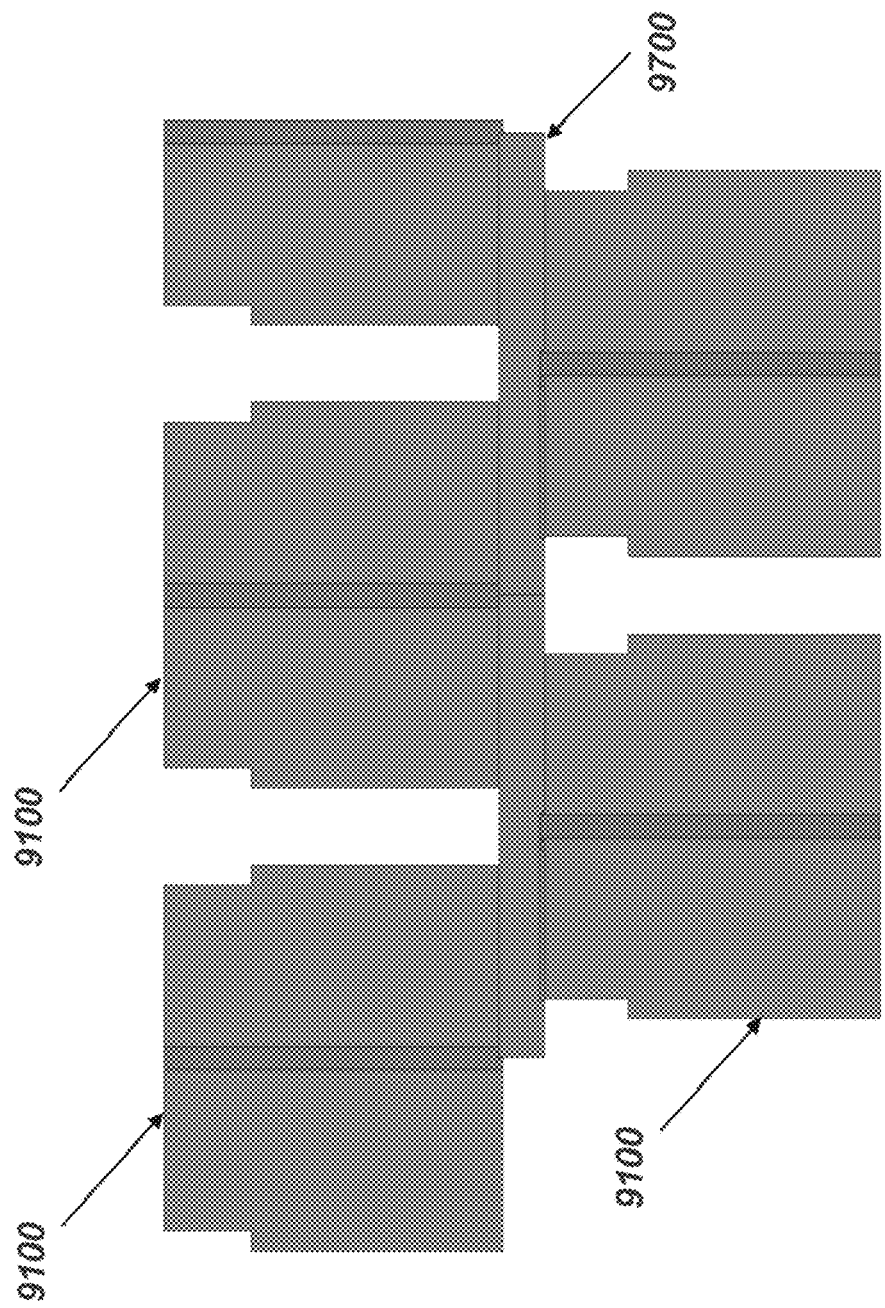
FIG. 96 illustrates a side view of an assembly of thermal energy storage blocks arranged on support slabs according to the example implementations.

FIG. 96 shows a side elevation view of the arrangement of blocks 9100 described above. Blocks 9100 are provided in a staggered, or offset, arrangement both above and below the support slabs 9700.

Figure 97:
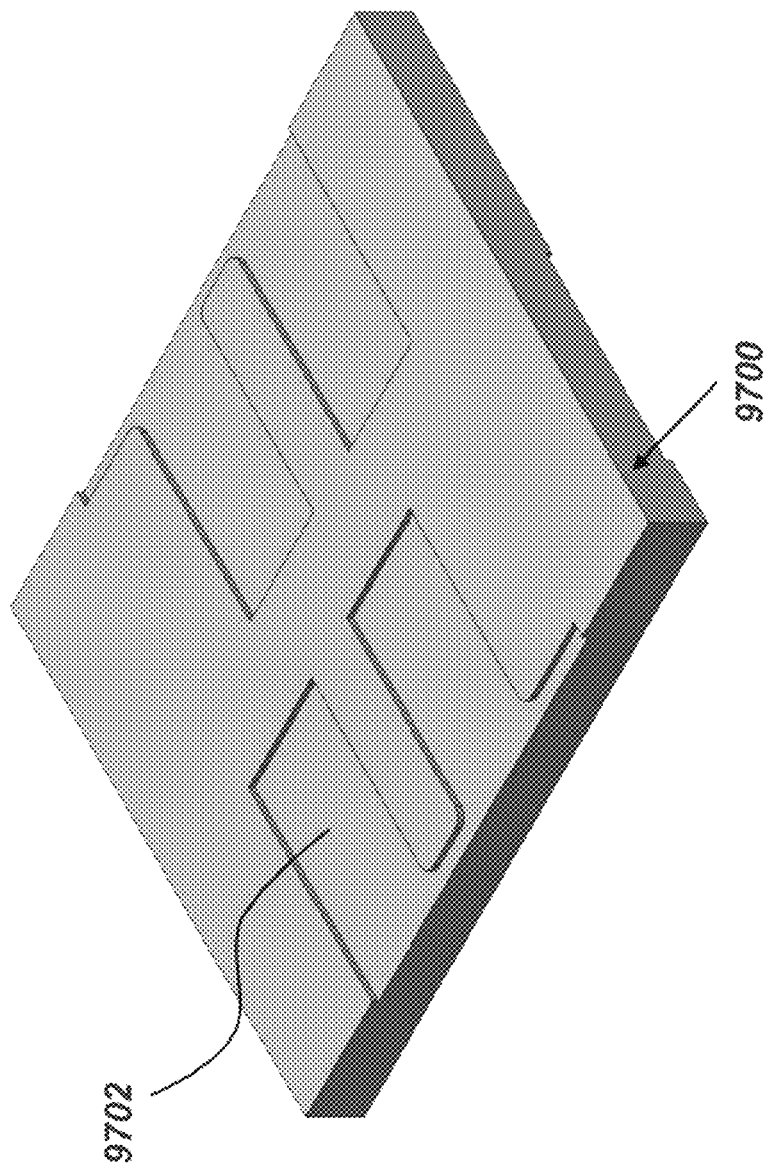
FIG. 97 illustrates a schematic perspective view of a top side of a support slab for thermal energy storage blocks according to the example implementations.

FIG. 97 shows a perspective view of a top side of support slab 9700 for use with the blocks 9100 as described above. The support slab 9700 has a plurality of recessed bays 9702 formed in an upper surface of the slab, the recessed bays each shaped and configured to retain a thermal energy storage block therein. The recessed bays are spaced apart and arranged in rows to space apart the thermal energy storage blocks in the manner described above, with the appropriate gaps to form the thermal radiation cavities, and to provide space for the electrical heater elements. Two of the support slabs 9700 may abut in the manner depicted in FIGS. 91-94, in order to create the pairs of rows of blocks 9100 described above.

In particular, the recessed bays 9702 are spaced apart and formed in rows, with the recessed bays 9702 in adjacent rows offset, such that, when blocks 9100 are disposed in respective bays 9702, the blocks 9100 form thermal radiation cavities therebetween, as described above. The recessed bays 9702 in adjacent rows are offset in a manner whereby a recessed bay in one row aligns with the center of a gap between consecutive recessed bays in the adjacent row. In this way, two of the support slabs 9700 can be combined to create the pairs of rows of blocks 9100 with thermal radiation cavities 9240 as described above.

Figure 98:
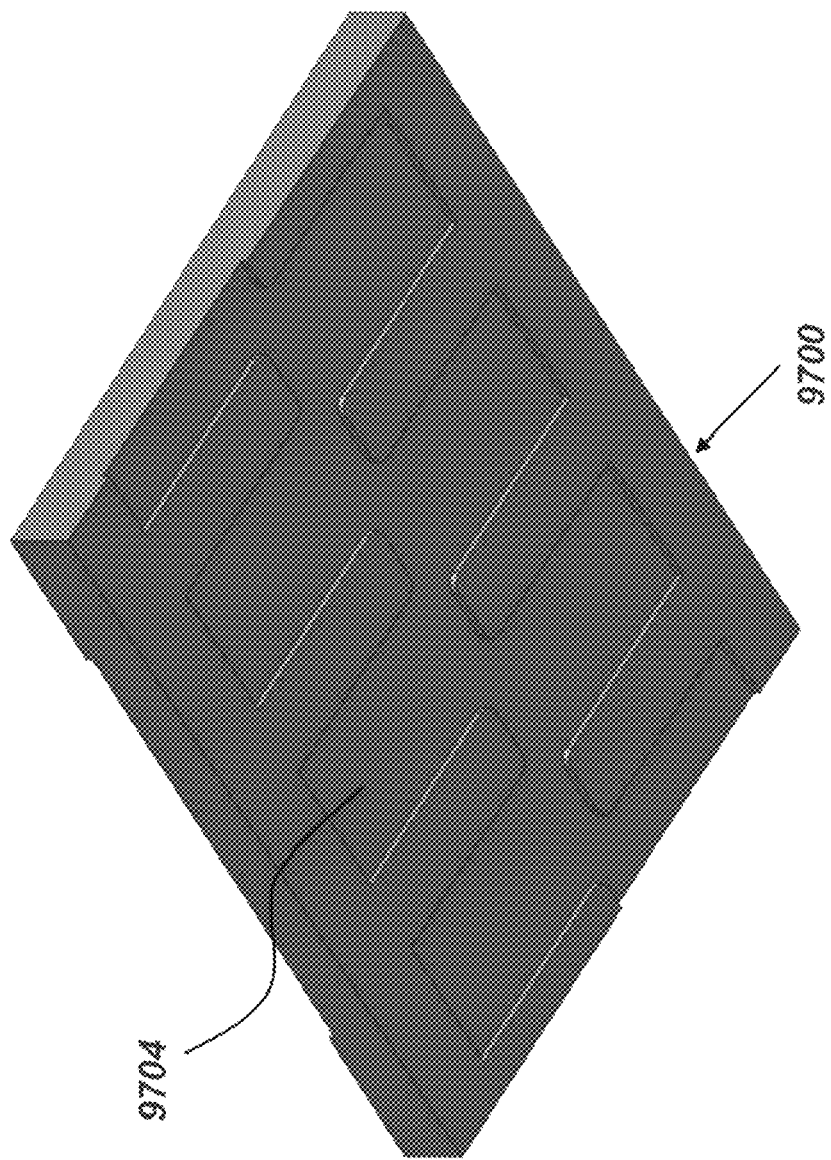
FIG. 98 illustrates a schematic perspective view of a bottom side of a support slab for thermal energy storage blocks according to the example implementations.

FIG. 98 is a perspective view of an underside of support slab 9700 for use with the blocks 9100. In a corresponding manner to the top side, the bottom side of the support slab 9700 also includes recessed bays 9704. The bays 9704 correspond in their form and arrangement to the bays formed in the upper surface of the support slab 9700, but can be laterally offset, to create the staggered configuration shown in FIG. 95. The support slab 9700 thereby enables a stacked arrangement of thermal energy storage blocks 9100 with the support slab between adjacent layers of the stack.

Summary of Claim Areas for Inventive Implementations
TES with a Raft Support Layer A thermal energy storage (TES) system, including:
a thermal energy storage medium;
a base including a support structure having multiple fluid flow channels, a first insulation layer positioned on the support structure and configured to resist a first temperature without damage and a second insulation layer adjacent the first insulation layer and configured to resist a second temperature without damage, wherein the second temperature is higher than the first temperature; and
multiple heater elements positioned to heat the storage medium via energy radiated onto at least one radiation chamber of the thermal energy storage medium.

The TES system may be configured to include one or more of the following features:

The storage medium is formed from layers of interlocking thermal storage blocks.
The support structure is positioned over a foundation of gravel.
The support structure includes metal.
The support structure includes multiple fluid flow channels.
The support structure includes reinforced concrete.
The support structure includes reinforced concrete and metal.
An insulative layer positioned adjacent the storage medium.
A securing strap positioned on an outer surface of the insulative layer and configured to seismically secure the storage medium.
A segmented outer enclosure detachably attached to the foundation, each of the segments of the outer enclosure configured to be removed and/or opened independently of the other segments.
The outer enclosures includes an upper frame, end walls, and an insulative layer.
One end of the storage medium includes at least two different types of thermal storage blocks.
The TES includes a plenum at a rectangular or terraced end of the storage medium.
The TES includes one or more support blocks beneath an inverted terrace end of the storage medium.
The TES includes one or more support blocks beneath a reverse ziggurat end of the storage medium. "Reverse ziggurat" is used here to refer to an inverted terrace configuration where upper layers protrude beyond edges of lower layers, as shown for example in the region of support blocks 3322 in FIG. 33 and support blocks 4022 in FIG. 40A.
Support tiles are positioned under the storage medium but above the insulation layers of the raft.
Piping can carry water or other fluid for cooling the support structure.

TES with Multiple Storage Assemblages and a Common Heat Exchanger/Steam Generator A thermal energy storage (TES) system including:
a first assemblage of thermal storage material;
a second assemblage of thermal storage material;
a heat exchanger assembly in fluid communication with the first assemblage and the second assemblage;
wherein the first assemblage is configured to provide a first thermal output to the heat exchanger assembly;
wherein the second assemblage is configured to provide a second thermal output to the heat exchanger assembly.

The TES system may be configured to include one or more of the following features:

The first assemblage includes multiple thermal energy storage blocks made from the thermal storage material.
The second assemblage includes multiple thermal energy storage blocks made from the thermal storage material.
At least one of the first assemblage and the second assemblage is configured to have a rectangular end.
At least one of the first assemblage and the second assemblage is configured to have a ziggurat (terraced) end.
At least one of the first assemblage and the second assemblage is configured to have a reverse ziggurat (inverted terrace) end.
A housing enclosing at least one of the first assemblage and the second assemblage, the housing being configured to withstand pressurization above atmospheric pressure.
The heat exchanger assembly includes a steam generator.

TES with Controlled Horizontal Thermocline

A thermal energy storage (TES) system, including;
a thermal energy storage assemblage including multiple substantially horizontal fluid flow pathways; and
a fluid movement system configured to provide a fluid flow of a fluid through the fluid flow pathways;
wherein the fluid movement system is configured to control a flow rate of the fluid flow to generate a substantially horizontal thermocline through the thermal energy storage assemblage.

In another implementation, the system is configured to maintain the thermocline in a substantially consistent isotherm of the fluid at an angle relative to horizontal throughout a majority of the thermal energy storage assemblage.

The TES system may be configured to include one or more of the following features:

The fluid movement system is further configured to generate the substantially consistent isotherm across a substantially vertical plane of the storage assemblage.
The fluid movement system is further configured to generate the substantially consistent isotherm of the fluid at an isotherm angle that is substantially similar to an exit angle, relative to horizontal, of an end of the storage assemblage through which the fluid flow exits.

The TES system is configured to adjust separate portions of the fluid flow for multiple horizontal levels in the thermal energy storage assemblage.

The fluid flow movement system includes at least one orifice plate positioned at least one end of the thermal energy storage system, the orifice plate including variably sized orifices configured to be adjusted to permit a variable flow rate of the fluid.

The fluid flow adjustment is achieved using at least one orifice plate with varying sizes and/or shapes of orifices in one or more orifice plates, or using a rotary orifice plate assembly.

The fluid flow movement system includes at least one of the following: adjustable valves, louvres, gates, and/or other fluid flow adjustment devices configured to be manipulated to regulate fluid flow through the fluid flow pathways.

The fluid flow pathways are of substantially equal length through selected heated portions of the storage assemblage.

Multiple blowers configured to adjust a fluid flow rate through multiple fluid flow pathways of the storage assemblage.

The TES system may include multiple heating elements that extend from a low portion of the storage assemblage to a higher portion of the storage assemblage.

The TES system has a blower at a first end of the storage assemblage configured to direct fluid into the storage assemblage to generate a heated fluid, and at least one duct at a second end of the storage assemblage configured to receive the heated fluid from the storage assemblage.

The thermal energy storage medium in the TES system includes a structured medium having multiple lateral pathways defining multiple layers in the storage assemblage, wherein the pathways are configured such that pathways in at least some different layers are not in communication with one another, to establish substantially independent fluid pathways in different layers.

The thermal storage medium may be configured to include multiple thermal storage blocks positioned in a ziggurat stack.

The thermal storage assemblage is configured to include multiple thermal storage blocks positioned in a terraced configuration.

The fluid movement system of the TES system may include an air distribution system.

The TES system includes an enclosure configured to contain a pressurized environment above atmospheric pressure around the thermal storage assemblage.

The enclosure is configured to contain at least a 2 PSI pressure above ambient in the environment outside the enclosure.

Multi-Layer Bottom Insulation and Support

A thermal energy storage (TES) system including:

a thermal energy storage assemblage positioned on a multi-layer support structure;

a heating system configured to heat the storage assemblage; and a fluid flow system configured to heat a fluid using heat from the heated storage assemblage;

wherein the support structure includes:

a first insulating layer;

a first set of pathways in the first insulating layer configured to provide a relatively cool fluid flow in the first set of pathways;

a second insulating layer adjacent the first insulating layer; and a third layer adjacent the second insulating layer and having a second set of pathways at an angle to the first set of pathways.

The support structure may be configured to include one or more of the following features:

The first insulating layer is formed from calcium silicate.

The first set of pathways positioned in a portion of the first insulating layer near the second insulating layer, configured to cool an interface between the first insulating layer and the second insulating layer.

The first set of pathways is configured to channel bypass fluid from one end of the storage medium to another end to mix with hot fluid exiting the storage medium.

The fluid flow system includes an exit region of the storage assemblage, and the first set of pathways is configured to provide a bypass channel configured to deliver the relatively cool fluid from one end of the storage assemblage to mix with heated fluid in the exit region.

The second set of pathways is configured to be passively driven by buoyancy of hot fluid rising at one end of the pathways drawing cooler air into the second set of pathways.

The second insulating layer includes cellular glass material.

The temperature at an interface between the first insulating layer and the second insulating layer does not exceed 400° C.

The temperature at an interface between the first insulating layer and the second insulating layer does not exceed 300° C.

Sealed Thermal Heat Exchanger

A thermal energy storage (TES) system including:

a thermal energy storage medium in a first enclosure, and an exhaust port on the first enclosure that opens to a second enclosure thermally insulated from the first enclosure;

wherein the second enclosure has at least one heat exchange surface configured to direct thermal energy away from the first enclosure.

The TES system may be configured to have one or more of the following features:

The second enclosure may have a return port for directing fluid back into the first enclosure.

This configuration allows for fluid in the first enclosure to be cooled by being directed into the second enclosure, but without directly mixing fluid in the second enclosure with any fluid or environment external to the TES system.

Fault Tolerant Heating Element

A heating system including:

multiple electrical heating elements, multiple heating element supports;

wherein each of the elements is configured to extend from one of the supports to another of the heating element supports;

wherein at least one of the heating element supports includes a material that is sufficiently electrically conductive to form a parallel electrical connection between all of the heating elements in contact with the material of this heating element support, such that when a fault occurs in one of heating elements, this material is configured to carry electricity to heating elements without the fault and in contact with the material of the support, rebalancing a voltage potential of the system.

The heating system may be configured to have one or more of the following features:

The heating elements include one or more metal wires.
The heating elements are made from graphite.
The heating element supports include a non-conductive material.
The material that is sufficiently electrically conductive is shaped as a busbar on one of the heating element supports.

Methods

A method for storing thermal energy including:
providing a thermal energy storage medium including multiple layers of thermal energy storage blocks, each of the layers defining multiple substantially horizontal flow pathways through the storage medium;
heating the thermal energy storage blocks with one or more heater elements; and
flowing a gas or fluid through at least one of multiple substantially horizontal flow pathways through the storage medium, wherein each of the flow pathways are fluidically isolated from one another in the storage medium;
wherein gas or fluid in one of the flow pathways traverses at least one flow channel in one of the storage blocks, at least one radiation chamber, and at least one heating element receiving channels that are all in one layer of the storage medium.

The method may further comprise:
The step of heating the thermal energy storage blocks including radiating thermal energy from one or more of the heater elements to one or more surfaces of the thermal energy storage blocks; and/or
Enclosing the storage medium in a sealed housing; and/or
The material being a refractory material.

Thermal Block Manufacturing Method

A method for manufacturing a thermal energy storage block including:
providing a thermal energy storage material;
forming multiple thermal radiation chambers in the material;
forming a first set of substantially horizontal flow channels in the material, wherein the channels are in fluid communication with at least one of the thermal radiation chambers;
forming a second set of substantially horizontal flow channels in the material, wherein the channels are in fluid communication with at least another of the thermal radiation chambers; and shaping the material such that block has an asymmetrical perimeter shape relative to a longitudinal axis of the storage block.

The method may further comprise;
Forming one or more protrusions or recesses in the material configured to engage with another energy storage block.
The material being a refractory material.

Seismic Stability Method

A method for improving seismic stability including:
providing a thermal energy storage medium formed from multiple layers of thermal energy storage blocks;
attaching a cap layer positioned over a top portion of the thermal storage medium;
positioning multiple support posts around the thermal storage medium; and coupling the cap layer to the support posts, wherein such coupling is configured to minimize lateral movements of the thermal storage medium.

The method may further comprise connecting multiple cross-braces to at least two of the support posts.

Method of Minimizing Soil Heating

A method for minimizing heating of soil including:
providing a thermal energy storage medium;
heating the thermal energy storage medium with one or more heating elements by radiating thermal energy on to one or more surfaces of the thermal energy storage medium;
isolating the thermal energy storage medium from the soil by providing a support structure between the soil and the storage medium, the support structure including:
a first insulation layer configured to resist a first temperature without damage;
a second insulation layer configured to resist a second temperature without damage, wherein the second temperature is higher than the first temperature;
multiple fluid flow channels in the support structure.

The method may further comprise;
Including a second set of fluid flow channels in the second insulation layer.
Including a layer of refractory tile above the first insulation layer.
Forming the support structure from a metal.

Method of Using a Common Heat Exchanger

A method for thermal energy storage including:
heating a first assemblage of thermal storage material;
heating a second assemblage of thermal storage material;
providing a heat exchanger assembly in fluid communication with the first assemblage and the second assemblage;
directing a first thermal output from the first assemblage to the heat exchanger assembly;
directing a second thermal output from the second assemblage to the heat exchanger assembly; and
combining the first thermal output and the second thermal output at the heat exchanger assembly.

The first assemblage may include multiple thermal energy storage blocks made from the thermal storage material.

Method of Maintaining a Horizontal Thermocline

A method for thermal energy storage including:
providing a thermal energy storage medium including multiple substantially horizontal flow pathways through the storage medium;
directing a gas or fluid through the substantially horizontal flow pathways using a fluid movement system; and
adjusting a flow rate of the fluid movement system such that a substantially horizontally oriented thermocline is maintained through the thermal energy storage medium with a consistent isotherm profile through that storage medium.

The method may further comprise;
The fluid movement system being configured to maintain the thermocline in a substantially consistent isotherm profile and angle relative to horizontal throughout a majority of the thermal energy storage medium.
Using an orifice plate as part of the fluid movement system to regulate flow through the thermal energy storage medium.
A first flow rate through a top portion of the thermal energy storage medium being greater than a second flow rate through a lower portion of the thermal energy storage medium.

Individually setting a flow rate for each level of the thermal energy storage medium.

Multiple blowers being used to regulate the flow rate, wherein each of the blowers sets a flow rate for one level of the thermal energy storage medium.

Multiple valves being used to regulate the flow rate, wherein each of the valves sets a flow rate for one level of the thermal energy storage medium.

Multiple groups of orifices being used to regulate the flow rate, wherein each of the group of orifices is used to set a flow rate for one level of the thermal energy storage medium.

Method of Minimizing Soil Heating Using Multiple Air Flow Channels

A method for minimizing heating of soil including:

providing a thermal energy storage medium;

heating the thermal energy storage medium with one or more heating elements by radiating thermal energy on to one or more surfaces of the thermal energy storage medium;

isolating the thermal energy storage medium from the soil by providing a multi-layer support structure between the soil and the storage medium, the multi-layer support structure including:

a first insulating layer;

a first set of pathways in the first insulating layer configured to provide cooling through fluid flow in the pathways; a second insulating layer, and a second insulating layer, and a third layer having a second set of pathways at an angle, optionally substantially orthogonal to the first set of pathways.

The method may further comprise;

Blowing air or gas through the first set of pathways to actively cool a portion of the first insulating layer.

Using convection to direct air or gas into the second set of pathways to passively cool a portion of the third insulating layer.

Method of Using a Sealed Thermal Heat Exchanger

A method for thermal energy storage including:

providing a thermal energy storage medium in a first enclosure;

opening an exhaust port on the first enclosure, wherein the exhaust port opens to a second enclosure around the first enclosure;

directing air or gas into the second enclosure from the first enclosure;

cooling the air or gas in the second enclosure to create cooled air or gas; and returning the cooled air or gas to the first enclosure through an inlet port connecting the first enclosure with the second enclosure, wherein the inlet port is positioned lower on the first enclosure than the exhaust port.

The method may further comprise;

The exhaust port being a quarter-turn valve.

The second enclosure having at least one heat exchange surface configured to direct thermal energy away from the first enclosure.

Method for Handling Faults in a Heater Element

A method for handling faults in a heater element including:

providing multiple electrical heating elements;

providing multiple heating element supports coupled to the heating elements, wherein at least one of the heating element supports includes a material that is sufficiently electrically conductive to form a parallel electrical connection between all of the heating elements in contact with the material of this heating element support; and rebalancing a voltage potential of the system when a fault occurs in one of heating elements by using the heating element support with the material to carry electricity to the other heating elements in contact with the material in the support and without the fault.

The heating elements may include one or more metal wires.

The claimable subject matter includes any of the systems or methods in the exemplary claims. Optionally, a method is provided comprising at least one technical feature from any of the prior features. Optionally, the method comprises at least any two technical features from any of the prior features. Optionally, a device is provided comprising at least one technical feature from any of the prior features. Optionally, the device comprises at least any two technical features from any of the prior features. Optionally, the system is provided comprising at least one technical feature from any of the prior features. Optionally, the system comprises at least any two technical features from any of the prior features.

Terminology

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic, graphite, or other composition that can generate heat. Optionally, some embodiments may use metal or other thermally conductive conduit(s) that carry molten salt, hot air, hot fluid, hot gas, or other medium for channeling heat through the conduit(s).

Further, the term furnace and reactor can be used interchangeably in the above work meant to signify the reactor of a material processing system which, for example in the case of DRI production, may be referred to as a furnace from art approaches.

Similarly, the terms describing fluid compressions devices (such as, but not limited to, blowers, compressors, fans and pumps) can be used interchangeably.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

While foregoing example implementations may refer to "air", the inventive concept is not limited to this composition, and other fluid streams may be substituted therefor for additional industrial applications, such as but not limited to, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or case of installation, integration or maintenance. As would be understood by those skilled in the art, the thermal storage units disclosed herein may be substituted with other thermal storage units having the desired properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The following patent applications and patent are directed to related technologies: U.S. patent application Ser. No. 17/537,407 (filed Nov. 29, 2021; issued as U.S. Pat. No. 11,603,776 on Mar. 14, 2023); and International Patent Application No.: PCT/US2021/061041 (filed Nov. 29, 2021). The foregoing applications and patent are incorporated herein by reference in their entirety for all purposes.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A thermal energy storage (TES) system including:
a thermal energy storage medium including multiple layers of thermal energy storage blocks, each of the layers defining multiple substantially horizontal fluid flow pathways through the storage medium;
one or more heater elements;
one or more receiving channels in the storage medium for receiving the heater elements;
wherein:
at least one first fluid flow channel in one of the storage blocks, at least one first radiation chamber, and at least one first receiving channel are configured to form a first fluid flow pathway positioned in a first layer;
at least one second fluid flow channel in one of the storage blocks, at least one second radiation chamber, and at least one second receiving channel are configured to form a second fluid flow pathway positioned in a second layer; and the first and second fluid flow channels are fluidically isolated from one another.

2. The system of claim 1 wherein at least one of the heater elements is positioned in one of the receiving channels to heat the storage medium via thermal energy radiated onto one or more surfaces of the thermal energy storage blocks.

3. The system of claim 1, including an outer housing configured to enclose the storage medium.

4. The system of claim 3 wherein the housing is sealed to provide a pressurized environment for the storage medium.

5. The system of claim 1, further including a heat exchanger configured to receive thermal output from the storage medium.

6. The system of claim 1, wherein at least some of the storage blocks include multiple radiation chambers configured to receive thermal energy radiated from the one or more heater elements.

7. The system of claim 1, wherein at least some of the storage blocks include multiple flow channels extending through at least a portion of the storage blocks.

8. The system of claim 1, wherein at least some of the storage blocks include multiple air flow channels of different sizes extending substantially horizontally through at least a portion of the storage block.

9. The system of claim 8, wherein at least some of the flow channels in a storage block are in fluid communication with the one or more radiation chambers of the storage block.

10. The system of claim 1, wherein a first storage block in one layer of the storage medium is configured to interlock with a second storage block in a second layer, forming a first interlocking region defining one surface of the heater element receiving channel.

11. The system of claim 10, wherein the first storage block is configured to interlock with a third storage block in a third layer, forming a second interlocking region defining another surface of the heater element receiving channel.

12. The system of claim 1, wherein a storage block in one layer of the storage medium is configured to interlock with at least two other storage blocks in another layer to maintain a spacing in a predetermined range between rows of storage blocks, wherein the spacing defines the heater element receiving channel.

13. The system of claim 1, wherein the storage medium has a substantially trapezoidal cross-sectional shape.

14. The system of claim 1, wherein the storage medium has a substantially ziggurat cross-sectional shape.

15. The system of claim 1, wherein the flow channels are defined at least in part by the storage blocks.

16. The system of claim 1, wherein at least some of the receiving channels extend at an angle that is non-parallel to a longitudinal axis of the thermal energy storage medium.

17. The system of claim 1, wherein at least some of the receiving channels are distributed in an alternating pattern throughout the storage medium, alternating between receiving channel and thermal storage block.

18. The system of claim 1, wherein at least one radiation chamber is defined by a first thermal storage block and a second thermal storage block positioned adjacent one another, wherein a first side wall of the first thermal storage block and a second side wall of the second thermal storage block define side walls of the radiation chamber.

19. The system of claim 1, wherein one thermal energy storage block in one layer is positioned to interlock with at least four thermal energy storage blocks in another layer.

20. A thermal energy storage block, including:

multiple thermal radiation chambers;

a first set of substantially horizontal flow channels in fluid communication with at least one of the thermal radiation chambers;

a second set of substantially horizontal flow channels in fluid communication with at least another of the thermal radiation chambers; and one or more protrusions or recesses configured to engage with another energy storage block.

21. The thermal energy storage block of claim 20, wherein the block has an asymmetrical perimeter shape relative to a longitudinal axis of the storage block configured to complement a substantially similar asymmetrical perimeter shape of another storage block and form connected radiation chambers and fluidly connected horizontal flow channels when positioned together.

22. The thermal energy storage block of claim 20, further including a third set of horizontal flow channels extending through a portion of the storage block.

23. The thermal energy storage block of claim 20, further including a fourth set of horizontal flow channels extending through a portion of the storage block.

24. The thermal energy storage block of claim 20, wherein the thermal energy storage block is formed from a refractory material.

25. The thermal energy storage block of claim 20, wherein at least some of the flow channels are configured with openings that have a size different from sizes of other openings of other flow channels.

26. The thermal energy storage block of claim 20, wherein at least one side wall of the storage block is configured to define one wall of a radiation chamber when the storage block is placed adjacent another storage block.

27. The thermal energy storage block of claim 20, including a first portion defining a first set of air flow passages, a second portion defining a second set of air flow passages, and a radiation chamber defined between the first portion and the second portion.

28. The thermal energy storage block of claim 20, wherein at least one face of the block is shaped to define a support surface configured to support a heating element.

* * * * *